(12) United States Patent
Mauney et al.

(10) Patent No.: US 8,265,691 B2
(45) Date of Patent: Sep. 11, 2012

(54) ENHANCED WIRELESS HANDSET, INCLUDING DIRECT HANDSET-TO-HANDSET COMMUNICATION MODE

(75) Inventors: Daniel Wayne Mauney, Austin, TX (US); Marc A. Sullivan, Austin, TX (US); Charles A. Green, Austin, TX (US); Steven A. Harbin, Austin, TX (US)

(73) Assignee: Bertrum Technologies LLC, Wilmington, DE (US)

( * ) Notice: Subject to any disclaimer, the term of this patent is extended or adjusted under 35 U.S.C. 154(b) by 0 days.

(21) Appl. No.: 13/230,458

(22) Filed: Sep. 12, 2011

(65) Prior Publication Data
US 2012/0015614 A1 Jan. 19, 2012

Related U.S. Application Data

(60) Continuation of application No. 13/014,065, filed on Jan. 26, 2011, now Pat. No. 8,019,381, which is a continuation of application No. 12/659,684, filed on Mar. 17, 2010, now Pat. No. 7,885,684, which is a continuation of application No. 10/838,112, filed on May 3, 2004, now Pat. No. 7,693,542, which is a continuation of application No. 09/968,856, filed on Oct. 3, 2001, now Pat. No. 6,865,372, which is a division of application No. 09/094,600, filed on Jun. 15, 1998, now Pat. No. 6,484,027.

(51) Int. Cl.
*H04M 1/00* (2006.01)

(52) U.S. Cl. ............... 455/552.1; 455/41.2; 455/517; 455/518; 455/519; 455/458; 455/553.1; 455/566; 455/574

(58) Field of Classification Search ........ 455/41.1–41.2, 455/502, 507, 514–515, 517–519, 566, 90.1–90.2, 455/445, 550.1, 552.1, 553.1, 572, 574, 522, 455/101–103, 458–466; 370/400–410, 310–311, 370/254–255; 375/211–212; 707/1, 2, 6, 707/100–102
See application file for complete search history.

(56) References Cited

U.S. PATENT DOCUMENTS
4,935,927 A * 6/1990 Kaewell et al. ............... 370/506
(Continued)

FOREIGN PATENT DOCUMENTS
EP 0 671859 9/1995
(Continued)

OTHER PUBLICATIONS

"Cellular Phone and Roaming Service," www.members.tripod.com/peacecraft/infomining/cellphon.htm; 19.
(Continued)

*Primary Examiner* — Tuan A Tran
(74) *Attorney, Agent, or Firm* — Connolly Bove Lodge & Hutz LLP

(57) ABSTRACT

A wireless handset is provided with enhanced features and capabilities. The wireless handset may be embodied as a full-featured handset that is capable of operating either within a wireless network (such as a cellular or PCS network) or in a direct handset-to-handset communication mode that is independent of the wireless network. Alternatively, the wireless handset may be embodied as a special purpose handset, that is capable of simply operating in a direct handset-to-handset communication mode. The wireless handset may additionally include features for supporting and enhancing direct communication between handsets. Such features may include a find feature that permits a user to determine which objects, including other wireless handset users, are located within a predetermined operating range of the wireless handset. A memorize feature may also be provided to permit handsets and other objects exchange information by wireless transmission.

20 Claims, 72 Drawing Sheets

DIRECT HANDSET-TO-HANDSET COMMUNICATION

U.S. PATENT DOCUMENTS

| Patent | | Date | Inventor | Class |
|---|---|---|---|---|
| 4,989,230 | A * | 1/1991 | Gillig et al. | 455/552.1 |
| 5,127,042 | A * | 6/1992 | Gillig et al. | 455/552.1 |
| 5,142,695 | A * | 8/1992 | Roberts et al. | 455/437 |
| 5,155,759 | A * | 10/1992 | Saegusa et al. | 455/463 |
| 5,218,716 | A | 6/1993 | Comroe et al. | |
| 5,247,567 | A | 9/1993 | Hirano | |
| 5,260,988 | A | 11/1993 | Schellinger et al. | |
| 5,353,331 | A | 10/1994 | Emery et al. | |
| 5,367,558 | A | 11/1994 | Gillig et al. | |
| 5,375,161 | A | 12/1994 | Fuller et al. | |
| 5,412,654 | A * | 5/1995 | Perkins | 370/312 |
| 5,442,680 | A | 8/1995 | Schellinger et al. | |
| 5,461,666 | A * | 10/1995 | McMahan et al. | 379/88.04 |
| 5,469,496 | A | 11/1995 | Emery et al. | |
| 5,502,724 | A | 3/1996 | Chen et al. | |
| 5,515,366 | A | 5/1996 | Chieu et al. | |
| 5,541,583 | A | 7/1996 | Mandelbaum | |
| 5,550,895 | A | 8/1996 | Burson et al. | |
| 5,553,117 | A | 9/1996 | Peterson et al. | |
| 5,581,594 | A | 12/1996 | McAfee | |
| 5,594,777 | A | 1/1997 | Makkonen et al. | |
| 5,606,560 | A | 2/1997 | Malek et al. | |
| 5,636,243 | A | 6/1997 | Tanaka | |
| 5,644,620 | A | 7/1997 | Shimura | |
| 5,661,788 | A * | 8/1997 | Chin | 379/142.01 |
| 5,673,308 | A | 9/1997 | Akhavan | |
| 5,706,284 | A | 1/1998 | Lee | |
| 5,737,325 | A | 4/1998 | Fukuda | |
| 5,745,850 | A | 4/1998 | Aldermeshian et al. | |
| 5,748,147 | A | 5/1998 | Bickley et al. | |
| 5,771,463 | A | 6/1998 | Lehmusto et al. | |
| 5,781,860 | A | 7/1998 | Lopponen et al. | |
| 5,790,938 | A | 8/1998 | Talarmo | |
| 5,809,417 | A | 9/1998 | Nealon et al. | |
| 5,842,112 | A | 11/1998 | Fuller et al. | |
| 5,896,375 | A | 4/1999 | Dent et al. | |
| 5,905,956 | A | 5/1999 | Young et al. | |
| 5,907,794 | A | 5/1999 | Lehmusto et al. | |
| 5,909,183 | A | 6/1999 | Borgstahl et al. | |
| 5,950,133 | A | 9/1999 | Bledsoe | |
| 5,978,367 | A | 11/1999 | Kinnunen et al. | |
| 5,995,500 | A | 11/1999 | Ma et al. | |
| 5,995,839 | A | 11/1999 | Coursey et al. | |
| 6,029,065 | A | 2/2000 | Shah | |
| 6,032,051 | A | 2/2000 | Hall et al. | |
| 6,047,178 | A | 4/2000 | Frian | |
| 6,069,588 | A | 5/2000 | O'Neill, Jr. | |
| 6,069,896 | A | 5/2000 | Borgstahl et al. | |
| 6,091,949 | A | 7/2000 | Sanchez | |
| 6,108,540 | A | 8/2000 | Sonti et al. | |
| 6,125,287 | A * | 9/2000 | Cushman et al. | 455/566 |
| 6,130,938 | A | 10/2000 | Erb | |
| 6,134,437 | A * | 10/2000 | Karabinis et al. | 455/427 |
| 6,141,531 | A | 10/2000 | Williams et al. | |
| 6,154,300 | A | 11/2000 | Cho | |
| 6,185,427 | B1 | 2/2001 | Krasner et al. | |
| 6,188,888 | B1 | 2/2001 | Bartle et al. | |
| 6,201,950 | B1 | 3/2001 | Fuller et al. | |
| 6,208,854 | B1 | 3/2001 | Roberts et al. | |
| 6,253,091 | B1 | 6/2001 | Naddell et al. | |
| 6,289,218 | B1 | 9/2001 | Liu | |
| 6,301,350 | B1 | 10/2001 | Henningson et al. | |
| 6,320,534 | B1 | 11/2001 | Goss | |
| 6,332,082 | B1 | 12/2001 | Fuller et al. | |
| 6,362,778 | B2 | 3/2002 | Neher | |
| 6,373,817 | B1 | 4/2002 | Kung et al. | |
| 6,373,829 | B1 | 4/2002 | Vilmur | |
| 6,377,668 | B1 * | 4/2002 | Smock et al. | 379/142.08 |
| 6,424,840 | B1 | 7/2002 | Fitch et al. | |
| 6,477,384 | B2 | 11/2002 | Schroderus et al. | |
| 6,480,593 | B1 | 11/2002 | Munday et al. | |
| 6,484,027 | B1 * | 11/2002 | Mauney et al. | 455/421 |
| 6,516,060 | B1 | 2/2003 | Foladare et al. | |
| 6,574,470 | B1 | 6/2003 | Chow et al. | |
| 6,587,475 | B1 | 7/2003 | Przygienda | |
| 6,587,683 | B1 | 7/2003 | Chow et al. | |
| 6,590,928 | B1 * | 7/2003 | Haartsen | 375/134 |
| 6,611,681 | B2 | 8/2003 | Henderson | |
| 6,636,489 | B1 | 10/2003 | Fingerhut | |
| 6,735,432 | B1 | 5/2004 | Jarett et al. | |
| 6,766,175 | B2 | 7/2004 | Uchiyama | |
| 6,856,806 | B1 | 2/2005 | Bosik et al. | |
| 6,865,372 | B2 * | 3/2005 | Mauney et al. | 455/41.2 |
| 6,871,063 | B1 | 3/2005 | Schiffer | |
| 7,693,542 | B2 * | 4/2010 | Mauney et al. | 455/552.1 |
| 7,885,684 | B2 * | 2/2011 | Mauney et al. | 455/552.1 |
| 8,019,381 | B2 * | 9/2011 | Mauney et al. | 455/552.1 |
| 2001/0014599 | A1 | 8/2001 | Henderson | |
| 2002/0111190 | A1 | 8/2002 | Harrison et al. | |
| 2003/0036350 | A1 | 2/2003 | Jonsson et al. | |
| 2003/0039242 | A1 | 2/2003 | Moore | |
| 2003/0092451 | A1 | 5/2003 | Holloway et al. | |
| 2004/0072544 | A1 | 4/2004 | Alexis | |
| 2004/0116073 | A1 | 6/2004 | Mauney et al. | |
| 2004/0266425 | A1 | 12/2004 | Gonsalves et al. | |
| 2005/0020236 | A1 | 1/2005 | Mauney et al. | |
| 2005/0032475 | A1 | 2/2005 | Mauney et al. | |
| 2005/0054335 | A1 | 3/2005 | Pearson et al. | |
| 2005/0063360 | A1 | 3/2005 | Lowmaster | |
| 2005/0063528 | A1 | 3/2005 | Pearson et al. | |
| 2005/0064853 | A1 | 3/2005 | Radpour | |
| 2005/0064855 | A1 | 3/2005 | Russell | |
| 2005/0159107 | A1 | 7/2005 | Mauney et al. | |

FOREIGN PATENT DOCUMENTS

| | | |
|---|---|---|
| EP | 0 713345 | 5/1996 |
| GB | 2305078 | 3/1997 |
| GB | 2136271 A | 2/1998 |
| JP | 8-163646 | 6/1996 |
| JP | 8-172673 | 7/1996 |
| JP | 8-294168 | 11/1996 |
| JP | 8-294170 | 11/1996 |
| JP | 8-317468 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98476 | 4/1997 |
| WO | WO-94/05101 | 3/1994 |

OTHER PUBLICATIONS

Webopedia: "Short Message Service," www.webopedia.com/TERM/S/Short.sub.--Message.sub.--Service.html; Mar. 12, 2002; 3 pages.

Gupta, Puneet, "Short Message Service: What, How and Where?"; Wireless Developer Network; www.wirelessdevnet.com/channels/sms/features/sms.html.

Verb Exchange Service—Tagline—One Number gets me everywhere; www.verbx.com/srv/service.sub.--tagline.html; 2002; 1 page.

Zbar, Jeff, "Follow-me phone service keeps remote worker tethered to clients, co-workers"; NetworkWorldFusion; www.nwfusion.com/net.worker/columnists/2002/0826zbar.html; Aug. 26, 2002; 7 pages.

www.officescape.com/services.asp; Follow-me phone; 2000-2003, 1 page.

Callagenix "call diversion service"; www.callegenix.com/services/diversion.html; Mar. 2003, 3 pages.

English Language Abstract of JP No. 9-98476.
English Language Abstract of JP No. 9-84117.
English Language Abstract of JP No. 9-55981.
English Language Abstract of JP No. 9-37345.
English Language Abstract of JP No. 8-322087.
English Language Abstract of JP No. 8-317468.
English Language Abstract of JP No. 8-294170.
English Language Abstract of JP No. 8-294168.
English Language Abstract of JP No. 8-172673.
English Language Abstract of JP No. 8-163646.

Bluetooth Consortium, "Specification of the Bluetooth System: Profiles"; Dec. 1, 1999.

Haartsen, J., "Bluetooth: A New Radio Interface Providing Ubiquitous Connectivity", IEEE, pp. 107-111, Dec. 2000.

Schneiderman, R., "Bluetooth's Slow Dawn", IEEE, pp. 61-65, Dec. 1999.

"Infrared Data Association Serial Infrared Link Access Protocol (IrLAP)"; Timothy Williams et al.; Version 1.1, Jun. 16, 1996.

* cited by examiner

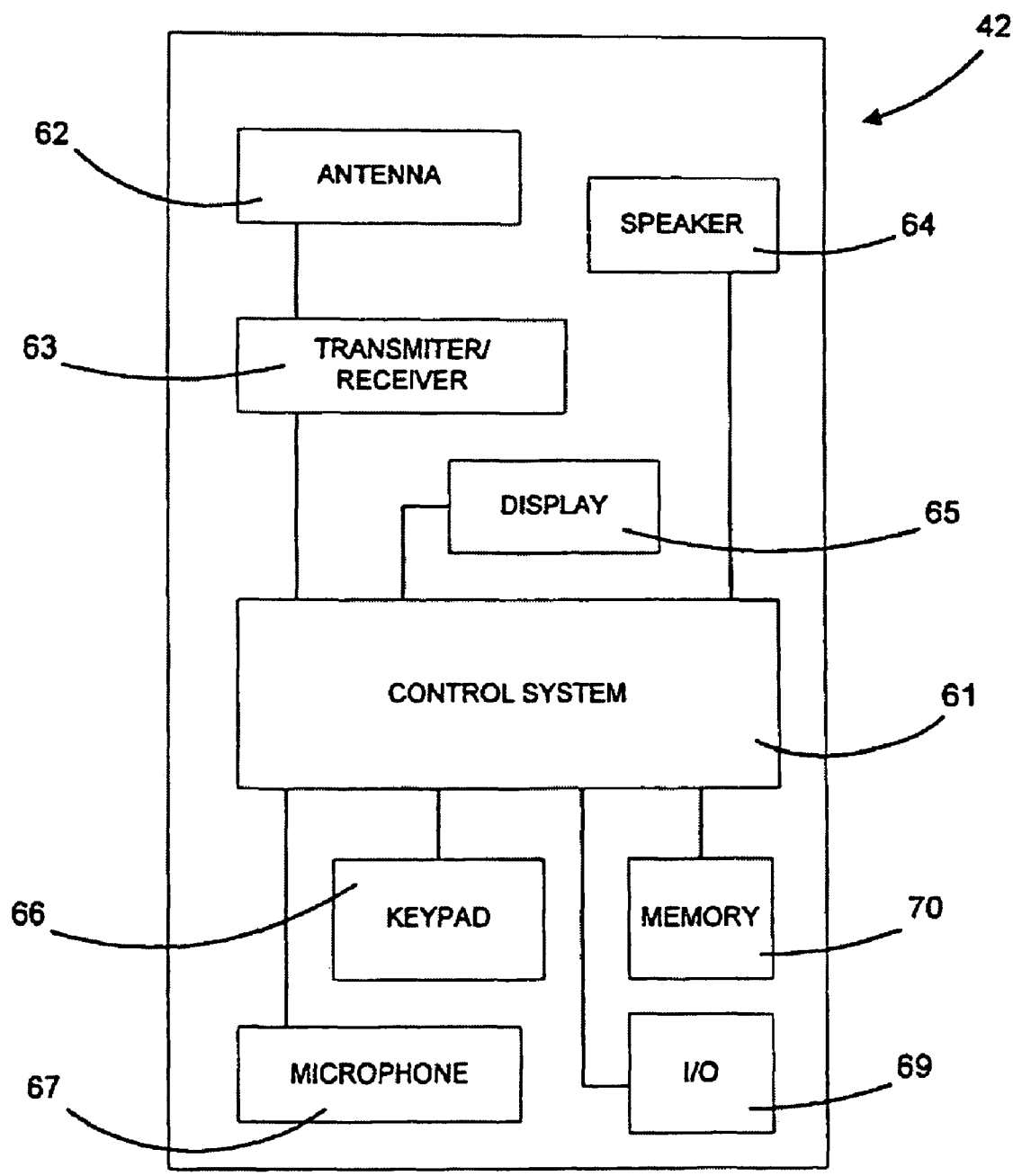

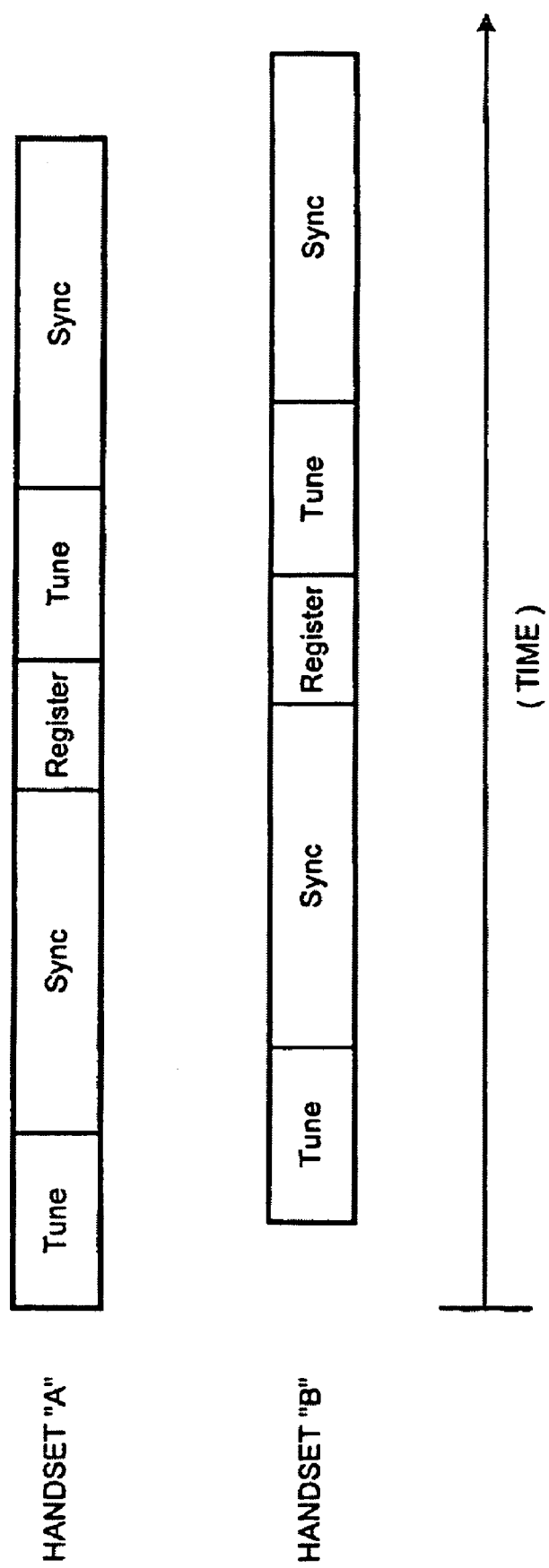

FIG. 18B

|  | TS1 | TS2 | TS3 |
|---|---|---|---|
| Handset A | | | |
| Transmit | C | ATBR | ATCR |
| Receive | C | CTAR | BTAR |
| Handset B | | | |
| Transmit | C | BTCR | BTAR |
| Receive | C | ATBR | CTBR |
| Handset C | | | |
| Transmit | C | CTAR | CTBR |
| Receive | C | BTCR | ATCR |

FIG. 18C

|  | TS1 | TS2 | TS3 |
|---|---|---|---|
| Handset A | | | |
| Transmit | C | ATBR | ATCR |
| Receive | CTAR | BTAR | C |
| Handset B | | | |
| Transmit | BTCR | BTAR | C |
| Receive | C | ATBR | CTBR |
| Handset C | | | |
| Transmit | CTAR | C | CTBR |
| Receive | BTCR | C | ATCR |

ENHANCED WIRELESS HANDSET, INCLUDING DIRECT HANDSET-TO-HANDSET COMMUNICATION MODE

CROSS REFERENCE TO RELATED APPLICATION

This is a continuation of co-pending U.S. patent application Ser. No. 13/014,065, filed on Jan. 26, 2011, which is a continuation application of U.S. patent application Ser. No. 12/659,684, filed on Mar. 17, 2010 (now U.S. Pat. No. 7,885, 684), which is a continuation application of U.S. patent application Ser. No. 10/838,112, filed on May 3, 2004 (now U.S. Pat. No. 7,693,542), which is a continuation application of U.S. patent application Ser. No. 09/968,856, filed on Oct. 3, 2001 (now U.S. Pat. No. 6,865,372), which is a divisional application of U.S. patent application Ser. No. 09/094,600, filed on Jun. 15, 1998 (now U.S. Pat. No. 6,484,027), the contents of all are expressly incorporated herein by reference in their entirety.

BACKGROUND OF INVENTION

The present invention generally relates to the field of communications and the use of wireless handsets. More particularly, the present invention relates to wireless handsets with enhanced functionality, including the ability to operate within a wireless network and in a direct handset-to-handset communication mode.

Acronyms

The written description provided herein contains acronyms which refer to, for example, various communication services, components and techniques, as well as features relating to the present invention. Although some of these acronyms are known, use of these acronyms is not strictly standardized in the art. For purposes of the written description herein, acronyms will be defined as follows:
Citizens Band (CB)
Complimentary Metal Oxide Semiconductor (CMOS)
Customer Premise Equipment (CPE)
Electronically Erasable Programmable Read Only Memory (EEPROM)
Federal Communications Commission (FCC)
Group System for Mobile Communications (GSM)
Interim Standard (IS)
Liquid Crystal Display (LCD)
Mobile. Identification Number (MIN)
Mobile Switching Center (MSC)
Mobile Telephone Switching Office (MTSO)
Number Assignment Module (NAM)
Personal Access Communication System (PACS)
Personal Communications Network (PCN)
Personal Communications Services (PCS)
Personal Handyphone Systems (PHS)
Public Land Mobile Network (PLMN)
Plain Old Telephone Service (POTS)
Public Switched Telephone Network (PSTN)
Random Access Memory (RAM)
System Access List (SAL)
Supervisory Audio Tone (SAT)
System Identification Code (SID)
Subscriber Identity Module (SIM)
System Operator Code (SOC)
Signal Strength (SS)
Transmission Control Protocol/Internet Protocol (TCP/IP)
Time Division Multiple Access (TDMA)

BACKGROUND AND MATERIAL INFORMATION

Traditionally, wireless handsets have been provided to facilitate mobile communications. Such handsets are typically assigned a unique wireless or mobile identification number. By dialing the number assigned to the handset, a user may attempt to access a wireless handset user through the wireless network infrastructure. The wireless network may facilitate communications between two mobile wireless handset users, or between a user located at a fixed location (such as, for example, a Plain Old Telephone Service (POTS) station location) and a wireless handset user. In addition, the wireless network may comprise a cellular network or a mobile telephone network to facilitate communication.

Wireless networks enable mobile station users to roam over large geographic areas while maintaining immediate access to communication services. Mobile station users often carry their handsets or have them installed in their vehicle(s). Mobile stations comprising cellular telephones or wireless handsets may be operable in cooperation with cellular or Personal Communications Services (PCS) communications systems. Cellular communication systems typically provide service to a geographic area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCs) through landlines and/or other communication links. The MSCs may, in turn, be connected via landlines to the Public Switched Telephone Network (PSTN).

FIG. 1 illustrates the main components of a conventional cellular network. As shown in FIG. 1, a wireless handset 38 may place or receive calls by communicating with a cell site 30 or a cell site 40, depending upon the location of the wireless handset and the cell coverage area that is provided by each cell site (i.e., cell coverage area 35 of cell site 30 or cell coverage area 45 of cell site 40). For purposes of illustration, wireless handset 38 is depicted in FIG. 1 as being able to communicate with either cell site 30 or cell site 40, even though the wireless handset is not illustrated as being located within cell coverage area 35 or cell coverage area 45. Under normal operating conditions, the extent to which wireless handset 38 will be able to communicate with cell site 30 or cell site 40 will depend on the geographic location of the wireless handset and the size of the cell coverage area of each cell site. Further, although only two cell sites are depicted in FIG. 1, the entire cellular network may include, for example, more than two cell sites. In addition, more than one cell site may be connected to each MSC and more than one wireless handset 38 may be operating within each cell site.

Wireless handset 38 may include a conventional cellular telephone unit with a transceiver and antenna (not shown) to communicate by, for example, radio waves with cell sites 30 and 40. Various air-interface technologies may be implemented to facilitate communication between each wireless handset and the cell sites. Cell sites 30 and 40 may both include a radio transceiver (not shown) and be connected by landlines 16 or other communication links to MSCs 24, 28. A PSTN 12 is also connected to each of the MSCs 24, 28 by landline 16 or other communication links. PSTN 12 may also be connected to fixed Customer Premise Equipment (CPE) 6 (which may include telephone equipment) by communication or trunked lines 10.

The MSCs 24, 28 may be conventional digital telephone exchanges that control the switching between PSTN 12 and the cell sites 30 and 40 to provide wireline-to-mobile, mobile-to-wireline and mobile-to-mobile call connectivity. Each MSC may perform various functions, including: (i) processing mobile station status data received from the cell site controllers; (ii) handling and switching calls between cells; (iii) processing diagnostic information; and (iv) compiling billing information. The transceiver (not shown) of each cell site 30 and 40 provides communications, such as voice and data, with each wireless handset 38 while it is present in its geographic domain. The MSCs 24, 28 may track and switch wireless handset 38 from cell site to cell site, as the wireless handset passes through various coverage areas. When wireless handset 38 passes from one cell to another cell, the MSC of the corresponding cell may perform a "hand-off" that allows the wireless handset to be continuously serviced.

In the current North American cellular system, any given area may be serviced by up to two competing service providers of cellular airtime communication services. By Federal Communications Commission (FCC) regulations, the two competing cellular service providers are assigned different groups of frequencies within the 800-900 MHZ region through which services are provided. A frequency set typically includes control channels and voice channels. The control channels are used for preliminary communications between a mobile station and a cell site for setting up a call, after which a voice channel is assigned for the mobile station's use on that call. The assigned frequency sets are generally referred to as "A band frequencies" and "B band frequencies". Typically, the A band frequencies are reserved for non-wireline service providers, while the B band frequencies are reserved for wireline service providers. While each frequency set for a given cellular service area is assigned to only one service provider, in different service areas the same frequency set may be assigned to different service providers or companies. Cellular service providers often charge usage fees for airtime since they have to purchase or license the wireless bandwidth over which cellular calls take place, and because they have to maintain their wireless network. The FCC, however, has also designated unlicensed bands in Northern America which do not require a license to operate on if the transmit power is sufficiently low. For example, the 902-928 MHZ Industrial, Scientific and Medical band is unlicensed in the United States. This band is commonly used for home cordless telephones and is well suited for voice communications at limited distances.

Depending upon which cellular service provider is subscribed to by the user of the wireless handset, the home frequency set of the user may correspond to the A frequency band or the B frequency band. Whenever a call is placed by the mobile station or wireless handset, the unit will ordinarily attempt to use the home frequency set to establish the call. If a call is handled outside of the user's home network area, then the unit is said to be "roaming" and service will be attempted through a frequency set of the preferred service provider in that area. Typically, the user's home service provider will have a roaming agreement or reciprocal billing arrangement with the non-home service provider to permit service to be extended to the user's wireless unit when it is roaming in the non-home service provider's service area.

The wireless handset may include a memory device, such as a number assignment module (NAM), in which an assigned phone number (MIN) and a system identification code (SID) is stored to uniquely identify the home service provider for the unit. In addition, the wireless handset may store a unique Electronic Serial Number (ESN) that is assigned to the wireless handset. In the North American cellular system, each cellular market or provider is assigned a distinct, fifteen bit SID. In Europe, on the other hand, the Global System for Mobile Communications (GSM) standard (see, for example, Recommendation GSM 02.11, Service Accessibility, European Telecommunications Standards Institute, 1992) defines a process for network selection based on the wireless handset reading the GSM equivalent of the SID, called the Public Land Mobile Network (PLMN) identity. The SID or equivalent system identification number is broadcast by each service provider or cellular provider and is used by the wireless handset to determine whether or not the wireless handset is operating in its home network or if it is operating in a roaming condition. The wireless handset makes this determination by reading the SID that is broadcast in the cellular market in which it is located, and comparing it to the home SID stored in the NAM of the cellular phone unit. If the SIDs do not match, then the wireless handset is roaming, and the mobile station must attempt to gain service through a non-home service provider. Due to the imposition of a fixed surcharge or higher per unit rate, the airtime charges when the mobile station is roaming are customarily higher than when it is operating within its home network.

When a wireless handset is switched ON, the handset scans the group of control channels to determine the strongest cell site or base station signal. Control channels are primarily involved in setting up a call and moving it to an unused voice channel. When a telephone call is placed, a signal is sent to the cell site or base station. The MSC usually dispatches the request to all base stations in the cellular system. The MIN which is assigned as the phone number to the wireless handset is then broadcast as a paging message throughout the cellular system. When the wireless handset receives the page, the handset identifies itself to the base station it received the page from (usually the strongest base station) and informs the MSC of the "handshake". The MSC then instructs the base station to move the call to an unused channel. As noted above, the MSC may also provide access to the PSTN once a channel is established.

Operation under a roaming condition is often under the control of the wireless handset user. The user can select whether the mobile station will operate in a Home System Only, A Band Only, B Band Only, A Band Preferred, or B Band Preferred operating mode. The user typically controls the system preference and mode operation through menu choice or selection. This current method of roaming control is conventionally known as "Preferred System Selection". In the most common roaming situation, the wireless handset remains on the same band as the home cellular network. That is, if the wireless handset is homed to a cellular network with an odd numbered SID (which is normally assigned to an A band cellular service provider), then the wireless handset will obtain service from the A band cellular service provider when roaming.

In addition to conventional cellular network systems, Personal Communications Services (PCS) systems are also available. PCS covers a broad range of individualized communication services. However, providing cellular or PCS services is costly. To recover these costs, a subscriber is normally required to pay a monthly fee and additional fees may be charged for time spent talking on the wireless handset (often referred to as airtime). Some service plans may give a subscriber a certain number of minutes of airtime free per month and then charge for every minute over that allotment. Other plans may charge for every minute spent using the wireless handset. In addition, the subscriber is often required to purchase the wireless handset or sign a multi-year service contract. Additional charges may also be incurred for service features (such as voice mail) or using the wireless handset in other service markets. Roaming charges can be costly, especially where preferred roaming carriers are not available.

Forms of wireless or mobile communication that do not incur these fees are also available. For example, cordless phone systems, land mobile radio systems, CB radios and walkie-talkies are available. Cordless phone technologies are often utilized in home or office environments and operate over unlicensed bands to provide wireless or cordless phone capabilities via a cordless phone base station. Cordless phone units typically employ a manufacturer's proprietary protocol to manage full duplex communications between the handset and a single cordless phone base station connected to a phone line. Further, land mobile radio, systems, CB radios, walkie-talkies and radios using the new family band provide half duplex (push-to-talk) wireless voice commination over extended ranges (e.g., at ranges up to 2 miles). These devices communicate directly by broadcasting voice signals over channels that are shared with anyone who buys a similar device and desires to listen in to the conversation.

Such technologies do, not incur fees, since they do not rely upon a wireless network infrastructure or service provider, such as with cellular or PCS units. However, these devices also suffer from several drawbacks. For example, cordless phone systems operate over limited ranges and do not support direct handset-to-handset communication, since all calls are handled through the cordless phone base station. Cordless phone units also have limited capabilities and operating features that restrict their usefulness. Further, while land mobile radio systems, CB radios, walkie-talkies and other radio systems provide direct communication between units over extended ranges, such devices do not provide any level of privacy since all signals are broadcasted by the units and may be received by other parties. In addition, radio devices only provide half-duplex communications and require that users manually select similar operating channels.

In recent years, Personal Handyphone System (PHS) handsets have been provided as an alternative and more economical solution for wireless communications. PHS systems utilize low powered handsets and a micro-cell network architecture including a large number of cell stations to provide coverage. Each cell station picks up a carrier at random from those available and selects a carrier on the basis of least interference. A traffic channel is then allocated to provide wireless communications. PHS systems also provide other features, such as user authentication, location registration and seamless handover during calls. PHS systems, however, have not been commercially successful in many developed countries (including the United States and Germany) and have limited handset features.

In view of the foregoing, there is presently a need for a full-featured wireless handset that includes enhanced features or capabilities to provide a user with greater flexibility and optimum performance. For example, many users would benefit from a full-featured wireless handset that is capable of operating within a wireless network (such as a cellular phone, PCS or PHS network), as well as operating in a direct handset-to-handset mode within a limited range but without the utilization of a wireless network. Since direct handset-to-handset calls avoid the use of a wireless network, users would be provided with the benefit of being able to place calls free of the wireless network and with little or no airtime charges (i.e., monthly service or use charges could be applied to the user by the supplier of the wireless handset). A full-featured wireless handset with such functionality would have broad appeal to many users and could be applied to many applications to permit users to reduce their cellular phone charges. There is also a need for an improved wireless handset that has enhanced features, and which does not suffer from the drawbacks of existing communication devices, such as those described herein. For example, a wireless handset that is capable of operating in a direct handset-to-handset communication mode would be beneficial if it included enhanced features, such as full-duplex, private communication, dynamic channel allocation and handset locating capabilities. Such features would eliminate the need for users to prearrange or manually select operating channels (which is a common drawback in radio systems such as CB radios) and provide full duplex communication free of a communication network and without incurring substantial airtime charges.

Various user groups and industries would benefit from such an enhanced wireless handset. For example, the functionality of such a wireless handset is currently needed by mobile crews, on-site mobile personnel, businesses, teachers, teenagers and families. Mobile crew workers, including contractors, electricians, plumbers, tow truck drivers and caterers, have a strong need for such a wireless handset to enable such personnel to keep in contact with one another at various job sites and to facilitate collaboration on projects at a substantial cost savings. On-site mobile personnel, such office building employees and personnel, security personnel, and warehouses, as well as teachers and other faculty members would also benefit from such a wireless handset, by enabling them to keep contact with other personnel and departments while spending much of their day in transit or in remote locations of the job site. In addition, there is a need for an enhanced, wireless handset communication device by teenagers and families which wish to keep in contact with one another during social events or vacations. Such a device would also provide an inexpensive solution for locating one another and preventing parties from being lost or separated.

SUMMARY OF THE INVENTION

In view of the foregoing, the present invention, through one or more of its various aspects, embodiments and/or specific features or subcomponents thereof, is thus intended to bring about one or more of the objects and advantages as discussed below.

An object of the present invention is to provide a fully featured, wireless handset that provides greater flexibility and operating capabilities for users.

In addition, an object of the invention is to provide a wireless handset that is inexpensive to operate and that includes enhanced features and capabilities.

A further object of the invention is to provide a wireless handset that is capable of operating in a direct handset-to-handset communication mode.

Another object of the present invention is to provide a wireless handset that has enhanced operating features, including the capability of operating either within a wireless network or outside of a wireless network in a direct handset-to-handset communication mode.

Still another object of the present invention is provide a wireless handset that is capable of providing full-duplex communication and performing dynamic channel allocation to establish communication with another handset.

Yet another object of the present invention is to provide a wireless handset with enhanced features, such as a find feature that assists a handset operator in determining what objects, including other handset users, are located within the handset's operating range.

Another object of the invention is to provide a wireless handset that includes a memorize feature, which permits a wireless handset to exchange information conveniently and securely with another handset or object by wireless transmission.

In addition, an object of the invention is to provide a plurality of enhanced features for a wireless handset, including find features, memorize features, conference call features and short range messaging features.

Accordingly, an enhanced wireless handset is provided that is capable of operating within a traditional wireless network or in a direct handset-to-handset communication mode. The wireless handset includes enhanced operating features, including find features for locating objects, including other wireless handsets, paging devices and beeping devices or clips attached to items (such as keys, tools, pets, etc.), that are within range of the wireless handset. In order to provide such features, the wireless handset is implemented with: means for initiating a find feature to determine if at least one specified object is within range of the wireless handset; means for generating a query message over a control channel based on the initiation of the find feature; means for detecting a positive response message from the specified object in reply to the query message; and means for indicating, based on the positive response message being detected by the detecting means, that the specified object is within range of the wireless handset.

According to an aspect of the invention, the wireless handset may include a find list that comprises a plurality of entries, wherein each of the entries includes information for specifying at least one object. The information of each entry in the find list may include the name and/or ID associated with the object specified by the entry. The initiating means may initiate a find feature based on the information of at least one entry of the find list. The wireless handset may also include means for selecting an entry in the find list to specify an object, whereby the initiating means initiates a specific find request based on the object specified by the entry of the find list selected with the selecting means to determine if the selected object is within range of the wireless handset. When no entry in the find list is selected with the selecting means, the initiating means may initiate a general find request based on each object specified by the plurality of entries of the find list in order to determine which objects on the find list are within range of the wireless handset.

In accordance with another aspect of the invention, the indicating means may comprise means for recording information to a found list based on the positive response message and means for displaying the found list to indicate that the specified object is within range of the wireless handset. The wireless handset may also include means for detecting when a response has not been received, within a predetermined wait time, from the specified object in reply to the query message, and means for alerting that the object was not found when the detecting means detects that a response has not been received. The query message may comprise an ID of the specified object and an ID of the wireless handset that generated the query message. Means for detecting a signal strength of the positive response message may also be provided, and the indicating means may indicate the detected signal strength of the positive response message to the user of the wireless handset.

In accordance with another aspect of the invention, a method is provided for locating objects, such as other wireless handsets, paging devices and beeping devices or clips, that are within range of a wireless handset. The method comprises: initiating a find feature to determine if at least one specified object is within range of the wireless handset; generating a query message over a control channel based on the initiation of the find feature; detecting a positive response message from the specified object in reply to the query message; and recording information to a found list based on the positive response message to indicate that the specified object is within range of the wireless handset.

The method may further comprise providing a find list comprising a plurality of entries, and initiating a find feature based on information of at least one entry of the find list, wherein the information of each entry in the find list specifies at least one object to be located. The method may also provide selecting an entry in the find list to specify an object and initiating a find feature based on the object specified by a selected entry of the find list to determine if the selected object is within range of the wireless handset. When it is detected that no entry in the find list has been selected, a general find request may be initiated based on each object specified by the plurality of entries of the find list to determine which objects on the find list are within range of said wireless handset.

The present invention also relates to a wireless handset with enhanced operating features, including find features for locating objects (such as other wireless handsets) that are within range of the wireless handset. In accordance with an aspect of the invention, the wireless handset comprises: means for initiating a find feature to determine if at least one specified object is within range of the wireless handset; means for tuning to a registry channel based on the initiation of the find feature; means for receiving a registry message on the registry channel from the at least one specified object in response to the query message; and means for recording information based on the registry message received from the at least one specified object.

The information that is recorded by the recording means may include the name and/or ID associated with the specified object. Further, the recording means may record the information to a found list to indicate that the specified object is within range of the wireless handset. Alternatively, the information that is recorded by the recording means may comprise the ID associated with the specified object and a channel for contacting the specified object. In such a case, the recording means may record the information to a temporary list of the wireless handset. Further, means for generating a query message over the channel for contacting the specified object may be provided, as well as means for detecting a positive response message from the specified object in reply to the query message.

The wireless handset may also comprise means for indicating, based on the positive response message detected by the detecting means, that the specified object is within range of the wireless handset, means for recording information to a found list based on the positive response message, and means for displaying the found list to indicate that the specified object is within range of the wireless handset. In this case, the information that is recorded by the recording means may indicate a channel for contacting the specified object and a slot time for contacting the specified object on the channel.

In accordance with another aspect of the invention, a method is provided for locating objects that are within range of a wireless handset. The objects to be located may comprise other wireless handsets, paging devices and beeping devices or clips attached to items. In general, the method may comprise: initiating a find feature to determine if at least one specified object is within range of the wireless handset; tuning to a registry channel based on the initiation of the find feature; receiving a registry message on the registry channel from the at least one specified object in response to the query message; and recording information based on the registry message received from the at least one specified object.

The information that is recorded may include the name and/or ID associated with the specified object. Further, in the disclosed method, information may be recorded to a found list to indicate that the specified object is within range of the wireless handset.

According to another aspect of the invention, a wireless handset with enhanced operating features is provided, wherein the enhanced operating features comprise a memorize feature for exchanging information with objects, including other wireless handsets that are capable of operating in a communication mode with the wireless handset. To implement the memorize feature, the wireless handset may comprise: means for initiating a memorize feature with at least one object; means for generating a query message based on the initiation of the memorize feature to request a response from the at least one object; means for receiving a positive response message from the at least one object in reply to the query message; and means for recording information based on the positive response message received from the at least one object.

The information that is recorded by the handset may include an ID or number associated with the at least one object. Further, the generating means may generate the query message at a reduced power level when the at least one object is in close proximity to the wireless handset, so that the query message is not received by other objects.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIG. 4A is an exemplary block diagram of the main components of a wireless handset, in accordance with an aspect of the present invention;

FIG. 11C is an illustration of the manner in which handsets may register sequentially on a control channel;

FIGS. 18A, 18B and 18C illustrate an embodiment for providing three-way conferencing through the use of time domain multiplexing;

DETAILED DESCRIPTION OF THE PREFERRED EMBODIMENTS

Referring to the accompanying drawings, a detailed description of the preferred embodiments and features of the present invention will be provided.

The present invention relates to a wireless handset that includes enhanced features to provide greater flexibility and optimum performance. According to an aspect of the present invention, a wireless handset is provided that permits a user to operate either within a wireless network or to communicate with another user in a direct handset-to-handset operating mode. The direct handset-to-handset communication mode provides full-duplex, two-way communication without utilizing a wireless network infrastructure. In addition, as further described herein, the wireless handset of the present invention includes features that enhance the operability and functionality of the handset. Such features include a find or locate feature that assists a handset operator in determining what other handset users are located within the operating range of the wireless handset. These and other features and aspects of the present invention will now be described in greater detail with reference to the accompanying drawings.

Figure 1:
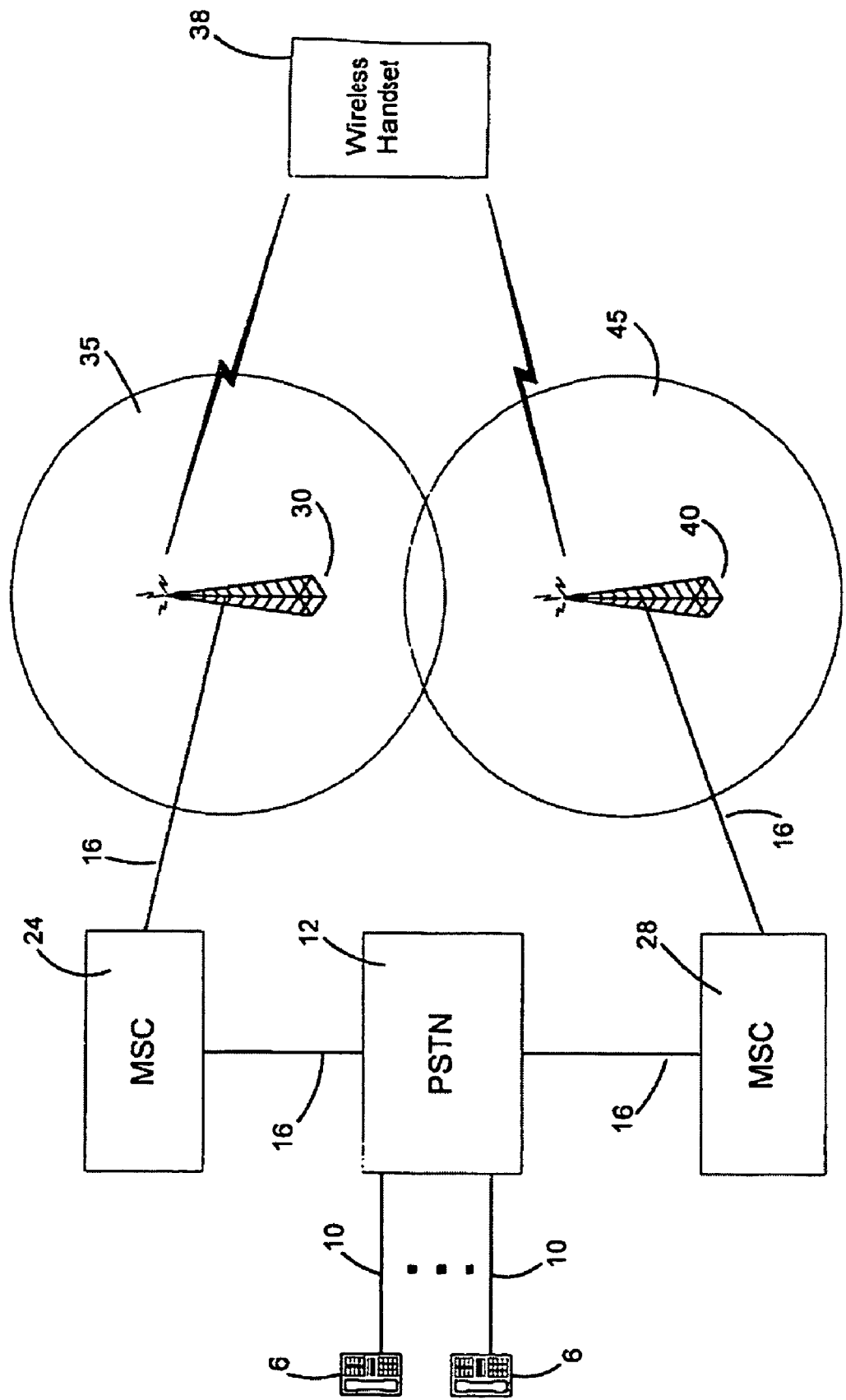
FIG. 1 illustrates the basic components of a conventional cellular network system.
Figure 2:
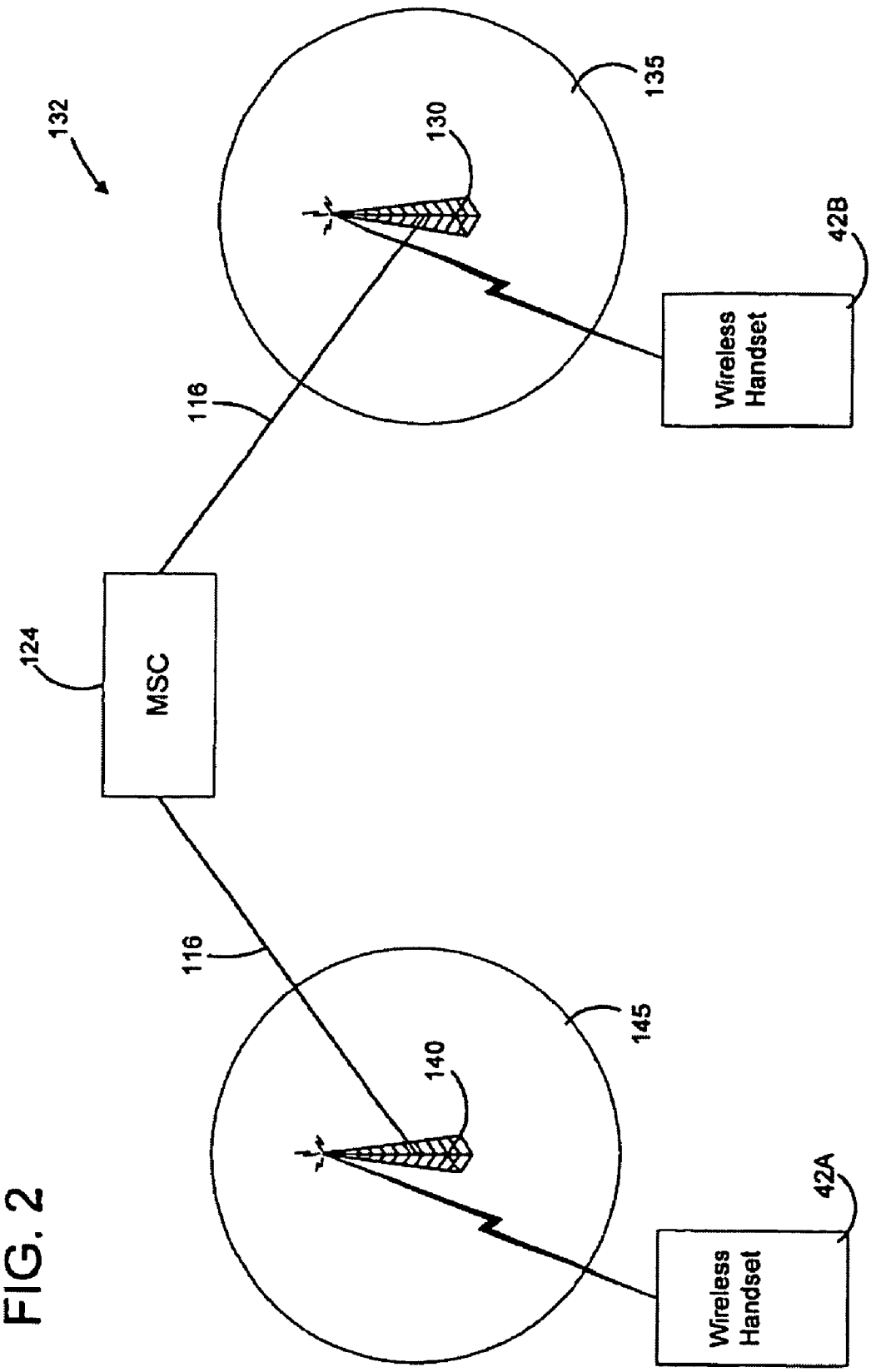
FIG. 2 illustrates exemplary components of a network infrastructure for supporting wireless communication between enhanced wireless handsets, according to an aspect of the present invention.
Figure 3:
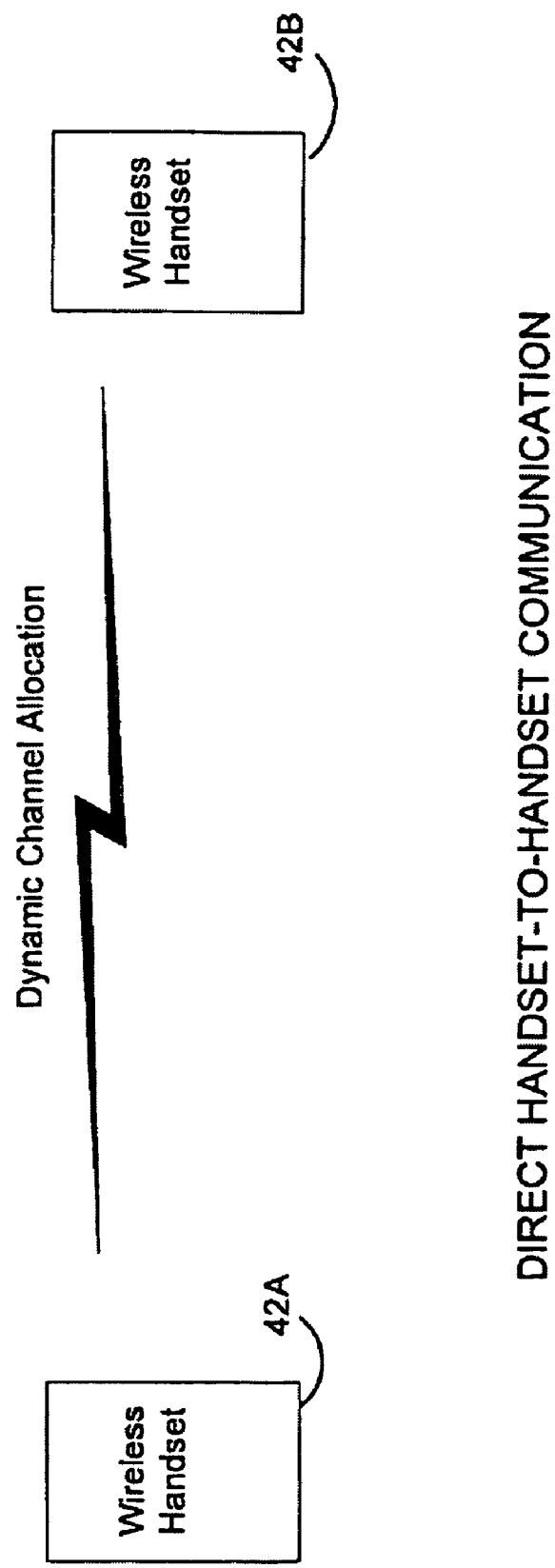
FIG. 3 illustrates, in accordance with another aspect of the present invention, a direct handset-to-handset communication mode between wireless handsets.

The wireless handset of the present invention may be implemented as a fully featured handset that is capable of operating in a wireless network, such as a cellular or PCS network, and/or to operate independent of a wireless network in a direct handset-to-handset communication mode. FIGS. 2 and 3 illustrate the main operating modes of the wireless handset of the invention. While it is preferred that the handset is provided with this dual capability or functionality, it is possible to implement the wireless handset and features of the present invention in the form of a special purpose handset that is capable of only operating in a direct handset-to-handset communication mode. Such a special purpose handset may communicate with other special purpose handsets and/or with full-featured handsets that are also capable of operating within a wireless network. In addition, it is also possible to implement the wireless handset of the present invention in the form of a handset that is capable of operating in a direct handset-to-handset communication mode and that can function as a cordless phone in cooperation with a cordless phone base station. Such a wireless handset may also be provided with the capability to operate within a wireless network, such as a cellular or PCS network. Other modifications and implementations may be realized according to the needs of the wireless handset user.

FIG. 2 illustrates a wireless network operating mode of a wireless handset, according to an aspect of the present invention. As shown in FIG. 2, wireless handsets 42A, 42B may communicate with one another via a wireless network infrastructure 132. Wireless network infrastructure 132 may be implemented utilizing conventional cellular or PCS technology. In the exemplary embodiment of FIG. 2, wireless handset 42A may establish wireless communication with wireless handset 42B under the control of mobile switching center (MSC) 124. Assuming that wireless handset 42A is operating within a cell coverage area 145 of base station or cell site 140, a call may be completed to wireless handset 42B operating within cell coverage area 135 of base station or cell site 130 by use of conventional air interface technology and landlines 116 connecting the base stations to the MSC 124. A call may also be completed if both wireless handsets 42A and 42B are operating within the same cell coverage area (e.g., area 135 or 145), in which case only one base station is involved. When operating within wireless network infrastructure 132, calls initiated by either wireless handset 42A or 42B are normally assessed airtime charges or fees according to the service plans subscribed to by the users. In addition, fees may also be assessed if either handset 42A or 42B is roaming outside of its home market area or if certain service options are enabled.

When operating in a direct handset-to-handset communication mode, the wireless handsets 42A, 42B of the present invention directly establish communication between one another without use of a wireless network infrastructure. As a result, airtime charges may be avoided when the wireless handsets 42A, 42B are functioning in a direct handset-to-handset mode and independently of a network. As illustrated in FIG. 3, when communicating in a direct handset mode, wireless handsets 42A, 42B can directly communicate with one another without the use of a base station or MSC. As further described herein, the selection and setup of a channel for providing communication between the handsets may be established through the use of a dynamic channel allocation technique or process. In such a case, predefined channels may be allocated and searched, with a channel being selected based on the channel having the least detected interference level or the first located channel providing sufficient signal strength. In addition, other channel selection and setup techniques may be utilized to avoid the need for manual channel selection and coordination by each user or operator.

Figure 4B:
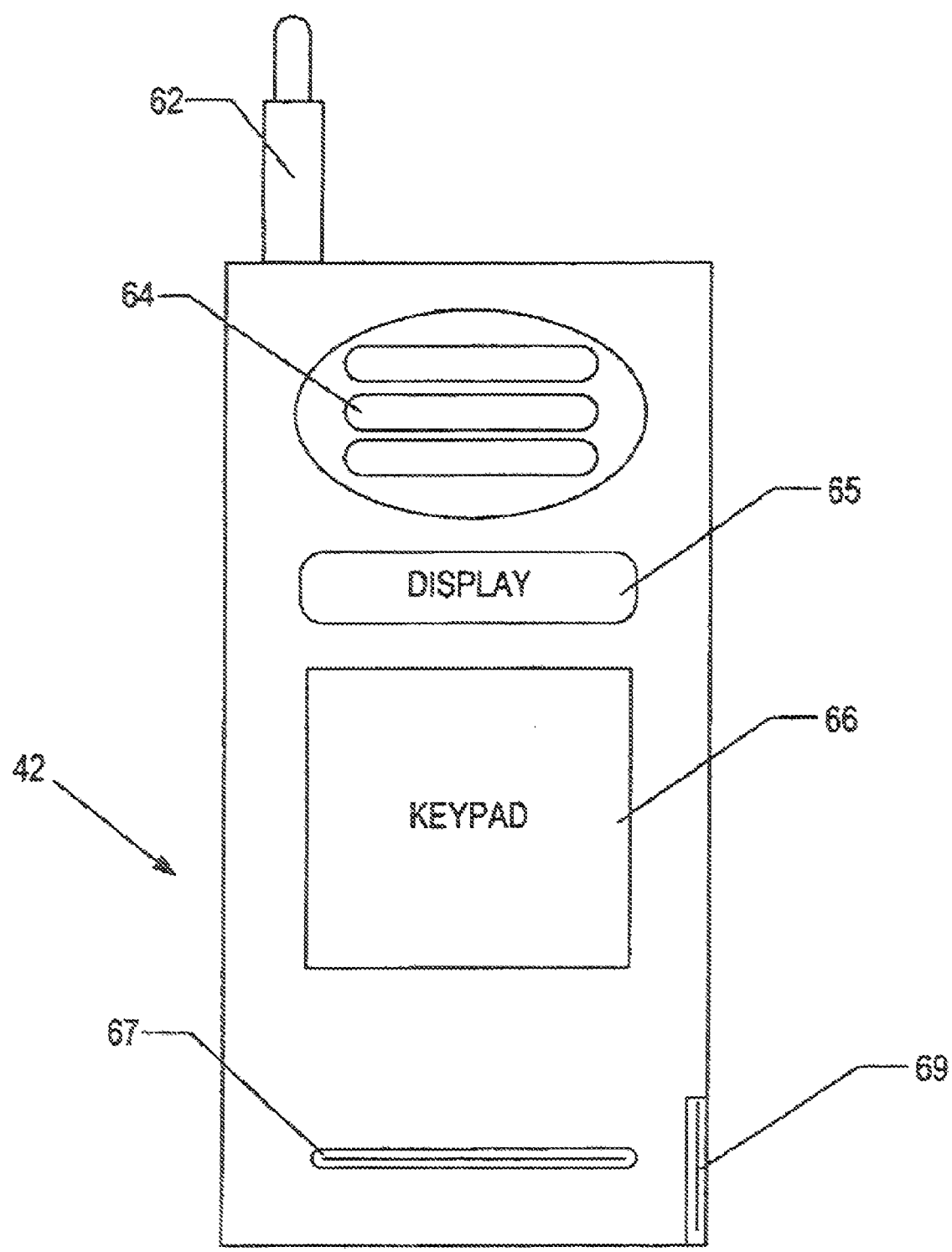
FIG. 4B illustrates, in accordance with an aspect of the invention, exemplary features of a wireless handset.

As discussed above, the wireless handset of the present invention may be configured and implemented according to the level of functionality and operability that is required (e.g., direct handset mode only or with dual communication mode capabilities). FIGS. 4A and 4B illustrate exemplary components and features of a wireless handset that is capable of operating both within a wireless network and outside of a wireless network in a direct communication mode. The construction and features of wireless handset 42 in FIGS. 4A and 4B may be utilized to construct the wireless handsets 42A or 42B illustrated in FIGS. 2 and 3 and further described herein.

As illustrated in the exemplary block diagram of FIG. 4A, wireless handset 42 may be implemented as a full featured wireless handset that comprises a control system 61, an antenna 62, a transceiver or tuner 63, a speaker 64, a display 65, a keypad 66, a microphone 67, and memory 70. An input/output (I/O) port 69 may also be provided for facilitating communication with various devices (such as a portable computer, modem, printer, etc.) and for downloading or loading information into memory 70. Wireless handset unit 42 may be configured to provide all the features of a conventional cellular handset unit, in addition to the unique programming and memory configurations and contents for implementing the direct handset communication mode and other operating features of the present invention.

By way of non-limiting example, speaker 64 may comprise a conventional speaker for converting electrical audio signals received by antenna 62 into acoustic audio signals, and microphone 67 may comprise a conventional microphone for converting voice utterances of a user from acoustic audio signals into electric audio signals for transmission by antenna 62. In addition, display 65 and keypad 66 may be implemented by conventional display and keypad devices for displaying and permitting entry of alphanumeric and other information. For instance, display 65 may comprise dedicated status lights and/or a liquid crystal display (LCD) to indicate (through flashing lights, alphanumeric messages, symbols, icons, etc.) the status of the wireless handset unit and the operating mode. Further, keypad 66 may comprise menu selection buttons and/or a conventional 12-button, alphanumeric keypad for initiating and receiving calls, and programming or selecting operating conditions for the wireless handset. The keys of keypad 66 may include dedicated keys which initialize or select certain functions of the handset or enter alphanumeric data when pressed. The keys of keypad 66 may also include "soft keys" which provide multiple functionality depending on the operating state or mode of the handset. For example, a soft key may be provided which functions as both a power (i.e., ON/OFF) switch as well as an end call (i.e., On-Hook) switch.

FIG. 4B illustrates an exemplary embodiment of the external construction and arrangement of the main components of wireless handset 42, including antenna 62, speaker 64, display 65, keypad 66, and microphone 67. The arrangement of these components may of course be modified or enhanced according to the needs of the user and the type of features incorporated into the handset. In addition, as discussed above, wireless handset 42 may also include an I/O port 69 (illustrated as being provided on a side surface of wireless handset 42 in FIG. 4B) to facilitate the loading and downloading of information into memory 70 of the wireless handset 42. I/O port 69 may comprise, for example, a data port, a Subscriber Identity Module (SIM) card slot and/or other types of ports or slots. Memory 70 of wireless handset 42 may store the MIN, programming and other operational information to implement the various features and aspects of the invention. Memory 70 may comprise a read-write memory device that has an independent power supply or whose contents will not be effected by power downs of ordinary duration. By way of non-limiting example, memory 70 may be implemented by a programmable Electronically Erasable Programmable Read Only Memory (EEPROM), a Complimentary Metal Oxide Semiconductor (CMOS) memory chip, or a conventional Random Access Memory (RAM) with an independent power supply.

As illustrated in the exemplary architecture arrangement of FIG. 4A, antenna 62 may be connected to transceiver or tuner 63, which in turn is connected to a control system 61. Although transceiver 63 is illustrated as a single unit in FIG. 4A, a separate transmitter and receiver may also be provided to provide the functionality of transceiver 63.

Control system 61 may be implemented as a microprocessor-based control system and may be programmed to carry out the various features of the invention. The programming of control system 61 may be carried out by any suitable combination or use of software, hardware and/or firmware. Control system 61 may control the various components of the wireless handset 42 to permit a user to send and receive calls and program the wireless handset. In addition, control system 61 may have access to memory 70, in which the MIN and other programming information is stored, for directing operation of the wireless handset. A more detailed description of the various processes and functions of the operating features and modes of the invention is provided below with reference to the accompanying drawings.

As discussed above, the wireless handset of the present invention may be a full-featured wireless handset that is capable of operating within a wireless network (e.g., a cellular or PCS network) or in a direct handset-to-handset communication mode that functions independently of a wireless network. As such, the wireless handset of the present invention may be embodied as a full featured wireless handset capable of making traditional wireless calls and that has the additional functionality of enabling the handset to place direct calls to other handsets. Since direct calls do not access a wireless network, such calls will operate free of the wireless network and with little or no airtime charges (i.e., a monthly, service or use charge may be charged to the user by the provider of the wireless handset). Direct calls that are placed without access to a network are referred to as "free calls" herein. According to, an aspect of the present invention, the wireless handset may be provided with traditional or conventional wireless features, as well as the specific features and functionality of the present invention. Generally, the features of the wireless handset may be classified into the following categories: Traditional Wireless features; Free Call Control features; Find features; List Maintenance features; Conference Call features; Short Range Messaging features; and Accessory-Related features. Each of these features will be discussed in greater detail below.

If the wireless handset is embodied to provide Traditional Wireless features and call functionality, then the wireless handset may be implemented with traditional analog and/or digital wireless features. Such features may include: Caller ID; Caller ID Log; Short Message Service (SMS); Auto Answer; Choice of Alerts; Vibration Alert; Call Mute; Large, Scrollable Speed Dial List; Headset (with microphone accessory); and Computer Connectivity and Control. Any combination of these features, as well as additional features, may be embodied in the wireless handset to facilitate traditional analog and/or digital wireless connectivity. Of course, as discussed above, it is possible that the wireless handset be provided as a special purpose handset with only direct handset-to-handset functionality. In such a case, the above-described features may be eliminated or may be modified and provided to support direct handset communication.

As indicated above, calls made in a direct handset communication mode with the wireless handset are referred herein to as "free calls", since such calls are made free of the wireless network and with little or no airtime charges. Free Call Control features may be provided to enhance the operation of the wireless handset when calls are placed directly from one handset to another. These features may encompass both call initiate and call receive features, and call in progress and alert features. Various call initiate feedback features may also be provided for Free Call Control. For example, when a user initiates a free call with the handset, the status or progress of the call may be indicated to the user through the use of predetermined messages and/or icons that are displayed on the handset and/or the generation of predetermined audible tones that are transmitted to the user through the speaker of the handset. For example, the display of the handset may indicate the name or ID of the handset to which the call is directed, and one or more icons or messages may be displayed on the handset to indicate the progress of the call (e.g., on-hook, off-hook, ringing, etc.). The status and progress of the initiated call may also be indicated to the user through the use of predetermined audible tones (e.g., dialing, ringing, busy, etc.). Messages may also be displayed on the handset to provide feedback to the user as to whether the offered call was not responded to or received by the called party. With such features, a user will be better equipped to handle and control direct handset calls with other users.

As indicated above, the handset of the present invention may also be provided with various Find features. These features may be provided to permit a user to determine all objects, including other handset users, that are within range or to determine if a specific handset or object is within range of the user. As further described below, the handset of the user may have a prestored find list of other handsets or objects that can be located with the Find features. A user may be given the option to locate a specific handset or object on the list or to initiate a general find function such that each of the handsets or objects on the list are queried to determine if they are within range. In order to maintain privacy, each handset or object may only respond to a query if they have the querying handset on a list and they are in range of the user. As a result, only handsets or objects that have given the querying handset permission to find them will respond to a find query.

The wireless handset of the present invention may also include a set of List Maintenance features. These features may be provided to permit a user to add and delete handsets or objects to one or more lists stored in the handset, such as a speed dialing list for initiating calls, a find list for locating other handsets or objects, and/or a privacy list for blocking find queries from specific handsets so that privacy may be maintained. With the List Maintenance features, a user may be permitted to add, delete and view each list stored in their handset. In accordance with an aspect of the present invention, a single list may be stored in each handset to function as a master list for all direct handset calls. In such a case, the master list may serve as a speed dial list, a find list and a privacy list. That is, the master list serves as a speed dial list when a direct handset call is initiated by a user, and also serves as a querying or find list when a find function is initiated by a user to locate all handsets or objects, or a specific handset or object that is within range. The List Maintenance features may also include a memorize feature which permits two handsets to update their respective master list, find list or privacy list with the ID of the other handset. The memorize feature may be activated when handsets are brought in close proximity to each other or their respective antennas are brought into contact, and users press a predetermined key or button within a short time window. As further discussed below, the memorize feature may also permit a user to memorize other objects, such as an accessory or device that is capable of being queried (such as a beeping clip or paging device) by activating the memorize function on the object in order to automatically add the object to the find list.

Other features that may be provided with the wireless handset include Conference Call features, Short Range Messaging features, and Accessory-Related features. The Conference Call features may permit "free call" conferencing between three handset users. The three-way conferencing may be enabled through time domain multiplexing and, as further described below, may utilize either a fixed controlled time slot or a variable controlled time slot to permit conferencing. The Short Range Messaging features may include features to permit short range messages to be sent directly from one handset to another handset when both handsets are idle or during a controlled time slot if the receiving handset is on a call. Further, Accessory-Related features may be provided to enhance the wireless handset of the present invention. For example, computer connectivity may be provided to enable downloading of lists and configuration data. Further, beeping clips or other paging devices may be provided that can be attached or secured to items (such as keys, wallets, tools, etc.) in order to facilitate finding those items through the Find features of the invention.

Figure 5:
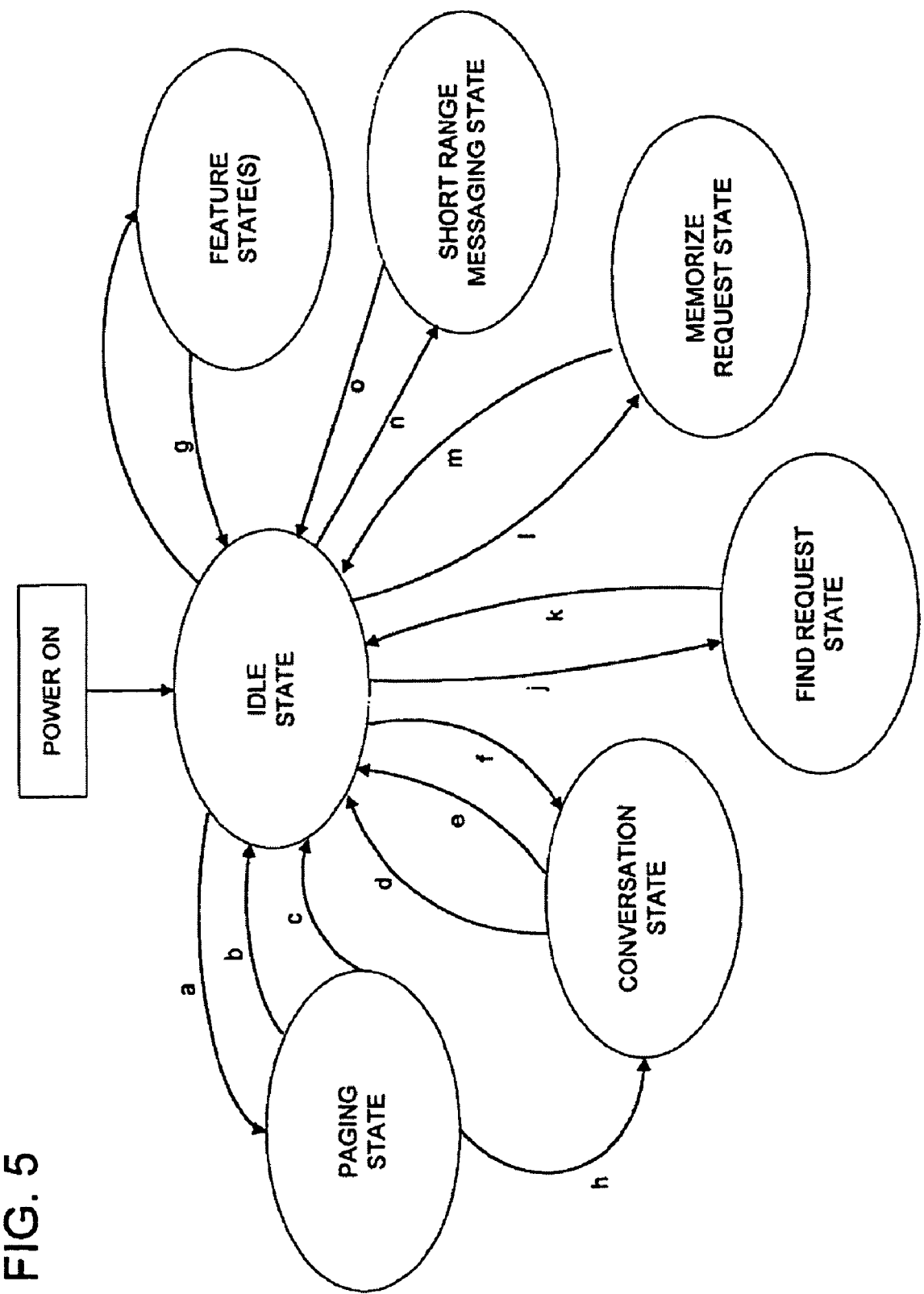
FIG. 5 illustrates a state transition diagram of a wireless handset, in accordance with an aspect of the invention.

In order to implement the wireless handset of the present invention with such functionality, the wireless handset may be embodied with any suitable combination of hardware, software, logic and/or programmed code to perform the required functions. FIG. 5 illustrates a state transition diagram of the functionality that may be embedded in the wireless handset to provide direct handset-to-handset communication and free call capability. The exemplary state transition diagram of FIG. 5 illustrates the various states and trigger conditions to transition between each state. As discussed above, this functionality may be provided in a special purpose wireless handset or preferably may be embodied or bundled with a wireless handset which also has cellular or PCS capability. A wireless handset having both capabilities would provide a user with nearly ubiquitous coverage, either handset-to-handset or via a wireless network. In addition, such a wireless handset can also share circuitry to reduce costs over having two separate wireless handsets. For example, the handset-to-handset communication capability can use the same 10 Kbps data circuitry, used in conventional analog cellular phones. The same voice processing circuitry could also be used, as well as the same housing, keypad, display, antenna, microphone, speaker, etc. by both functions.

Referring to FIG. 5, when the wireless handset is powered or turned ON, the wireless handset may initialize and enter an Idle state. When in an Idle state, the wireless handset is waiting for a call. Calls may be placed in a direct handset-to-handset communication mode by dialing the assigned directory or telephone number of the handset. If a wireless handset is provided with dual functionality, the telephone number of the analog or digital handset (i.e., the MIN) may be the same number used for placing free calls to the wireless handset in a direct communication mode. In a direct communication mode, full duplex handset-to-handset call setup and call states are provided using frequency domain duplexing. In an Idle state, the receiver of the wireless handset may monitor a higher range of the duplex band to search for pages directed to its internally stored directory number or MIN. Free calls may be set up and handled over a non-cellular or unlicensed band. For example, direct handset-to-handset communication may be provided by utilizing a non-cellular, unlicensed band such as the 930 MHZ Industrial, Scientific and Medical band that is authorized under Part 15 of the FCC Rules.

As further discussed below with reference to FIGS. 6A-6E, when a wireless handset is in an Idle state, the receiver of the handset may scan a predetermined set of frequencies (i.e., $f_1, f_2, \ldots f_N$). When the receiver or transceiver of the wireless handset tunes to a frequency, the handset may dwell long enough to measure the signal strength, obtain synchronization and decode a paging message, if available. If the signal strength is below a set threshold, or if no message is being sent, or a paging message directed to a different mobile station or wireless handset is decoded, the wireless handset may tune to the next frequency and repeat the process. If a paging message directed to the wireless handset is decoded, then the responding handset may send a page response on a lower range of the duplex band corresponding to the frequency to which the receiver is tuned. While paging, the originating wireless handset receiver listens for a page response on the lower associated duplex frequency (Paging state in FIG. 5). If the receiver decodes the response without error, then the wireless handset will switch to a voice mode on the same duplex frequency pair and enter a Conversation state. This is illustrated in FIG. 5 by condition f (page received and user answers). If the page response is not decoded after a predetermined number of attempts (i.e., M page attempts), the originating handset may provide a reorder alert (e.g., a reorder tone in the speaker or earpiece) and not enter into a Conversation state. "M" may be selected to ensure that a handset in the Idle mode will scan and decode the frequency at least once. Under this condition, the originating wireless handset which sent the paging message will return to an Idle state from a Paging state. This transition is illustrated in FIG. 5 by condition c (no page response received). In an Idle state, the paged wireless handset may respond a predetermined number of times (e.g., L times) when paged by an originating wireless handset. "L" may be greater than one to increase the reliability that the message will be received without errors. The paged wireless handset will then switch to a voice mode and enter a Conversation state when the user indicates that the call should be answered (i.e., a user may press an answer key to indicate that the call should be received). This transition is indicated in FIG. 5 by condition f (page received and user answers). Otherwise, if the user does not answer, the paged wireless handset will eventually time out and stay in an Idle state.

Figure 6A:
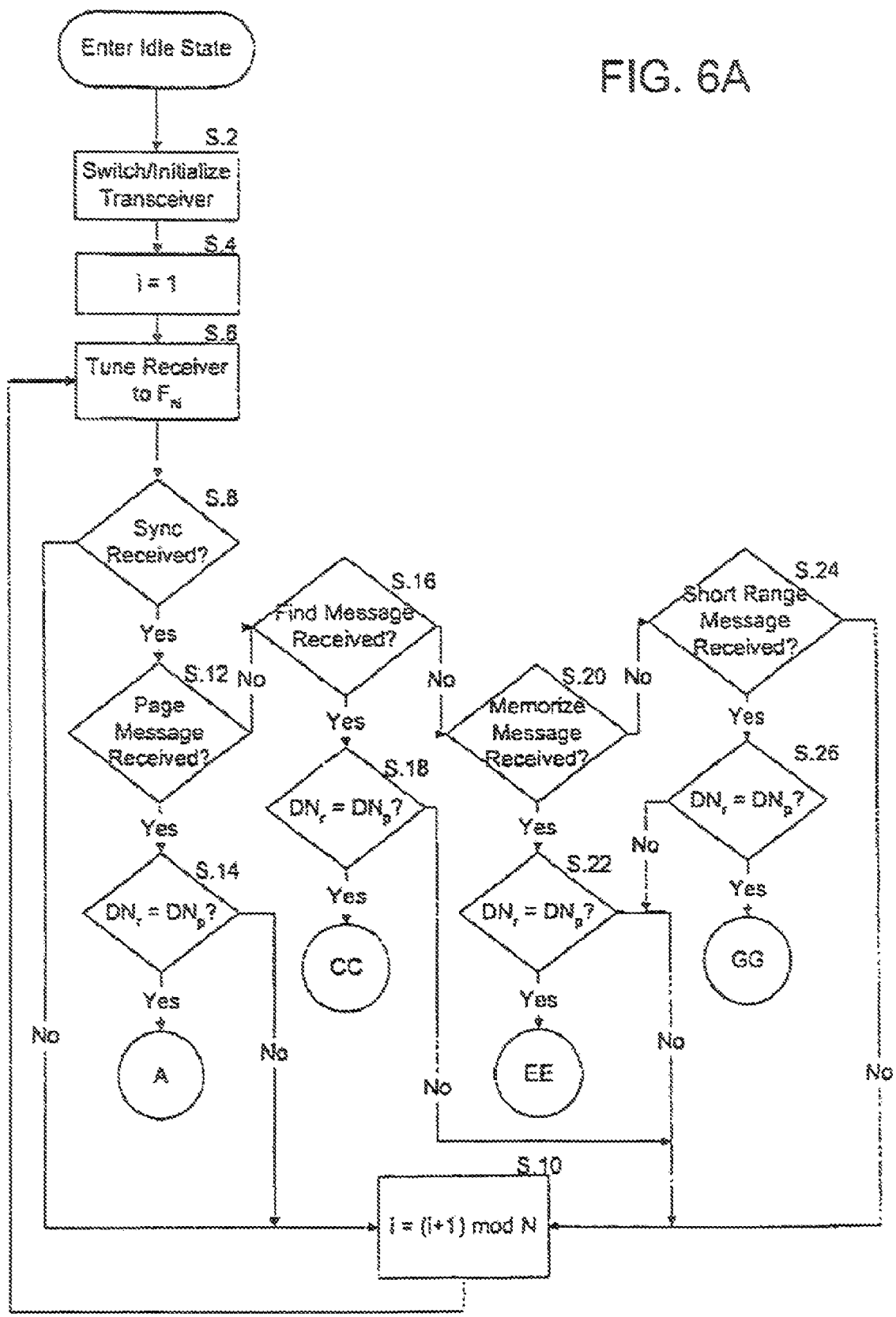
FIGS. 6A, 6B, 6C, 6D and 6E are exemplary flowcharts of the various processes and operations that may be performed by a wireless handset of the invention when operating in an Idle state and responding to messages from other handsets.

FIGS. 6A-6E are exemplary flowcharts of the various processes and operations that may be performed by a wireless handset of the invention when operating in an Idle state and responding to various messages from other handsets. According to an aspect of the present invention, N frequency pairs may be assigned to the wireless handset. The higher frequency associated with the duplex channel "i" is designated as $F_{hi}$. Further, in the illustrated embodiment, the lower frequency is designated as $F_{li}$. Essentially, up to N simultaneous calls can be supported assuming adequate adjacent channel selectively in the wireless handsets. FIG. 6A illustrates a sequential scan of the N channels. Alternative arrangements, however, may be provided. For example, a quick search based on signal strength could be implemented. In such a case, only channels exceeding a predetermined or programmed signal strength threshold would be evaluated for synchronization and paging messages. Further, the signal strength ranking would be updated periodically.

In the exemplary embodiment of FIG. 6A, when a wireless handset enters an Idle state, the receiver of the wireless handset is switched to a predetermined higher band of the duplex pass band (see step S.2). Further, at step S.2, the transmitter is switched to a predetermined lower band of the duplex pass band. Thereafter, at step S.4, a counter i is set to 1. At step S.6, the receiver of the wireless handset is tuned to the high frequency $F_{hi}$. After tuning the receiver to the frequency $F_{hi}$, the handset waits for a synchronization signal.

At step S.8, it is determined whether a synchronizing signal is received. If synchronization is received, then logic flow proceeds to step S.12. Otherwise, at step S.10, the counter i is modified according to the following formula:

$$i = (i+1) \bmod N.$$

Following step S.10, logic flow returns to step S.6, where the receiver of the handset is returned to the next high frequency $F_{hi}$.

At step S.12, the wireless handset determines whether a page message has been received. If a page message is not received within a predetermined period of time, then logic flow proceeds to step S.16, where the handset determines whether another type of message has been received. Otherwise, at step S.14, the called party directory number DNr is decoded by the receiver based on the page message that is received and it is determined whether the directory number DNp stored in the wireless handset is the same as or corresponds to the called party directory number DNr.

If it is determined at step S.14 that DNr=DNp, then at step S.1600 (see FIG. 6B) the transmitter of the wireless handset is tuned to the lower frequency $F_{li}$. Otherwise, logic flows back to step S.10, so that i is modified and the receiver is tuned to a different high frequency.

Figure 6B:
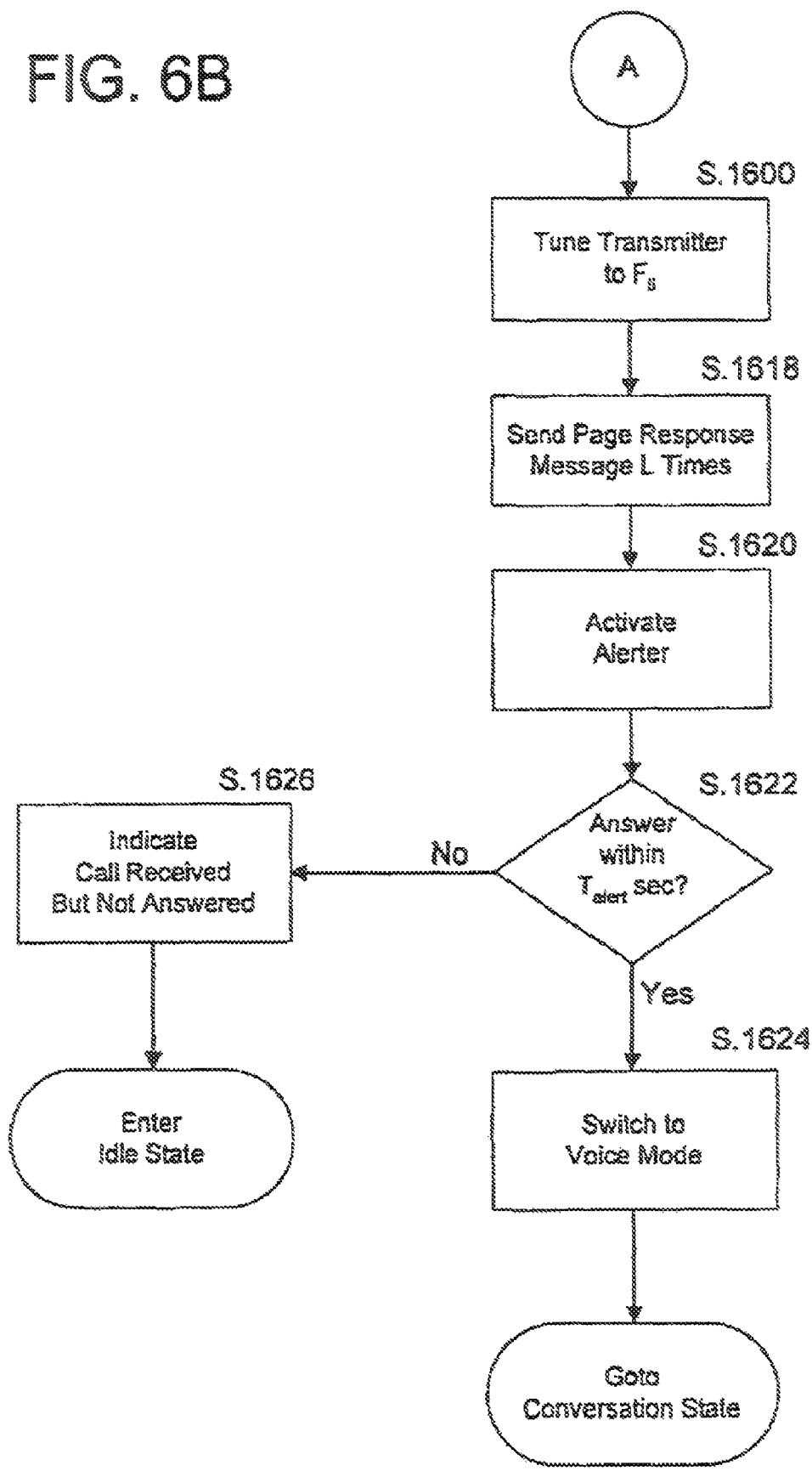

As shown in FIG. 6B, following step S.1600, the receiving wireless handset sends a page response message at step S.1618. In accordance with an aspect of the present invention, the page response message may be sent back to the originating wireless handset repetitively to ensure receipt of the same. For this purpose, the page response message may be sent a predetermined number of times (e.g., L times). Thereafter at step S.1620, the receiving wireless handset may activate an alerter of the receiving handset so as to provide an alert indication to the user of the incoming call. The alert indication provided by the alerter may comprise an alerting signal or tone (such as a ringing signal or tone) or activation of a vibration mechanism to cause the wireless handset to vibrate. Other alerting indications may be provided and may be activated by the user.

As further shown in FIG. 6B, at step S.1622, the wireless handset determines whether the user has indicated to answer the incoming call in response to the generation of the alert indication. In accordance with an aspect of the present invention, the user may be given a predetermined amount of time (i.e., T.sub.alert seconds) to respond to and to indicate whether a call should be answered. If the wireless handset user indicates to answer the call within the predetermined time (e.g., by pressing an answer or talk button on the wireless handset), the wireless handset may switch to a voice mode at step S.1624 and enter into a Conversation state to provide full duplex communication between the wireless handsets. Otherwise, at step S.1626, the wireless handset may display an indication to the wireless handset user that the call was received but not answered and, thereafter, enter into an Idle state.

Referring again to FIG. 6A, if it is determined that a page message was not received at step S.12, then at step S.16 the handset will determine whether a find message has been received from another handset. As disclosed herein, the wireless handsets of the present invention may include a find feature that permits a handset to locate objects, including other wireless handsets, that are within range. If a find message has been received at step S.16, then logic flow proceeds to step S.18. Otherwise, if a find message has not been received at step S.16, the handset proceeds to step S.20 to determine if another type of message has been received.

At step S.18, the called party directory number DNr is decoded by the receiver of the handset based on the find message that is received and it is determined whether the directory number DNp stored in the wireless handset is the same as or corresponds to the called party directory number DNr. If it is determined at step S.18 that DNr=DNp, then at step S.1630 (see FIG. 6C) the wireless handset will determine whether, the requesting handset that sent the find message is on its Find list. Otherwise, logic flows back to step S.10, so that i is modified and the receiver is tuned to a different high frequency.

Figure 6C:
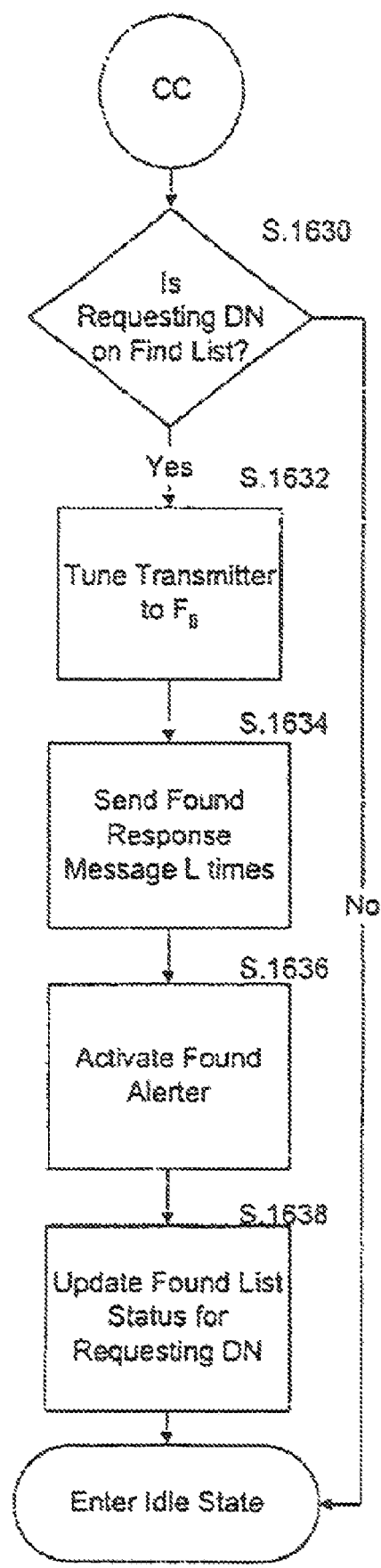

As illustrated in FIG. 6C, at step S.1630 it is determined whether the requesting DN is on the Find list of the handset. The determination at step S.1630 may be made by comparing the directory number DN or ID of the requesting handset provided in the find message that was received with the entries in the Find list of the wireless handset. As further described below, this determination may be made in order to maintain privacy and limit the find capability to only authorized handset users. If the requesting DN is on the Find list, then at step S.1632 the transmitter of the wireless handset is tuned to the lower frequency F.sub.li. Otherwise, the find request may be ignored and the handset may enter back into the Idle state following step S.1630.

After tuning the transmitter at step S.1632, the receiving wireless handset sends a found response message to the requesting handset at step S.1634. In accordance with an aspect of the present invention, the found response message may be sent back to the requesting wireless handset repetitively to ensure receipt of the same. For this purpose, the found response message may be sent a predetermined number of times (e.g., L times). Thereafter, at step S.1636, the receiving wireless handset may activate a found alerter of the receiving handset so as to provide an alert indication to the user of the find request. The alert indication provided by the alerter may comprise an alerting signal or tone (such as a ringing signal or tone) and/or a message that is displayed on the handset. In addition, at step S.1638, the receiving handset may update a Found list so as to indicate that the requesting handset is within range. Following step S.1638, the wireless handset may enter an Idle state.

Referring once again to FIG. 6A, if it is determined that a find message was not received at step S.16, then at step S.18 the handset will determine whether a memorize message has been received from another handset. As disclosed herein, the wireless handsets of the present invention may include a memorize feature that permits handsets to exchange handset information, including handset DN or ID, and corresponding name. If a memorize message has been received at step S.20, then logic flow proceeds to step S.22. Otherwise, if a memorize message has not been received at step S.20, the handset proceeds to step S.24 to determine if another type of message has been received.

At step S.22, the called party directory number DNr is decoded by the receiver of the handset based on the memorize message that is received and it is determined whether the directory number DNp stored in the wireless handset is the same as or corresponds to the called party directory number DNr. If it is determined at step S.22 that DNr=DNp, then at step S.1640 (see FIG. 6D) the wireless handset will set the value of a timer i to zero. Otherwise, logic flows back to step S.10, so that i is modified and the receiver is tuned to a different high frequency.

Figure 6D:
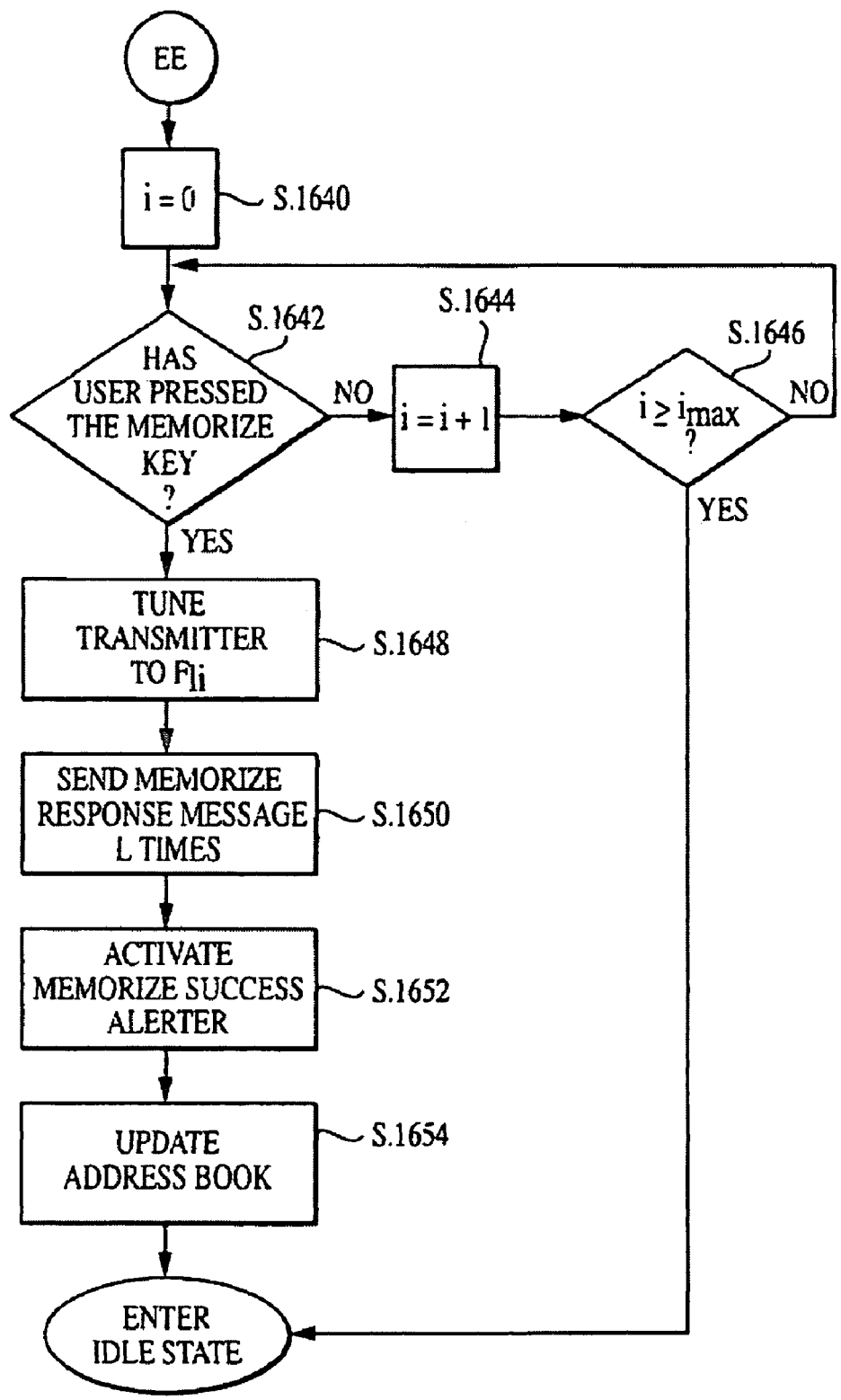

As illustrated in FIG. 6D, at step S.1640 the value of a timer i is initialized and set to zero. Thereafter, the handset determines at step S.1642 whether the user has responded by pressing an appropriate key or button on the handset (e.g., a memorize key) so as to activate the memorize feature. In accordance with an embodiment of the memorize feature described herein, the memorize feature must be activated by both handsets within a predetermined time window to permit the exchange of information to occur. If the memorize feature is not activated at step S.1642, then the handset will increment the timer i by one at step S.1644 and determine at step S.1646 whether the value of the timer i is greater than or equal to a predetermined time limit i.sub.max. If the value of the timer i.sub.max, is less than i.sub.max, then logic flow loops back to step S.1642 to again determine whether the memorize feature has been activated. Otherwise, if the timer i is not less than i.sub.max, then the time limit for activating the memorize feature has been exceeded and the memorize request is ignored, with the handset entering the Idle state.

If the user responds and activates the memorize feature at step S.1642, then at step S.1648 the transmitter of the wireless handset is tuned to the lower frequency F.sub.li. Further, after tuning the transmitter at step S.1648, the wireless handset sends a memorize response message to the requesting handset at step S.1650. In accordance with an aspect of the present invention, the response message may be sent back to the requesting wireless handset repetitively to ensure receipt of the same. For this purpose, the memorize response message may be sent a predetermined number of times (e.g., L times). Thereafter, at step S.1652, the receiving wireless handset may activate a memorize success alerter so as to provide an indication to the user of that the memorize feature has been invoked with the requesting handset. The alert indication provided by the alerter may comprise an alerting signal or tone (such as a ringing signal or tone) and/or a message that is displayed on the handset. Following the successful exchange handset information, at step S.1654 the handset may update the speed dial and/or find lists of the handset with the handset information of the handset that sent the memory request. Following step S.1654, the wireless handset may enter an Idle state.

As shown in FIG. 6A, if it is determined that a memorize message was not received at step S.20, then at step S.24 the handset will determine whether a short range message has been received from another handset. As disclosed herein, the wireless handsets of the present invention may include a short range messaging feature that permits handsets to send and receive short range messages. If a short range message has been received at step S.24, then logic flow proceeds to step S.26. Otherwise, if a memorize message has not been received at step S.24, logic flow loops back to step S.10, so that i is modified and the receiver is tuned to a different high frequency.

At step S.26, the called party directory number DNr is decoded by the receiver of the handset based on the short range message that is received and it is determined whether the directory number DNp stored in the wireless handset is the same as or corresponds to the called party directory number DNr. If it is determined at step S.26 that DNr=DNp, then at step S.1660 (see FIG. 6E) the wireless handset will tune the transmitter of the handset to the lower frequency F.sub.li. Otherwise, logic flows back to step S.10, so that i is modified and the receiver is tuned to a different high frequency.

Figure 6E:
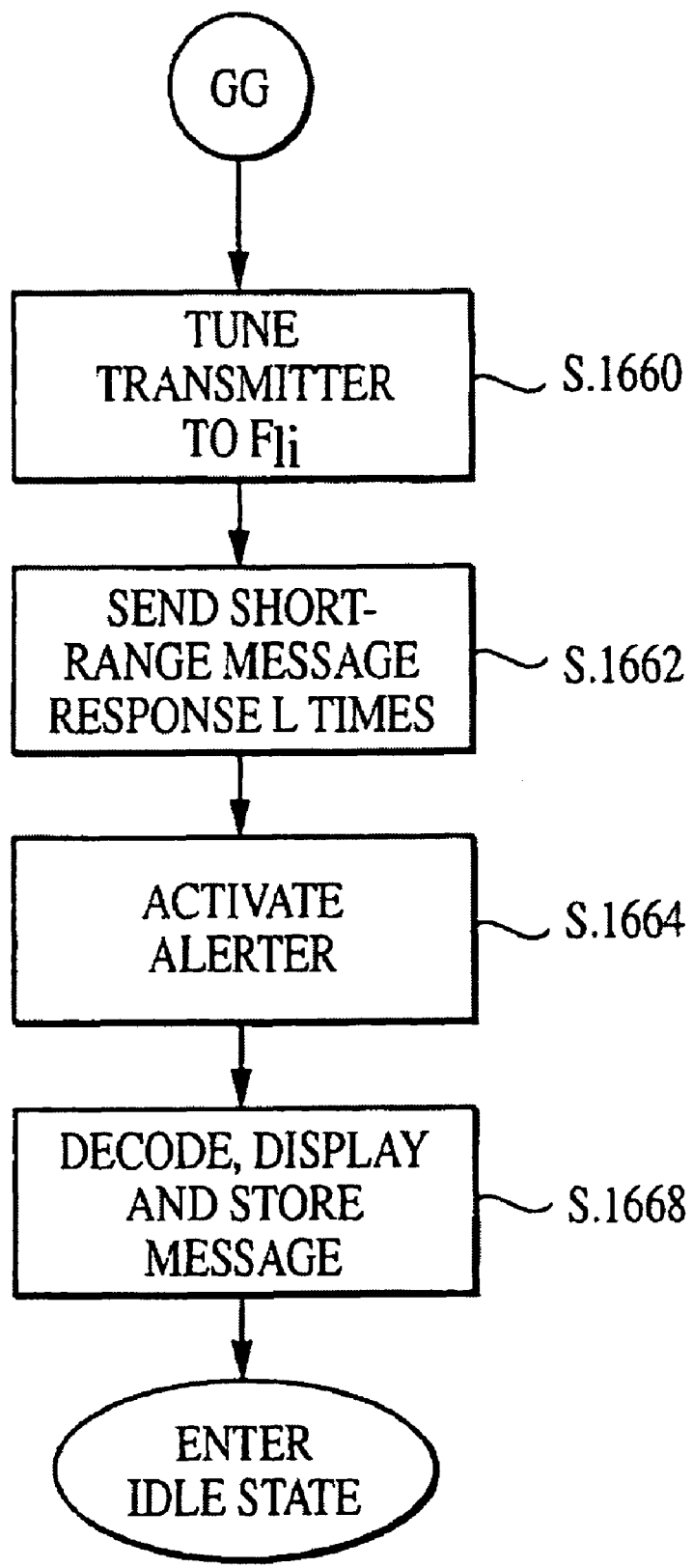

At step S.1660, the transmitter of the wireless handset is tuned to the lower frequency F.sub.li. As illustrated in FIG. 6E, after tuning the transmitter at step S.1660, the wireless handset sends a short range message response message to the transmitting handset at step S.1662 to confirm receipt of the short range message. In accordance with an aspect of the present invention, the response message may be sent back to the originating wireless handset repetitively to ensure receipt of the same. For this purpose, the short range message response message may be sent a predetermined number of times (e.g., L times). Thereafter, at step S.1664, the receiving wireless handset may activate an alerter so as to provide an indication to the user of that a short range message has been received. The alert indication provided by the alerter may comprise an alerting signal or tone (such as a ringing signal or tone) and/or a message (e.g., "Short Range Message Received") that is displayed on the handset. Following step S.1664, the handset may decode the short range message at step S.1668 and, display and/or store the decoded message with the handset. The decision to display or store the message may be optional and/or controlled by the user. Following step S.1668, the wireless handset may enter an Idle state.

As illustrated in FIG. 5, the wireless handset will transition between an Idle state and a Conversation state under condition f; that is, when a page message is received and the user answers, the wireless handset will transition from an Idle state to a Conversation state. In a Conversation state, the wireless handset will operate in a voice mode to provide full duplex communication between the wireless handsets. The wireless handset may return to an Idle state under various conditions. For example, as further illustrated in FIG. 5, the wireless handset will return to an Idle state from a Conversation state under condition d (when the user indicates that the call is to be ended by pressing, for example, an end key). A transition from a Conversation state to an Idle state may also occur where a supervisory signal is lost (this is indicated by condition e in FIG. 5).

When an originating wireless handset initiates a call, the originating wireless handset will transition from an Idle state to a Paging state. The transition from an Idle state to the Paging state occurs under condition a, when a user indicates to initiate or start a free call by pressing a send or free key on the wireless handset. In the Paging state, the wireless handset essentially functions in a state where it pages another wireless handset based on the directory number or telephone number entered by the user. Normally, the Paging state is entered from the Idle state according to the conditions described above.

More specifically, the trigger to enter the Paging state is when a valid handset or object is chosen and the appropriate key (such as a send button or free call button) is pressed by the user. As illustrated in FIG. 5, the wireless handset may transition back to the Idle state under various conditions. Condition b and condition c in FIG. 5 illustrate two such examples. In condition b, the wireless handset will transition from the Paging state to the Idle state when the called party does not answer the call request. Additionally, the transition from the Paging state to the Idle state will occur under condition c, when no page response has been received by the originating wireless handset. If a page is successfully received and the call request is answered by the called party, then the wireless handset will transition from a Paging state to the Conversation state. This condition is depicted in FIG. 5 by condition h (i.e., page response received and called party answers).

Figure 7A:
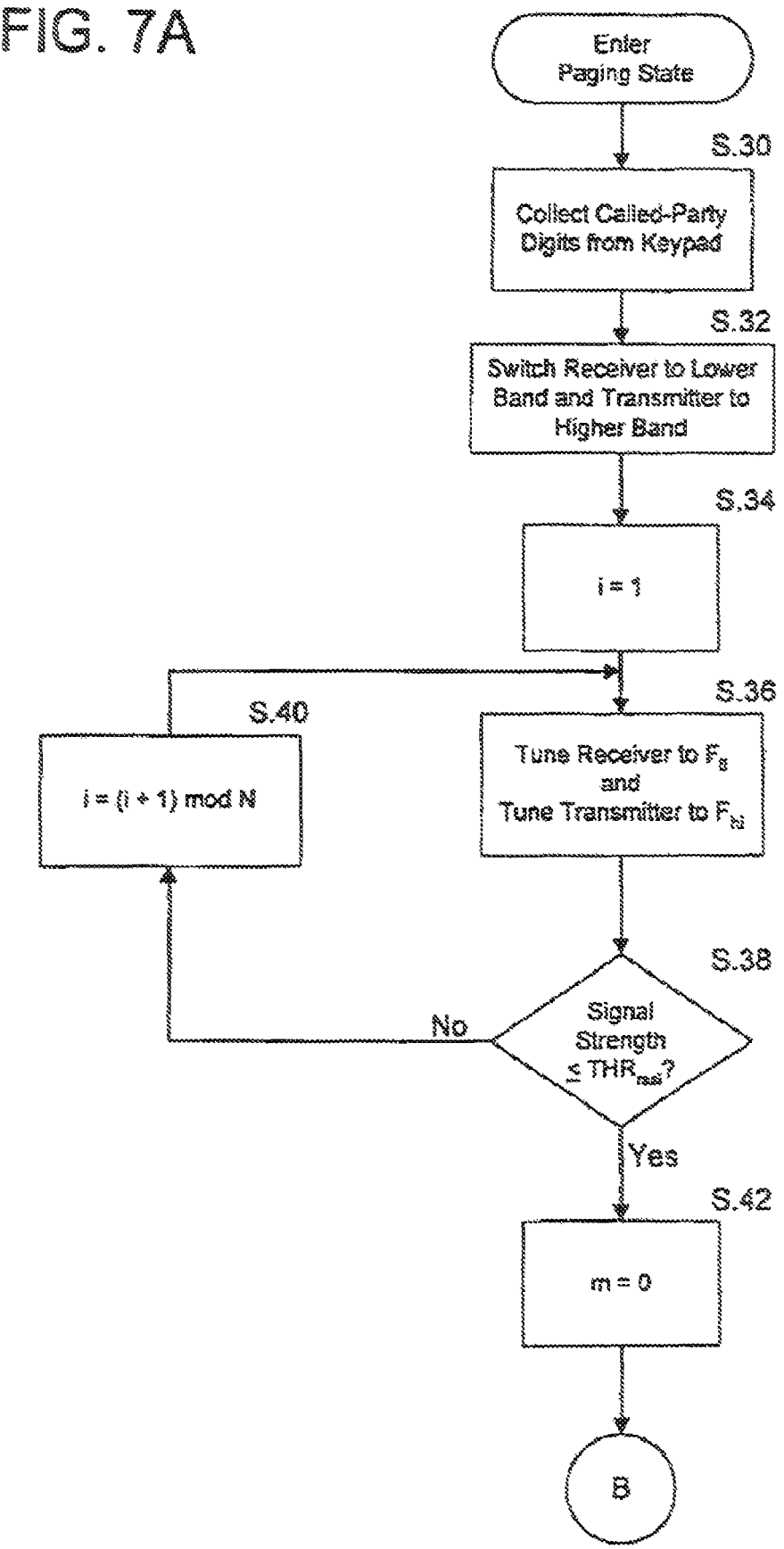
FIGS. 7A and 7B illustrate exemplary flowcharts of the various processes and operations in an Paging state, according to an aspect of the invention.
Figure 7B:
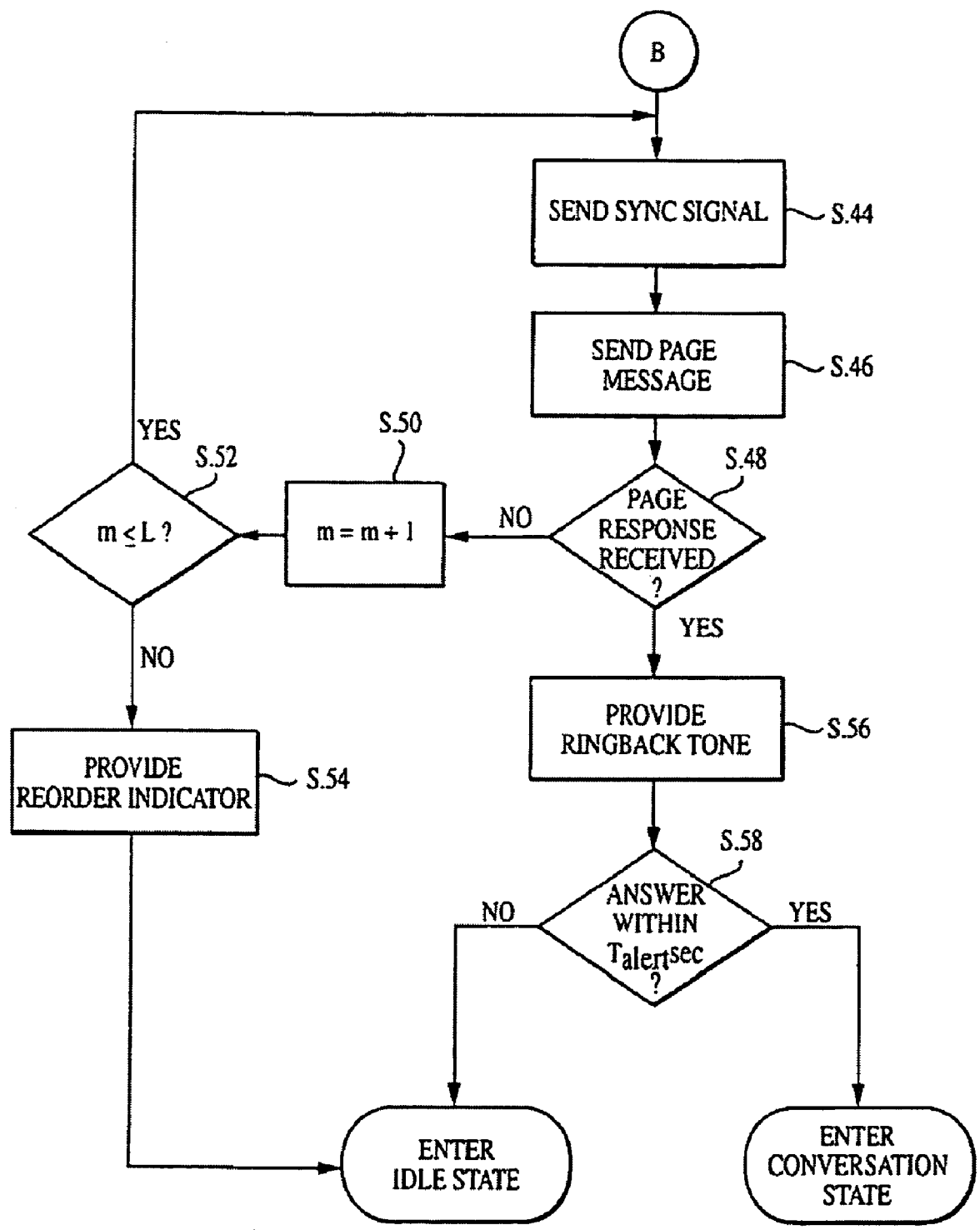

As described above, in a Paging state, the wireless handset pages another wireless handset with the appropriate directory number or phone number. FIGS. 7A and 7B illustrate an exemplary flowchart of the various processes and operations that may be carried out during a Paging state. Generally, in a Paging state, the wireless handset swaps the transmit and receive frequencies so that other wireless handsets in an Idle state can listen for pages. If a page is responded to and the called party enters the Conversation state, the call is set up.

Prior to selecting a channel, the wireless handset may check the channel for possible interference based on, for example, signal strength. The exemplary flowchart of FIGS. 7A and 7B illustrate that such checks may be made until a channel is located that has a signal strength less than or equal to a predetermined threshold level, THR.sub.rssi. As an additional measure, the wireless handset may be configured such that it will terminate analysis of channels for signal strength after a predetermined period of time and provide a warning tone to the user to indicate that no channels are available.

More particularly, as illustrated in FIG. 7A, when entering a Paging state, a wireless handset will first prepare or gather the handset phone number at step S.30. The called party digits may correspond to the directory or phone number of the wireless handset of the called party. At step S.32, the wireless handset will then switch the receiver to the lower frequency band of the duplex pass band and will switch the transmitter to the higher frequency band. At step S.34, the handset will initialize a counter i to 1. Then, at step S.36, the receiver of the handset will be set to the low frequency F.sub.li and the transmitter will be tuned to the higher frequency F.sub.hi.

After tuning the receiver and transmitter, the wireless handset will determine at step S.38, whether there is interference in the channel. Interference may be analyzed by determining whether the signal strength of the channel is not greater than a predetermined threshold. For example, at step S.38, the wireless handset may determine whether the received signal strength of the channel is less than or equal to a threshold level THR.sub.rssi. If it is not, then at step S.40, the count i may be modified according to the following equation:

$$i = (i+1) \bmod N$$

After i is reset, logic flow proceeds back to step S.36 so that another channel is tuned to and analyzed for interference.

If the signal strength of the channel is determined to be appropriate, then at step S.42 a counter m is initialized and set to 0. Thereafter at step S.44 (see FIG. 7B), a synchronization signal is sent by the wireless handset, as well as a paging message at step S.46. The paging message may contain the directory phone number of the called party, as well as the calling party name or number for caller ID purposes. If caller ID is not equipped in the system, then sending of the calling party name and number is not necessary in or processed from the paging message.

At step S.48, it is determined whether a page response message has been received indicating that the called party's wireless handset is within range. If no page response message is received, then at step S.50 the counter m is incremented by one and at step S.52 it is determined whether m has exceeded a predetermined limit L. If m is less than or equal to the predetermined limit L, then logic flow proceeds back to step S.44 so that a synchronizing signal and the paging message may be resent. Otherwise, at step S.54, a reorder indication is provided to the user to indicate that the call request was unsuccessful and that the call request should be placed at another time. Following step S.54, the wireless handset transitions from the Paging state back to the Idle state.

As illustrated in FIG. 7B, if a page response message is received at step S.48, then at step S.56, a ring back tone or another form of signal is provided to the user to indicate that the call request was received. In accordance with conventional wireless handsets, the ring back tone may, be an audible tone that is provided at the earpiece of the speaker of the wireless handset.

At step S.58, the originating mobile station determines whether the called party has answered within a predetermined amount of time. For example, a predetermined amount of time (designated as T.sub.alert seconds in FIG. 7B) may be designated to permit the called party to answer within a certain number of seconds (for example, 20-30 seconds). If it is determined at step S.58 that the called party has not answered within the predetermined period, then the originating phone may return to an Idle state. Otherwise, if the called party answers within the predetermined time, then the phone may enter into a Conversation state to permit full duplex voice communication to be carried out between the parties.

Figure 8:
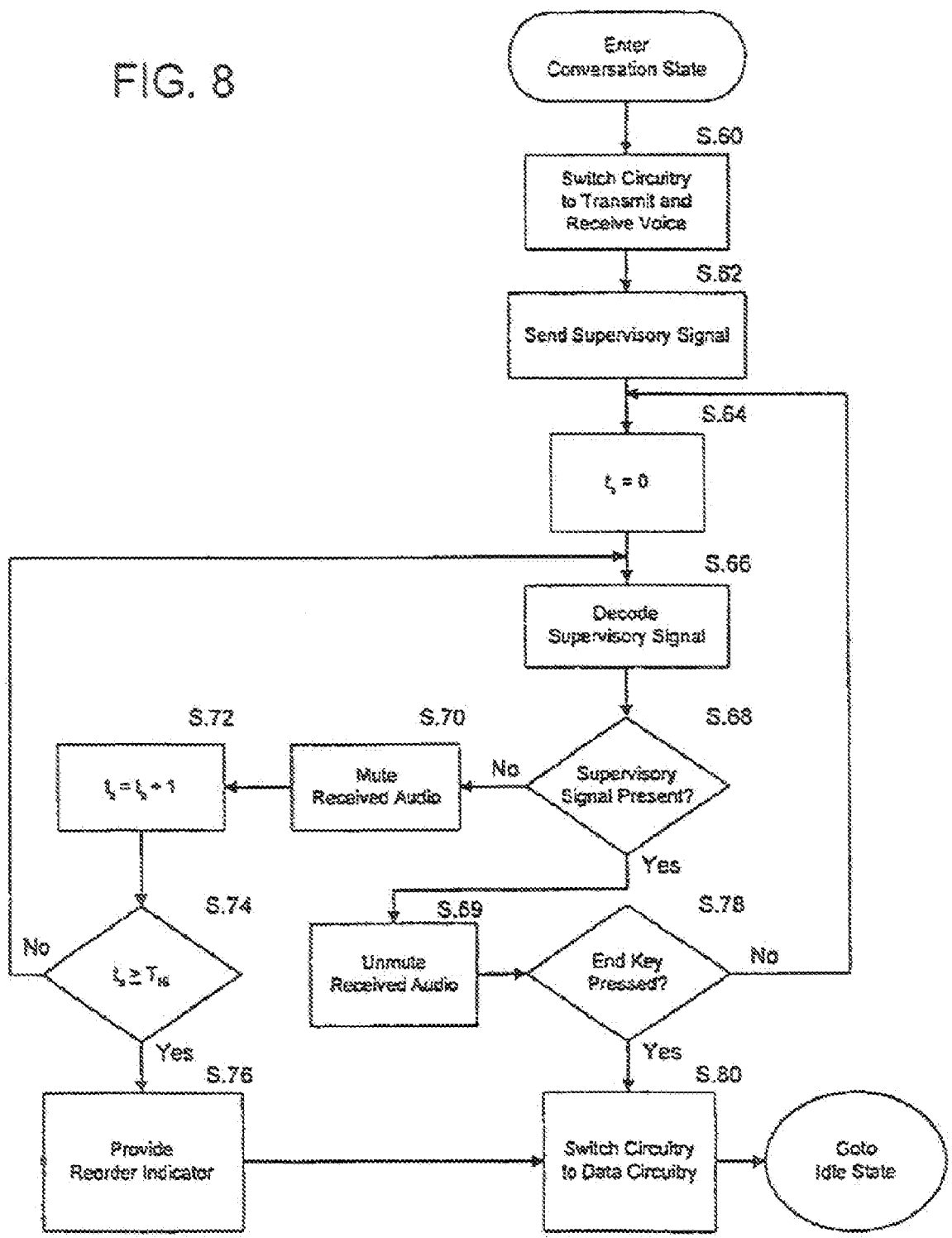
FIG. 8 illustrates an exemplary flowchart of the various processes and operations in a Conversation state, according to an aspect of the invention.

FIG. 8 illustrates an exemplary flowchart of the various processes and operations that may be carried out by a mobile station when it is in a Conversation state. As indicated in FIG. 5, the mobile handset may transition into the Conversation state from either an Idle state (under condition f) or from a Paging state (under condition h). A transition from an Idle state to a Conversation state will occur under condition f, when a page has been received and the user answers. A transition from a Paging state to a Conversation state will occur under condition h, when a page response is received and the called party answers. Therefore, both the originating and answering mobile station may enter into a Conversation state. The originating handset may transmit on a frequency that the answering mobile station is tuned to receive and vice versa, in accordance with the previous descriptions.

At step S.60, the wireless handset that has entered into a conversation state switches circuitry to transmit and receive voice communication signals. Thereafter, at step S.62, a supervisory signal is sent. The supervisory signal may be based on the supervisory audio tone (SAT) encoding/decoding circuitry employed by cellular phones. At step S.64, the mobile station then initializes a counter t.sub.s to 0. Thereafter, the supervisory signal is decoded at step S.66.

At step S.68, the mobile station determines whether the supervisory signal is still present. If the supervisory signal is still present, then the received audio is unmuted at the handset's earpiece at step S.69 and the mobile handset determines whether an end key is pressed by the user to indicate end of the conversation at step S.78. If the end key is pressed by the user or another appropriate key is pressed by the user to indicate end of the conversation or call, then at step S.80 the handset switches back to the data circuitry and stops sending the supervisory signal. Subsequent to step S.80, the mobile handset returns to the Idle state. If, at step S.78, it is determined that the end key has not been pressed by the user, then logic flow proceeds back to step S.64 where the counter t.sub.s is initialized to 0 once again.

If, at step S.68, it is determined that the supervisory signal is not present, then at step S.70 the received audio is muted at the handset's earpiece and at step S.72 t.sub.s is incremented by 1. Thereafter, at step S.74, it is determined whether a corrupted signal is received for a time period that exceeds a predetermined interval or time. That is, at step S.74, it is determined whether t.sub.s is greater than or equal to the maximum interval or time T.sub.Hi. If t.sub.s is greater than or equal to T.sub.Hi then at step S.76 a reorder indicator or tone is provided to the user to indicate that the signal has been lost. Thereafter, at step S.80, the mobile station switches back to the data circuitry and stops sending the supervisory signal. This permits the wireless handset to transition back to the Idle state.

If, however, at step S.74 it is determined that t.sub.s is not greater than or equal to T.sub.Hi, then logic flow proceeds back to step S.66 where the wireless handset attempts to decode the supervisory signal. Thereafter, the mobile station determines whether the supervisory signal is present at step S.68 and, if so, then the Conversation state proceeds as normal (see step S.78). If, however, the supervisory signal is still not located, then the received audio is muted at step S.70 and the counter t.sub.s is incremented again by 1 (see, for example, step S.72). The logic flow then proceeds as discussed above.

In the Conversation state, the mobile station operates on the same frequencies being used prior to entering the Conversation state. The modulating circuitry of the mobile station is switched from the data mode to voice mode so that normal voice-band information is transmitted. A supervisory signal that is easily filtered out of the audio information is also transmitted to indicate when the link is active or broken. As discussed above, one example of a supervisory tone or signal that may be used by the mobile station is the SAT (supervisory audio tone) that is used in analog cellular phones. Another supervisory signal that may be utilized is the sub-audible data stream used in narrow band AMPS (IS-91). If the supervisory tone is corrupted for a prolonged period of time (i.e., a period of time greater than or equal to T.sub.Hi) then it is assumed that the communication path has been lost. In this case, a reorder indication in the form of, for example, an audible and/or visual indication, is provided to the user to warn of the situation and the lost communication path. As discussed above with respect to FIG. 8, when the Conversation state is terminated or ended, the data circuitry of the mobile station is switched back in and the mobile station returns to the Idle state.

As further shown in FIG. 5, the mobile station may transition from the Conversation state to the Idle state under different conditions. That is, under condition d, the mobile station will transition from the Conversation state to the Idle state when the end key is pressed by the user to indicate that the conversation has ended. This condition is tested at step S.78 in FIG. 8. The mobile handset will also transition from the Conversation state to the Idle state when the supervisory signal is lost, as indicated by condition e in FIG. 5. The testing of the supervisory signal is performed at steps S.68-S.74 in FIG. 8. After entering the Idle state, the mobile station may reenter the Paging state or the Conversation state depending on the operational mode or state of the mobile station. In addition, the mobile station may enter into other feature states depending on the manner in which the mobile station is controlled or operated by the user.

That is, when the phone is in the Idle state, as shown in FIG. 5, the mobile station may transition to one or more feature states under various conditions. In the exemplary state diagram of FIG. 5, condition i is provided to represent the condition where a user selects an additional function or state of the wireless handset. These features, including the Traditional Wireless features, Free Call Control features, Find features, List Maintenance features, Conference Call features and other features to be described hereinafter, may be selected by the user to perform various functions. Under such conditions, the handset will enter one of the feature states to permit various functions to be carried out under the command of the user. In FIG. 5, three exemplary feature states are shown for purposes of illustration. The illustrated feature states include a Find Request state, a Memorize Request state, and a Short Range Message state. Aspects and exemplary embodiments of these features are further described below with reference to FIGS. 39-41. The Find Request state, the Memorize Request state, and the Short Range Message state may be entered into from the Idle state when the user selects or activates one of these features, as represented by conditions j, l and n in FIG. 5, respectively. Termination of the feature states and transition back to the Idle state will occur when the feature or function is completed under normal conditions or when it is terminated by the user (e.g., when the user indicates to exit or end the function or mode). In FIG. 5, this is represented by conditions k, m and o for the Find Request state, the Memorize Request state, and the Short Range Message state, respectively, and by condition g for the other feature state(s) that may be provided in the handset.

One of the feature states that may be selected by the user is a feature state for Traditional Wireless features, which may include all of the features and functions required of and included in analog or digital wireless handsets. The set of features that are provided in the wireless handset may, of course, vary depending upon the needs of the handset user. With such features, the handset may be permitted to operate in accordance with traditional analog or digital wireless communication protocols, or a more enhanced wireless handset may be provided that is capable of operating in both analog and digital wireless networks. As described above, the set of features provided as part of the Traditional Wireless features for the handset may include: Caller ID; Caller ID Log; Short Message Service (SMS); Auto Answer, Choice of Alerts; Vibration Alert; Call Mute; and Large, Scrollable Speed Dial List. Other features may be provided including Computer Connectivity and Control, and Headset (with microphone accessory). Any combination of these features may be embodied in the wireless handset to facilitate traditional analog and/or digital wireless connectivity. It is also possible that the wireless handset of the invention be provided as a special purpose handset with only direct handset-to-handset functionality, in which case the above-noted features may be eliminated or modified and provided to support direct handset communication. Similar features or overlapping features may also be provided for free call control and other general features for direct handset-to-handset communication, as further described below.

When placing a free call, the wireless handset does not use a cellular or digital network. Instead, such calls are placed directly, from one handset to another, as illustrated in FIG. 3. Free Call Control features may be provided to enhance and control the operation of the wireless handset in connection with direct handset communication. One or more of these features could also be utilized in connection with a handset operating through Free Call Control features that may encompass both call initiate and call receive features, as well as various call initiate feedback features. Table 1 illustrates an exemplary set of call receive features that may be implemented with the wireless handset. Further, Table 2 illustrates an exemplary set of call initiate features, and Table 3 illustrates an exemplary set of call initiate feedback features that may also be provided. Depending on the needs of the user, these features may be modified or only various combinations of these features may be provided.

TABLE 1

CALL RECEIVE FEATURES

| Call Intitiate Features | Description |
|---|---|
| Call Acceptance | All calls can be accepted by presenting a predefined key (e.g., RCV or TALK) or by pressing almost any key on the handset, with the exception of main function keys (e.g., END, PWR). |
| Auto Answer | All calls will be automatically answered by the wireless handset |
| Caller ID | The name and number (ID) of the originator of the call will appear on the display of the receiving handset. |
| Call Waiting | The user will be alerted that another call has been received while the user is using the handset. The alerting signal (e.g., visual or audible) may be selected by the user. The user will also be able to switch over to the other call and then back to the original call. |
| Call Mute | The call alerting signal for the incoming calls will be muted without notifying the originator that the receiver's handset is not providing an alerting signal. |
| Call Reject With Message | The alerting signal for an incoming call is muted and the originator of Message the call is notified via a short message that the call was not accepted. The message may be user defined or multiple predefined messages may be selected. |
| Network Voice Mail Message | The incoming call is rejected with a short message sent to the Message originator indicating the number of the network voice mail which the originator can call by pressing a key (e.g., SEND or TALK) on their handset. |

TABLE 2

CALL INITIATE FEATURES

| Call Receive Features | Description |
|---|---|
| FREE Button | A FREE call can be initiated by entering the number of the recipient and pressing a key (e.g., a FREE key) of the handset. A traditional wireless call using the network may be initiated by using a separate key (e.g., a SEND key). |
| Auto FREE Redial | The handset will redial a call to another handset (that is initially out of range) until that handset comes into range, or for a specified period of time, or until the user cancels this feature. |
| Speed Dial List | The speed dial list can be scrolled through using arrow keys on the handset. When an entry is highlighted, the user can press the FREE key to place a direct handset-to-handset call. For traditional wireless network calls, a separate speed dial list may be maintained or such a list may be integrated with the speed dial list for free calls. |
| Speed Dial List Spell-Out | By typing the first characters of names, the user may quickly navigate the speed dial list by having the list jump and display, in alphabetical order, those names in the list beginning with the typed characters. |
| Found List | The Found list is a list of users who have compatible wireless handsets that are within range to enable free calls. The list can be scrolled through using the arrow keys on the handset |

TABLE 2-continued

CALL INITIATE FEATURES

| Call Receive Features | Description |
|---|---|
| | and a call can be placed to a user highlighted on the list by pressing the FREE key. |
| Emergency Call | When activated, this feature will place a call to the closest handsets automatically to alert those people of an emergency. |

TABLE 3

CALL INITIATE FEEDBACK FEATURES

| Call Initiate Feedback Features | Description |
|---|---|
| Unavailable | A message (e.g., "Unavailable") will be displayed on the screen of the call originator handset if the call receive handset is out of range or is turned off. The option to simply hit a key (e.g., SEND) and place the call using the wireless network will then be given. |
| Ringing | A ringing tone will be heard in the earpiece of the call originating handset if the call receive handset is in range and can accept the call. The call will continue to ring until it is answered or until the call originator ends the call or until a predetermined timer expires. The ringing tone for a free call may have a different sound then the ringing associated with a traditional wireless connection. |
| Busy | A busy signal will be heard in the earpiece of the call originating handset if the call receive handset cannot accept the call because it is in use. |
| Call Reject Message | A message that the call was not accepted will be presented on the handset display if the Call Reject With Message was used by the call receive handset. An alert will be heard in the earpiece of the call originating handset to signal that the message is on the display. |

In addition to the above-noted features, other features may be provided to facilitate use and operation of the wireless handset. For example, a set of Call In Progress features may be provided for supporting free or direct handset-to-handset calls. Such features may include a signal strength or distance indicator which will display the strength of the free call during the progress of the call, so as to provide to the user an approximate indication of signal strength or distance. Strong signals may indicate that the two handsets are close together physically, while weak signals may indicate that the two handsets are far apart physically. In addition, a very weak signal alert may be provided, in the form of a beep emitted from both handsets, to indicate that the signal is very weak and may be dropped. Such an alert may be accompanied by an option to reconnect the call using the wireless network by pressing the SEND key. Other features that may be accessible during call progress may include: Call Waiting; Memorize; Spontaneous Conferencing; and Short Range Message (including the alerting and retrieval of messages).

As indicated above, the wireless handset of the present invention may be implemented with Find features which enable the user to determine which handsets or users are within range for placing a free call. The Find features may include a Find list that is stored in the handset. The Find list may comprise a list of objects (including other wireless handsets and items with paging devices or beeping clips) that the handset user wants to find. As further discussed below, the objects on the Find list may be grouped or categorized.

For privacy reasons, when performing a Find request, the user of the requesting handset will not be able to detect if another handset is within range unless that other handset is on the Find list of the requesting handset and the requesting handset is on the Find list of the other handset. Should a handset receive a Find request where the requesting handset is not on its Find list, a message may be displayed to the receiving handset's user asking if the user wishes to add the originating handset to their Find list. If the user accepts, then they will be "found" at that moment and the originating handset will be added to the receiver's Find list, as well as the receiver's Speed Dial List, if separate. If the user does not respond to a Find query or message, the message may be kept as a short range message and the user can respond or delete the message in the future, as desired. Should the receiving handset's user decline, this message will not be displayed again upon subsequent requests from that originating handset. In this case, if the originating handset is ever in future added to the receiving handset's list and then deleted, the message will be displayed if that Find request is received again from the handset.

In order to perform a Find request, the wireless handset may be equipped with a FIND button or key. When pressed, this button may return a list of objects (including other wireless handsets) that are on the Find list and that are within range to perform (if possible) a free call. This list, which is returned after performing a Find request, is referred to herein as the Found list. The Found list may display the signal strength of each object that is within range. If the FIND button is pressed by the user with an object or a group highlighted on the Speed Dial List or the Find list, then the handset will only search for that specific object or objects in that group and return the results in the Found list. With the Find request feature of the present invention, which is further described below with reference to the accompanying figures, a Find request may take no longer than approximately four seconds to determine if twenty objects are within range.

In accordance with an aspect of the present invention, a user may wish to configure, their handset to automatically perform a Find request at preset or predetermined intervals. For this purpose, the Find features may include Auto Find and Auto Find Object features which permit a Find request to be performed at preset intervals. These options may be selectively turned ON or OFF by the user. With Auto Find, the wireless handset will automatically perform a Find request at preset intervals and update the Found list. Additional options may be provided to inform the user when there is a change to the Found List through a beeping tone, vibration, a ringing tone, or a change on the display. The Auto Find feature may be interruptible to permit a user to make or receive a call or short message. With Auto Find Object, the user may select a specific object on the list and automatically perform a find request at preset intervals that will alert the user if that particular object has recently come into range. An additional option will permit the user to be automatically alerted if that object has recently gone out of range. The Auto Find Object feature may also be interruptible to permit a user to make or receive a call or short message.

As discussed above, the wireless handset of the present invention may perform a general Find request whereby all objects on the user's Find list are queried or the handset may perform a specific object Find request whereby a specific object or group of objects highlighted on the Find list by the user is queried to determine if they are within range. Various techniques may be utilized for implementing the general find and specific object find features of the present invention. For example, all handsets may be equipped with a separate or dedicated tuner which is always on a dedicated channel or sets of channels to perform Find requests. In the alternative, each handset may register on a control channel at predetermined intervals when the handset is idle or when the handset is on a call. In such a case, a separate tuner may not be provided. In accordance with another embodiment, the handset requesting a Find may transition from an Idle state to a Find Request state, as shown in FIG. 5. While in the Find Request state, the requesting handset may utilize a technique similar to the Paging state to indicate the objects that are being queried. The queried objects may check for Find messages while in the Idle state. In this state, a procedure similar to that illustrated in FIGS. 6A-6B may be used to indicate that it is within range. Other embodiments and variations are also possible.

Figure 39A:
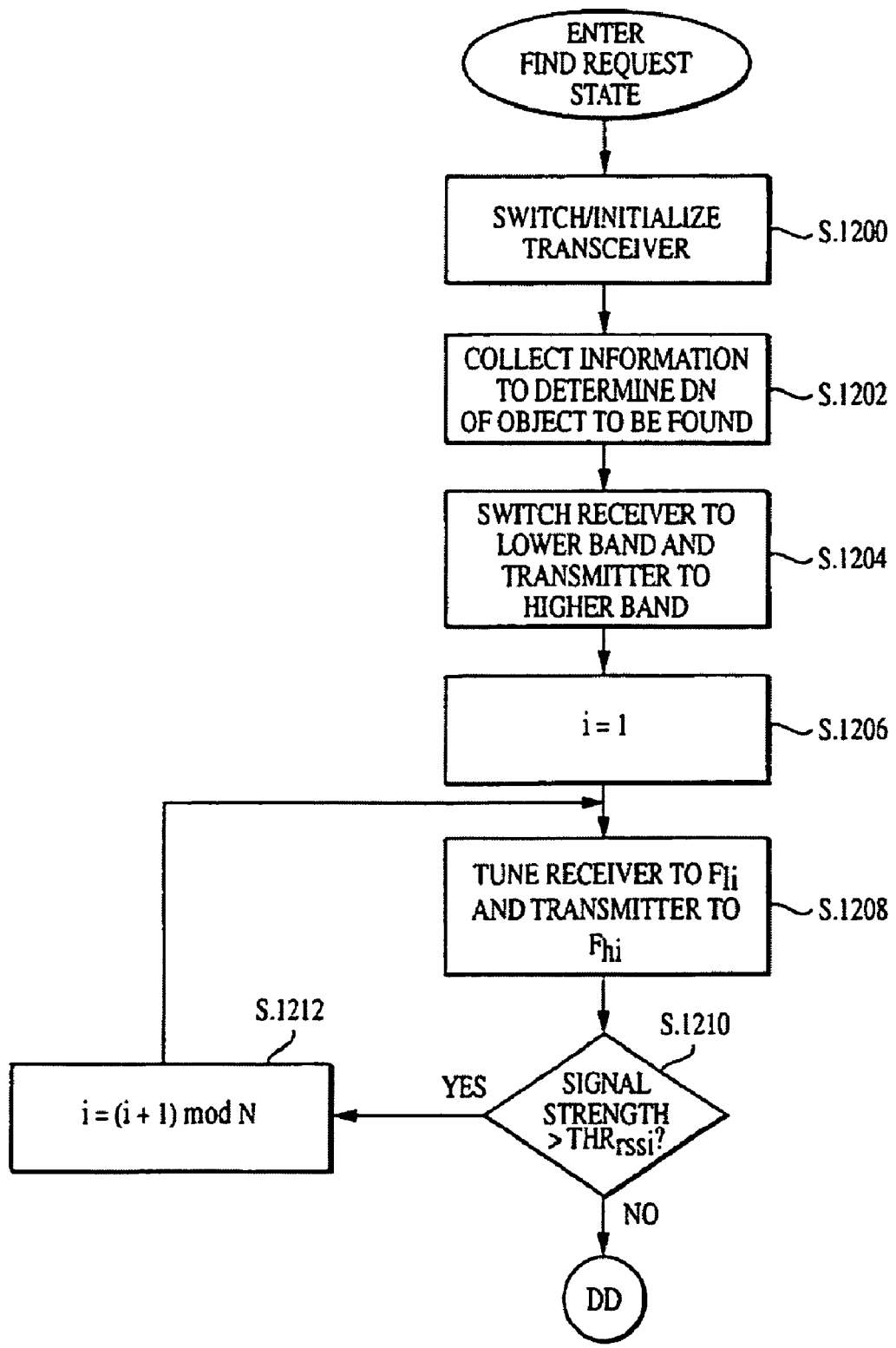
FIGS. 39A and 39B illustrate exemplary flowcharts of the various processes and operations in a Find Request state, according to an aspect of the invention.
Figure 39B:
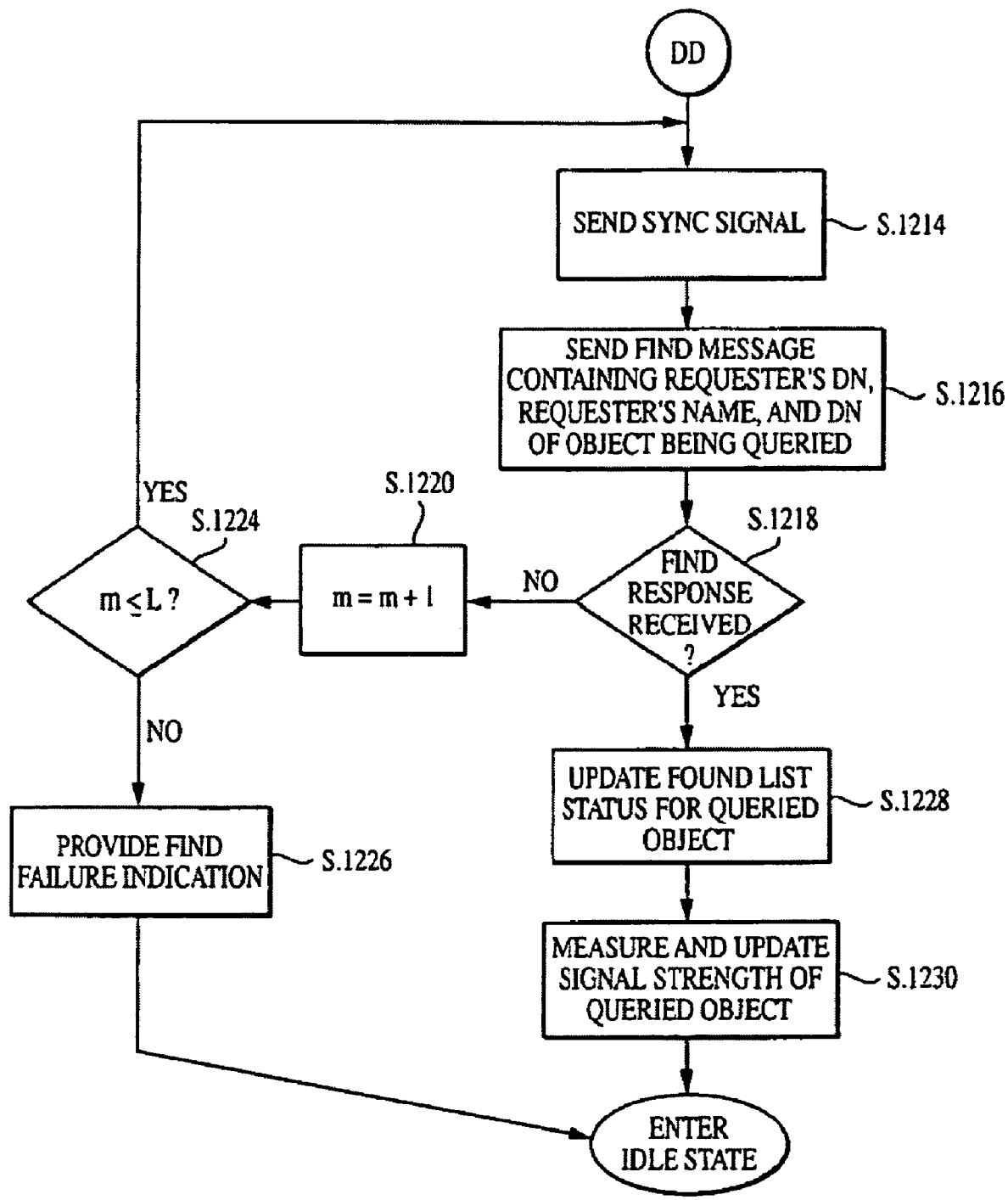

FIGS. 39A and 39B illustrate exemplary flowcharts of the various processes and operations in a Find Request state, according to an aspect of the invention. As illustrated in FIG. 5, when initiating a Find request to locate an object, the wireless handset will transition from an Idle state to a Find Request state. The transition from an Idle state to the Find Request state occurs under condition j, when a user indicates to initiate or start a Find request to locate a specified object (e.g., another wireless handset) by pressing an appropriate key or button on the wireless handset. If the user wishes to determine if a specific wireless handset is within range, the ID or directory number DN of the handset should be entered or selected through the handset. In the Find Request state, the wireless handset will attempt to locate the specified handset by transmitting a find message and waiting for a response from the specified handset. The wireless handset may transition back to the Idle state from the Find Request state (represented by condition k in FIG. 5) after successfully locating the specified object or after failing to locate the specified object. FIGS. 39A and 39B illustrate exemplary flowcharts of the various processes and operations that may be performed in a Find Request state when attempting to locate a specified object, such as an another wireless handset.

In particular, as illustrated in FIG. 39A, when entering a Find Request state the wireless handset will first switch and/or initialize the transceiver of the handset at step S.1200 for the Find request. That is, similar to the embodiment of FIG. 6A, N frequency pairs may be assigned to the wireless handset for performing a Find request, with the higher frequency associated with a duplex channel "i" being designated as $F_{hi}$ and the lower frequency being designated as $F_{li}$. After initializing the transceiver, the wireless handset will collect or gather the information specifying the handset or object to be located at step S.1202. The collected information may include the directory number or ID of the wireless handset that the user specified for the Find request.

At step S.1204, the wireless handset will switch the receiver to the lower frequency band of the duplex pass band and switch the transmitter to the higher frequency band. Then, as shown in FIG. 39A, the handset will initialize the value of a counter i to 1 at step S.1206. Following step S.1206, the receiver of the handset will be set to the low frequency $F_{li}$ and the transmitter will be tuned to the higher frequency $F_{hi}$ at step S.1208.

After tuning the receiver and transmitter, the wireless handset will determine at step S.1210 whether there is interference in the channel. Interference may be analyzed by determining whether the signal strength of the channel is not greater than a predetermined threshold. For example, at step S.1210, the wireless handset may determine whether the received signal strength of the channel is greater than a threshold level $THR_{rssi}$. If it is determined that the threshold has been exceeded and that there is interference on the channel, then at step S.1212 the value of the count i may be modified according to the following equation:

$$i = (i+1) \bmod N$$

After the value of the counter i is reset, logic flow proceeds back to step S.1208 so that another channel is tuned to and analyzed for interference.

If the signal strength of the channel is determined to be acceptable at step S.1210, then a counter m may be initialized and set to 0 and at step S.1214 (see FIG. 39B) a synchronization signal may be sent by the wireless handset. After synchronization, the wireless handset may transmit a find message over the channel at step S.1216. The find message may include the directory number of the object or handset that is being queried. In addition, the find message may include the directory number of the requesting handset and/or the name of the user that requested the find request. Following step S.1216, the wireless handset will wait for a response to determine if the queried object is within range.

In particular, at step S.1218, the wireless handset will determine whether a find response message has been received indicating that the queried object is within range. If no find response message is received, then at step S.1220 the counter m is incremented by one and at step S.1224 it is determined whether m has exceeded a predetermined limit L. If m is less than or equal to the predetermined limit L, then logic flow proceeds back to step S.1214 so that a synchronizing signal and the find message may be resent. Otherwise, at step S.1226, a find failure indication may be provided to the user to indicate that the find request was unsuccessful. Following step S.1226, the wireless handset may transition from the Find Request state back to the Idle state, as illustrated on FIG. 39B.

If a find response message is received at step S.1218, then at step S.1228 the requesting handset will update the status of the queried object in the handset's Found list in order to indicate that the queried object is within range. Further, at step S.1230, the handset will measure the signal strength of the response message from the queried object and update the corresponding signal strength information in the Found list. The found status of the specified object and the measured signal strength may also be indicated or displayed to the user of the requesting handset to notify the user of this information. Following step S.1230, the find routine may terminate and the handset may transition from the Find Request state back to the Idle state.

In accordance with other embodiments of the invention, FIGS. 9-12 are exemplary flowcharts of the various processes and operations that may be performed for carrying out a general Find request for other wireless handsets. In addition, FIGS. 13-16 illustrate various embodiments for carrying out a specific object Find request for a specific wireless handset user with the present invention. Each of these embodiments are described in greater detail below. In particular, FIGS. 9A and 9B are exemplary flowcharts of the various processes and operations that may be carried out for performing a general Find request by utilizing a dedicated separate tuner. According to the embodiment of FIGS. 9A and 9B, each handset is equipped with a separate tuner that is always on a predetermined dedicated channel. Such a tuner is provided in addition to a tuner for establishing and providing communication with other handsets. FIG. 9A illustrates an exemplary logic flow for a handset (i.e., handset "A") that initiates the general Find request. FIG. 9B illustrates the exemplary logic flow of operations performed by each handset that is on the Find list of handset A. In the exemplary flowcharts of FIGS. 9A and 9B, list_count represents or designates to an entry in the Find list of handset A, and ID#list_count is the ID of the handset or object stored in an entry of the Find list.

Figure 9A:
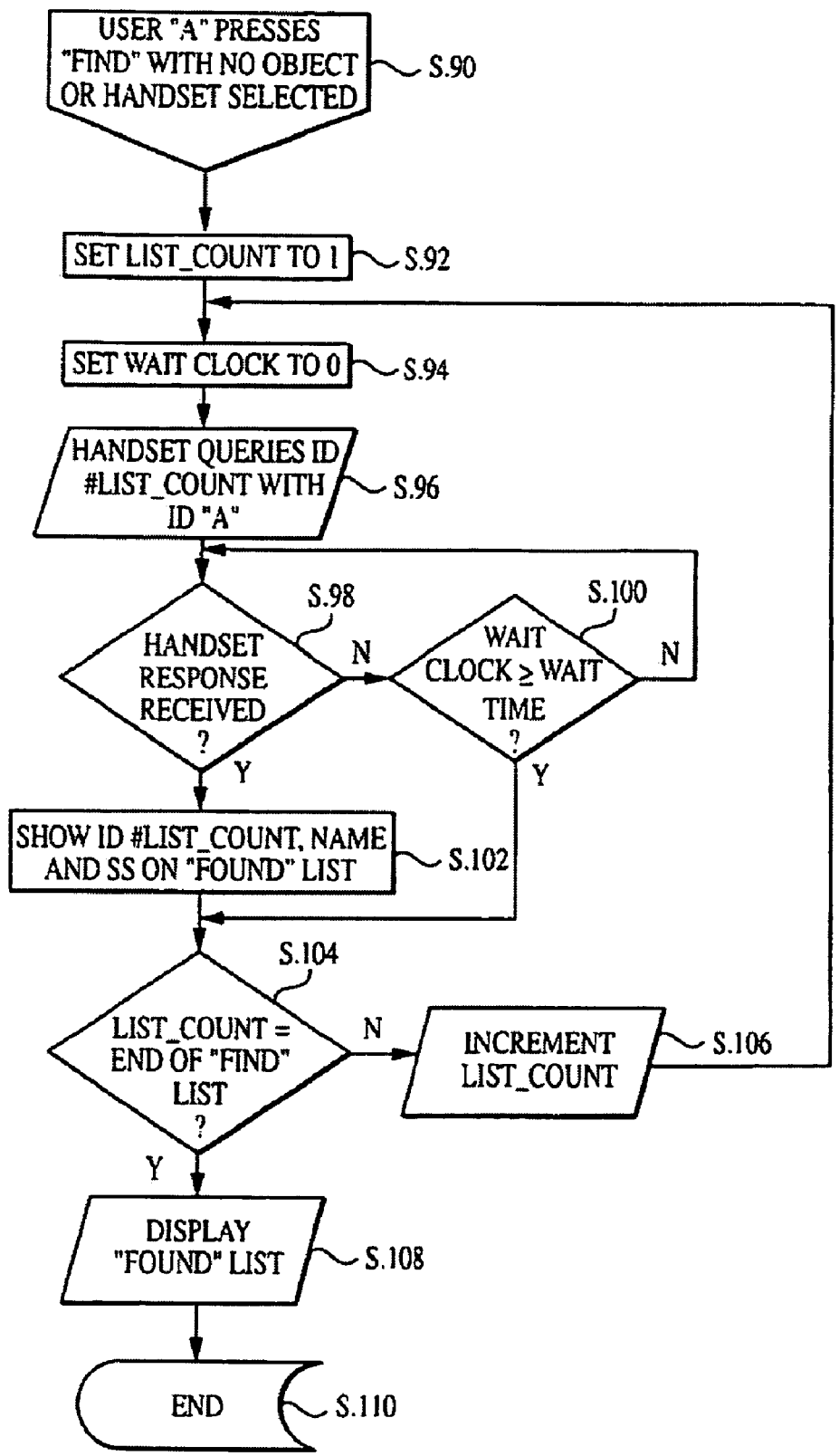
FIGS. 9A and 9B are exemplary flowcharts of the various processes and operations that may be carried out for performing a general find request with a separate or dedicated tuner.

As shown in FIG. 9A, a general find request is initiated by the user of handset A at step S.90 when the user. A presses a predetermined key on the handset (hereinafter referred to as a "FIND key") with no object or handset specifically highlighted or selected on the Find list. In response, at step S.92, the value of a list_count is initialized and set to one. Further, at step S.94, the handset initializes the value of a wait_clock to 0. After initializing the values of the counters, the handset A queries the first entry in the Find list. In one embodiment, the handset includes a separate tuner that is always on a dedicated channel, the find request or query is sent or transmitted by the tuner on the dedicated channel. The find query may include the ID of the handset specified by the entry in the Find list corresponding to the value of the list_count (initially set to one) and also includes the ID of handset A to indicate that the query is from handset A. The find query message may be transmitted based on any message structure protocol that is suitable for carrying and supporting such information elements. Further, the message structure that is utilized may incorporate parity bits or other techniques for error detection and correction. In another embodiment, the handset enters the Find Request state from the Idle state (see FIG. 5). While in the Find Request state, the requesting handset searches for an interference-free channel to send the query.

As further shown in FIG. 9A, the handset at step S.98, determines whether a response has been received. In accordance with an aspect of the present invention, handset A may dwell and wait for a predetermined time for a response from the queried handset before moving on to the next entry in the Find list. As such, if a response is not received at step S.98, then at step S.100 it is determined whether the value of the wait_clock is greater than or equal to the value of a predetermined wait time. If the wait time is not exceeded at step S.100, then logic flow loops back to step S.98. Otherwise, if the value of the wait_clock is greater than or equal to the wait time, then logic flow proceeds to step S.104.

If it is determined that a response is received at step S.98, then at step S.102 the Found list of handset A is updated with the ID of the handset that responded. In addition to indicating the ID number of the handset, the name of the handset and the signal strength (SS) of that handset may be indicated and stored in the Found list. The relative signal strength may be indicated by a numeric value, code or symbol. Further, various conventional techniques may be utilized for detecting and preparing the signal strength. The Found list may be actively displayed and updated for viewing by the user as each response is received or the Found list may be displayed only after each entry in the Find list has been queried.

After updating the Found list at step S.102, the handset determines at step S.104 whether all of the entries in the Find list have been queried. That is, at step S.104, the handset determines if the value of the list_count equals the end of the Find list. If the end of the Find list has not been reached, then at step S.106 the value of the list_count is incremented by 1 and logic flow proceeds back to step S.94. Otherwise, if the list_count equals the end of the Find list, then at step S.108 the entire and complete Found list is displayed to the user A. At step S.108, an alerting signal (e.g., a beep or message on the display) may be provided to alert the user that the find request has been completed. After displaying the Found list at step S.108, the find request routine terminates at step S.110.

As mentioned above, FIG. 9B is an exemplary flowchart of the various processes and operations that are carried out by each handset when receiving a find query or request from handset A. In one embodiment, each handset includes a separate or dedicated tuner that is always on a predetermined channel and that monitors the same for find requests. Steps S.112 through S.120 generally represent the functions performed by a responding handset. In particular, at step S.112, the handset is active and performing other functions according to the features implemented by the user. If the dedicated tuner detects that a find request or query has been received at step S.114, then at step S.116 the handset will temporarily store the ID (i.e., the ID of handset A) in memory. The ID of handset A is then compared with the Find list of the handset to determine if the particular ID is on the list. If it is determined at step S.118 that the ID of handset A is on the Find list, then a positive response is transmitted at step S.120 by the tuner on the dedicated channel. The response message that is transmitted at step S.120 may include the ID of the responding handset and the ID of the handset to which the positive response is directed. The positive response message may be transmitted based on any message structure and protocol that supports these information elements.

In another embodiment, the same or a similar functional process is implemented. However, a group of channels are scanned and a channel having acceptable interference levels is selected in accordance, for example, with the procedures described herein with reference to FIGS. 5, 6A, 6B, 30A and 30B. This embodiment is better suited for use with the handset when it is implemented with analog cellular handset circuitry.

Figure 9B:
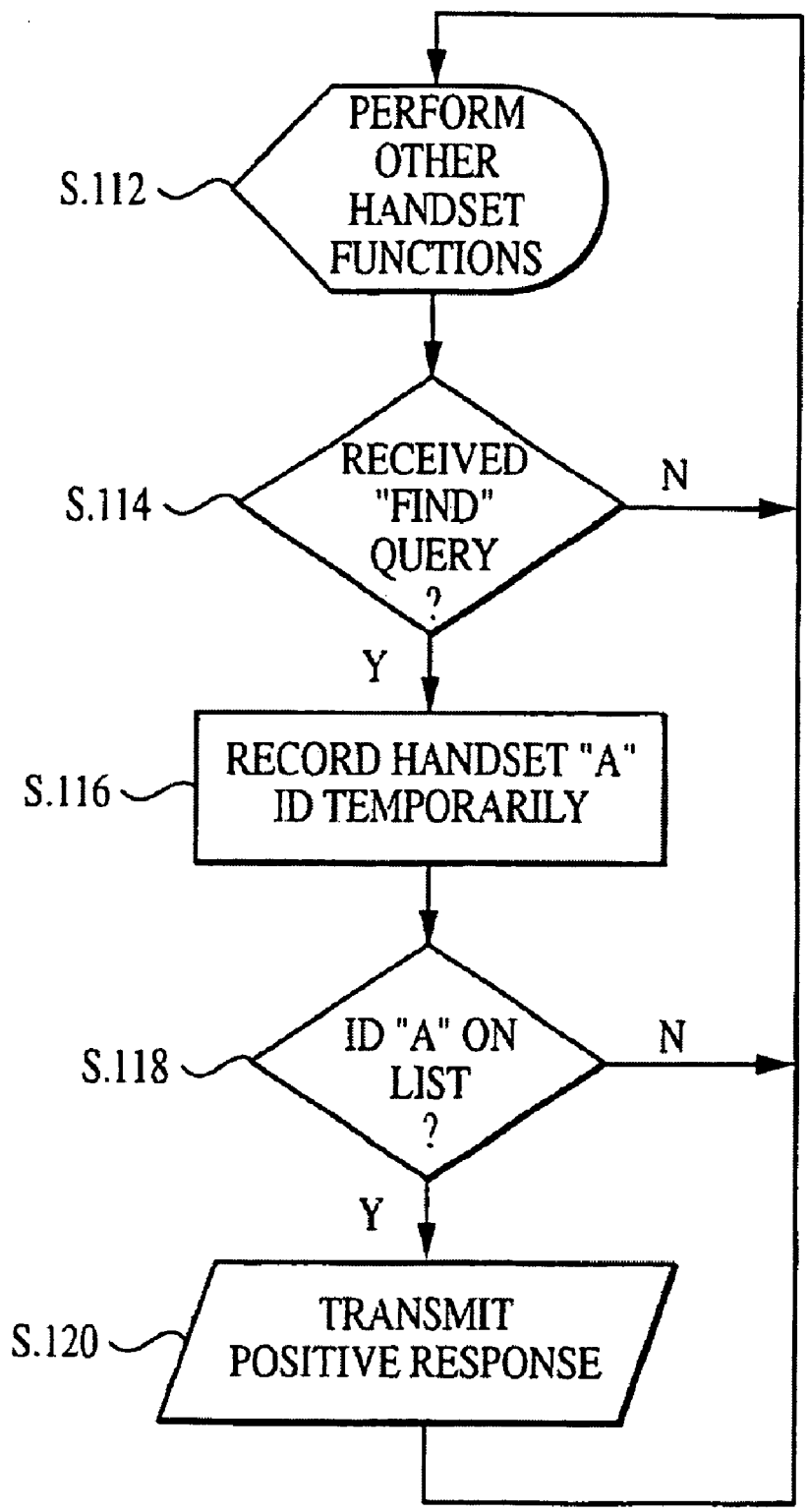

As further shown in FIG. 9B, after transmitting a positive response at step S.120, logic flow proceeds back to step S.112, so that other handset functions may be performed. Logic flow will also return to step S.112 when a find request is not detected at step S.114 or when it is determined that the ID of the querying handset (i.e., handset A) is not on the Find list at step S.118.

In the embodiment of FIGS. 9A and 9B, each handset utilizes a separate tuner which is always on a dedicated channel. When a find command is given, the handset uses the dedicated channel to contact all other handsets sequentially to determine if they are within range. Only handsets that are on the list of the handset A will be queried to determine if they are in the area. Further, only handsets that are on the list of handset A, have handset A on their list, and are within range will respond to the query, as indicated above. As such, only handsets that have given handset A permission to find them will respond. Further, according to this embodiment, since the handset utilizes a dedicated or separate tuner, find queries can occur when the handset is on a call with another handset without disruption of any call. Thus, in the exemplary flowchart of FIG. 9B, each handset may check to determine if a find query has been received on the dedicated channel even if other handset functions are being performed at the same time. That is, step S.112 may be performed concurrently with the operations performed at steps S.114 through S.120 in FIG. 9B. Further, in this embodiment, handset A may query all handsets on the Find list sequentially and, therefore, the total query time will be dependent upon the length of the Find list of handset A.

Figure 10A:
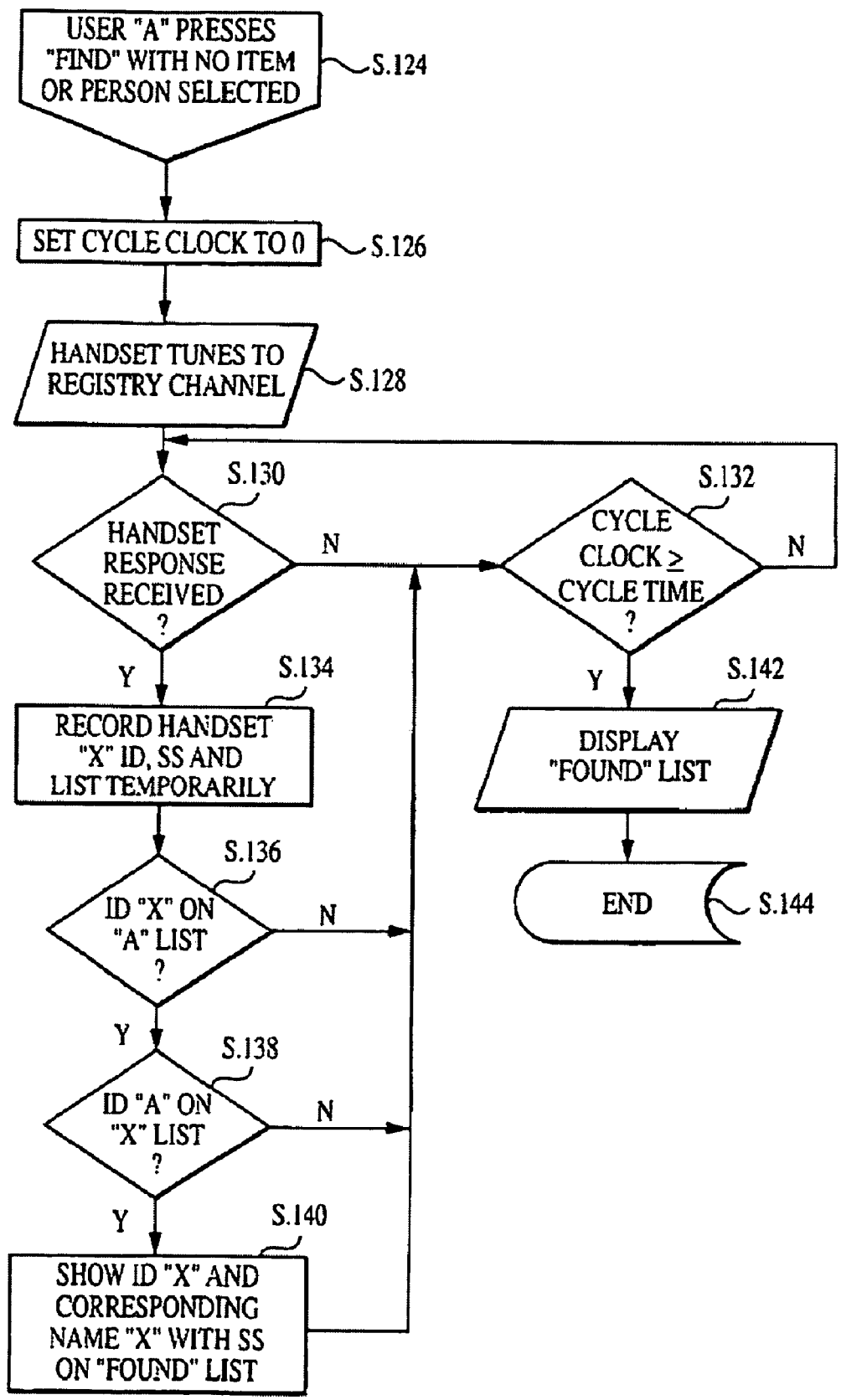
FIGS. 10A and 10B are exemplary flowcharts, in accordance with another embodiment of the invention, of the various processes and operations that may be carried out for performing a general find request with a predefined control channel.
Figure 10B:
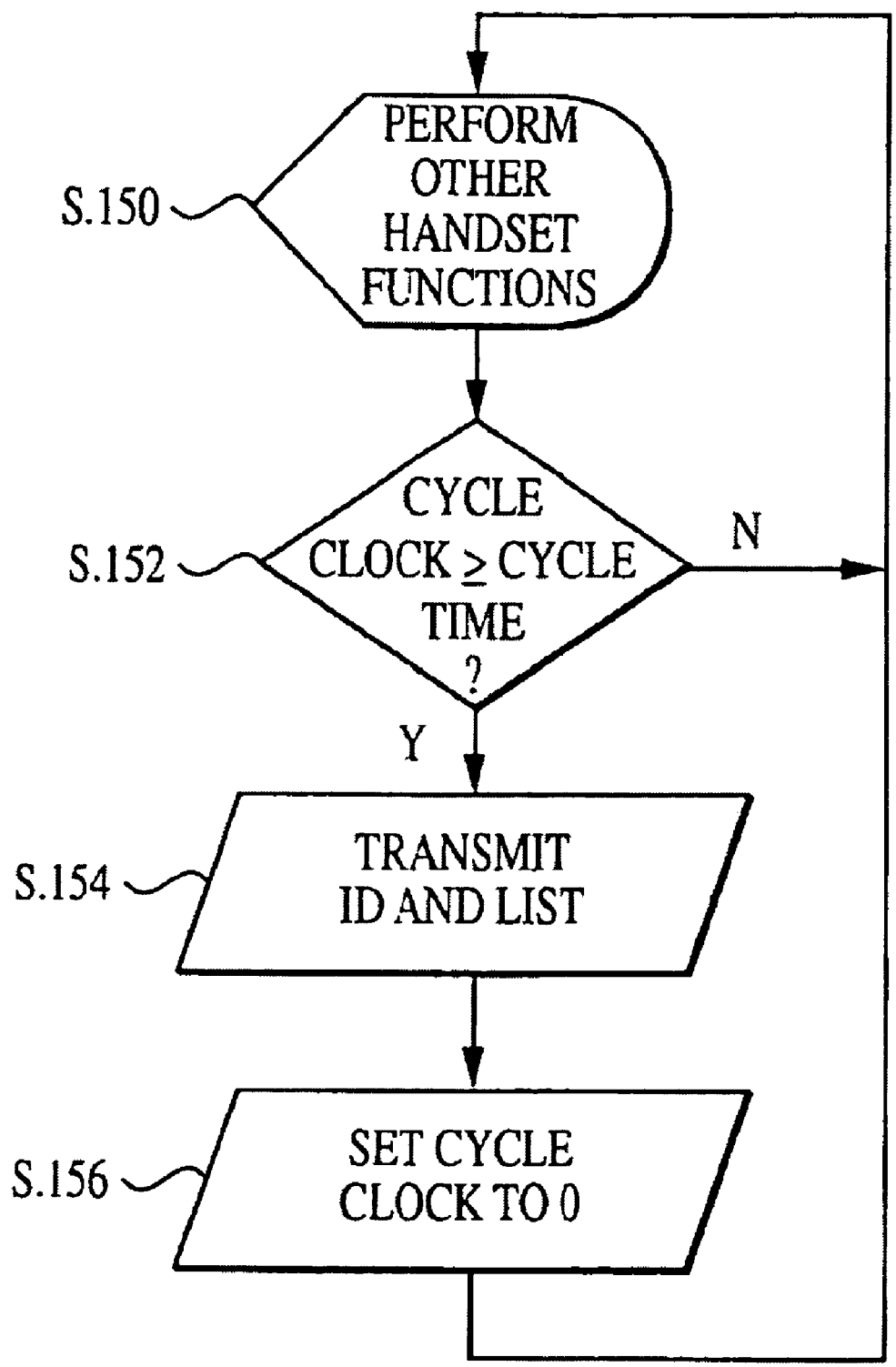

In accordance with another embodiment of the present invention, FIGS. 10A and 10B are exemplary flowcharts for performing a general find query. The embodiment of FIGS. 10A and 10B does not require the use of a dedicated or separate tuner. Instead, according to this embodiment, all handsets register on a control channel at predetermined time intervals (e.g., every "x" minutes or seconds). This registration on the control channel may occur when the handset is idle and when the handset is on a call. Registering during a free call will disrupt the call for a short period of time, since the handset utilizes the same tuner required for the free call. The registry message may include the ID of the registering handset and a list of other handset IDs that are on the Find list of the registering handset. When user A initiates a find query by pressing the FIND key, the handset of user A will tune to the registry channel and listen for the predetermined time interval (i.e., for "x" minutes or seconds). For those handsets that are on the Find list of handset A, handset A will check to ensure that handset A is on their list. FIG. 10A is an exemplary flowchart of the various processes and operations that may be performed by handset A (i.e., the handset originating the find request), and FIG. 10B is an exemplary flowchart of the processes and operations that may be carried out by each of the handsets that are on the Find list of handset A.

As shown in FIG. 10A, at step S.124 a general find request is initiated by user A when the FIND key is pressed on the handset with no specific object or handset on the Find list being selected or highlighted. In response to the FIND key being pressed at step S.124, the handset A will initialize and set the value of a cycle_clock to zero at step S.126. Thereafter, at step S.128, the handset tunes to the predetermined control or registry channel. At step S.130, the handset then determines whether a response or message is received on the registry channel. As indicated above, according to this embodiment, all handsets register on the control or registry channel in accordance with a predetermined cycle time (e.g., every "x" minutes or seconds). As such, the handset of user A will dwell and wait for the duration of one cycle time to determine if each entry in the Find list is within range. Thus, if it is determined at step S.130 that a response has not been received, then at step S.132 it will be determined if the cycle_clock is greater than or equal to the predetermined cycle time. The cycle_clock may be incremented in accordance with an internal system clock of the wireless handset. The value of the cycle_clock will, thus, maintain the elapsed time of the find query.

If it is determined that the cycle time has not been elapsed at step S.132, then logic flow proceeds back to step S.130. If a response is detected at step S.130, then at step S.134 the registry, message of the handset that sent the response (i.e., "handset X") is recorded. In particular, at step S.134, the registry message is temporarily recorded, including the ID of the handset X and the list of other handset IDs that are on the Find list of handset X. In addition, the measured signal strength (SS) of the registry signal may be recorded by handset A. Thereafter, at step S.136, it is determined whether the ID of handset X is on the Find list of handset A. If handset X is on the Find list of handset A, then at step S.138 it is determined whether the ID of handset A is on the Find list of handset X based on the information recorded from the detected registry message. If it is determined that handset A is on the list of handset X, then at step S.140 the ID of handset X is added to the Found list of handset A, along with the corresponding name for user X and the signal strength (SS). Thereafter, logic flow returns to step S.132. If the cycle time has not expired at step S.132, then additional responses that are received from other users on the registry or control channel are analyzed and (if proper) added to the Found list in accordance with steps S.134 through S.140.

When the cycle time has elapsed or been exceeded at step S.132, logic flow proceeds to step S.142 where the complete Found list is displayed to the user A. Once again, an alerting signal (such as an audible beep tone or message on the handset display) may be provided to the user to indicate that the general find query has been completed. Alternatively, the information from the Found list could be updated and displayed to the user after every successful find query by adding a "found" icon or message next to each item on the Find list as they are located or by creating a second list of those objects that were found. Following step S.142, logic flow proceeds to step S.144 where the routine terminates.

FIG. 10B is an exemplary flowchart of the various processes and operations that may be carried out by each handset (i.e., handset X) registering on the registry control channel. As discussed above, in the embodiment of FIGS. 10A and 10B, all handsets register on a predetermined control channel every x minutes or seconds. Each handset maintains a cycle_clock, which monitors the elapsed time and is used to determine when the cycle time or period has elapsed. More particularly, as shown in FIG. 10B, when not registering on the registry channel, the handset X performs other functions at step S.150. Concurrently with the performance of other handset functions or upon completion of a handset function, the handset determines at step S.152 whether the value of the cycle_clock is greater than or equal to the predetermined cycle time. If the cycle time has elapsed or been exceeded, then at step S.154 the handset will tune to the registry channel and transmit the ID of the handset and the list of other handset IDs that are on the Find list for the handset. As indicated above, the registration on the registry control channel may occur when the handset X is idle or when the handset is on a call. As such, registering during a free call will disrupt the call for a short period of time since the same handset utilizes the tuner required for the call.

Following step S.154, the handset X at step S.156 will reset the value of the cycle_clock to zero. Thereafter, the cycle_clock will be incremented in accordance with the system clock of the handset so as to keep track of the elapsed time and so that the value of the cycle_clock may be evaluated to determine each cycle period. Following step S.156, logic flow proceeds back to step S.150 and the operations at steps S.152 through S.156 are repeated. As further shown in FIG. 10B, logic flow will loop back to step S.150 whenever it is determined at step S.152 that the cycle_clock is not greater than or equal to the predetermined cycle time.

In the embodiment of FIGS. 10A and 10B, a dedicated tuner is not required for each handset. However, each handset is required to register on a registry channel in accordance with a predetermined cycle time (i.e., every x minutes or seconds). The total time required to perform a find request is approximately equivalent to the cycle time, no matter how long or short the Find list is for the handset, unless the handset tunes to the registry channel while idle. The length of the cycle time may be preset or variably set by the user or by elements in the wireless network. In either case, the length of the cycle time should be set based on the number of handsets that could be registering in a particular area and the size of the list that each handset could be transmitting on the registry channel. By requiring all handsets to transmit their associated Find lists, comparisons between the lists can be made to, ensure that handset A is on the list of handset X and vice versa, without having to contact handset X directly. For registrations that occur during a free call, two potentially long disruptions may occur. These disruptions are required while each handset registers and transmits its list on the registry channel every cycle period. The length of the disruption is dependent upon the length of the list transmitted.

Various modifications may be made to the embodiment of FIGS. 10A and 10B. For example, a procedure may be included in FIGS. 10A and 10B to provide for collision detection and/or collision correction. A collision may occur when one handset tries to register while another handset is registering on the registry channel. As further described below, by monitoring and listening to the registry channel, each handset may avoid some collisions by ceasing transmission and waiting a random predetermined period of time and retransmitting whenever a collisions is detected on the registry channel. Another feature may be added whereby an idle handset can tune to the registry channel and maintain updates on the handsets on its lists so that when the FIND key is pressed, the handset is able to immediately inform the user of the list update. Such a feature could also enhance the operation of the find procedure.

Figure 11A:
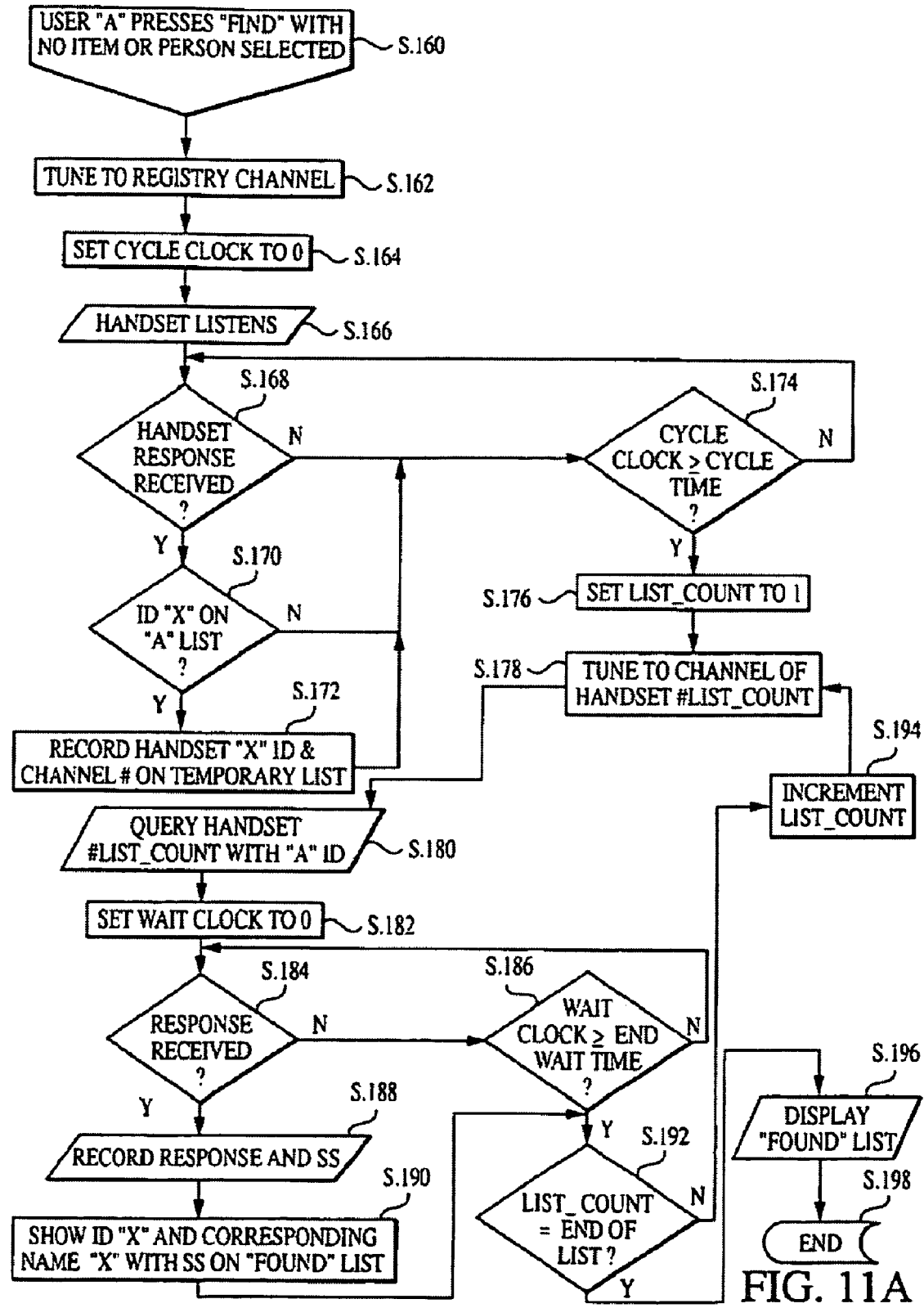
FIGS. 11A and 11B are exemplary flowcharts of the various processes and operations that may be carried out for performing a general find request, in accordance with yet another embodiment of the invention.
Figure 11B:
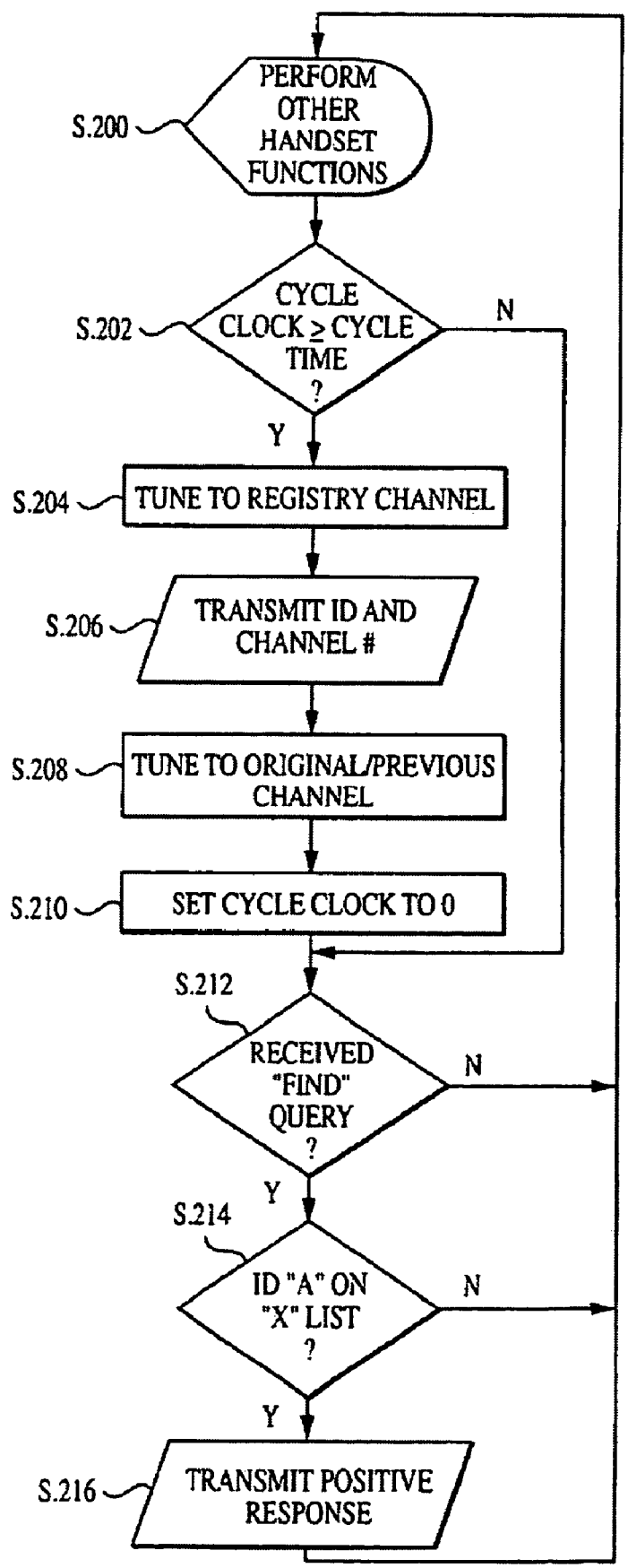

FIGS. 11A and 11B illustrate another embodiment for providing a general find request. The embodiment of FIGS. 11A and 11B combines the advantages of the embodiment of FIGS. 9A and 9B and the embodiment of FIGS. 10A and 10B. As further discussed below, in the embodiment of FIGS. 11A and 11B, all handsets register on a control channel every x minutes or seconds. The registry occurs when the handset is idle and when the handset is on a call. Registering during a free call will disrupt the call for a short period of time, since the handset utilizes the tuner required for the free call and does not include a separate or dedicated tuner for performing the registration. The registry includes the ID of the handset and the frequency at which the handset can be contacted. If the handset is on a free call, the registered frequency will be the frequency of the call. If the handset is idle or on a cellular or PCS call, the registry frequency will be the frequency of the dedicated control channel. When user A initiates a general find request by pressing the FIND key, the handset will tune to the registry or control channel and will listen for a duration corresponding to the cycle time (i.e., x minutes or seconds). For those handsets that are registered on the registry channel, handset A will contact them directly on the frequency specified in the registry. Only handsets that are on the list of handset A and that are on the registry channel will be queried. Further, only handsets that are queried, have handset A on their Find list, and are within range will respond to the query. Thus, only handsets that have given handset A permission to find them will respond. FIG. 11A is an exemplary flowchart of the various processes and operations that may be performed by the handset performing the general find request (i.e., handset A), and FIG. 11B is an exemplary flowchart of the various processes and operations that may be performed by each handset that registers on the dedicated control channel (i.e., handset X).

As shown in FIG. 11A, the general find request is initiated at step S.160 when user A presses the FIND key of the handset with no specific object or person selected on the Find list. Thereafter, at step S.162, the handset tunes to the registry or control channel. Then, at step S.164, the value of the cycle_clock is initialized and set to 0. Following step S.164, the handset A listens to the control channel for responses at step S.166.

If a handset registry response is not received at step S.168, then at step S.174 the handset checks to see if the predetermined cycle time has elapsed or been exceeded. In particular, the value of the running cycle_clock is compared with the cycle time, to determine if the value of the cycle_clock is greater than or equal to the cycle time. If the cycle_clock is less than the cycle time, then logic flow loops back to step S.168 to once again determine if a registry message has been received.

When a handset registry response is received at step S.168, then logic flow proceeds to step S.170 where the registry information is analyzed. In particular, at step S.170 it is determined whether the ID of the handset X (which registered) is on the Find list of the handset A. If user X is not on the Find list, then logic flow proceeds to step S.174. If, however, user X is on the Find list, then at step S.172 the ID of user X and the frequency or channel number contained in the registry are temporarily recorded in a separate list. As noted above, information in the registry may include the ID of the handset which registered, as well as the frequency at which that handset can be contacted. Following step S.172, logic flow proceeds back to step S.174.

After the cycle time has elapsed or been exceeded at step S.174, the handset will set the value of a list_count to one at step S.176. The value of the list_count represents an entry in the temporary list of the handset A. As shown in FIG. 11A, following step S.176 the handset will attempt to directly query and contact each of the handsets in the list which registered on the registry channel based on the frequency that was specified. Thus, only the handsets that are on the Find list of handset A and that are detected to be on the registry channel will be queried. Further, as discussed below with reference to FIG. 11B, only handsets that are queried, have handset A on their Find list, and are within range will respond to the query.

In particular, at step S.178 in FIG. 11A, the handset will tune to the specified channel or frequency of the handset identified by the value of the list_count in the Find list or temporary list of user A. Then, at step S.180 the handset will be queried with the ID of handset A being specified. The value of a wait_clock is then set to zero at step S.182 and it is determined at step S.184 whether a response message is received from the queried handset. The handset A will wait for a predetermined time to see if a response is received. Thus, if a response is not received at step S.184, logic flow proceeds to step S.186 where the value of the wait_clock is compared with the predetermined wait time. The wait_clock may be stored in the handset and incremented in accordance with the system clock to keep a running count of the wait time. If the value of the wait_clock is less than the wait time, then logic flow proceeds back to step S.184. When a response is received at step S.184, the response is recorded along with the detected signal strength (SS) at step S.188. Thereafter, at step S.190, the ID of the responding handset X and the corresponding name for the user X with the signal strength is updated to the Found list. Logic flow then proceeds to step S.192, as shown in FIG. 11A.

When it is detected at step S.186 that the value of the wait_clock is greater than or equal to the predetermined wait time, logic flow proceeds to step S.192 where it is determined whether the end of the list has been reached. In particular, at step S 192 the value of the list_count is compared with the number of entries in the Find list or temporary list stored in handset A. If the list_count equals the end of the list, then the complete Found list is displayed to the user at step S.196. Thereafter, the routine terminates at step S.198. If, however, the end of the list is not reached at step S.192, logic flow proceeds to step S.194 where the value of the list_count is incremented by one and logic flow proceeds back to step S.178, so that other handsets on the list may be directly queried. Thereafter, logic flow proceeds as described above at steps S.178 through S.192.

FIG. 11B is an exemplary flowchart of the processes and operations that may be performed by each queried handset (i.e., handset X). In particular, after performing other handset functions at step S.200, the handset X checks to determine if the cycle time has elapsed at step S.202. In this regard, a cycle_clock may be maintained that keeps a running time in accordance with an internal system clock of the handset. When it is detected that the cycle_clock is greater than or equal to the predetermined cycle time, then at step S.204 the handset X will tune to the registry channel. Then at step S.206, registration will be performed by transmitting the ID of the handset X and the channel or frequency at which the handset can be contacted. As described above, if the handset is on a free call when performing a registration, the frequency that is specified may be the frequency of the call. If, however, the handset is idle or on a cellular or PCS call, the specified frequency may be the frequency of a dedicated control channel.

After registering on the registry channel, the handset X will tune back to the original or previous channel at step S.208. Thereafter, at step S.210, the cycle_clock will be reset to zero so as to count another cycle time (e.g., another x minutes or seconds). Following step S.210, logic flow proceeds to step S.212. Further, as shown in FIG. 11B, logic flow will proceed to step S.212 from step S.202 whenever it is determined that the cycle_clock is less than the predetermined cycle time.

At step S.212, the handset X will evaluate and determine whether a find query has been received on the frequency or channel that was specified by the handset in the registry message. If a find query is not detected, then logic, flow proceeds back to step S.200 where other handset functions are performed. If, however, a find query is received, then at step S.214 the handset X determines if the ID of handset A (which is contained in the find query) is on the Find list of the handset X. If handset A is on the Find list, then a positive response is transmitted at step S.216. The positive response may include the ID of handset X. Following step S.216, logic flow proceeds back to step S.200. Further, if handset A is not on the Find list of handset X, then logic flow will also proceed back to step S.200 from step S.214.

Although not depicted in the flow charts of FIGS. 11A and 11B, if two handsets (for example, handset A and handset B) are on a free call, the handsets may register sequentially on the control channel. FIG. 11C illustrates this principle. That is, since most of the time to register is occupied in tuning to the registry channel, synchronizing with the registry channel, and then tuning back to the voice channel of the free call, conversational time can be saved by registering sequentially. In FIG. 11C, handset A and handset B are represented as sequentially registering on a control channel relative to time, with handset B registering sequentially to handset A. As a result, the total time spent away from the conversation and the free call is the total time to tune twice, sync twice and register twice. If the tune and sync times were not overlapped as illustrated in FIG. 11C, the total time spent away from a conversation would be the required time to tune four times, sync four times and register twice. As a result, by registering sequentially, the disruption of the free call can be minimized.

As discussed above, free calls that are established with handset-to-handset communication may utilize time domain multiplexing. Therefore, when handset A needs to find another handset (e.g., handset B) that is on a free call, handset A will tune to the channel in which handset B is conducting a voice conversation. As explained above, this channel will be specified by the handset when registering on the registry or control channel. When directly contacting handset B, handset A will transmit on a control time slot of the specified channel a request to handset B to check its Find list, and receive on the control time slot of the channel the response if handset A is on the Find list of handset B. Further information regarding time domain multiplexing and control time slots is provided below with reference, for example, to the description of the conferencing features of the present invention.

Various additional procedures or modifications may be made to the embodiment of FIGS. 11A and 11B. For example, an idle handset can tune to the registry channel and maintain updates on the handsets on its Find list, so that when the FIND key is pressed by the user, the direct queries of the handsets can be performed while shortening the time required for a find procedure. Further, as discussed above with reference to the embodiment of FIGS. 10A and 10B, procedures for collision detection and/or collision correction may be included in the embodiment of FIGS. 11A and 11B.

As detailed above, the embodiment of FIGS. 11A and 11B does not require a dedicated or separate tuner to be provided in each of the handsets. Instead, handsets register on a control channel according to a cycle time (e.g., every x minutes or seconds). A registry occurs when the handset is idle and when the handset is on a call. A disruption on a free call is required while both handsets register and sequentially transmit their frequency on the registry channel every cycle period. The length of this disruption should be less than that in the embodiment of FIGS. 10A and 10B, since the Find list of the handset does not need to be transmitted. Further, conversational time is improved if two handsets on a free call register sequentially. The registry message may include the ID of the handset and the frequency on which the handset can be contacted. Time domain multiplexing also allows the handsets on a free call to be queried directly on the channel while the call is occurring. With time domain multiplexing a control time slot may be utilized for querying the handset. The total time required for a find procedure includes the cycle period plus the time required to directly contact the other handsets that are within range, unless the handset tunes to the registry channel while idle. In such a case, the time required for a find procedure is only the time to directly contact the handsets that are within range.

Figure 12A:
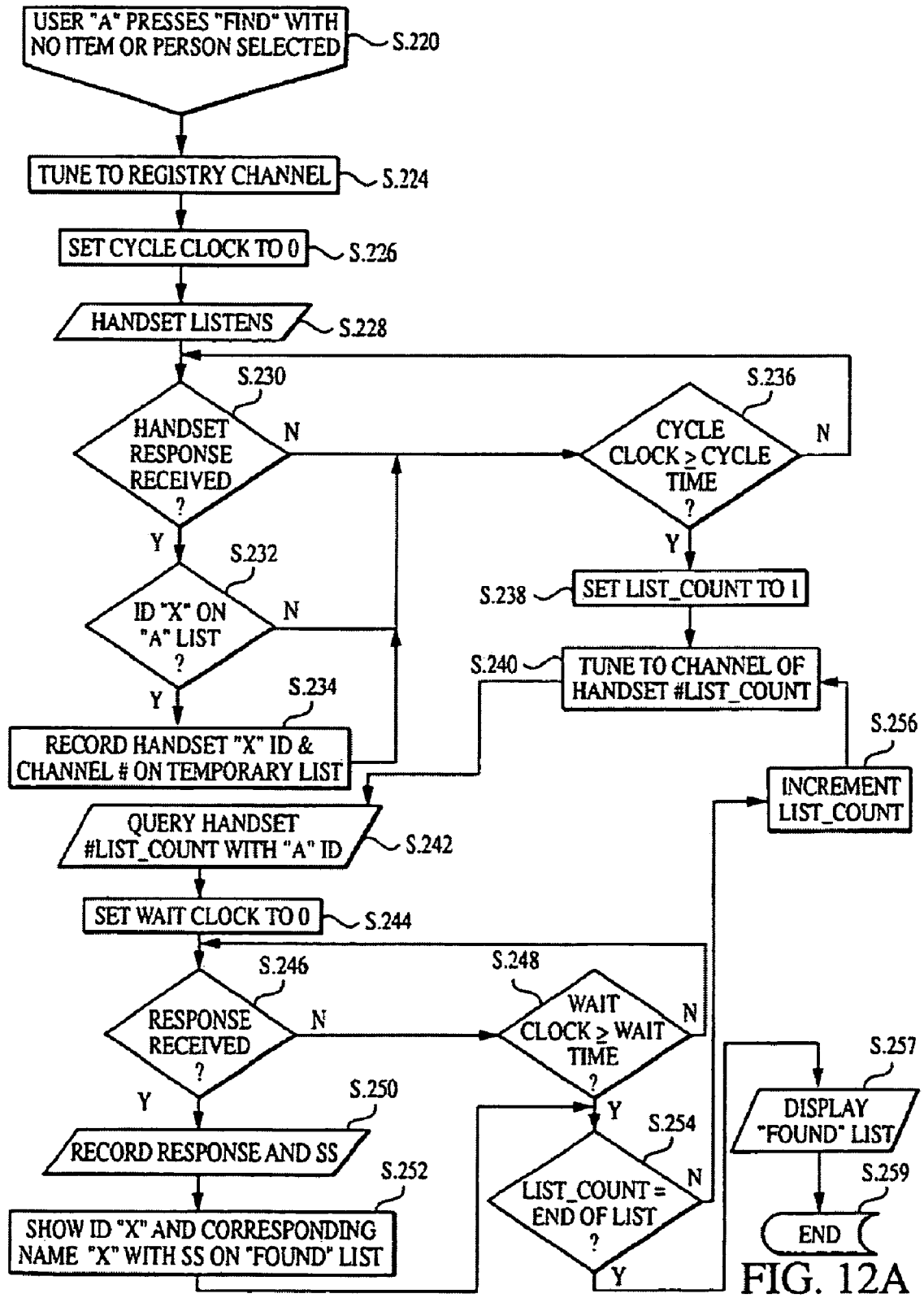
FIGS. 12A and 12B are exemplary flow charts of another embodiment of the invention for performing a general find request.
Figure 12B:
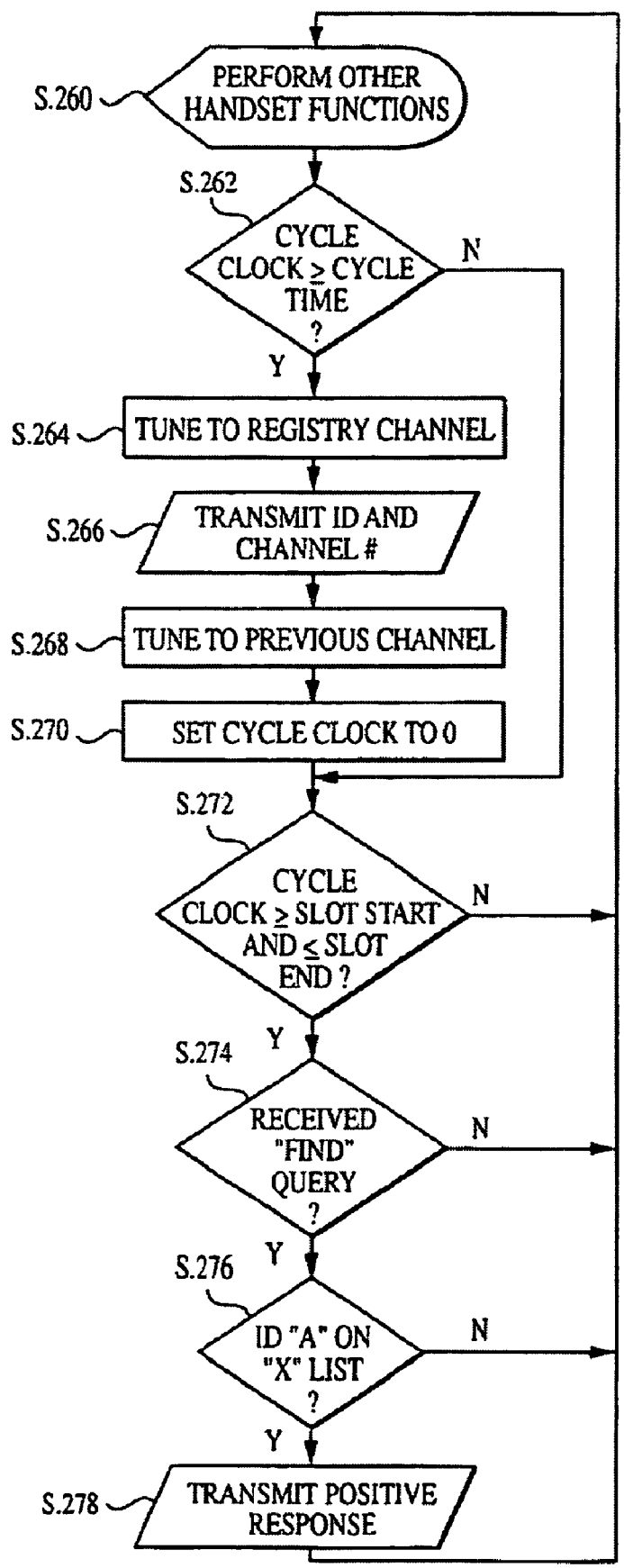

FIGS. 12A and 12B illustrate another embodiment of the present invention for performing a general find request. The embodiment of FIGS. 12A and 12B combines the advantages of using a registry and a dedicated channel. In particular, the embodiment does not require a dedicated or separate tuner, but instead each handset registers on a control or registry channel according to a predetermined cycle time (i.e., every x minutes or seconds). This registry occurs when the handset is idle and when the handset is on a call. The registry consists of the ID of the handset, the frequency at which that handset can be contacted, and the time slot in which the handset can be contacted if it is on a call. The onset of this time slot is communicated as an offset from the time that the registration occurred. If the handset is on a free call, the specified frequency will be the frequency of the call and the time slot will be the time that the other handset registers. If the handset is idle or on a cellular or PCS call, the specified frequency will be the frequency of the dedicated control channel and the time slot will be any time.

In the embodiment of FIGS. 12A and 12B, when user A presses the FIND key on the wireless handset, the handset will tune to the registry channel and listen for a duration equal to the cycle time (i.e., for x minutes or seconds). Each handset that is registered on the registry channel will be contacted directly by the handset A based on the frequency and time frame specified in the registry message. Only handsets that are on the Find list of handset A and that are on the registry channel will be queried. Further, only handsets that are queried, have handset A on their respective Find list, and are within range will respond to the query. As such, only handsets that have given handset A permission to find them will respond.

FIG. 12A is an exemplary flowchart of the various processes and operations that may be performed by the handset that initiates the general find procedure (i.e., handset A). Further, in accordance with an aspect of the invention, FIG. 12B is an exemplary flowchart of the processes and operations carried out by each handset (i.e., handset X) to register on the control channel and to respond to find queries. A detailed description of FIGS. 12A and 12B will now be provided.

As shown in FIG. 12A, a general find request is initialized when user A presses the FIND key of the handset at step S.220, with no object or handset selected or highlighted on the Find list. Thereafter at step S.224, the handset tunes to the registry channel. Further, at step S.226, the value of a cycle_clock is initialized and set to zero. Thereafter, the cycle clock may be incremented in accordance with an internal system clock of the handset, so that the elapsed time can be monitored. At step S.228, the handset listens to the registry channel to detect other handsets which have registered.

At step S.230, it is determined whether a handset response is received over the registry channel. If a handset registry is not received, then logic flow proceeds to step S.236. At step S.236, the cycle_clock is compared with the predetermined cycle time. If it is determined that the cycle time has elapsed or has been exceeded, then logic flow proceeds to step S.238. Otherwise, logic flow loops back to step S.230, where the handset continues to listen and determine whether a handset registry response is received.

When a handset response is received, handset A first checks to determine whether the ID of the handset X (which registered on the control channel) is on the Find list of the handset A. If the handset X is not on the Find list, then logic flow proceeds back to step S.236, where the cycle time is again evaluated. If, however, the handset X is on the Find list, then at step S.234 the registry message is temporarily recorded. In particular, at step S.234, the ID of handset X and the specified channel or frequency at which the handset X can be contacted is temporarily stored in memory in a separate temporary list. Further, the specified time slot (if present in the registry message) is recorded at step S.234. Following completion of step S.234, logic flow proceeds back to step S.236, where the cycle time is again evaluated.

When the value of the cycle_clock is equal to or greater than the cycle time, logic flow proceeds from step S.236 to step S.238. At this point, the handset A will set the value of a list_count to one and then proceed to step S.240 to tune to the specified frequency or channel for the handset of the entry of the Find list or temporary list corresponding to the value of the list_count (initially, the first entry in the list). Then, at step S.242, the handset A will query the handset identified by the list_count. The query message may include the ID of the handset A, and may be transmitted in accordance with the specified time slot (if required). At step S.244, the handset will set the value of a wait_clock to zero and thereafter wait for predetermined time at steps S.246 and S.248 for a positive response. The wait_clock may be incremented in accordance with an internal system clock of the handset to keep track of the elapsed time. If the value of the wait_clock is greater than or equal to the predetermined wait time, then logic flow will proceed from step S.248 to S.254. Otherwise, the handset will return and again test at step S.246 as to whether a response to the query is received. When a positive response is received from handset X, the handset A will record the response and the detected signal strength (SS) at step S.250. The Found list will then be updated at step S.252 with the ID of the responding handset (i.e., the ID of handset X) and the corresponding name of the user X with the detected signal strength (SS). Following step S.252, logic flow will proceed to step S.254.

At step S.254, it is determined whether the end of the temporary list has been reached. This determination is made by the handset by comparing the value of the list_count to the total number of entries in the List. If the list_count equals the end of the list, then the complete Found list is displayed to the user A at step S.257. Thereafter, the general find routine terminates at step S.259. If it is determined that the list_count does not equal the end of the list at step S.254, then logic flow proceeds to step S.256, where the value of the list_count is incremented by one so that additional handsets which registered and are on the List may be directly queried. Logic flow then proceeds to step S.240, where the handset tunes to the specified channel for the next handset to be directly queried. Logic flow then proceeds at steps S.242 through S.259, as described above.

FIG. 12B is an exemplary flowchart of the operations that may be performed by each handset (i.e., handset X) that registers on the control channel and transmits positive responses to handset A. When directly queried at step S.260, the handset X performs other functions. After performing other handset functions or concurrently with performance of other handset functions, the handset X detects whether the value of a cycle_clock is greater than or equal to the predetermined cycle time at step S.262. As noted above, each handset will register on the control channel in accordance with a predetermined cycle time (i.e., every x minutes or seconds). The cycle_clock may be maintained to keep track of the elapsed time and may be incremented in accordance with an internal system clock of the handset. When it is determined that the cycle time has elapsed or has been exceeded, logic flow proceeds to step S.264 where the handset tunes to the control or registry channel. Thereafter, at step S.266, registration is performed by transmitting the ID of the handset X and specifying the channel or frequency at which the handset can be contacted. At step S.266, the handset may also transmit the time slot in which the handset can be contacted if it is in on a call. As described above, the onset of the time slot may be communicated as an offset from the time that the registration occurred. Following step S.266, the handset X tunes to the previous channel of the call (if not idle) at step S.268 and, at step S.270, the value of the cycle_clock is set to zero. Logic flow then proceeds to step S.272. Further, as shown in FIG. 12B, logic flow will proceed to step S.272 from step S.262 when it is determined that the cycle time has not elapsed.

At step S.272, the value of the cycle_clock is compared with the value of the slot start time and the slot end time. In particular, at step S.272, it is determined whether the cycle_clock is greater than or equal to the slot start time and less than or equal to the slot end time. If both of these conditions are satisfied, then at step S.274 the handset determines whether a find query has been received on the specified channel during the required time slot. If a find query has been received, then at step S.276 it is determined whether the ID of the handset A (provided in the find query message) is on the Find list of the handset X. If handset A is on the Find list of handset X, then a positive response is transmitted at step S.278. Thereafter, logic flow loops back to step S.260, whereby the entire procedure is repeated. As shown in FIG. 12B, logic flow will also proceed back to step S.260 if any of the conditions in steps S.272, S.274 and S.276 are not satisfied. Further, step S.272 may be skipped when a time slot has not been specified by handset X in the registry.

In the embodiment of FIGS. 12A and 12B, registering during a free call will disrupt the call for a short period of time, since the handset utilizes the same tuner required for the free call. In particular, two disruptions on a free call are required while each handset registers and transmits its frequency and slot time on the registry channel. The length of each disruption should be less than that required in the embodiment of FIGS. 10A and 10B, since the handset does not need to transmit its Find list. As described above, the registry message may include the ID of the handset, the specified frequency for contacting the handset, and the time slot (offset) when the handset can be contacted. Unlike the embodiment in FIGS. 11A and 11B, two handsets on a free call may not register sequentially. Further, time domain multiplexing is not required. Generally, the time required for a general find procedure to be executed is the time of the cycle time (x minutes or seconds) plus the time to directly contact the handsets that are within range, unless the handset tunes to the registry channel while idle. In such a case, the time required for a find is only the time to directly contact the handsets that are within range. In particular, an idle handset can tune to the registry channel and maintain updates on other handsets on its Find list, so that when the FIND key is pressed, the direct queries of the handsets can begin without listening for the predetermined cycle time; and, thus, shortening the overall time required for a find procedure.

As explained above, in the embodiment of FIGS. 12A and 12B, the handsets may not register sequentially. Instead, handsets that are on a call should register at non-overlapping times during the cycle time in order to provide the time required to respond to find queries of other handsets during the time slot. During a call set-up, the two handsets may exchange the time they will each register. Further, the time that the other handset registers may be defined as the slot time. If a collision occurs, the registry time, slot time and the cycle time will need to be renegotiated. The main advantage of this technique is that time domain multiplexing is not required. However, as indicated above, two disruptions will occur during the cycle time instead of only one.

In addition to performing a general find request for all objects on the Find list of a handset, the wireless handsets of the present invention may also be implemented to perform a specific find request. A specific find request may be performed to determine if a specific handset is within range. To perform a specific find request, a user may press the FIND key of the handset with one of the entries in the Find list being highlighted. As with the general find request, the specific find request may be implemented by utilizing a dedicated or separate tuner or through the use of a registry channel. FIGS. 13-16 illustrate various embodiments and implementations for performing a specific find request. In order to perform the various functions and operations outlined in the FIGS. 13-16, each handset may be implemented with any suitable combination of hardware, firmware, programmed logic, and/or software. A detailed description of each of the embodiments for performing a specific find request will now be described.

Figure 13A:
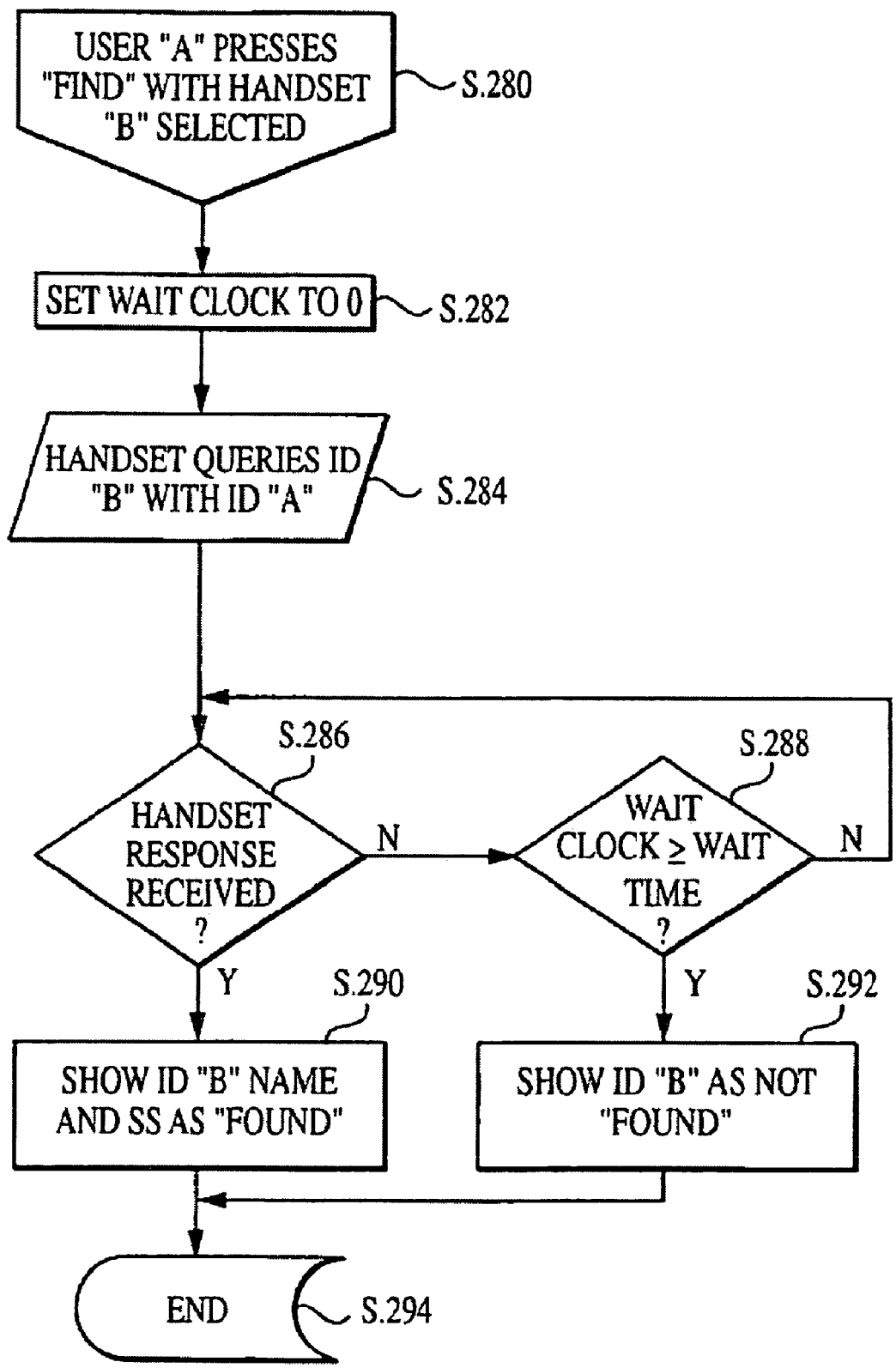
FIGS. 13A and 13B are exemplary flowcharts of the various processes and operations that may be carried out for performing a specific find request with a separate or dedicated tuner.
Figure 13B:
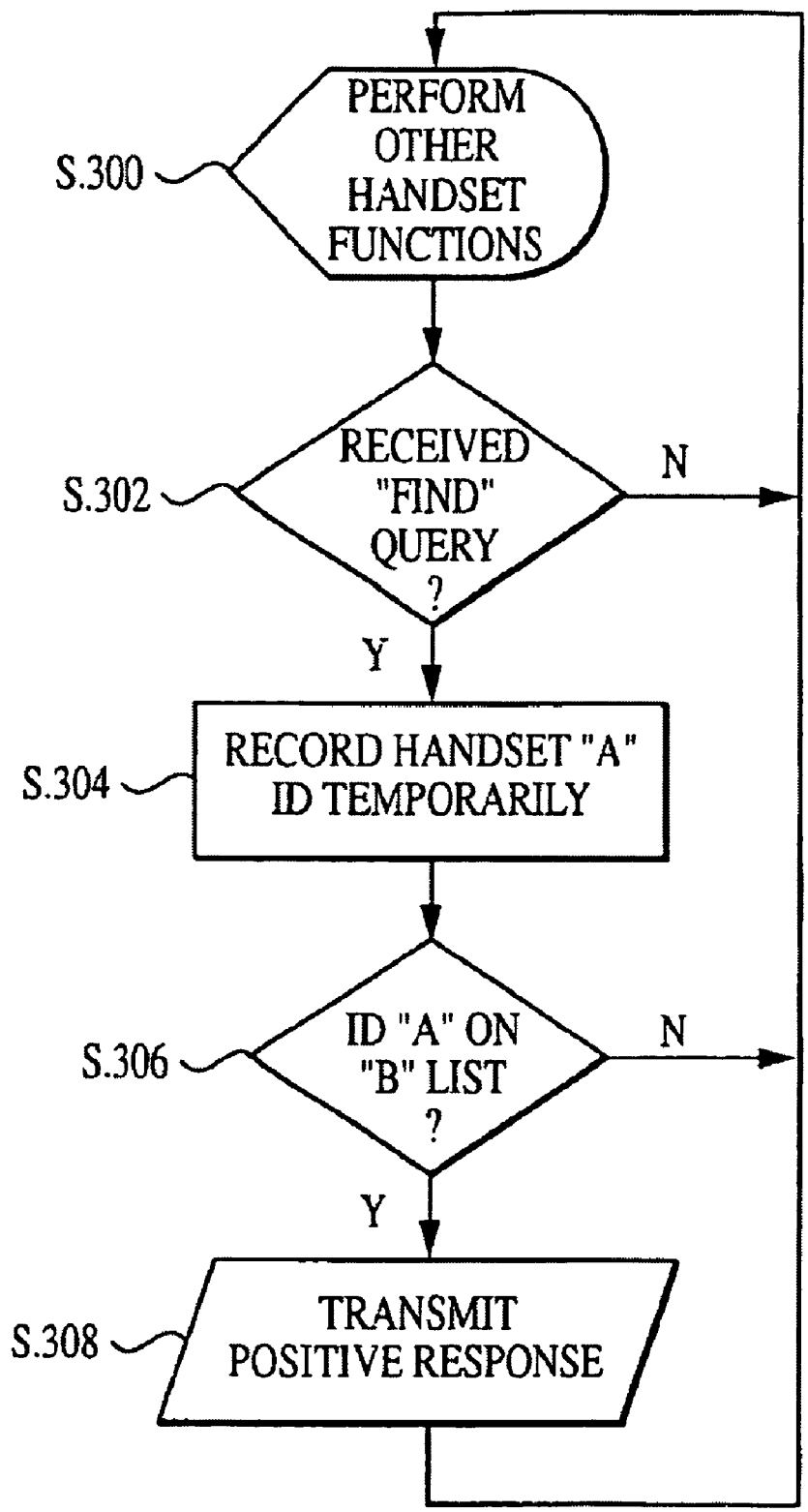

FIGS. 13A and 13B illustrate an embodiment of the invention for performing a specific find request with a dedicated tuner. That is, for this embodiment, each handset is equipped with a separate or dedicated tuner that is always on and tuned to a predetermined control channel. FIG. 13A is an exemplary flowchart of the various processes and operations carried out by a handset (i.e., handset A) which performs a specific find request with respect to another handset (i.e., handset B). FIG. 13B is an exemplary flowchart of the various processes and operations performed by handset B that is queried by handset A.

As shown in FIG. 13A, a specific handset find request is initialized at step S.280 when the user presses the FIND key of the handset A with handset B being selected or highlighted on the Find list. In response to the initialization of the specific find request, handset A initializes and sets the value of a wait_clock to zero at step S.282. The wait_clock may be provided to monitor the elapsed time and may be incremented in accordance with an internal system clock of the handset.

After setting the wait_clock, the handset A queries handset B on the dedicated control channel at step S.284. The find query may include the ID of handset B and the ID of handset A, which sent the query.

At step S.286, handset A determines whether a response has been received over the control channel. Handset A may wait and dwell for a predetermined time or wait time to determine if a response has been received from handset B. Thus, if a handset response is not received at step S.286, then handset A will determine at step S.288 whether the wait time has elapsed or been exceeded. In particular, the handset will determine if the value of the wait_clock is greater than or equal to the wait time. If the wait time has not elapsed, then logic flow loops back to step S.286 to check again whether a response has been received. When a response has not been received within the wait time, then at step S.292 it is assumed that handset B is out of range or not available, and the handset A will show or indicate to the user that handset B was not found. In this regard, the ID and/or name of handset B may be shown to the user. A as not being found on the display of the wireless handset.

If a positive response is received for the handset query at step S.286, then logic flow proceeds to step S.290. As shown in FIG. 13A at step S.290, the handset A will show the handset B as being found to the user. In this regard, the ID and/or name of handset B may be displayed on the display of the handset to user A, along with the detected signal strength (SS) and an indication that the handset was found (e.g., "Found"). Following steps S.290 and S.292, the handset find request terminates at step S.294.

FIG. 13B illustrates the various functions and operations that are performed by handset B, which was queried by handset A. At step S.360, handset B may perform other handset functions. Upon completion of the handset functions or concurrently with performance of handset functions, handset B determines at step S.302 whether a find query has been received on the dedicated control channel. As noted above, each handset includes a separate tuner which is always on and actively listens to a dedicated control channel to determine whether a find query has been received. If no find query is received at step S.302, then logic flow flows back to step S.300. If, however, a find query is received at step S.302, then steps S.304 through S.308 are performed.

In particular, at step S.304, the contents of the query message is temporarily stored in order to evaluate the same and determine whether the query has been received from a handset on the Find list of user B. Therefore, at step S.304 the ID of handset A (which sent the query) is temporarily stored. Then at step S.306, it is determined whether handset A is on the Find list of handset B. That is, the ID associated with handset A (which was contained in the find query) is compared with the entries in the Find list of handset B. If handset A is not on the Find list of handset B, then logic flow loops back to step S.300. Otherwise, if handset A is on the list of handset B, then at step S.308 a positive response is transmitted back to handset A on the dedicated control channel. The positive response message may include the ID of handset B and the ID of handset A (to which the positive response is directed). Following step S.308, logic flow then returns to step S.300.

In the embodiment of FIGS. 13A and 13B, a separate tuner is required in each of the handsets which is always on and tuned to a dedicated control channel. When a find command is given for a specific handset user, the handset uses the dedicated control channel to contact the specified handset to determine if it is within range. Since the handset has a separate or dedicated tuner for this function, the find queries can occur when the handset is on a call with another handset without disruption of the call. If the queried handset (i.e., handset B) is within range and has the querying handset (i.e., handset A) on its Find list, then a positive response message will be sent back to the querying handset over the dedicated channel.

Figure 14A:
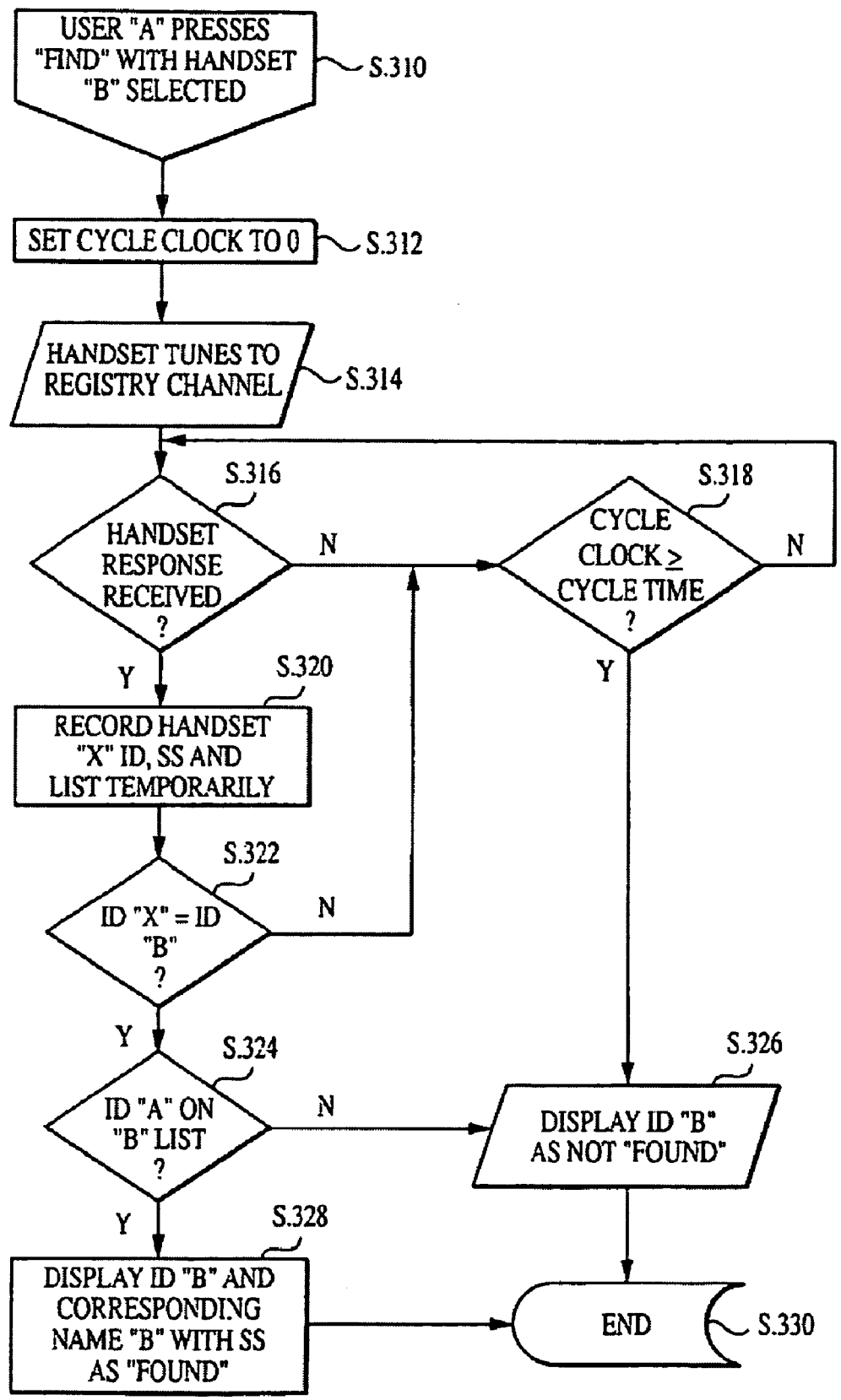
FIGS. 14A and 14B are exemplary flowcharts, in accordance with another embodiment of the invention, of the various processes and operations that may be carried out for performing a specific find request to locate a specific object, such as another wireless handset user, with a predefined control channel.
Figure 14B:
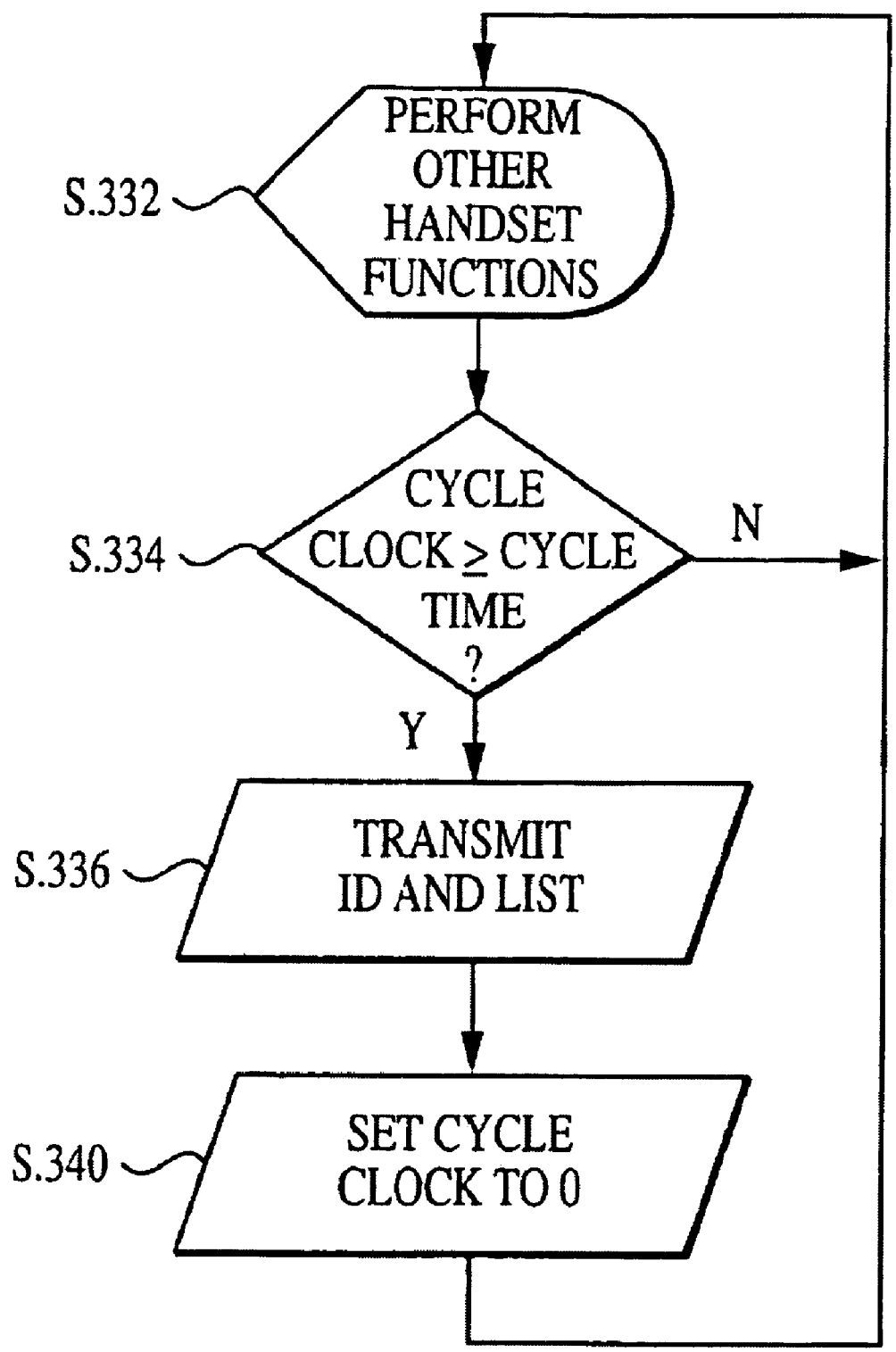

FIGS. 14A and 14B illustrate another embodiment of the invention for implementing a specific find request for a handset. In the embodiment of FIGS. 14A and 14B, a separate tuner is not required, since all handsets register on the control channel in accordance with a predetermined cycle time (i.e., every x minutes or seconds). This registry occurs when the handset is idle and when the handset is on a call. Registering during a free call will disrupt the call for a period of time, since the handset utilizes the same tuner required for the call. The querying handset (i.e., handset A) will tune to the control or registry channel and listen for the duration of one cycle time (i.e., for x minutes or seconds). For those handsets that are on the list of handset A, handset A will check to ensure that it is on their corresponding list, which is provided as part of each registry message. FIG. 14A is an exemplary flowchart of the various processes and operations performed by handset A when querying a specific handset (i.e., handset B). FIG. 14B is an exemplary flowchart of the various processes and operations performed by handset B that registers on the control channel. A detailed description of each of these figures will now be provided.

As illustrated in FIG. 14A, a specific handset request is initiated at step S.310 when user A presses the FIND key, with handset B being selected or highlighted on the Find list. Thereafter, the value of a cycle_clock is initialized and set to zero at step S.312 and the handset A tunes to the predetermined control or registry channel at step S.314. The cycle_clock may be provided to monitor the elapsed time and determine when the predetermined cycle time has elapsed. The cycle_clock may be incremented in accordance with an internal system clock of the handset. The handset A may dwell and wait at the registry channel for the duration of the cycle time to detect whether the selected handset (i.e., handset B) registers on the control channel and, thus, is within range.

Thus, at step S.316, handset A determines whether a response has been received on the registry channel. The registry response message may include the ID and the Find list of the handset. If a registry response is detected, then at step S.320 the ID of the handset that registered is recorded, along with the detected signal strength (SS) and the Find list of the registering handset. Thereafter, at step S.322, it is determined whether the ID of the registering handset (handset X) corresponds to the ID of the handset which was highlighted or designated by the user A (i.e., handset B). If the handset that registered is handset B, then at step S.324 it is determined whether handset A is on the Find list of handset B. That is, the Find list that was contained in the registry message is analyzed to determine whether the ID of user A is contained on the Find list of handset B. If user A is on the list of handset B, then at step S.328 the handset displays the ID of user B, along with the corresponding name and signal strength (SS) as being found (e.g., by displaying a "Found" message). Thereafter, the specific handset find routine terminates at step S.330.

If it is determined at step S.322 that the registering handset is not handset B, then logic flow proceeds to step S.318. Logic flow will also proceed to step S.318 from step S.316 when it is determined that handset response has not been received, as shown in FIG. 14A. At step S.318, the value of the cycle_clock is compared with the cycle time. If the cycle time has not elapsed or been exceeded based on the value of the cycle_clock, then logic flow loops back to step S.316, whereby handset listens and again determines whether a handset response has been received. If, however, the cycle_clock is greater than or equal to the cycle time at step S.318, then logic flow proceeds to step S.326.

At step S.326, the handset will display and indicate to the user that the handset B was not found. In this case, the ID and/or name of the user B may be displayed to the user of handset A, along with an appropriate message (e.g., "Not Found"). Step S.326 will also be performed when it is determined at step S.324 that the Find list of handset B does not include the ID for handset A. Following step S.326, logic flow proceeds to step S.330, where the specific handset find routine terminates.

FIG. 14B illustrates an exemplary flowchart of the operations and processes carried out by each handset (including handset B) for registering on the control channel. In particular, at step S.332, the handset performs other handset functions. Upon completion of a handset function or concurrently with the performance of other handset functions, the handset checks at step S.334 whether the cycle time has been lapsed or been exceeded. In this regard, a cycle_clock is maintained which is incremented in accordance with an internal system clock of the handset. When the value of the cycle_clock is greater than or equal to the predetermined cycle time, then it is time for handset to register on the control channel. In particular at step S.336, the handset will transmit the ID of the handset and its associated Find list on the registry channel. Thereafter, at step S.340, the cycle_clock will be reset to zero and logic flow will proceed back to step S.332. As further shown in FIG. 14B, logic flow will also loop back to step S.332 when it is determined at step S.334 that the value of the cycle_clock is less than the cycle time.

In the embodiment of FIGS. 14A and 14B, no dedicated or separate tuner is required. Instead, each handset registers on a predetermined control or registry channel every cycle period (i.e., every x minutes or seconds). The registration during a free call will interrupt the call for a period of time, since the handset utilizes the tuner required for the free call. The registry message may include the ID of the registry handset and the list of other handset IDs that are on the registering handsets Find list. By requiring all handsets to transmit their corresponding Find list, analysis of the list can be made to ensure that the querying handset (handset A) is on the list of specified handsets (handset B) and vice versa, without having to contact the specified handset directly.

Once again, it is possible to provide procedures for collision detection and/or collision correction to prevent or correct the handset from trying to register at the exact same time as another handset. A more detailed discussion of an exemplary embodiment for detecting and correcting collisions is provided below.

Various modifications may be made to the embodiment of FIGS. 14A and 14B to improve the efficiency of the specific handset find procedure. In particular, an idle handset can tune to the registry channel and maintain updates on the handsets on its list, so that when a specific find request is made, the handset is able to immediately inform the user of the Found list update.

Figure 15A:
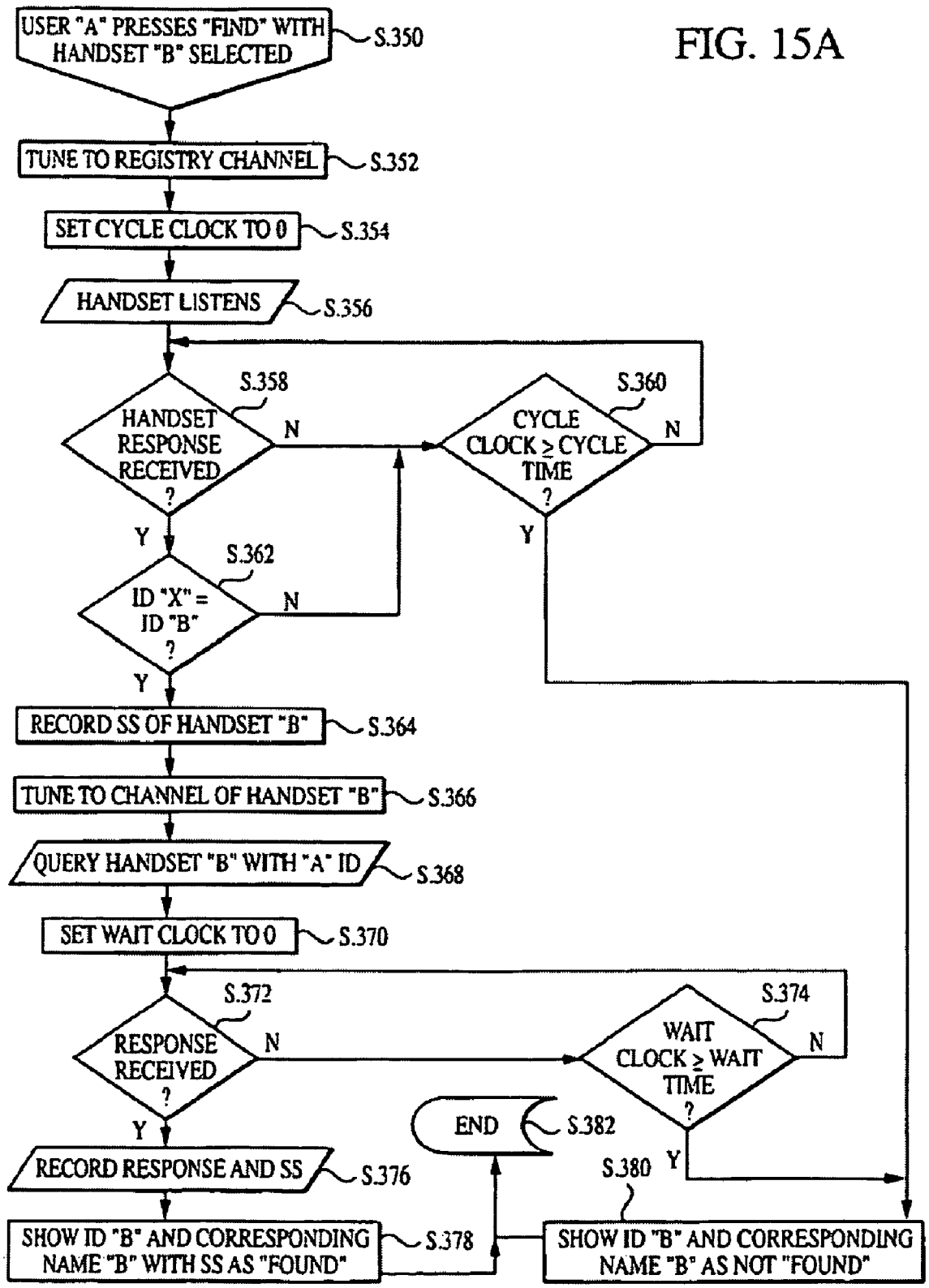
FIGS. 15A and 15B are exemplary flowcharts of the various processes and operations that may be carried out for performing a specific find request, in accordance with yet another embodiment of the invention.
Figure 15B:
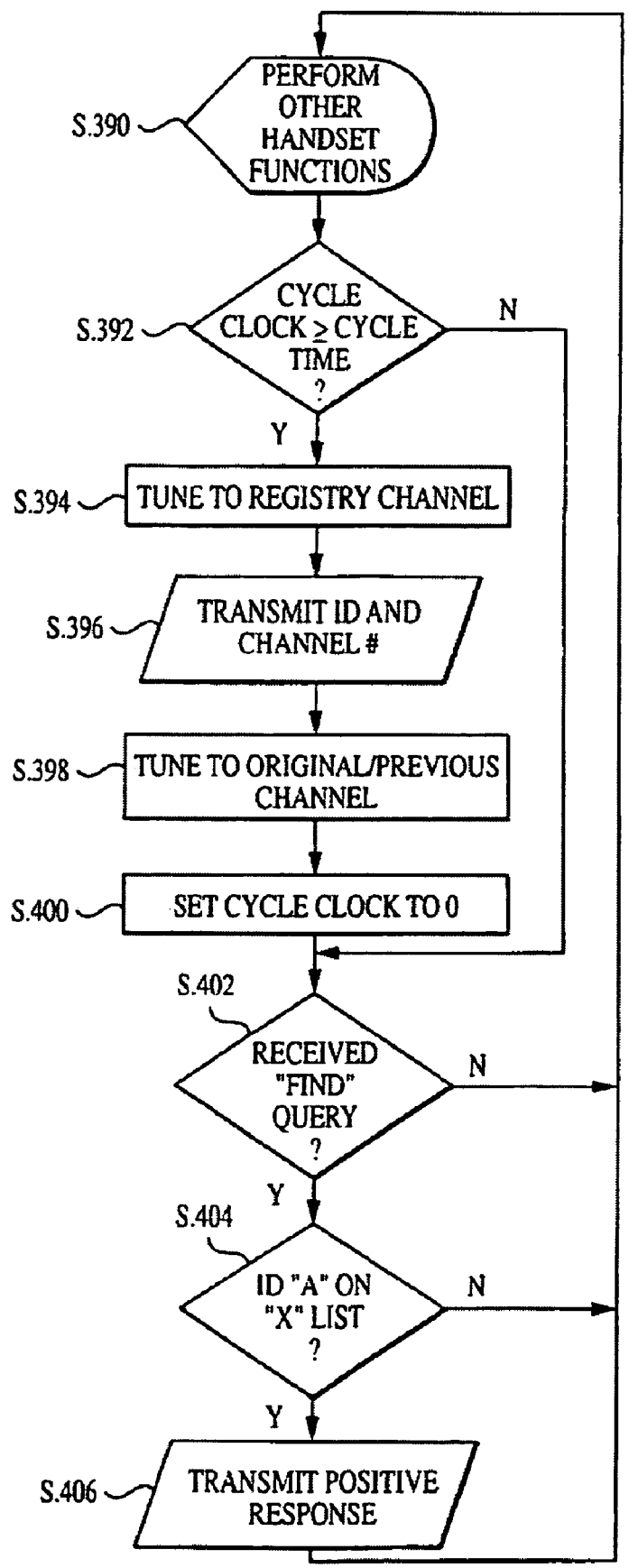

FIGS. 15A and 15B illustrate another embodiment of the present invention for providing a specific find request. The embodiment of FIGS. 15A and 15B combines the advantages of registering and having a dedicated control channel. In this embodiment, all handsets register on a predefined control or registry channel every cycle period (i.e., every x minutes or seconds). The registry occurs when the handset is idle and when the handset is on a call. The registry includes the ID of the handset that is registering and the frequency at which the handset can be contacted. If the handset is on a free call, then the identified or specified frequency will be the frequency of the call. If, however, the handset is idle or on a cellular or PCS call, the indicated frequency in the registry will be the frequency of the dedicated control channel. FIG. 15A is an exemplary flowchart of the various processes and operations that may be performed by a handset (i.e., handset A) which performs a specific request for another handset (i.e., handset B). FIG. 15B is an exemplary flowchart of the various processes and operations that are carried out by each handset (including handset B) for registering on the control channel and responding to find queries. Detailed descriptions of each of these figures will now be provided.

As shown in FIG. 15A, a specific find request is initialized at step S.350 when the user of handset A presses the FIND key with the handset B being selected or highlighted on the Find list. Thereafter, at step S.352, handset A tunes to the predefined control or registry channel and at step S.354, sets the value of a cycle_clock to zero. Thereafter, the handset A listens for registry responses at step S.356 on the registry channel.

At step S.358, it is determined whether, a handset response is received on the registry channel. If a handset registry message is not received, then at step S.360 it is determined whether the value of the cycle_clock is greater than or equal to the predetermined cycle time. As described above, the cycle_clock may be incremented in accordance with an internal system clock of the wireless handset and may be utilized to determine when the cycle time has elapsed. If the value of the cycle_clock is less than the cycle time at step S.360, then control loops back to step S.358 where the handset A again tests whether a handset response is received.

If a handset response is received at step S.358, then at step S.362 the handset A determines whether the ID of the handset which registered is equal to the ID of the handset which was highlighted by user A. That is, at step S.362, the handset A determines whether the ID of the registering handset (i.e., handset X) corresponding to the ID of handset B. If a handset other then handset B made the registry, then logic flow returns to step S.360 where the value of the cycle_clock is evaluated once again. Otherwise, if the ID corresponds to the ID for handset B, then at step S.364 the detected signal strength (SS) of the handset B is recorded. Further, at step S.366, handset A tunes to the specified channel or frequency for contacting handset B. As noted above, the registry message that is sent by each handset may include the frequency or channel at which the handset can be contacted. Following step S.366, handset A will send a find query to handset B at step S.368 with the ID of handset A being specified in the query message. The queried message will be sent on the specified frequency or channel for contacting handset B directly. At step S.370, handset A will also initialize the value of the wait_clock to zero.

At step S.372, it is determined whether a response has been received from the direct query. Handset A may dwell and wait for a predetermined wait time to detect a response from handset B. Thus, if no, response is received at step S.372, then at step S.374 it is determined whether the value of the wait_clock is greater than or equal to the predetermined wait time. The wait_clock may keep track of the elapsed time and be incremented in accordance with an internal system clock of the handset in order to keep track of the elapsed time. If the wait time has not elapsed, then logic flow returns to step S.372. Otherwise, when the wait time has elapsed or been exceeded, logic flow proceeds to step S.380, which is described in greater detail below.

If it is determined at step S.372 that a positive response has been received from handset B, then at step S.376 the response is recorded along with the detected signal strength (SS). Further, at step S.378, handset A indicates to the user that handset B has been found. This indication may be displayed on the display of the handset and may include the ID of handset B, the corresponding name of user B and/or the detected signal strength (SS). An appropriate message (e.g., "Found") may also be displayed to the user. Following step S.378, the specific handset find request terminates at step S.382.

If a response to the direct query is not detected within the predefined wait time at step S.374, then at step S.380 handset A will assume that handset B is out of range or unavailable and indicate to the user that handset B was not found. In particular, at step S.380 the ID of user B, along with the corresponding name of user B and/or a message (e.g., "Not Found") will be displayed to the user. Step S.380 will also be performed when it is determined at step S.360 that handset B did not register within the predetermined cycle time.

FIG. 15B is an exemplary flowchart of the manner in which each handset (including handset B) may register on the control or registry channel and respond to direct find queries. In particular, at step S.390, the handset may perform other handset functions. Since a separate tuner is not provided in this embodiment, disruptions may occur to a call when the handset determines it is time to register. At step S.392, the handset will check to see if it is time to register on the control channel. That is, at step S.392, the value of the cycle_clock will be compared with the predetermined cycle time. If the cycle_clock is greater than or equal to the cycle time, then at step S.394 the handset will tune to the control or registry channel. Further, at step S.396, the handset will register by transmitting the ID of the handset and the channel or frequency at which the handset can be contacted. If the handset is on a free call, the specified frequency or channel will be the frequency of the call. If, however, the handset is idle or on a cellular or PCS call, then the specified frequency will be the frequency of the dedicated control channel. Following step S.396, the handset tunes back to the original or previous channel at step S.398.

As shown in FIG. 15B, at step S.400 the handset will set the value of a cycle_clock to zero and then proceed to step S.402. Logic flow will also proceed to step S.402 from step S.392 when it is determined that the cycle time for registering has not elapsed. At step, S.402, it is determined whether a find query has been received over the specified frequency or channel for the handset. If a direct find query has not been received at step S.402, then logic flow proceeds back to step S.390. Otherwise, when a direct find query is received at step S.402, the handset then proceeds to step S.404 where it is determined whether the ID of the querying handset (i.e., the ID of handset A) is on the Find list for the handset (i.e., handset X, which may be the handset of user B or another handset user). If it is determined at step S.404 that handset A is not on the Find list, then logic flow proceeds back to step S.390. If, however, handset A is on the Find list, then permission exists for transmitting a positive response to the find query. Accordingly, at step S.406 the handset will transmit a positive response back to handset A. Following step S.406, logic flow proceeds back to step S.390.

With the embodiment of FIGS. 15A and 15B, no dedicated or separate tuner is required. However, a disruption on a free call may exist while both handsets register. As such, both handsets that are on a free call may register sequentially to minimize the disruption to the free call. In any event, the disruption to the conversation is minimized since each handset does not need to transmit their. Find list when registering.

Instead, the registry message only includes the ID of the handset and the frequency at which the handset can be contacted. Time domain multiplexing also allows the handsets on a free call to be queried directly on the channel where the call is occurring. Thus, when handset A needs to find handset B that is on a free call, handset A will tune to the channel on which handset B is conducting a voice conversation. It will then transmit the query on the control time slot of the channel to request handset B to check its list and receive from the control time slot of the channel the response if handset A is on the list of handset B.

In the embodiment of FIGS. 15A and 15B, an idle handset can tune to the registry channel and maintain updates on the handsets on its lists so that when a find request is pressed, the direct queries of a specified handset can begin. Such a modification will reduce the total time required for performing a find request in the embodiment of FIGS. 15A and 15B. In addition, procedures may be implemented in FIGS. 15A and 15B to detect collisions and/or correct collisions. As explained above, a collision may occur when one handset tries to register at the exact same time as another handset.

Figure 16A:
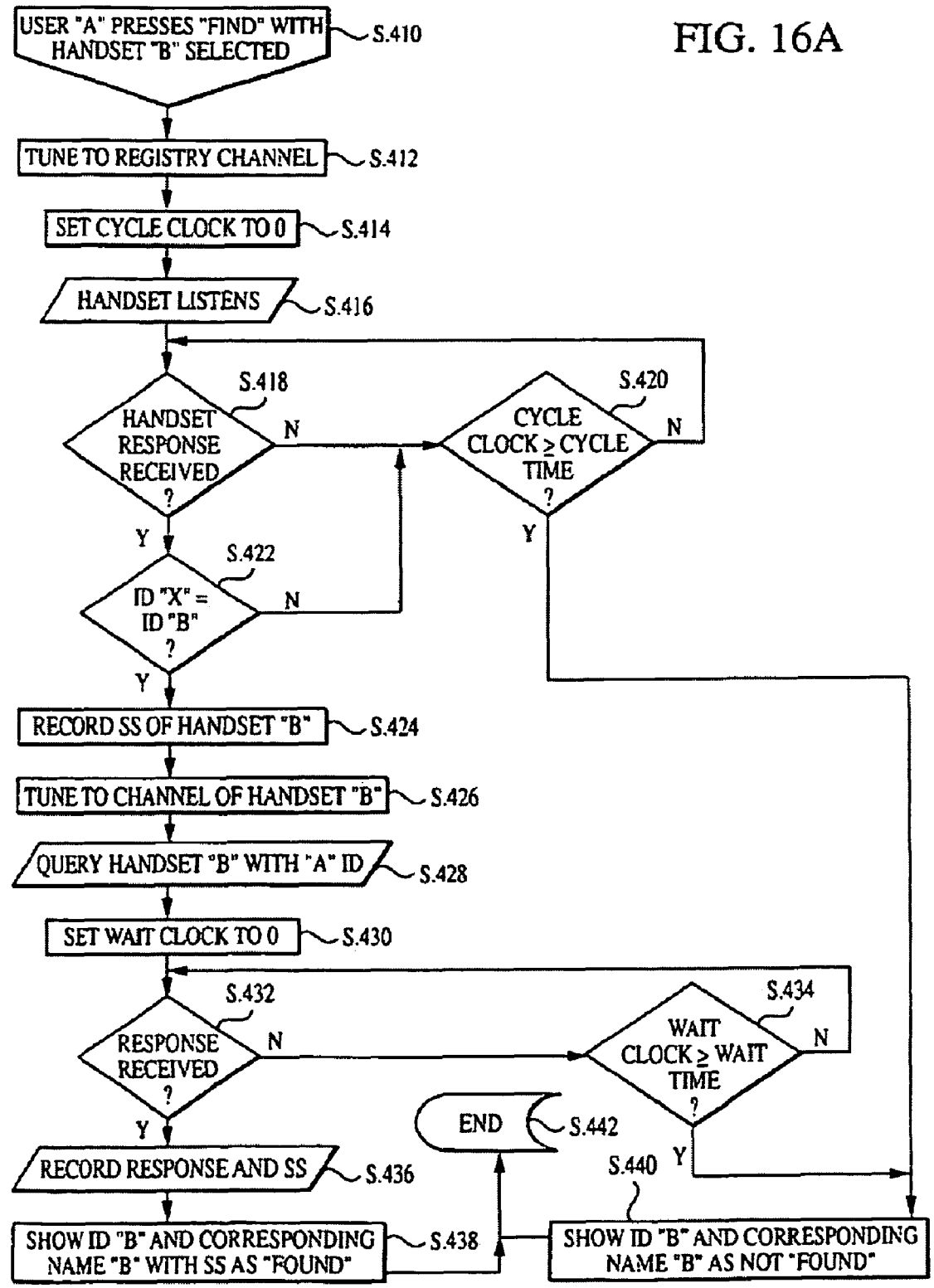
FIGS. 16A and 16B are exemplary flow charts of another embodiment of the invention for performing a specific find request.
Figure 16B:
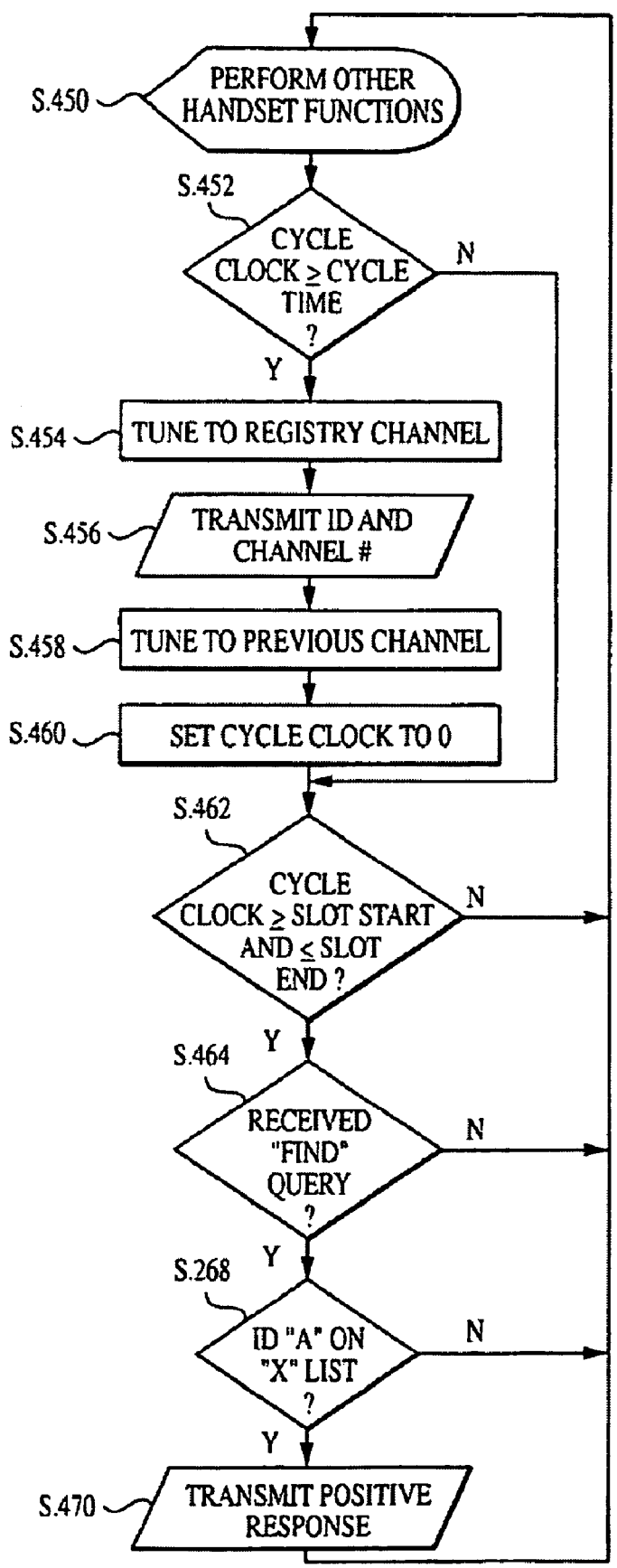

FIGS. 16A and 16B illustrate another embodiment of the present invention for implementing a specific find request for another handset. This embodiment is similar to the embodiment of FIGS. 12A and 12B in that the registry message includes not only the ID of the registering handset and the frequency at which it can be contacted, but also the time slot in which the handset can be contacted if it is on a call. By providing the time slot information, time domain multiplexing is not required in order to directly query a handset that is on a free call. FIG. 16A illustrates an exemplary flowchart of the various processes and operations that may be performed by a querying handset (i.e., handset A) which is attempting to find a specific handset (i.e., handset B) which was selected by the user. FIG. 16B is an exemplary flowchart of the various processes and operations performed by each handset (including handset B) for registering on the control channel and responding to direct find queries. A detailed description of each of these figures will now be provided below.

As shown in FIG. 16A, a specific find request is initialized at step S.410 when user A presses the FIND key with the handset B selected on the list. At step S.412, handset A tunes to the control or registry channel and at step S.414 sets the cycle_clock to zero. Thereafter, at step S.416, the handset listens to the registry channel in order to detect a handset registry or response.

If a handset response is received at step S.418, then at step S.422 it is determined whether the ID of the registering handset (i.e., handset X) corresponds to the ID of handset B, specified by user A for the specific find request. If it is determined at step S.422 that the responding handset is handset B, then at step S.424 the detect signal strength (SS) of the response is recorded and, at step S.426, the handset A tunes to the channel specified for contacting handset B. As noted above, the registry message includes the frequency at which the handset can be contacted and the time slot during which the handset can be contacted if it is on a call. At step S.428, handset A directly queries handset B on the specified channel. The direct find query will include the ID of the handset A to indicate the source of the query. Further, if handset B is on a free call, handset A will contact and send the query on the specified frequency and based on the specified time frame.

Following step S.428, the handset A will set the value of the wait_clock to zero at step S.430 and, at step S.432, determine whether a response has been received from the handset B. If a positive response is received from handset B, then at step S.436 the response is recorded along with the detected signal strength (SS) of the response. Thereafter, at S.438, the handset will indicate to the user that handset B was found. In this regard, handset A may display the ID of user B, along with the name of user B and/or the detected signal strength (SS). Following step S.438, the specific find request terminates at step S.442.

If a response is not received at step S.432, then logic flow will proceed to step S.434 to determine whether the predetermined wait time has elapsed. The handset may wait for the predetermined wait time to see if the directly queried handset responds. The value of the wait_clock may be incremented in accordance with an internal system clock of the handset to detect the elapsed time and to monitor the wait time. If the wait time has not been exceeded at step S.434, then logic flow will loop back to step S.432 so that the handset will again check to see whether a response has been received. Otherwise, if a response is not received and the predetermined wait time has been exceeded, then at step S.440, the handset will indicate that user B was not found. In this regard, handset A may display the ID of user B, along with the corresponding name of user B and/or an appropriate message (i.e.,"Not Found"). Following step S.440, the specific find request will terminate at step S.422.

Referring again to step S.418 in FIG. 16A, handset A will listen to the registry channel for the duration of one cycle time to detect whether handset B registers on the predefined control or registry channel. Thus, when a handset response is not received at step S.418, logic flow will proceed to step S.420 to check whether the cycle time has elapsed. As described above, the cycle_clock may be maintained to keep track of the elapsed time and to monitor when the cycle time has elapsed. As long as the cycle time has not elapsed, logic flow will loop back to step S.418 to check whether a handset response has been received. If, however, handset B is out of range or is not detected as registering on the control channel within the cycle time, then logic flow proceeds from step S.420 to step S.440 so that the handset A may indicate to the user that handset B was not found.

FIG. 16B illustrates an exemplary logic flow of the various procedures and operations that may be carried out by each handset (including handset B) to register on the control channel and to respond to direct find queries. At step S.450, the handset performs other handset-related functions. These functions may include maintaining a free call or performing a memory-related function. At step S.452, it is determined whether the value of a cycle_clock is greater than or equal to the cycle time. Upon detection of the lapse of the cycle time, the handset then determines that it is necessary to register on the control or registry channel. Thus, at step S.452, if the cycle_clock is greater than or equal to the cycle time, logic flow proceeds to step S.454 where the handset tunes to the registry channel. Thereafter, at step S.456, the handset transmits the ID of the handset as well as the channel or frequency at which it can be contacted. If the handset is on a free call, the handset will also specify in the registry message the time slot in which the handset can be contacted. The onset of this time slot may be communicated as an offset from the time that the registration occurred. If the handset is idle or on a cellular or PCS call, the specified frequency to contact the handset will be the frequency of the dedicated control channel and the time slot will be any time. Following step S.456, logic flow proceeds to step S.458 where the handset tunes to the previous channel. Thereafter, the cycle_clock is reset to zero. Logic flow then proceeds from step S.460 to step S.462. As shown in FIG. 16B, logic flow will also proceed to step S.462 from step S.452 when it is determined that the cycle time has not elapsed.

At step S.462 the value of the cycle_clock is compared with the slot start time and slot end time. In particular at step S.462, it is determined whether the cycle_clock is greater than or equal to the slot start time and less than or equal to the slot end time. If these conditions are satisfied, then logic flow proceeds to step S.464, where the handset determines whether a direct find query has been received during the specified time frame. If the conditions of step S.462 are not met (i.e., the value of the cycle_clock is outside of the specified time frame) or a find query is not received at step S.464, then logic flow will loop back to step S.450, as shown in FIG. 16B.

When a direct find query is received at step S.464, the handset will check to see if the ID of the querying handset (i.e., handset A) is on the list of the handset (i.e., the Find list of handset X, which may be handset B or another handset). If the ID of handset A is on the Find list, then a positive response is transmitted at step S.470. Thereafter, logic flow returns to step S.450. If, however, there is no permission to respond to the find query since handset A is not on the Find list of the handset, then logic flow will proceed directly back to step S.450 from step S.468.

In the embodiment of FIGS. 16A and 16B, when the querying handset (i.e., handset A) is initialized to perform a specific find request with respect to another handset (i.e., handset B), handset A will tune to the registry channel and listen for the duration of the cycle time. When it is detected that handset B registers on the registry channel, handset A will contact handset B directly on the frequency specified in the registry and in the time frame specified (if necessary). If handset B is within range, detects the find query from handset A and determines that handset A is on its corresponding Find list, then handset B will be able to respond to the query from handset A.

During call setup, two handsets may exchange the time that they will each register. The time that the other handset registers may be defined as the slot time. Therefore, in the embodiment of FIGS. 16A and 16B, handsets may not register sequentially. Instead, handsets on a call may register at non-overlapping times during the cycle time in order to provide the time required to respond to find queries of other handsets during the slot time. If a collision occurs, then the registry time, slot time, and cycle time should be renegotiated. While two disruptions on a free call are required (since each handset registers and transmits its frequency and slot time on the registry channel), each disruption is minimized since the Find list of each handset does not need to be transmitted. Further, this embodiment includes the advantage of not requiring time domain multiplexing.

As discussed above, the wireless handset of the present invention may also be implemented with a set of List Maintenance features. Generally, each wireless handset may store and maintain one or more lists of numbers and/or IDs of other handset users. According to a preferred embodiment of the invention, each handset is equipped with three lists of numbers, including a Speed Dial list, a Find list and a Found list. The Speed Dial list contains the names and numbers of all the people the user would like to call without having to dial the number directly. The Find list contains the names and number of all of the people that are on the Speed Dial list that have a wireless handset that is capable of operating in a direct handset-to-handset communication mode. Further, as described above, the Found list is the list of people or users that are on the Find list of the handset and that are within range of the user's wireless handset. The Found list is generated by pressing, for example, a FIND button on the handset and executing a find request. Each wireless handset may be implemented such that changes to any, one of these lists will automatically be reflected in the other lists. In addition, these lists (i.e., the Find, Speed Dial and Found lists) do not need to be provided separately in the wireless handset. For example, two lists or all three lists may be combined in the handset.

The List Maintenance features of the present invention may include features which permit a user to add, delete and modify entries to each list of the handset. In particular, according to an aspect of the present invention, the List Maintenance features may allow users to add entries identifying other handset users to their Speed Dial list and Find list. For example, a program feature may be provided which allows a user to program, with the buttons or keypad of the handset, the name and number of a person into either the Speed Dial list or the Find list. Such a feature may be similar in functionality to that used for programming speed dials in to conventional wireless handsets. However, the program feature of the invention may additionally require that the user indicate whether the number being programmed belongs to a compatible wireless handset that is capable for performing direct handset-to-handset communication.

Another feature which may be provided with the List Maintenance features is a delete feature. With the delete feature, a user may be given an option to delete an entry from either the Speed Dial List or the Find list. When deleting an entry, both the name and number of the user will be deleted. In addition to the delete feature, a group feature may also be provided to permit a user to group objects into sublists. This feature may be useful when grouping family members, co-workers or friends into sublists. Grouping items on the Speed Dial list may also automatically cause entries to be grouped on the Find list, and vice versa. When items are grouped, their members will continue to be available on the list, as well as the group as a whole.

According to an additional aspect of the present invention, the List Maintenance features of the wireless handset includes a memorize feature which provides an easy way for handset users to trade names and numbers with one another. The memorize feature may be invoked when two handset users are near each other (e.g., within an arm's reach or the same room) or are talking to each other on a free call. As illustrated in FIG. 5, a wireless handset may transition from an Idle state to a Memorize Request state when invoking the memorize feature. By invoking the memorize function at approximately the same time, the two handsets will exchange names and numbers, and enter those names and numbers into their respective Find list.

Figure 40A:
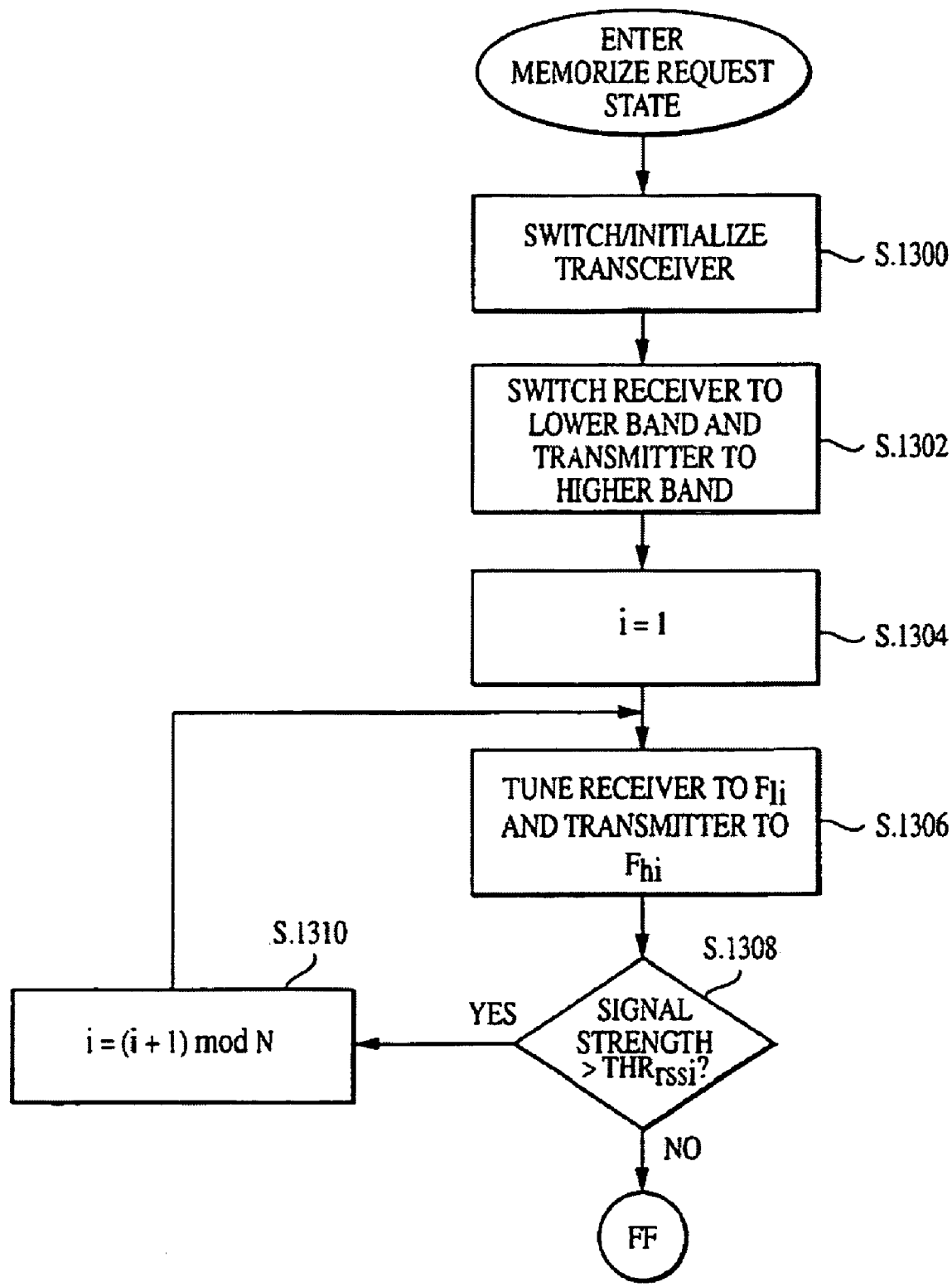
FIGS. 40A and 40B illustrate exemplary flowcharts of the various processes and operations in a Memorize Request state, according to another aspect of the invention.
Figure 40B:
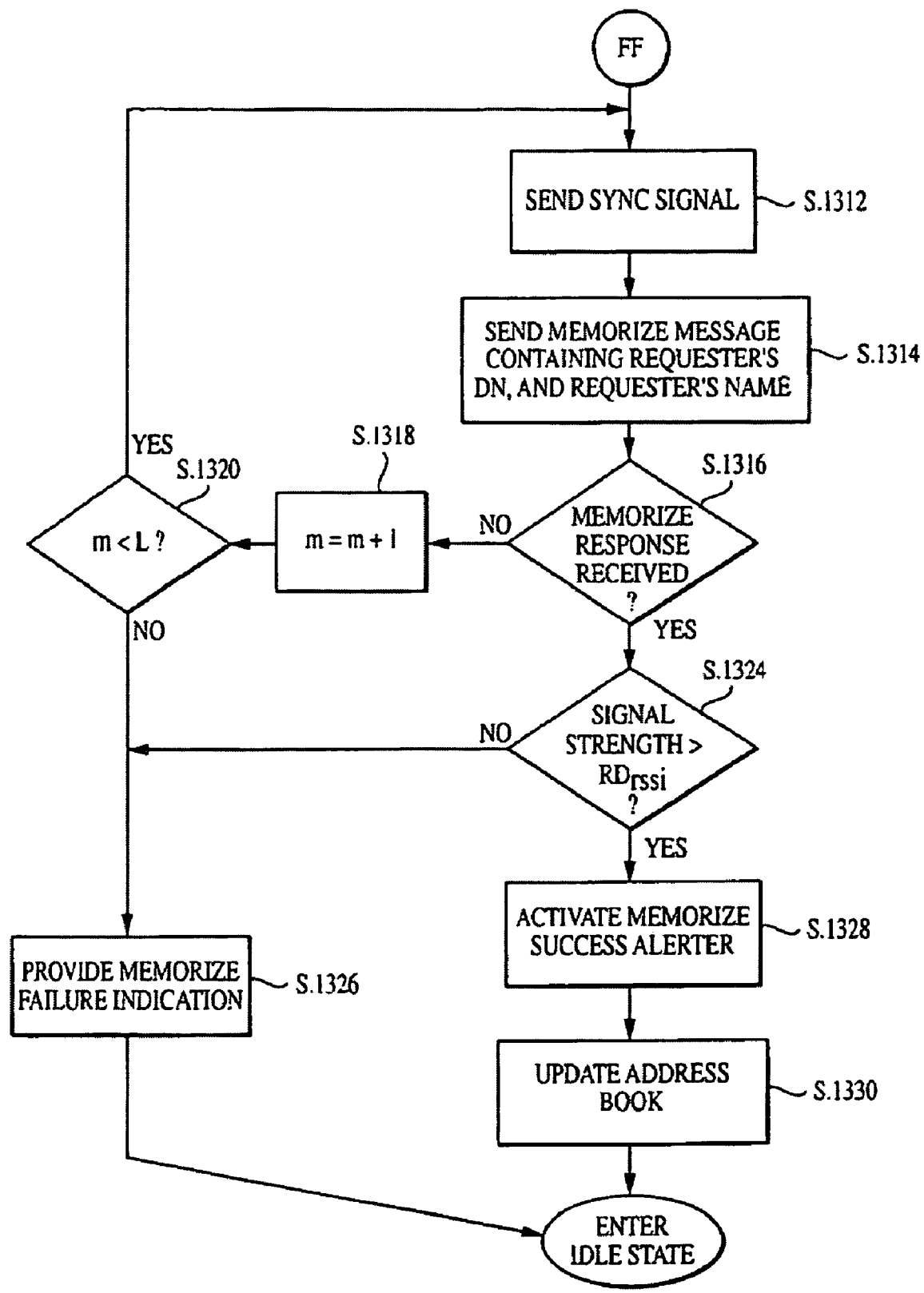

By way of a non-limiting example, FIGS. 40A and 40B are exemplary flowcharts of the various processes and operations in a Memorize Request state, according to an aspect of the invention. As illustrated in FIG. 5, when initiating the memorize feature to exchange information with an object, the wireless handset will transition from an Idle state to a Memorize Request state. The transition from an Idle state to the Memorize Request state may occur under condition 1, when a user indicates to initiate or start a memorize request to exchange information with another object (e.g., another wireless handset) by pressing an appropriate key or button on the wireless handset. In the Memorize Request state, the wireless handset will attempt to exchange information (including ID or directory number information) with another handset or object that is located within range. The wireless handset may transition back to the Idle state from the Memorize Request state (represented by condition m in FIG. 5) after successfully exchanging information with another object or handset or after failing to complete the memorize function.

More particularly, as illustrated in FIG. 40A, when entering a Memorize Request state the wireless handset will first switch and/or initialize the transceiver of the handset at step S.1300 for the memorize request. That is, N frequency pairs may be assigned to the wireless handset for performing a memorize function, with the higher frequency associated with a duplex channel "i" being designated as F.sub.hi and the lower frequency being designated as F.sub.li. Therefore, at step S.1302, the wireless handset will switch the receiver to the lower frequency band of the duplex pass band and switch the transmitter to the higher frequency band. As further shown in FIG. 40A, the handset will also initialize and set the value of a counter i to 1 at step S.1304. Following step S.1304, the receiver of the handset will be set to the low frequency F.sub.li and the transmitter will be tuned to the higher frequency F.sub.hi at step S.1306.

After tuning the receiver and transmitter, the wireless handset will determine at step S.1308 whether there is interference in the channel. Interference may be analyzed by determining whether the signal strength of the channel is not greater than a predetermined threshold. For example, at step S.1308, the wireless handset may determine whether the received signal strength of the channel is greater than a threshold level THR.sub.rssi. If it is determined that the threshold has been exceeded and that there is interference on the channel, then at step S.1310 the value of the count i may be modified according to the following equation:

$$i=(i+1)\bmod N$$

After the value of the counter i is reset, logic flow proceeds back to step S.1306 so that another channel is tuned to and analyzed for interference.

If the signal strength of the channel is determined to be acceptable at step S.1308, then a counter m may be initialized and set to 0 and at step S.1312 (see FIG. 40B) a synchronization signal may be sent by the wireless handset. After synchronization, the wireless handset may transmit a memorize message over the channel at step S.1314. The memorize message may include information associated with the handset, including the directory number DN and/or name associated with the wireless handset. Following step S.1314, the wireless handset will wait for a response at step S.1316 to determine if the object or other wireless handset responds by sending a memorize response message to complete the exchange of information. Ideally, the memorize feature should be invoked when both handsets are in close proximity to each other, so that memorize messages can be sent and received without interference (e.g., by calls or memorize messages transmitted between other wireless handsets in the area). In addition, the memorize messages may be transmitted at a reduced power level and within a short time window in order to avoid the messages from being received by other handsets or objects in the area. As such, the requesting handset that transmits the memorize message may wait for a predetermined period of time (e.g., a few seconds) to determine if a memorize response message has been received, before attempting to retransmit on another channel or determining that the memorize request has failed.

If a memorize response message is not received at step S.1316, then the counter m is incremented by one at step S.1318 and at step S.1320 the requesting handset determines whether m has exceeded a predetermined limit L. If m is less than or equal to the predetermined limit L, then logic flow proceeds back to step S.1312 so that a synchronizing signal and the memorize message may be resent. Otherwise, at step S.1326, the handset will assume that the memorize request has failed and a find failure indication will be provided to the user to indicate that the memorize request was unsuccessful. Following step S.1326, the wireless handset may transition from the Memorize Request state back to the Idle state, as illustrated on FIG. 40B.

If a memorize response message is received at step S.1316, then the wireless handset will check and analyze the signal strength of the memorize response message to determine if it was transmitted by the responding handset that is within close proximity, or next to the transmitting handset. That is, at step S.1324, the handset may compare the signal strength with a predetermined threshold RD.sub.rssi to confirm that the memorize response message was sent at a reduced power level. If the signal strength is greater than the predetermined threshold RD.sub.rssi, then the attempt to exchange information has failed and at step S.1326 a find failure indication will be provided to the user to indicate that the memorize request was unsuccessful. Thereafter, the handset may return to an Idle state. If, however, the signal strength is determined to be at the expected reduced power level, then the memorize response message has been received successfully and the information associated with the responding handset (including directory number and/or name) will be decoded. Further, at step S.1328, a memorize success alerter will be activated to notify the user that the memorize request was successful. This indication may comprise providing an audible tone and/or message to the user with the handset. Following step S.1328, the handset will store and update the decoded information in the handset. The information may be stored in the speed dial and Find lists of the handset, so that the user may initiate call requests and find requests with the stored information. Thereafter, the wireless handset may transition from the Memorize Request state back to the Idle state, as illustrated on FIG. 40B.

Figure 17A:
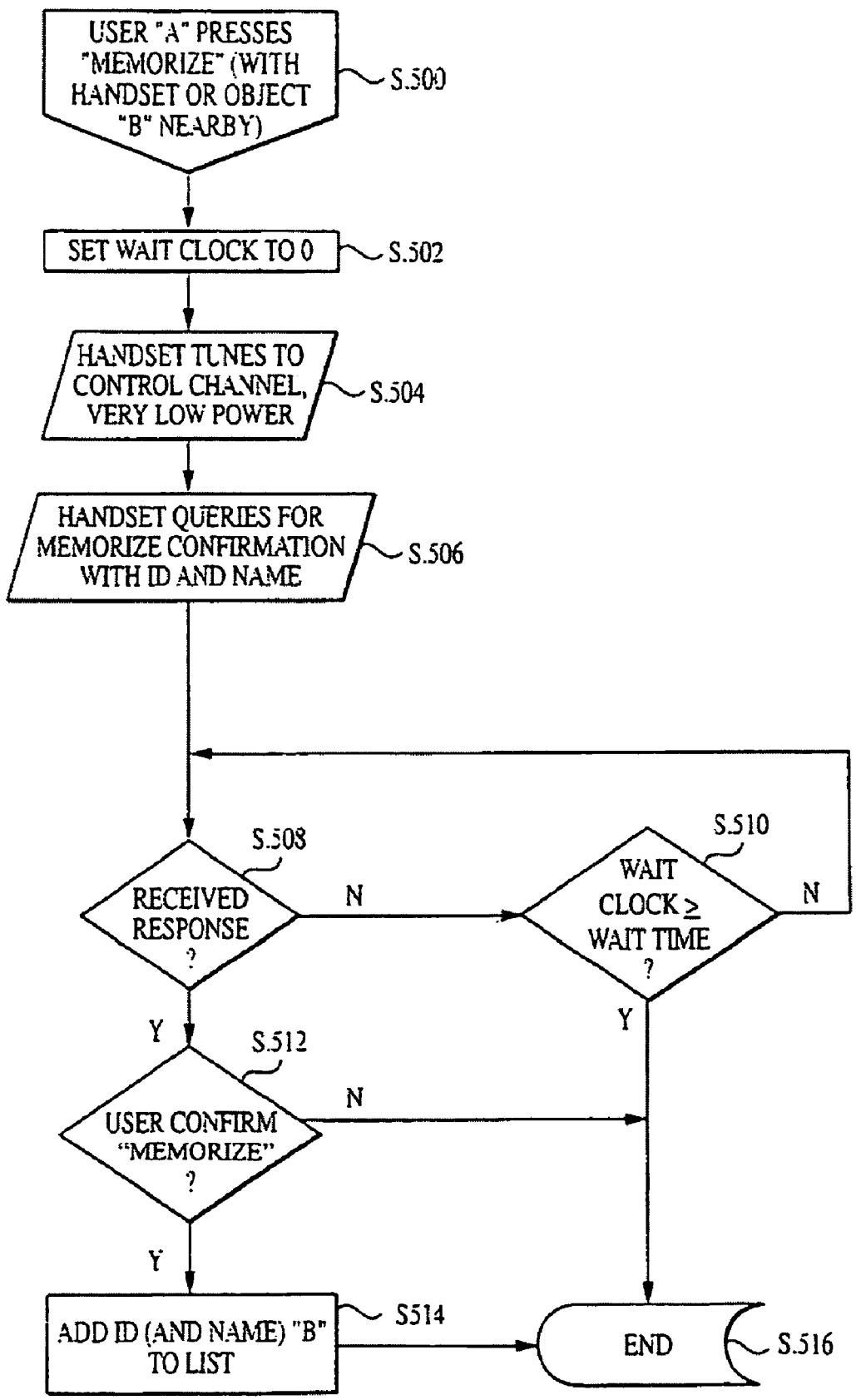
FIGS. 17A and 17B are exemplary flow charts of an embodiment for performing a memorize feature of the present invention.
Figure 17B:
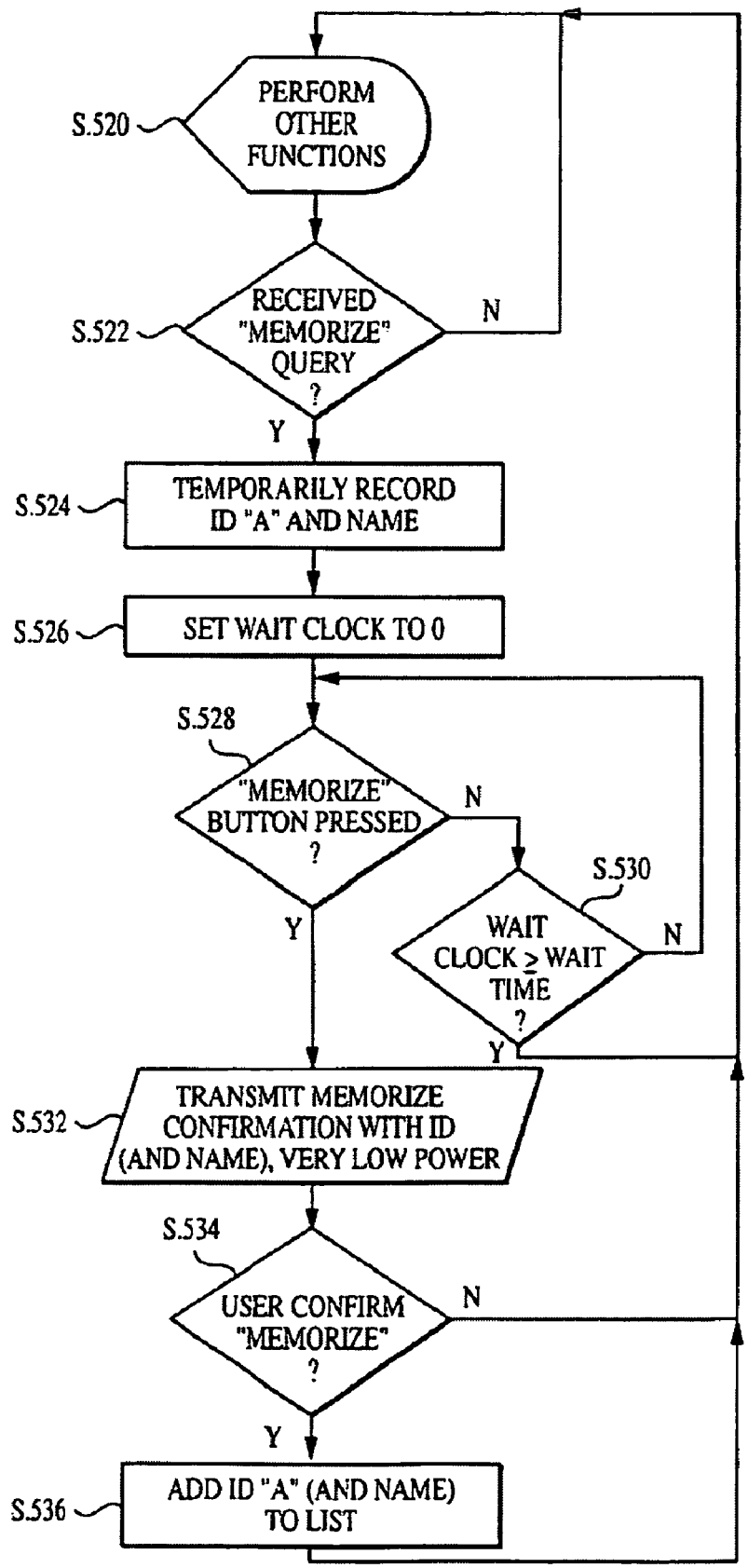

In accordance with another embodiment of the invention, FIGS. 17A and 17B represent an additional, exemplary implementation of the memorize feature that may be provided in a handset. In particular, FIG. 17A is an exemplary flowchart of the various processes and operations that may be performed by a handset (i.e., handset A) when invoking the memorize function to exchange name and number information with another handset (i.e., handset B) that is nearby. FIG. 17B illustrates an exemplary flowchart of the various processes and operations performed by the handset B that is near handset A and that is also invoked to perform a memorize procedure. Each of these figures will now be discussed in greater detail.

As shown in FIG. 17A, the memorize procedure is initialized by user A at step S.500 when the memorize feature is selected on the handset with the other handset or object B being nearby. Since the memorize procedure is performed with the handsets being set at reduced power, handset B should be in close proximity to handset A in order to receive the transmitted handset information. Generally, the handsets should be approximately an arm's length away from one another or should be in the same room. Further, although step S.500 illustrates user A as initializing the memorize procedure, it is of course possible that handset B initializes the memorize procedure by activating the memorize feature before user A.

At step S.502, handset A sets the value of a wait_clock to zero. The wait_clock may be a counter stored in the handset which is incremented in accordance with an internal system clock to keep track of the elapsed time. Following step S.502, the handset at step S.504 tunes to a predetermined control channel at a very low or reduced power. As discussed above, since the memorize information is exchanged at a reduced power level, handset A and handset B should be in close proximity to one another so that the information may be detected and received. The power level should be reduced to a level so as to prevent other handsets in the area from receiving the signal. Preferably, the handset units should be operated within several feet of one another or within one arm's reach.

At step S.506, handset A queries handset B over the control channel for a memorize confirmation. The memorize query message sent from handset A may include the ID and corresponding name for user A. Following step S.506, the handset A determines at step S.508 whether a positive response or confirmation has been received. If a response is not received, then at step S.510, the handset determines whether a predetermined wait time has expired. In accordance with an aspect of the present invention, each handset may wait for a predetermined wait time for a memorize confirmation from the other handset. The value of the wait_clock may be compared with the wait time to determine the amount of lapsed time since initializing the memorize procedure. If it is determined that the wait_clock is less than the wait time, then logic flow loops back to step S.508. Otherwise, if a memorize confirmation is not received within the wait time and, at step S.510, it is determined that the wait time has elapsed or been exceeded, then logic flow proceeds to step S.516 where the memorize routine is terminated.

If it is determined at step S.508 that a memorize confirmation has been received, then at step S.512 it is determined whether user A confirms that the ID and name of user B should be memorized. In this regard, user A may be prompted by the display of the handset to confirm that the memorize procedure should be completed by storing the ID and name of user B to the list. If user A does not confirm the saving of user B to the list, then logic flow proceeds to step S.516 where the routine terminates. If user A confirms the completion of the memorize procedure, then at step S.514 the ID and name of user B (which was included in the memorize confirmation message from handset B) is stored in the Find list for handset A. Following step S.514, the procedure terminates at step S.516.

FIG. 17B illustrates the various processes and operations that may be carried out by handset B when performing a memorize procedure with handset A. Specifically, at step S.520, handset B performs other handset related functions. Thereafter, at step S.522, handset B detects whether a memorize query has been received over the control channel. In accordance with an aspect of the present invention, the tuner for handset B may periodically check for responses received over the control channel, including whether a memorize query has been received. If it is determined that a memorize query is not received at step S.522, then logic flow loops back to step S.520. If, however, a memorize query is received in the control channel at step S.522, then the query message is analyzed at step S.524.

In particular, handset B temporarily records the ID and name of user A at step S.524. As discussed above, the ID and corresponding name of user A is included with the memorize query from handset A. Following step S.524, handset B sets and initializes the value of a wait_clock to zero. The wait_clock may be stored in handset B and is utilized to monitor the elapsed time. For this purpose, the wait_clock may be incremented in accordance with an internal system clock of the handset. At step S.528, the handset determines whether user B has pressed the memorize button or selected the memorize feature. That is, upon receipt of the memorize query from user A (which initialized the memorize procedure), user B may be prompted by the display of the handset to activate the memorize feature. Alternatively, the handset may not provide a prompt and user B may simply press or activate the memory feature with the handset after user A initializes the memorize procedure on his/her handset. If the memorize procedure is not activated by the user B, then at step S.530, it is determined whether a predetermined wait time has been exceeded. For this purpose, the value of the wait_clock is compared with the wait time. If the wait_clock is less than the wait time, then logic flow loops back to step S.528. Further, if the memorize feature is not activated at step S.528 and the wait time has been determined to be exceeded at step S.530, then the entire memorize procedure is skipped and logic flow returns to step S.520.

If it is determined at step S.528 that the memorize feature has been activated by user B, then at step S.532 a memorize confirmation message is sent back to handset A over the control channel. In this regard, handset B operates at a reduced power and includes the ID and name of user B with the memorize confirmation message.

Following step S.532, handset B determines at step S.534 whether the user confirms to complete the memorize procedure by saving the ID and name of user A (which was included in the memorize query from handset A). User B may be prompted to confirm the storing of the ID and name of user A by a message prompt on the handset. If user B confirms that user A is to be memorized, then at step S.536 the ID and name of user A is added to the Find list of handset B. Following step S.536, the routine ends and logic flow loops back to step S.520, so that other handset functions can be performed. Logic flow will also return to step S.520 from step S.534 if user B does not confirm that user A is to be added to the Find list.

Successful completion of the memorize procedure results in handset B showing on the Find list of handset A, and vice versa. The Speed Dial list of handsets A and B may also be updated in accordance with the information added to the Find list. In addition to two handsets exchanging information, other objects (such as tracking devices, including a paging device or a beeping clip attached to an item) can be memorized by having the user press the memorize button or activate the memorize feature on the object. Objects, however, can also be manually programmed into a Find list of a handset, thus alleviating the need for a memorize button on the object.

As discussed above, since the memorize procedure is performed with the handsets operating at a reduced power and for transmitting only for a short period of time, users must invoke the function in close proximity to one another and close together in time. Additional procedures may be incorporated into the logic flow of FIGS. 17A and 17B to detect collisions and/or correct collisions. A more detailed discussion of procedures for detecting and correcting collisions if provided below.

The memorize features of the present invention may also be used in connection with other objects, such as a tracking devices or clip. The memorize procedure may operate in a similar fashion to that for memorizing between two handsets. For example, when the memorize feature is invoked by a handset on a clip, the ID of the clip may be automatically transferred and stored in the Find list of the handset. The user of the handset may then be given an opportunity to associate a name with the clip or object. Such a feature may save a user from having to enter both the name and the ID into the handset.

Another set of features which may be implemented in the wireless handset of the present invention is a set of Conference Call features. Conference Call features may enable the user of the wireless handset to place conference calls to other compatible handsets through direct handset-to-handset communication, as long as all parties are within range of the conference initiator. Various methods may be provided for initiating a conference call. For example, a Spontaneous Conference Call feature may be provided to permit a user to add another person to an existing call (similar to three-way calling) to establish a conference call. This type of conferencing may be available during other types of conferencing. Further a Static Talk Group feature may be provided which enables the user to create a group of people in the Speed Dial list or the Find list to which the user would like to place a conference call. To establish a conference call, the user may select the group of people through the display of the handset, press the FREE button and the handset will simultaneously place a call to all members of that group. Should some of the users in the group not be available or reject the call, the conference may still be initiated, but without those members. Further, this conference feature will not continue to try to bring the missing members into the call. However, spontaneous conferencing may be available during this type of conference to permit the user to selectively add other users or try to contact the missing members of the group.

Other Conference Call features may be provided. For example, a Temporary Talk Group feature may be provided that allows a user to specify two or more people to place a call by selecting those people from the Speed Dial list, Find list, or Found list individually and then hitting the FREE button on the handset. Should some of the users from the group not be available or reject the call, the conference will still be initiated, but without those members. This conference, call feature will not try to bring these missing persons into the call, but the user may try to add these persons during the conference with the spontaneous conferencing feature.

Another feature that may be provided as part of the set of Conference Call features is a Conference Call Channel. In accordance with an aspect of the present invention, a Conference Channel may be a predefined channel which is open to all wireless handsets that are implemented according to the aspects of the present invention. Such a Conference Channel may function similar to a channel of a CB radio. Spontaneous conferencing may be made available with this type of conferencing to permit other members to be added to the conference call.

Figure 18A:
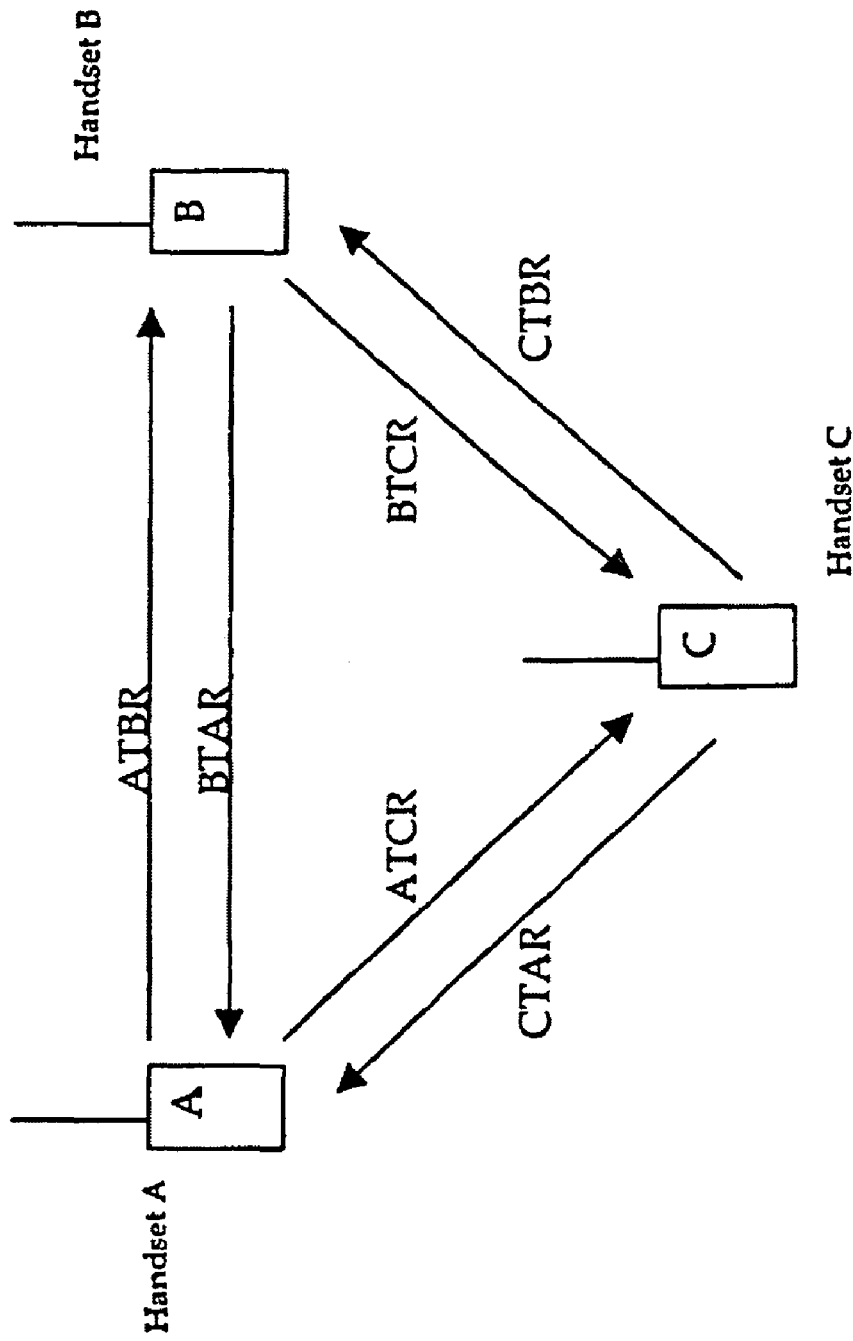

Various techniques may be utilized to implement and establish conference calls through direct handset-to-handset communication. According to an aspect of the present invention, time domain multiplexing is utilized to establish three-way conferencing and other types of conference calls. For three-way conferencing established through time domain multiplexing, three time slots per frame may be defined. In general, one time slot is utilized to carry control data and the other two time slots are utilized to carry voice data between any two handsets. FIGS. 18A, 18B and 18C illustrate embodiments of providing three-way conferencing through the use of time domain multiplexing, in accordance with aspects of the present invention.

In particular, FIG. 18A schematically represents a three-way conferencing scenario between handset A, handset B and handset C. In FIG. 18A time domain multiplexing may be utilized to implement three-way conferencing with the handsets communicating in a direct handset-to-handset communication mode. As mentioned above, three time slots per time frame are provided, with two of the time slots carrying voice data. To support bi-directional communication, the voice data may be transmitted by either party. For example, with respect to handsets A and B, handset A may transmit with handset B receiving (ATBR), or handset B may transmit voice data with handset A receiving (BTAR). Further, with respect to handsets A and C, handset A may transmit with handset C receiving (ATCR), or handset C may transmit with handset A receiving (CTAR) the voice data. Similarly, with respect to handsets B and C, handset B may transmit with handset C receiving (BTCR), or handset C may transmit with handset B receiving (CTBR) the voice data.

In addition to the two slots per time frame that are utilized to carry voice, one slot per frame may be dedicated for carrying control data. Various implementations may be utilized for allocating the three time slots per frame. FIGS. 18B and 18C illustrate two embodiments of the invention for time slot allocation. In FIG. 18B, the first, second and third time slots (TS1, TS2 and TS3) are defined, wherein the first time slot TS1 is dedicated for control data (C). In this embodiment, the first time slot TS1 may have a length that is as small or as large as needed for supporting the control data. The second time slot TS2 and the third time slot TS3 in FIG. 18B are provided to carry voice. In FIG. 18C, the first, second and third time slots (TS1, TS2 and TS3) are defined differently with respect to the control data time slot. That is, in FIG. 18C, any time slot can carry voice. Therefore, the control data (C) may be carried in any time slot. However, in the embodiment of FIG. 18C, the length of the time slot carrying the control data must be the same length as the voice channel or time slots. In any event, for both of the embodiments of FIGS. 18B and 18C, an additional framing bit may be provided at the beginning of each frame to help the receiving equipment synchronize.

As illustrated in FIGS. 18A-18C, three-way conferencing may be implemented and provided in the wireless handset of the present invention through the use of time domain multiplexing and a time frame including a plurality of time slots (preferably three slots). In the embodiment of FIG. 18B, the time slot carrying the control data may be of any required length, whereas in the embodiment of FIG. 18C the control data time slot must be the same length of the voice channel. Further, in the embodiment of FIG. 18C, only one handset has access to the transmit and receive control time slot at a time. Thus, handset specific data must either be sent over multiple time slots, or the proper time slot for each handset must be known. In contrast, in the embodiment of FIG. 18B, control data that applies to any or all of the handsets can be sent at one time and all handsets can receive the same. Since the first time slot TS1 is dedicated for carrying the control data, no prior knowledge of the proper time slot is required. While the embodiments of FIGS. 18B and 18C have been provided, other variations on the number of time slots per frame and the allocation of what is transmitted and received in each time slot may be provided.

The present invention has been described with reference to facilitating and supporting voice communication between handsets. In addition to supporting voice communication, the wireless handsets of the present invention may also be implemented so as to permit short range messages (including alphanumeric text, etc.) between handsets when communicating in a direct handset-to-handset communication mode. For this purpose, a set of Short Range Messaging features may be provided with the handset of the present invention. Such features may facilitate the sending of short range messages from one handset to another handset, as along as both handsets are within range. The types of messages that may be supported can include both numeric and alphanumeric messages. Short range messages can be sent directly from one handset to another if they are both idle, or can be received during the control time slot if the receiving handset is on a call. When sending a short range message, the sending handset may check a registry or control channel to determine if the handset is within range (i.e., the handset should perform a specific find request), and to identify the proper frequency on which to send the message. Short range messaging should be restricted if a user tries to initiate the same during a call.

Traditional short range messaging techniques and features may be utilized to provide short range messaging in the wireless handset of the present invention. That is, traditional message structures for sending messages (such as that used in short message service—SMS) may be used for sending short messages between handsets. However, since handsets are capable of communicating with one another without the use of a network infrastructure, a separate message center is not necessary to handle transmission of the short messages. Further, since the wireless handsets of the present invention are capable of communicating in a direct handset-to-handset mode, short range messages may be received by a handset during a call.

The set of Short Range Messaging features may provide various functionalities and capabilities to the user of the wireless handset. For example, a user may be able to enter custom messages, including numeric or alphanumeric messages, by typing them in using the keypad of the wireless handset. Once a message is typed in, the user will be given the option to store that message in a Saved Messages list. The Saved Messages list may store a predetermined number of messages, each of which is permitted to have a maximum length. When the limit of the Saved Messages list is reached, old messages may be deleted to provide sufficient room for additional or new messages. Further, the user may be given the ability to select message from the Saved Messages list to easily use and resend the messages without having to type those messages again. These messages may include basic alphanumeric messages (e.g., "Let's go to lunch") or other types of messages that are frequently sent by the user.

In order to send a message, the Speed Dial list, Find list or Found list can be utilized by the user to select a person or group to send the message. A message can be sent or broadcast to a group by selecting a defined group from the Speed Dial list or the Find list. In addition, the user can specify two or more recipients of a message by selecting those people or groups from the Speed Dial list, Find list or Found list. With respect to header information, the sender of the message, time and date the message was received will be displayed at the beginning of the message. An optional feature may also be provided which permits the display of all recipients of a broadcast message when this feature is selected.

Various types of feedback may be provided to the user when a message is sent. For example, if the receiving handset is out of range or turned off, a message stating this fact may be presented on the display of the sender's handset (e.g., "Unavailable"). Further, if the receiving handset is in use and cannot receive a message, then a message stating that the handset is busy may be presented on the sender's handset display (e.g., "Busy"). If the receiving handset confirms reception of the message, then a message stating this fact may be displayed (e.g., "Delivered").

Another feature that may be provided is a Query Message Read feature which allows users to ask the handset that received the message if that message was read. If the handset is in range, the handset will respond automatically without asking the user. In addition, a Read Feedback feature may be provided which, when selected, will automatically send a message back to the originator of the message that the message was read by the receiver (as indicated by the receiver scrolling to that message). If the originator is out of range, the handset will not continue to try to deliver this acknowledgment.

For incoming short range messages, various features may be provided for alerting and displaying the incoming messages. For example, a variety of message alert features may be provided which enable the handset to alert the user of an incoming message by the choice of a ringing signal, vibrating signal, blinking display, beeping signal (only once) or with no alerting signal. The choice of message alert may be selectable and an independent choice than that made for traditional wireless network calls or incoming handset-to-handset calls.

When an incoming message is received, a note on the screen may be displayed to the user to inform the user of the received message. The message display may indicate the number of messages received. When a message is received, the user may then be able to access that message and scroll through it using the arrow keys on the handset. For reply features, a one function reply to a message can be invoked. The reply can be numeric, alphanumeric or a message chosen from the Saved Messages list. The reply message may contain the quoted text of the original message. As discussed above, users may also be given the ability to delete messages, including messages stored in the Saved Messages list.

Figure 41A:
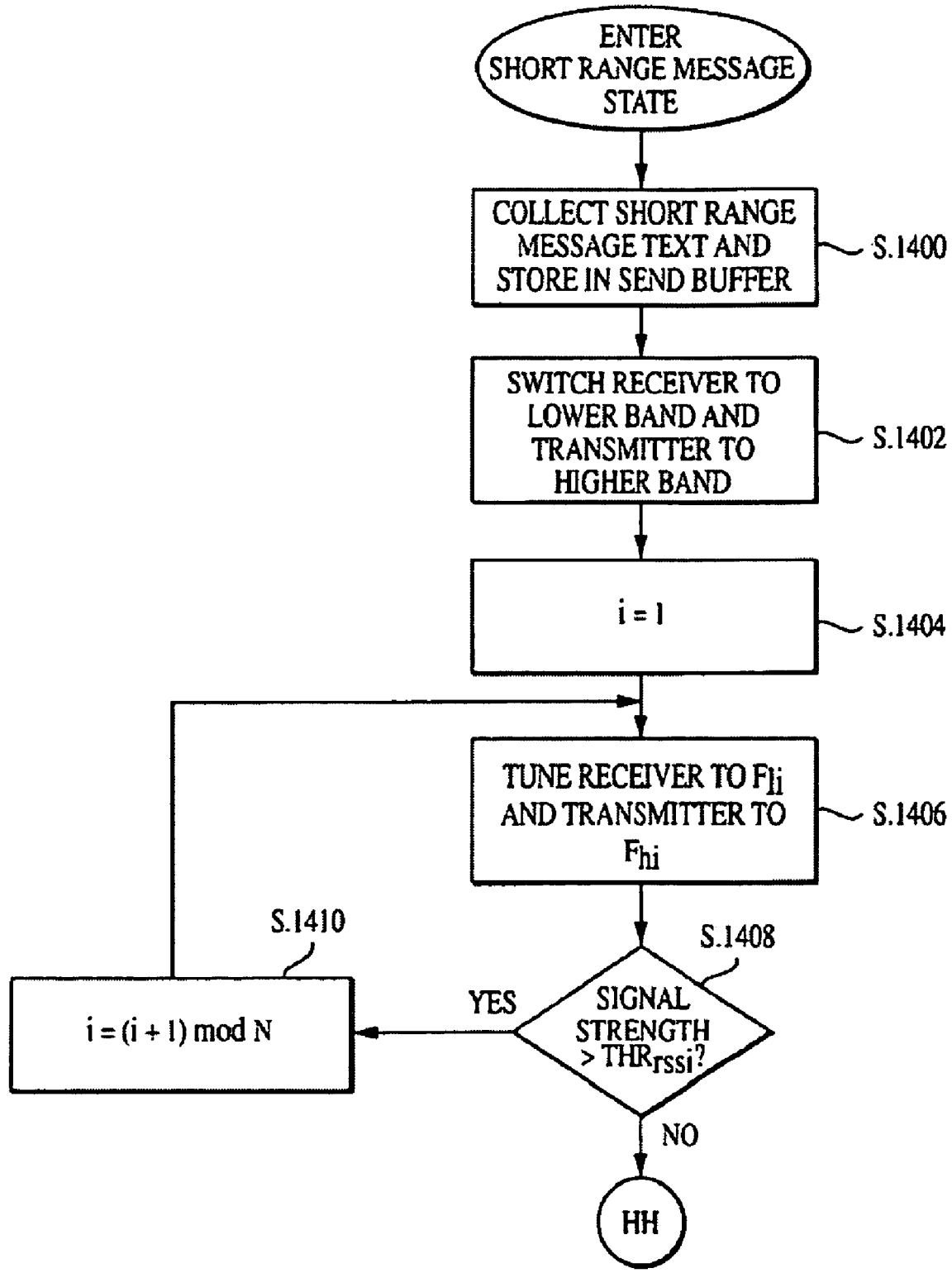
FIGS. 41A and 41B illustrate exemplary flowcharts of the various processes and operations in an Short Range Messaging state, according to still another aspect of the invention.
Figure 41B:
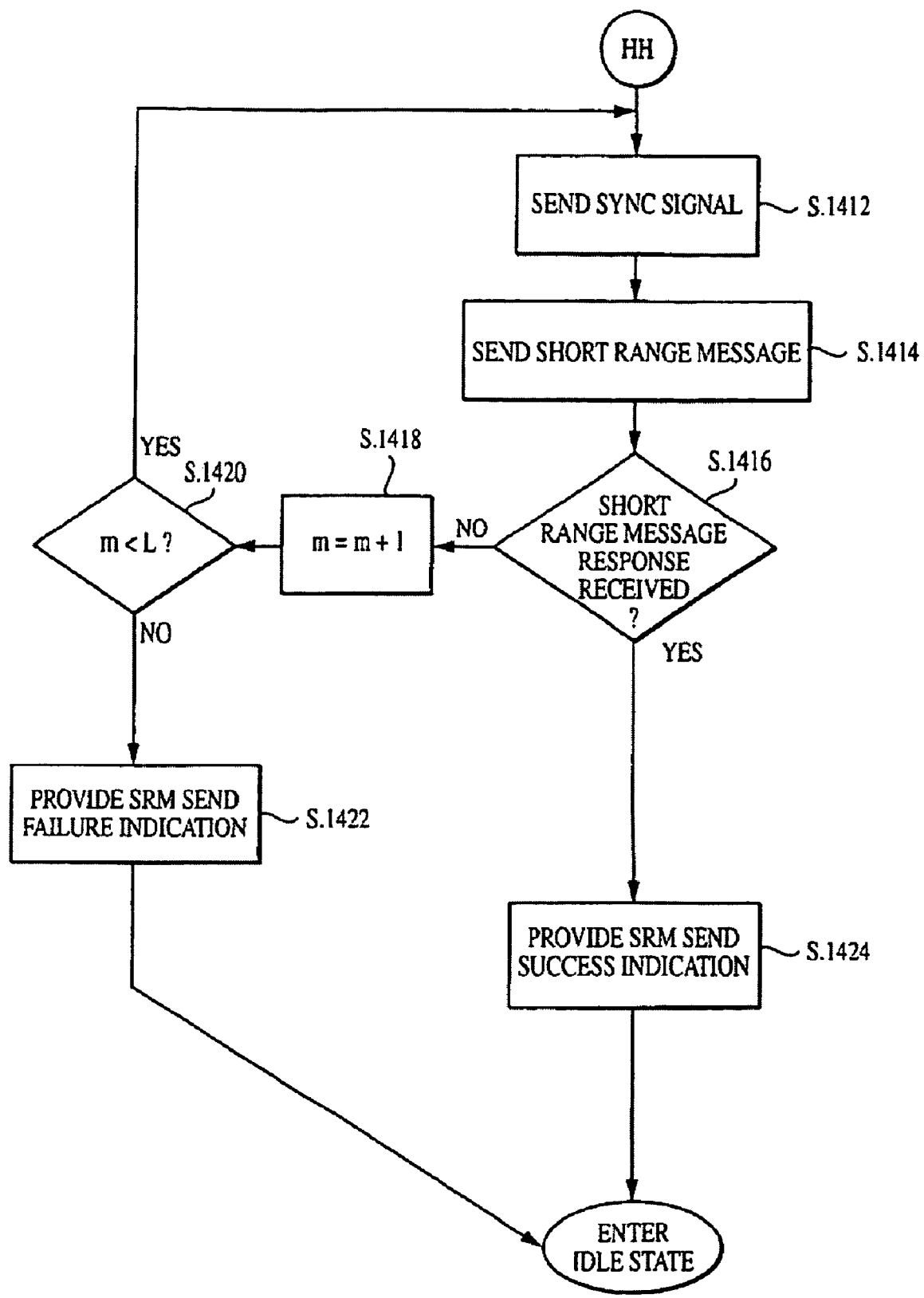

By way, of a non-limiting example, FIGS. 41A and 41B illustrate exemplary flowcharts of the various processes and operations that may be performed by a handset when sending a short range message in a Short Range Message state. That is, as illustrated in FIG. 5, a wireless handset may transition from an Idle state to a Short Range Message state when the handset is invoked by the user to transmit a short range message. This transition state is represented by condition n in FIG. 5. In the Short Range Message state, the wireless handset may transmit the short range message to a specified handset or object. Upon the successful transmission of the short range message or after determining that the short range message request has failed, the handset may transition back to the Idle state from the Short Range Message state (as represented by condition o in FIG. 5).

In particular, as illustrated in FIG. 41A, when entering a Short Range Message state the wireless handset will first collect the short range message entered by the user at step S.1400. The short range message may be entered by the user through the keypad of the handset. The handset may include pre-stored messages that the user may select and/or modify. At step S.1400, the short range message that is collected may be stored in a memory buffer of the handset. Then, at step S.1402, the handset will switch and/or initialize the transceiver in preparation of transmitting the short range message request. The handset may be implemented to sent the short range message over a dedicated control channel or a registry channel. Alternatively, in accordance with the embodiment of FIGS. 41A and 41B, N frequency pairs may be assigned to the wireless handset for transmitting short range messages. In such case, the higher frequency associated with a duplex channel "i" may be designated as $F_{hi}$ and the lower frequency designated as $F_{li}$. Therefore, at step S.1402, the wireless handset will switch the receiver to the lower frequency, band of the duplex pass band and switch the transmitter to the higher frequency band.

As further shown in FIG. 41A, the handset initializes and set the value of a counter i to 1 at step S.1404. Following step S.1404, one of the assigned frequency pairs is selected based on the value of the counter i, with the receiver of the handset being set to the low frequency $F_{li}$ and the transmitter will be tuned to the higher frequency $F_{hi}$. After tuning the receiver and transmitter, the wireless handset will determine at step S.1308 whether there is interference in the channel. Interference may be analyzed by determining whether the signal strength of the channel is not greater than a predetermined threshold. For example, at step S.1408, the wireless handset may determine whether the received signal strength of the channel is greater than a threshold level $THR_{rssi}$.

If it is determined that the signal strength exceeds the threshold and that there is interference on the channel, then at step S.1410 the value of the count i may be modified according to the following equation:

$$i=(i+1) \bmod N$$

After the value of the counter i is reset, logic flow proceeds back to step S.1406 so that another channel is tuned to and analyzed for interference.

If the signal strength of the channel is determined to be acceptable at step S.1408, then a counter m may be initialized and set to 0 and at step S.1412 (see FIG. 41B) a synchronization signal may be sent by the wireless handset. After synchronization, the wireless handset may transmit and send the short range message over the selected channel at step S.1414. The short range message include the directory number DN and/or name associated with the wireless handset or object that the short range message is directed to. Following step S.1414, the wireless handset will wait for a response at step S.1416 to determine if the short range message has been received. The handset that transmits the short range message may wait for a predetermined period of time (e.g., a few seconds) to determine if a short range message response has been received before attempting to retransmit on another channel or determining that the memorize request failed.

If a short range message response is not received at step S.1416, then the counter m is incremented by one at step S.1418 and at step S.1420 the handset determines whether m has exceeded a predetermined limit L. If m is less than or equal to the predetermined limit L, then logic flow proceeds back to step S.1412 so that a synchronizing signal and the short range message may be resent. Otherwise, at step S.1426, the handset will assume that the short range message was not received and a short range message (SMR) send failure indication will be provided to the user to indicate that the memorize request was unsuccessful. Following step S.1426, the wireless handset may transition from the Short Range Message state back to the Idle state, as illustrated on FIG. 41B.

If a short range message response is received at step S.1416, then at step S.1424 a short range message (SMR) send success indication will be provided to the user to indicate that the short range message was sent successfully. Following step S.1424, the wireless handset may transition from the Short Range Message state back to the Idle state, as illustrated on FIG. 41B.

In addition to providing Short Range Messaging features, the wireless handset of the present invention may be implemented with various Accessory-Related features. Various accessories may be provided with the wireless handset of the present invention. For example, the wireless handset may be provided with a port or connection to support computer connectivity. Computer connectivity features may be implemented in the wireless handset to enable downloading of large lists (e.g., Speed Dial lists, Find lists, Short Messages lists, etc.) and standard configurations. In addition, computer control of handset features, such as find features, may be available so that such features are performed automatically when they are required to perform other handset functions. The computer connectivity features may also permit handset data (e.g., the results of a find query) to be uploadable to a computer or other computer-based device.

Another accessory which may be provided with the wireless handset of the present invention is a tracking device, such as a beeping clip device or paging device that is secured to an item. Beeping clip and paging devices may be attached to items such as keys, wallets and tools to facilitate the locating of those items. These devices may be clipped onto the item or attached by other suitable means (e.g., an adhesive surface, a clasp, a chain, etc.). Further, these devices may be embedded in the item with other components (e.g., as part of a remote lock or key ring) or provided in another form. In any event, the word "clip" is used herein as a way of generally referring to all types of tracking devices. Accordingly, a beeping clip that clips to an item is an exemplary embodiment only and the word "clip" should not be construed as limiting the type of tracking device that may be utilized in the invention.

Each tracking device may have a unique ID and may be entered with other objects into the Speed Dial list and Find list of the handset by performing a memorize function or by entering the same manually. The user may also be given the option to individually name each item and to automatically group items together. By pressing a predetermined key or button on the handset with an item (which, for example, has a beeping clip or paging device attached thereto) being highlighted on the display, the selected item will be instructed to beep if it is within range. This will then permit the user to locate the item without difficulty. Items with attached clips can also be selected, as with persons and other objects, to make the items beep or ring whenever the items start in range but then exceed range, to facilitate ensuring that those items are not left behind (such as a tool or wallet) or do not wander away from the user (e.g., a toddler or a pet).

Figure 19A:
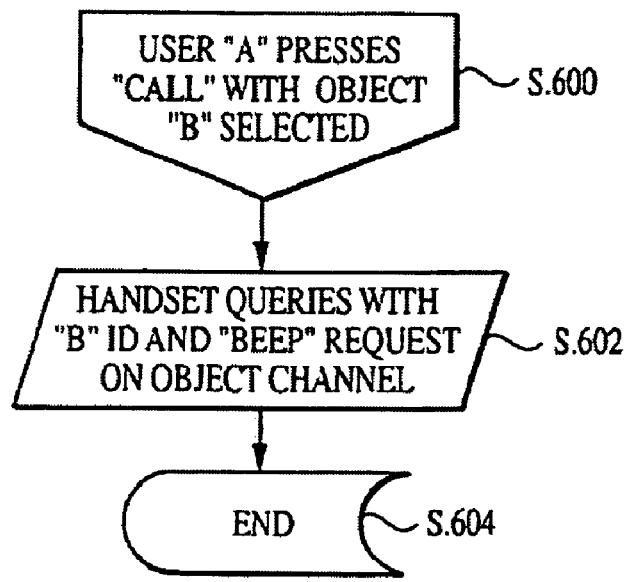
FIGS. 19A and 19B illustrate an embodiment for locating a non-transmitting object, such as a paging or clip device attached to an item.
Figure 19B:
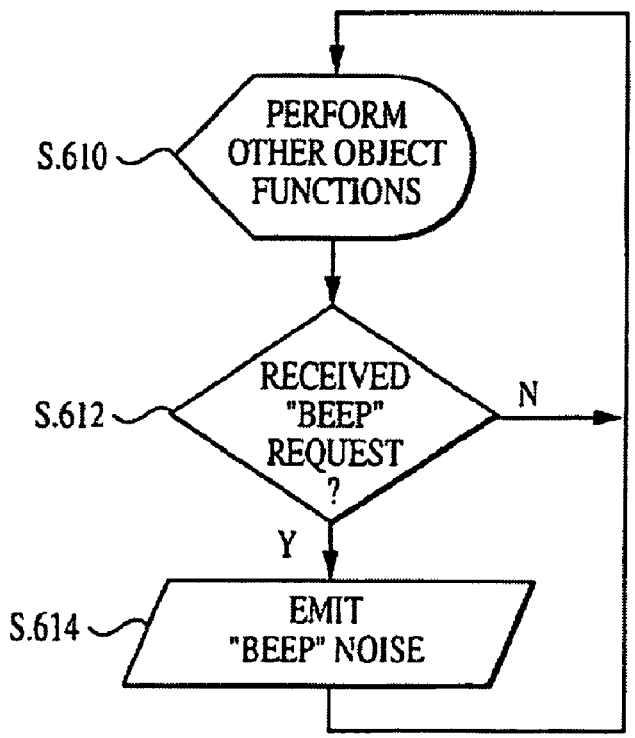
Figure 20A:
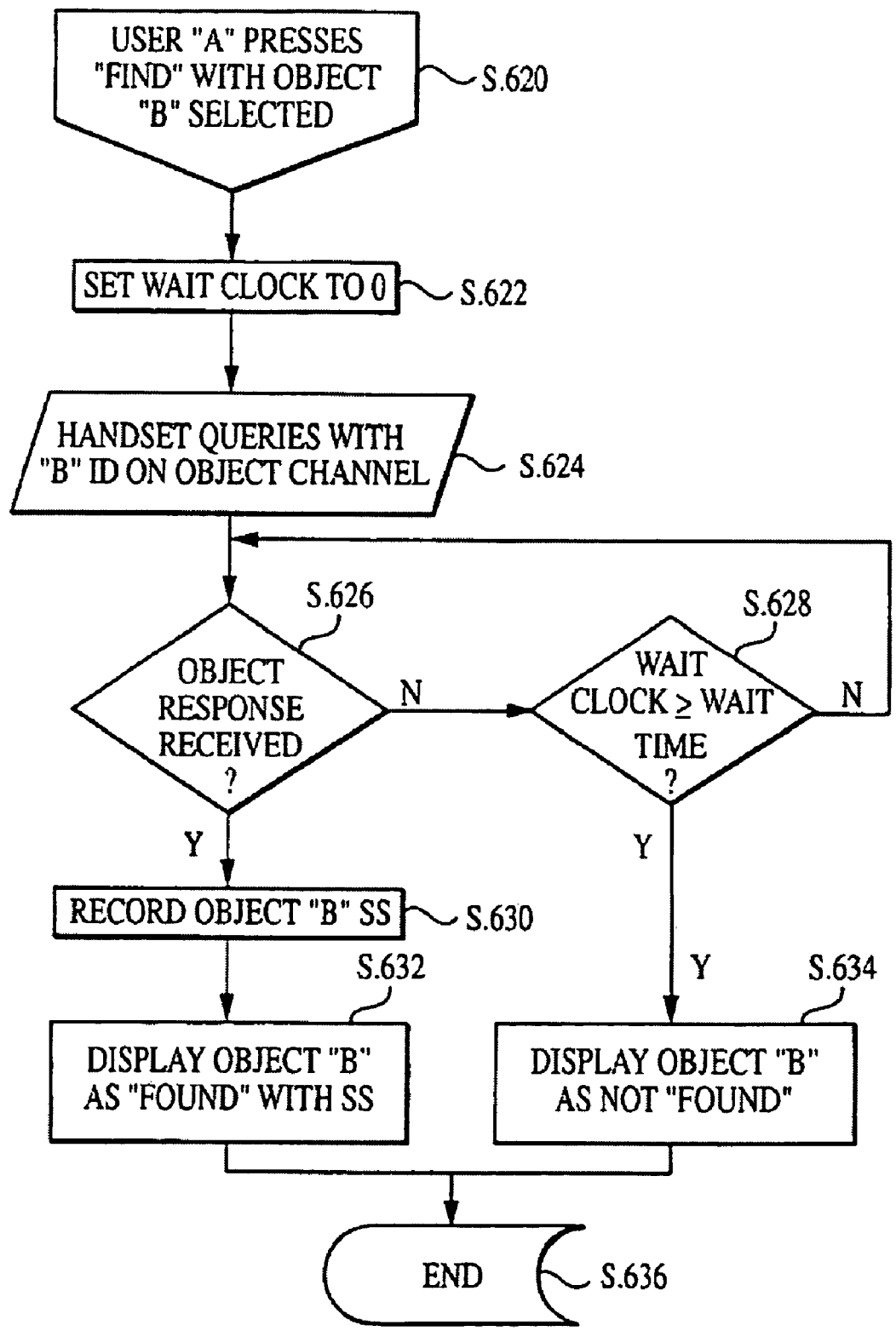
FIGS. 20A and 20B illustrate an embodiment for locating a transmitting object, such as a paging or clip device attached to an item.
Figure 20B:
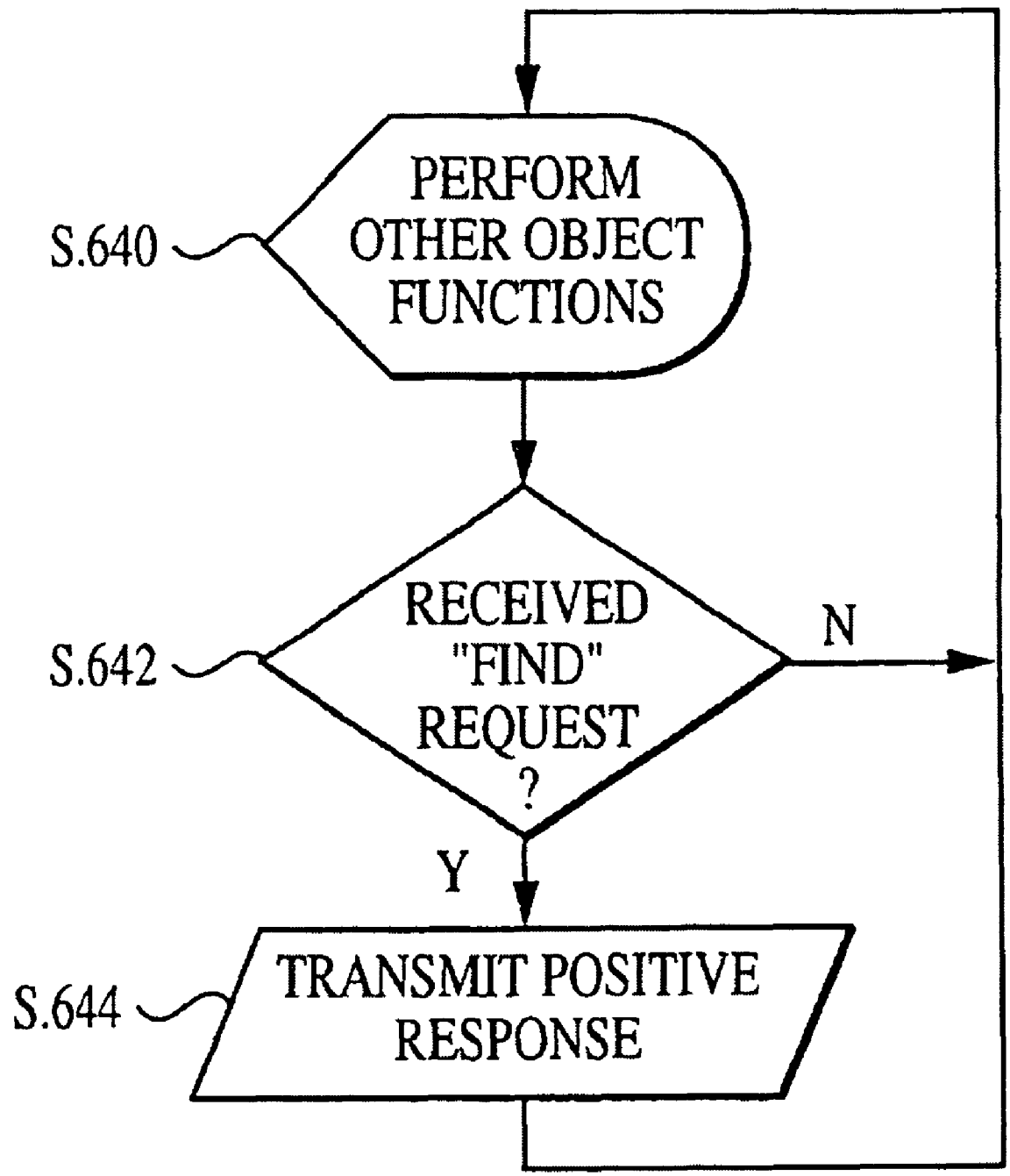
Figure 21A:
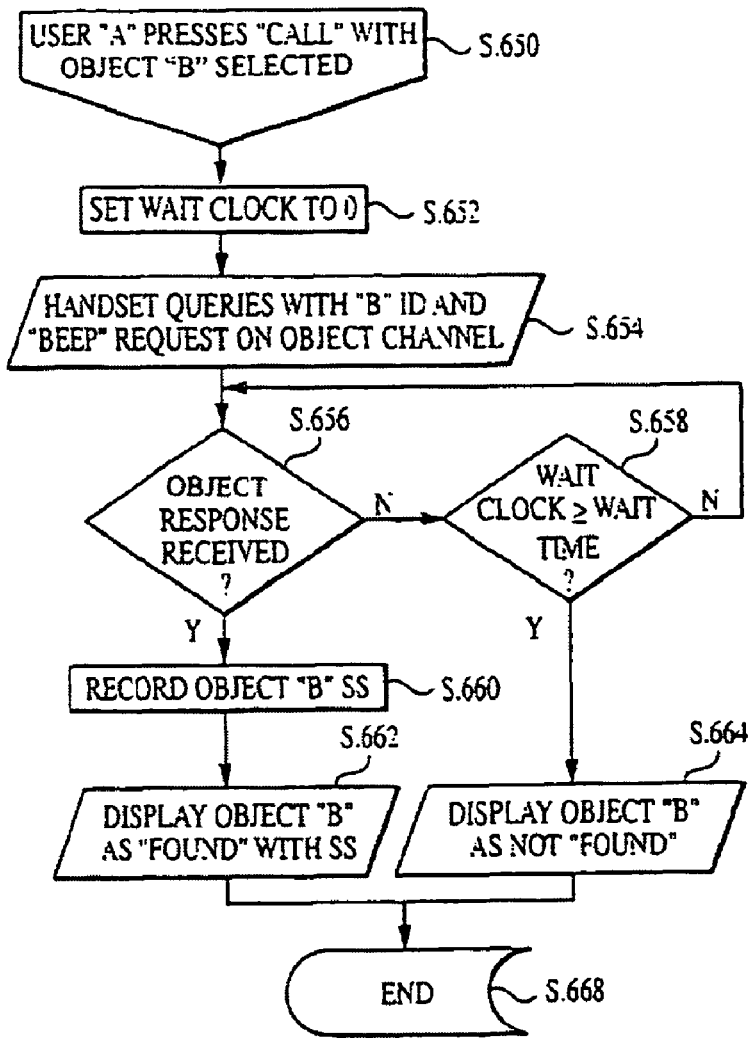
FIGS. 21A and 21B illustrate an embodiment for locating a transmitting object, such as a paging or clip device attached to an item, and causing the device to emit an audible beep.
Figure 21B:
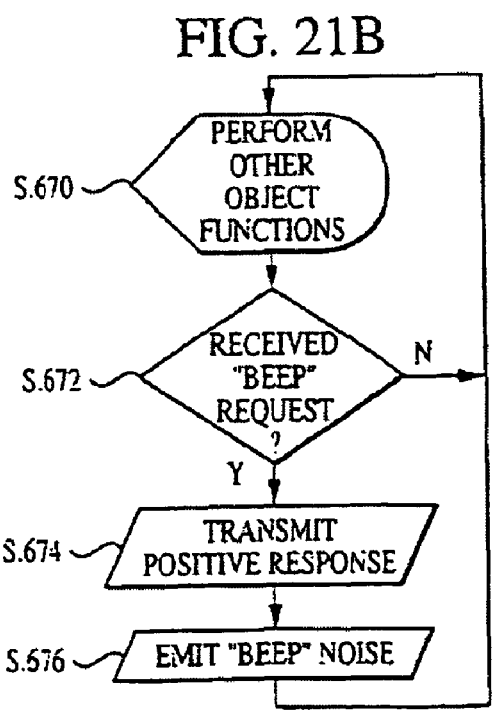

In connection with the Accessory-Related features and the use of clips, various features may be implemented for locating these type of objects. In general, clips may be transmitting or non-transmitting in type. That is, the clips may include the capability to transmit a response or beacon when queried by a handset (i.e., transmitting in type) or may be limited to only emitting an audible beep without transmitting a beacon or response signal (i.e., non-transmitting in type). FIGS. 19A and 19B illustrate an exemplary embodiment for locating a non-transmitting clip. Further, FIGS. 20A and 20B represent the manner by which a transmitting clip can be located by causing the clip to emit a beacon, in accordance with another embodiment of the invention. Moreover, in accordance with yet another embodiment of the invention, FIGS. 21A and 21B represent the manner by which a transmitting clip can be located by causing the clip to respond with a beacon signal and emit an audible beep. The various processes and operations represented in the flowcharts of FIGS. 19-21 may be implemented by any suitable combination of hardware, software, programmed logic and/or firmware. A detailed description of each of these embodiments will now be provided.

As noted above, FIGS. 19A and 19B represent an embodiment for locating a non-transmitting clip. In particular, FIG. 19A is an exemplary flowchart of the various processes and operations performed by a handset (i.e., handset A) which is attempting to locate at non-transmitting clip (i.e., object B). FIG. 19B illustrates an exemplary logic flow of the various processes and operations that may be performed by object B when queried by handset A. In the embodiments of FIGS. 19A and 19B, the non-transmitting clip only transmits an audible beep tone when queried, since it is incapable of transmitting a beacon or response signal.

Referring to FIG. 19A, a non-transmitting clip (i.e., object B) is queried or called when user A presses the call or send button at step S.600 with the object B selected or highlighted on the list. Thereafter, at step S.602, handset A queries object B based on the ID of object B at step S.602. The query at step S.602 includes a beep request so that the object B will emit an audible beep if it is within range of handset A. If the object B is not within range of handset A, then the query will not be received and object B will not emit a beep tone. In the embodiment of FIG. 19A, a predefined object or, control channel may be provided for querying object B. Following step S.602, the procedure terminates at step S.604.

FIG. 19B illustrates the various processes and operations carried out by the specified clip (object B) when responding to a query from handset A. In particular, at step S.610 other object functions are performed. Thereafter, at step S.612, object B determines whether a query message with a beep request has been received from a handset that is within range. A dedicated tuner or device may be provided for detecting when a beep request is received over the object channel. The monitoring of the channel by object B may be performed concurrently with the performance of other functions at step S.610. If a beep request is not received at step S.612, then logic flow loops back to step S.610. Otherwise, if a query with a beep request is received at step S.612, then at step S.614 object B emits an audible beep, noise or signal. If object B is heard by the user of handset A, then the object can be located. Following step S.614, logic flow returns to step S.610.

In the embodiment of FIGS. 19A and 19B, the object that is called is a non-transmitting type of clip that will only emit an audible beep when queried by the handset. Since the non-transmitting clip is not capable of transmitting a beacon or response signal, the querying handset will be prevented from measuring its relative signal strength and/or proximity. The non-transmitting clip, however, should be less expensive than a transmitting-type of clip, and may or may not include a memorize button for permitting the object to be memorized by a handset.

FIGS. 20A and 20B represent an exemplary embodiment for locating a transmitting-type of clip. In this embodiment, the clip (i.e., object B) is queried by the handset (i.e., handset A) to transmit a positive response or beacon without emitting a beep noise. FIG. 20A is an exemplary flowchart of the various processes and operations that may be performed by handset A when querying object B for a beacon signal. Further, FIG. 20B is an exemplary logic flow diagram of the processes and operations carried out by the clip B when queried by handset A.

As shown in FIG. 20A, the procedure for finding object B is initialized at step S.620 when user A presses the FIND button on a handset with the clip or object B being selected or highlighted on the Find list. Thereafter, at step S.622, the handset sets the value of the wait_clock to zero. The wait_clock may monitor the elapsed time and may be incremented in accordance with an internal system clock of the handset. Following steps S.622, handset A queries object B at step S.624 based on the ID associated with object B. This query may be sent on a predefined object or control channel for object B.

At step S.626, handset A determines whether a response or beacon signal has been received. If no response is received at step S.626, then at step S.628 it is determined whether a predetermined wait time has been exceeded. In this regard, the value of the wait_clock may be compared with the wait time. If the wait_clock is less than the wait time, then logic flow loops back to step S.626 to again determine whether a response has been received. Otherwise, if a response has not been received and the wait time has been exceeded at step S.628, then at step S.634 the handset A displays to the user that object B was not found. In this regard, an appropriate message (i.e., a "Not Found" message) may be displayed on the handset for viewing by the user. Following step S.634, the procedure terminates at step S.636.

If a response or beacon signal is received within the wait time at step S.626, then at step S.630 the signal strength (SS) of the response is measured and recorded. Conventional or standard techniques may be utilized to measure the signal strength of the beacon signal received from the object B. Following step S.630, the handset at step S.632 will indicate to the user that object B was found. In this regard, handset A may display the ID and/or name associated with object B along with a message (i.e., "Found") indicating that the object was found. In addition, handset A may also indicate and display the detected signal strength (SS) of the beacon signal. The signal strength may be indicated on the display by use of a numeric value or a sequence of bar segments. Following step S.634, the procedure terminates at step S.636.

FIG. 20B illustrates the various procedures and functions carried out by the clip (i.e., object B) when being queried by handset A. In particular, at step S.640 object B performs other functions. Concurrently with the performance of these functions or following the completion of these functions, object B determines at step S.642 whether a find query has been received on the predefined object or control channel. In this regard, a dedicated tuner or transceiver may be provided in the clip device to constantly monitor the channel for find queries. If it is determined at step S.642 that a find query was received, then at step S.644 the object B will transmit a positive response or beacon signal back to the handset A. Further, since the find query from handset A did not instruct the object B to emit a beep noise, no audible beep will be emitted by the object. Following step S.644, logic flow loops back to step S.640. Logic flow will also loop back to step S.640 if it is determined at step S.642 that a find query has not been received over the object channel.

In the embodiment of FIGS. 20A and 20B, a simple beacon or response signal is emitted by the object to permit the querying handset to detect and measure the signal strength of the signal. The receipt of the beacon or, response signal from object B will serve to indicate to the querying handset that the object is within range. Further, the detected signal strength will also provide a means by which the user of the querying handset may determine the relative distance to the object. The beacon or response signal that is emitted by object B may contain the ID of the object or the response may take the form of a direct synchronous connection to the handset (possibly containing the ID of the object) which is used to measure the signal strength. As noted above, object B does not emit a beep tone and, in fact, may or may not be capable of emitting such an audible beep. That is, in the embodiment of FIGS. 20A and 20B, a find query is performed in such a case where the user want to know if the object is within range, without making the object beep. Although the clip device is a transmitting type of clip and, therefore, is more complicated and expensive than the non-transmitting clip of FIGS. 19A and 19B, the clip for this embodiment may or may not have a memorize button (an object without a memorize button should be less complicated and expensive).

If a user wishes to determine if an item with an attached beeping clip is within range and to cause the object to beep, then a query of the object may be performed to measure the signal strength and to cause the object to emit an audible beep. FIGS. 21A and 21B illustrate an exemplary embodiment for carrying out such a function. In particular, FIG. 21 is an exemplary flowchart of the various processes and operations that may be performed by a handset (i.e., handset A) to locate a transmitting-type clip (i.e., object B) and to cause the object to emit a beep. FIG. 21B is an exemplary logic flow of the various processes and operations carried out by the object B which has been queried by handset A. FIGS. 21A and 21B are further discussed below.

In particular, as shown in FIG. 21A, a query to object B is initialized at step S.650 when user A presses the call or send button of the handset with the object B being highlighted or selected on the handset. Following step S.650, handset A sets and initializes the value of a wait_clock to zero. The wait_clock may be provided to keep track of the elapsed time and may be incremented in accordance with an internal system clock of the handset. After resetting the wait_clock, handset A queries object B at step S.654. The query that is sent at step S.654 may include the ID of object B and may be sent on a predefined object or control channel. Further, this query message means include a beep request which will cause object B to emit an audible tone or noise.

At step S.656, handset A determines whether a positive response or beacon signal has been received from object B. If no response is received at step S.656, then at step S.658 the handset determines whether the predetermined wait time has been exceeded. This may be performed by comparing the value of the wait_clock to the wait time. If the wait_clock is less than the wait time, then logic flow loops back to step S.656 where it is again determined whether the response has been received. Otherwise, if a response has not been received from the object within the wait time, then at step S.664 the handset A indicates to the user that object B was not found. In this regard, the handset may display a message (i.e., "Not Found") and/or the ID and name corresponding to object B. Following step S.664, the procedure terminates at step S.668.

If it is determined at step S.656 that a response has been received within the wait time, then the response signal or beacon signal is analyzed and the signal strength is detected and measured. Further, the detected signal strength (SS) is recorded at step S.660 and then at, step S.662 the handset indicates to the user that object B was found. At step S.662, the handset A may display a message (i.e., "Found") and the signal strength (SS) of the response received from object B. As indicated above, the signal strength may be indicated with a numeric value or through the aid of a bar segment display. Following step S.664, the procedure terminates at step S.668.

The basic procedures and functions performed by the clip device queried by handset A are illustrated in FIG. 21B. In particular, at step S.670, object B performs other functions. Concurrently with the performance of these functions or after the performance of a function, object B determines at step S.672 whether a query has been received on the object or control channel. In this regard, object B may include a dedicated tuner or device that is constantly monitoring the object channel for queries and beep requests. If it is determined at step S.672 that a query with a beep request has been received, then at step S.674 a positive response or beacon signal is sent back to handset A and at step S.676 object B emits an audible beep noise. Following step S.676, logic flow loops back to step S.670. Logic flow will also return to step S.670 if it is determined at step S.672 that a beep request has not been received.

With the embodiment of FIGS. 21A and 21B, the paged clip, device will respond with a beacon signal and emit an audible beep tone. The response may take the form of a beacon signal containing the ID of the object or the response may simply be a direct synchronous connection to the handset (possibly containing the ID of the object) which is used to measure the signal strength. The transmitting-type clip of FIGS. 21A and 21B includes the ability to respond with a positive response signal and to emit an audible beeping tone. The clip device, however, may or may not have a memorize button to facilitate adding the object to the listed handset.

As detailed above, clip devices that are provided as accessories with a wireless handset may be transmitting or non-transmitting in type. Whether the clip is implemented as a transmitting type object or a non-transmitting type object, a preferred embodiment of the invention does not require the objects to include a memorize button. By not requiring the memorize button, a user will have to manually program the clip into the list of the handset. However, without the memorize button, clip devices will be less complicated and expensive to implement and provide as an accessory. Further, for the transmitting type of clip device, a preferred embodiment of the invention utilizes the beacon transmission as a response, since this requirement is also believed to be less expensive than the alternative of providing a direct synchronous connection to the handset. In accordance with aspects of the present invention, FIGS. 35 and 36 are exemplary block diagrams of the main components of a non-transmitting clip device and a transmitting clip device, respectively.

Figure 35:
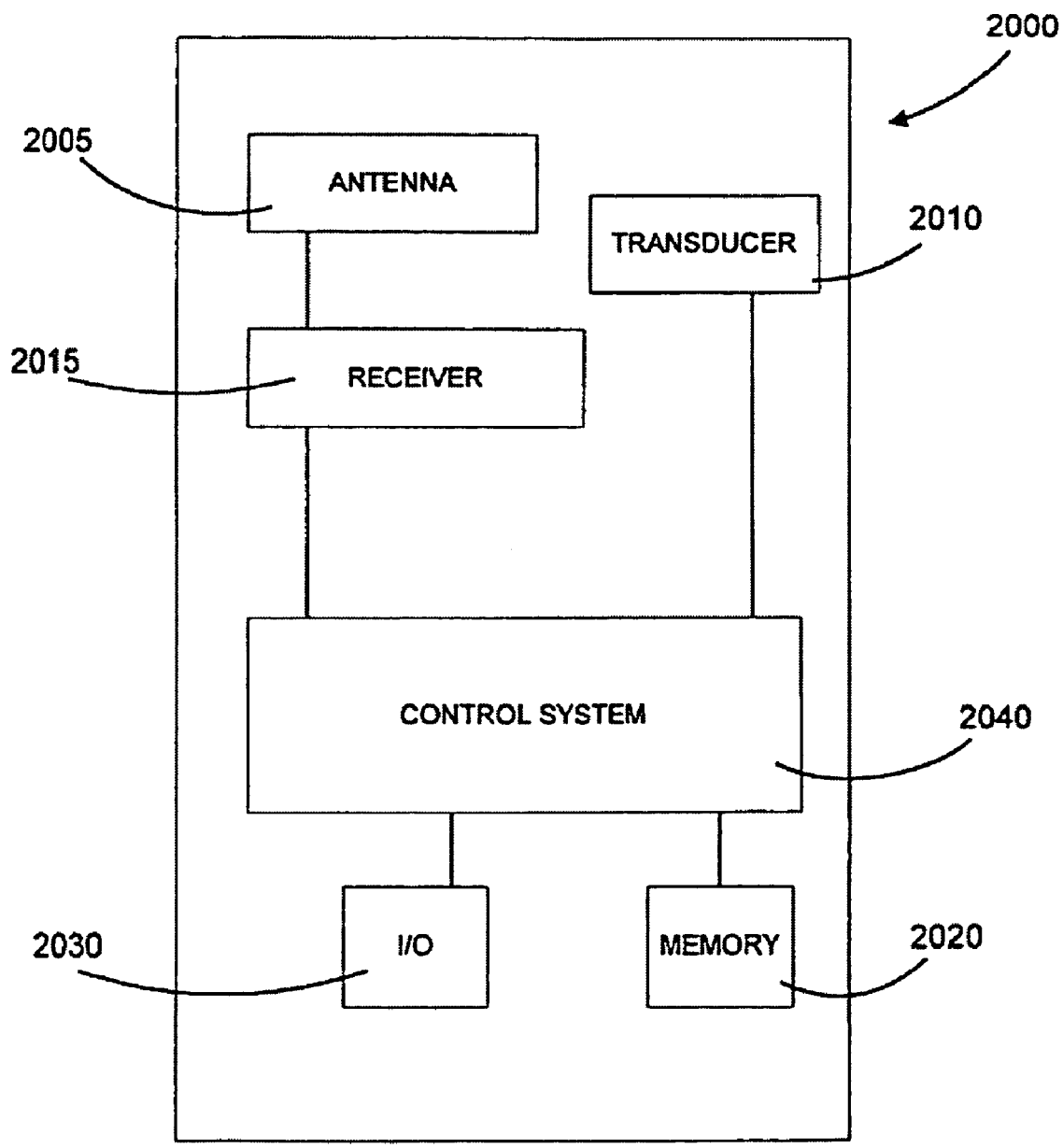
FIG. 35 is an exemplary block diagram of the main components of a non-transmitting clip device, in accordance with an aspect of the present invention.

In particular, as illustrated in the exemplary block diagram of FIG. 35, non-transmitting clip device 2000 may be implemented through various components, including a control system 2040, an antenna 2005, a transducer 2010, a receiver 2015, and a memory unit 2020. An input/output (I/O) interface 2030 may also be provided for facilitating communication with the other components of the clip device 2000, including the control system 2040. The I/O 2030 may also be configured to permit downloading and/or uploading of information from memory 2020. In addition, transducer 2010 may be implemented as a speaker, horn, or another type of device that is capable of generating an audible beep tone in response to a beep request that is received through antenna 2005 and receiver 2015. Further, since clip device 2000 is a non-transmitting type of object, a transmitter is not required in the device.

Figure 36:
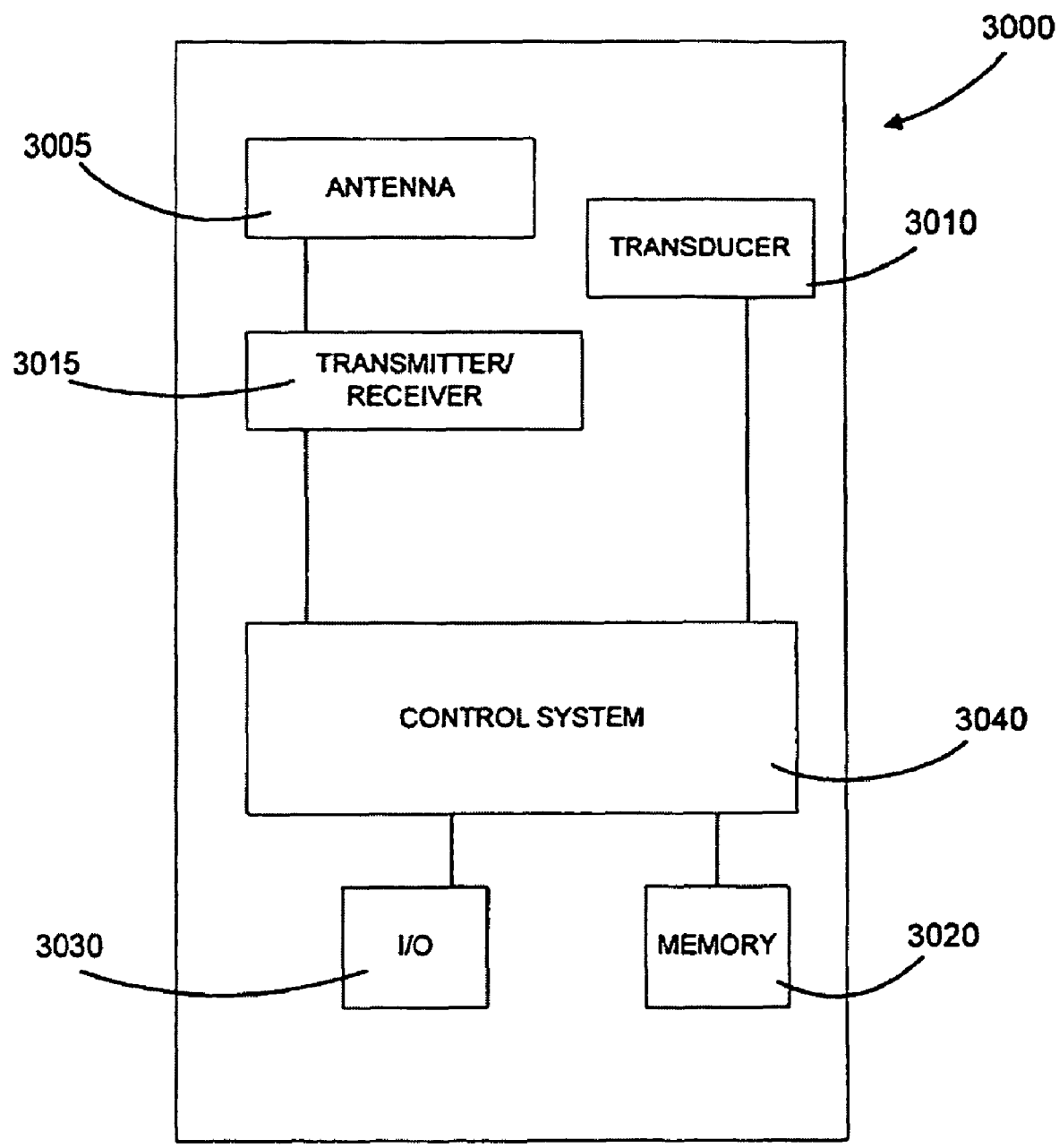
FIG. 36 is an exemplary block diagram of the main components of a transmitting clip device, in accordance with another aspect of the present invention.

In contrast, as indicated by reference numeral 3015 in FIG. 36, a transmitting clip device 3000 should include a transmitter as well as a receiver. These components may be provided as a single transceiver which is capable of receiving and responding to requests and queries from other objects, including wireless handsets. The other components provided in transmitting clip device 3000 may be similar to that provided in the non-transmitting clip device 2000. For example, as illustrated in the exemplary block diagram of FIG. 36, transmitting clip device 3000 may also comprise a control system 3040, an antenna 3005, a transducer 3010, a memory unit 3020, and an input/output (I/O) interface 3030 for interfacing with the components of the clip device. In the embodiment of FIG. 36, transducer 3010 may be implemented as a speaker, horn, or another type of device that is capable of generating an audible beep tone in response to beep requests.

The clip device configurations of FIGS. 35 and 36 may be modified to include additional features or components. For example, in order to facilitate the activation of features, one or more buttons or a keypad may also be provided in the clip device. Through the use of a keypad or button, a user may be permitted to initiate various features, such as the memorize feature of the invention to exchange information with another object or handset.

As discussed above, the wireless handset of the present invention may be implemented with additional procedures or routines to improve the operation of the handset. In this regard, separate procedures and routines may be provided for detecting and correcting collisions. A collision may occur when one handset tries to register at the exact same time as another handset on the registry channel. To detect collisions, each handset may be required to first listen on the registry channel before transmitting registry information. If the channel is not open, then the handset may wait until the channel is open before transmitting information and registering. Further, if another signal is detected during transmission on a channel, then all handsets transmitting during that interval may invoke a routine which causes them to wait a random period of time and then retransmit information. Such procedures will ensure future collisions with the same handset do not occur. In addition, the clock cycles will be reset to synchronize with the new interval.

In addition, other procedures and routines may be provided to prevent channels or conversations from interfering. For example, it is possible for two handsets (i.e., handsets H1 and H2) on a call to occupy a channel (i.e., F1) and that for two other handsets (i.e., H3 and H4) on a call but out of range of H1 and H2, to occupy that same channel, F1. If H3 and H4 are moving, and come within range of H1 and H2, then their conversations will interfere. Upon detection of interference on the channel, the control time slot may be used to renegotiate a new channel for either H1 and H2 or H3 and H4. Alternatively, both H1 and H2 and H3 and H4 may renegotiate a new channel by transmitting a randomly selected new channel and indicating the same with control data during the control time slot. Further, during the control time slot, all four handsets may recognize that there is interference and decide which handsets will move to a different channel.

Various embodiments are disclosed herein for initiating and establishing a call between wireless handsets in a direct handset-to-handset communication mode (see, e.g., FIGS. 5-8). It is of course possible to provide other implementations and embodiments to support direct handset-to-handset connectivity between wireless handsets. By way of non-limiting examples, FIGS. 22-25 illustrate exemplary flowcharts of the operations and processes that may be carried out for initiating and establishing a free call between wireless handsets, in accordance with the present invention. These embodiments utilize a registry channel for initiating and establishing a free-call. Call waiting features may also be enabled in the wireless handsets of the invention, exemplary embodiments of which are described below with reference to FIGS. 26-27.

Figure 22A:
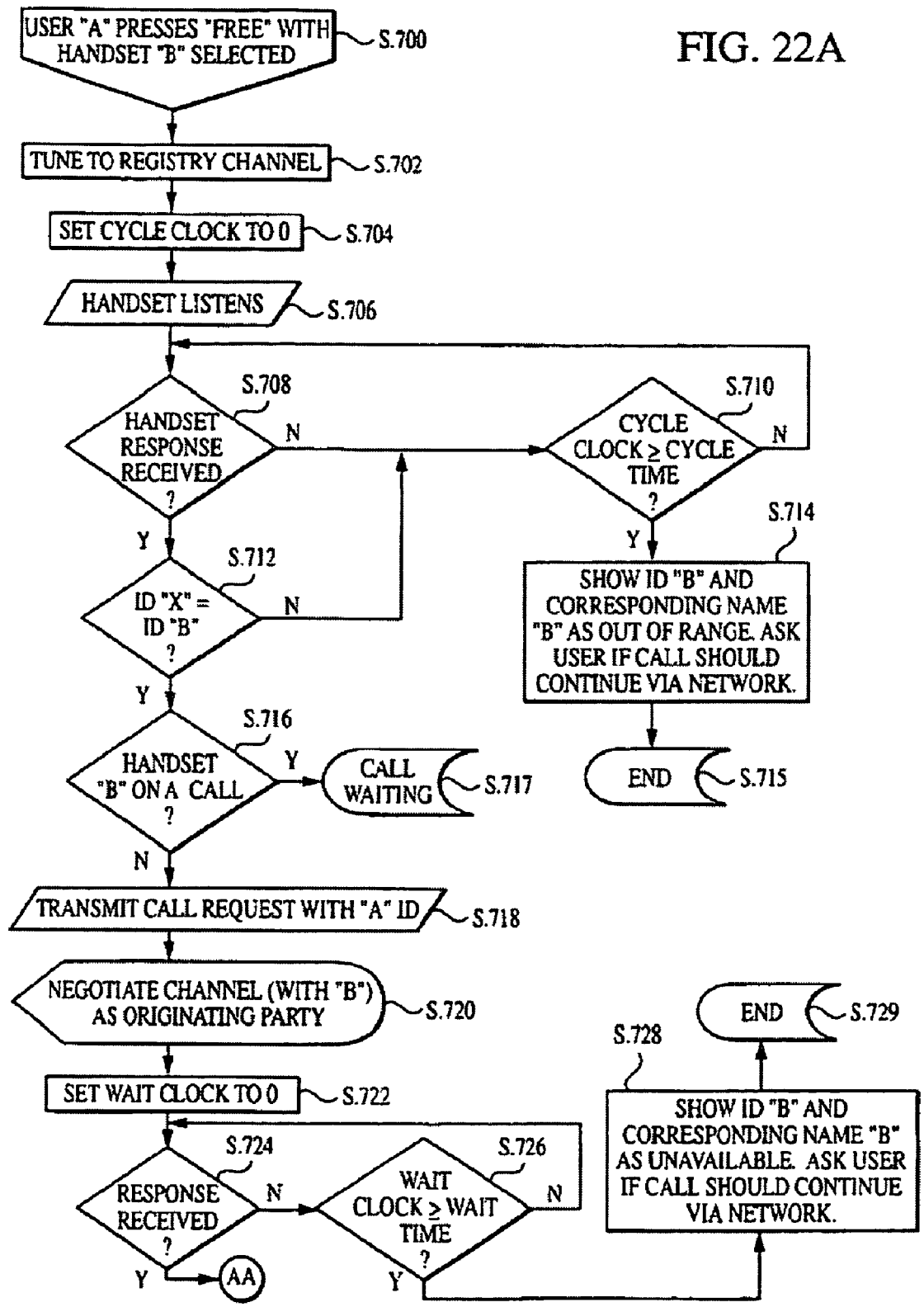
FIGS. 22A and 22B are exemplary flowcharts of the various processes and operations that may be carried out by a wireless handset (i.e., handset A) when a free call is to be initiated and set up with another handset (i.e., handset B)
Figure 22B:
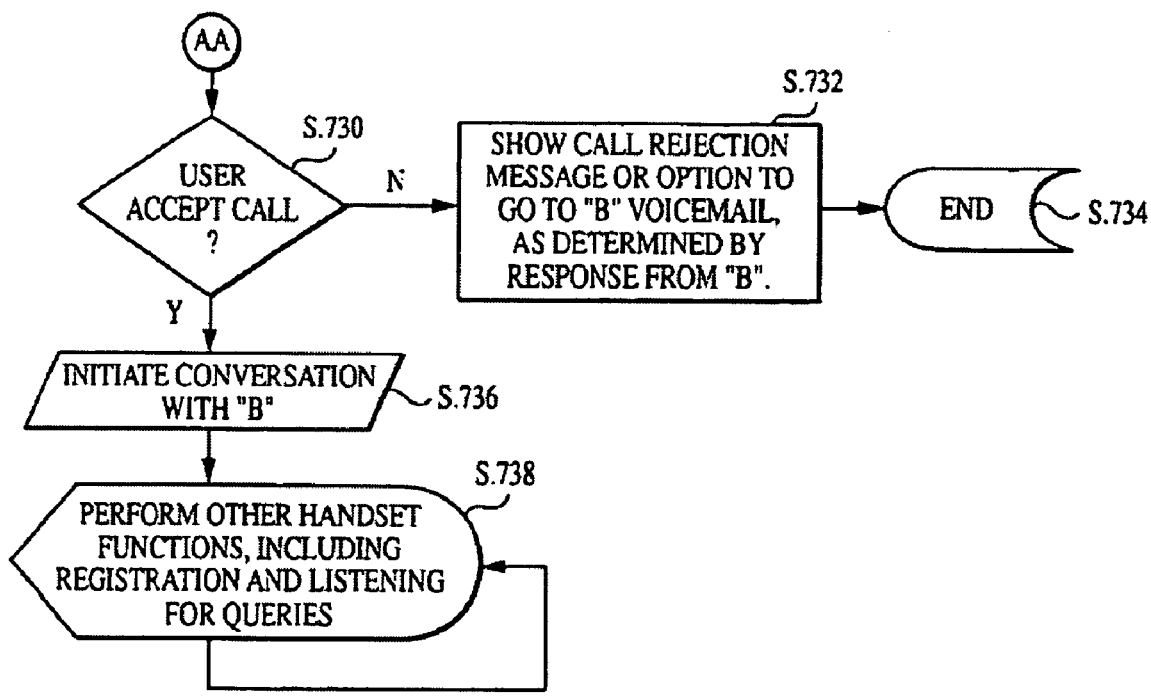
Figure 23A:
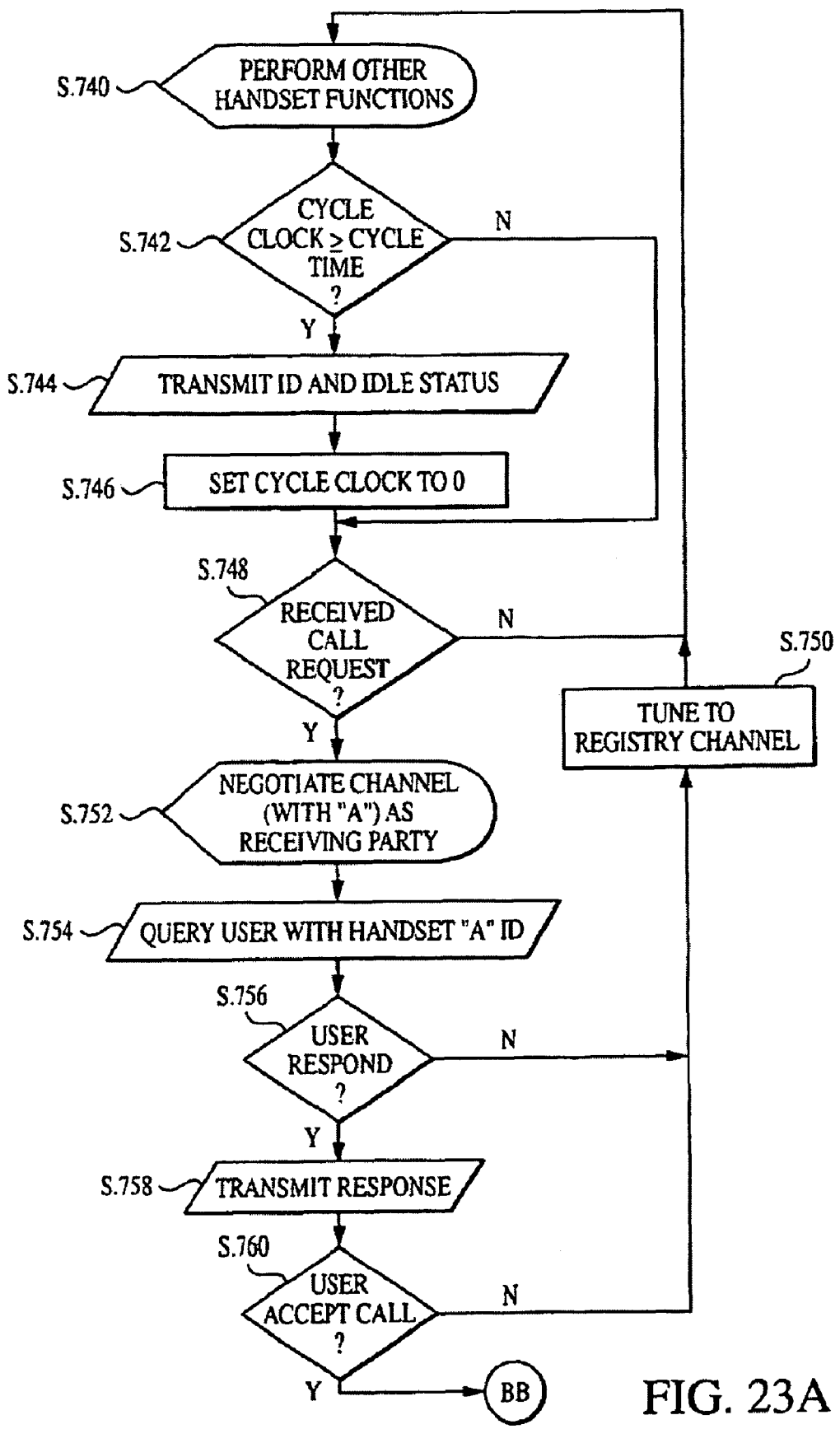
FIGS. 23A and 23B are exemplary flowcharts of the various operations and procedures that may be carried out by handset B when responding to the call request from handset A.
Figure 23B:
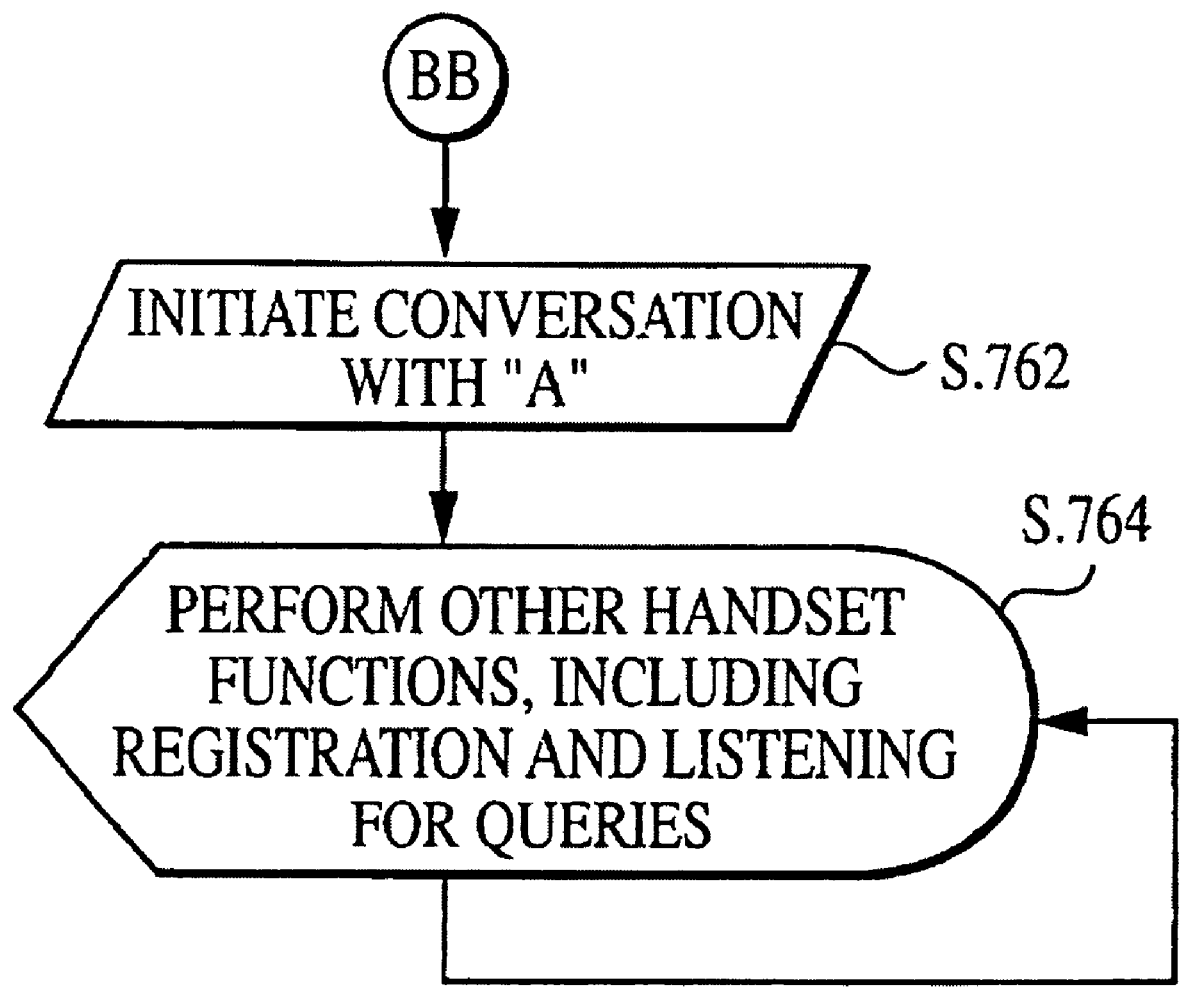
Figure 24A:
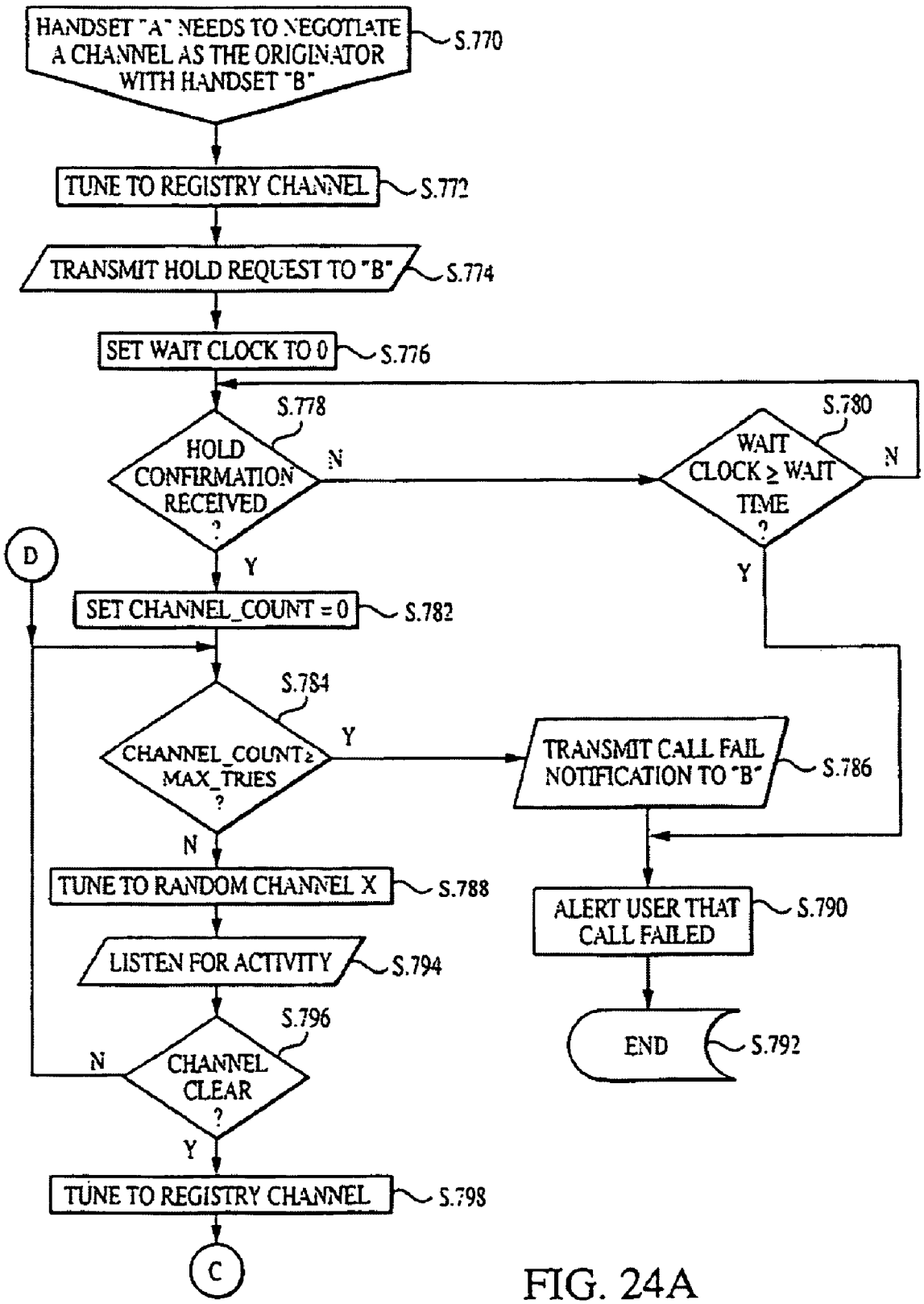
FIGS. 24A and 24B are exemplary flowcharts of the functions and procedures carried out by handset A when negotiating a channel for the call with handset B, wherein handset A acts as the originator or originating party for the channel negotiation.
Figure 24B:
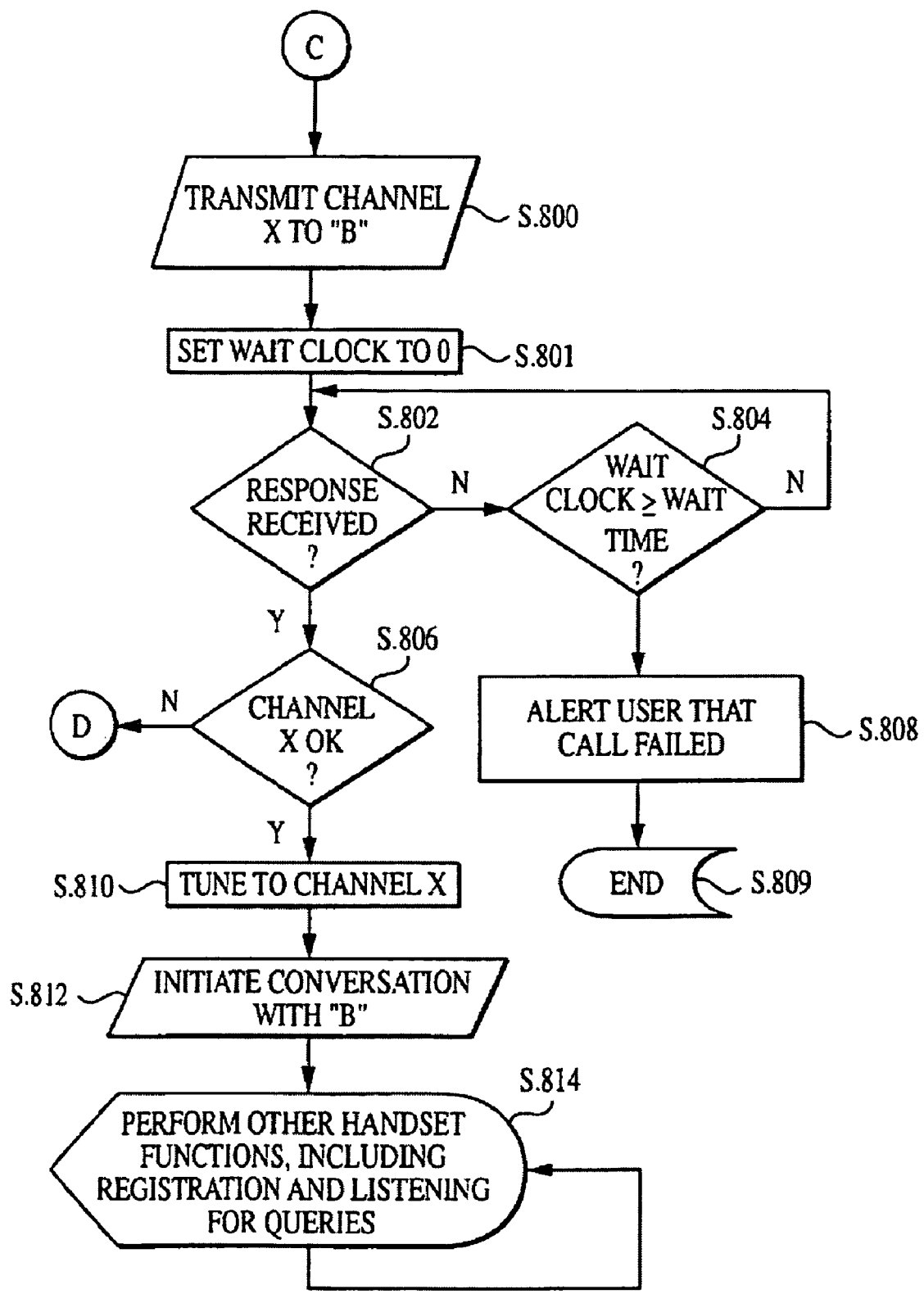
Figure 25A:
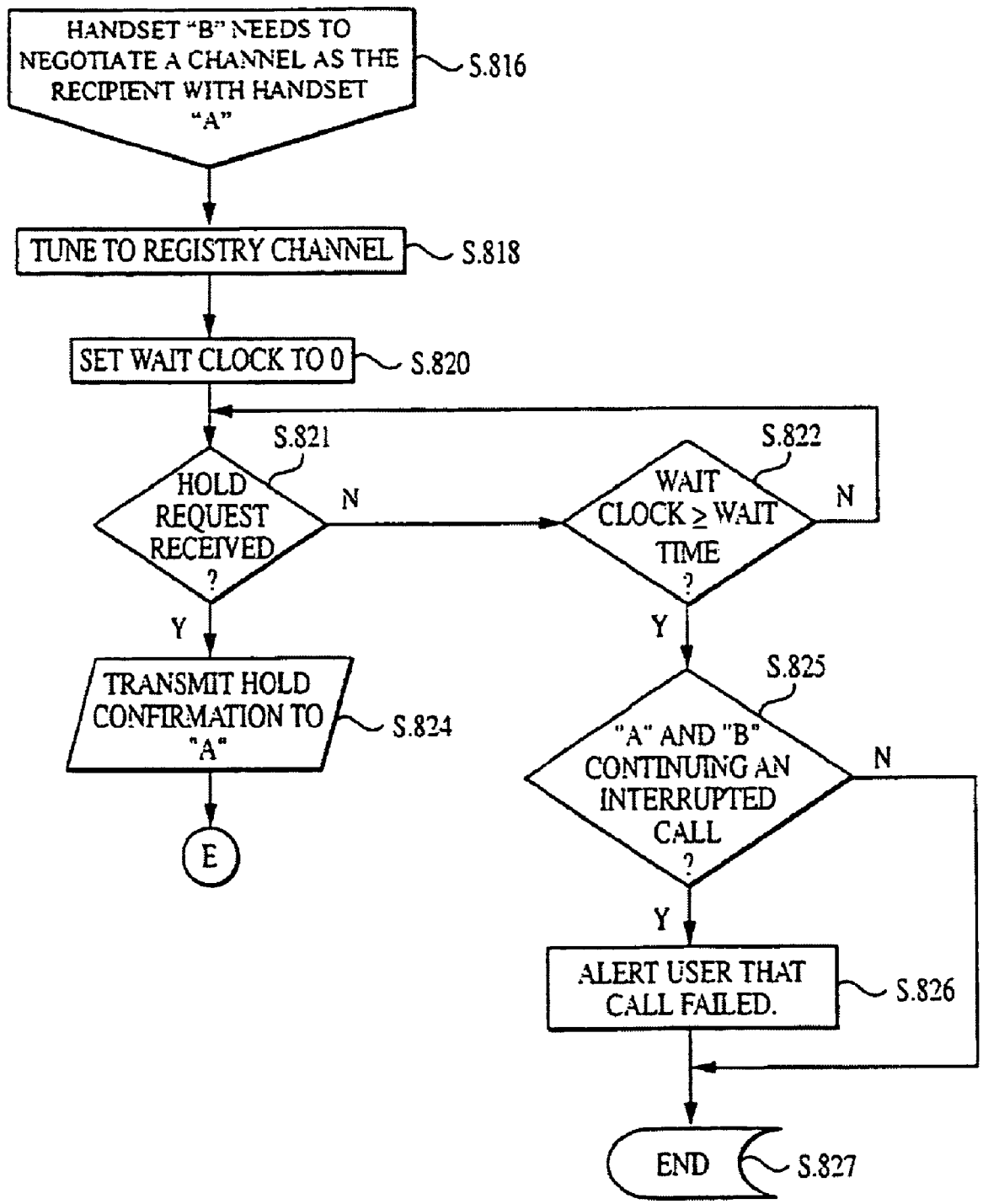
FIGS. 25A and 25B are exemplary flowcharts of the various procedures and operations carried out by handset B when negotiating the channel for the call with handset A, wherein handset B acts as the recipient for the channel negotiation.
Figure 25B:
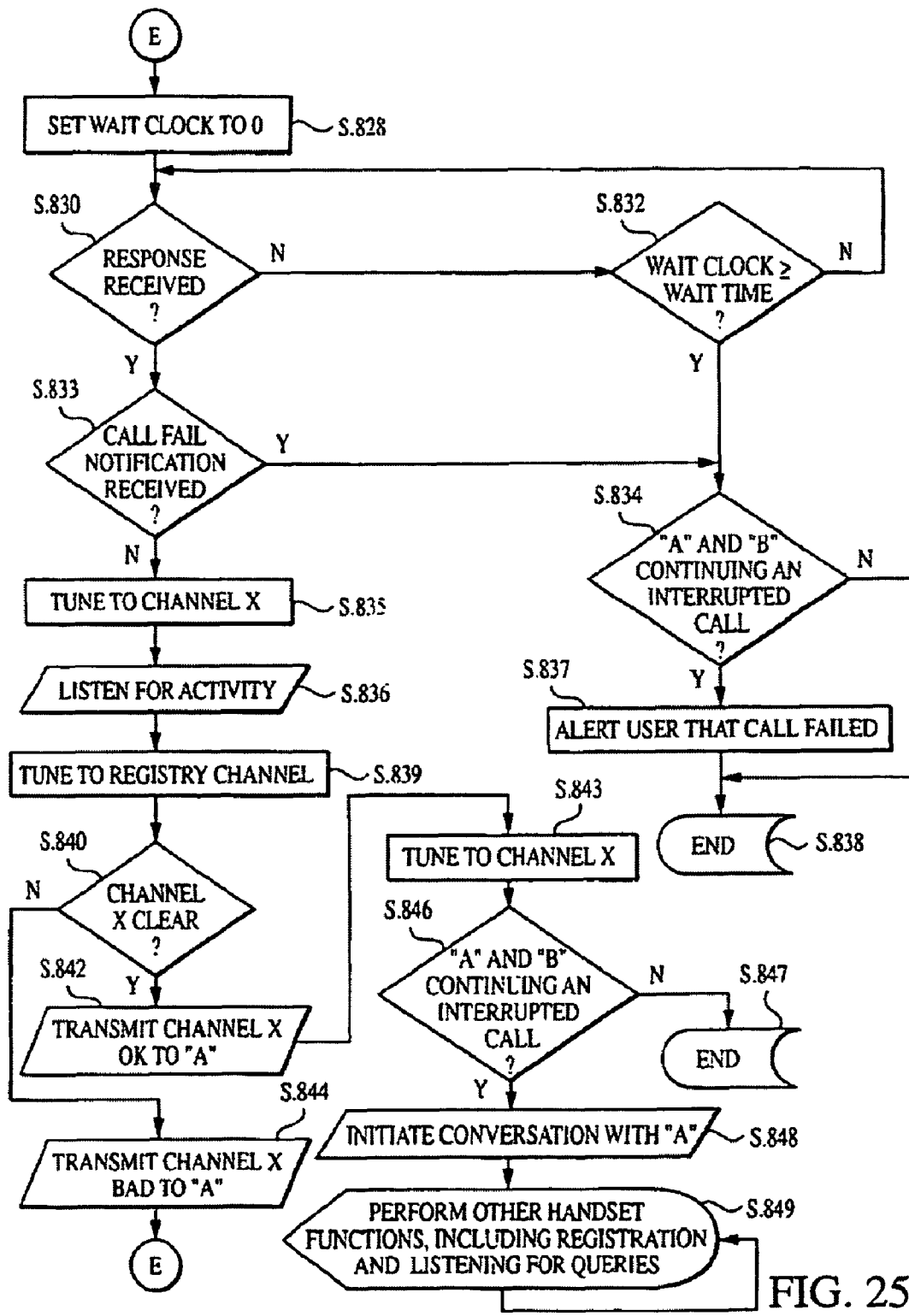

In particular, FIGS. 22A and 22B are exemplary flowcharts of the various processes and operations that may be carried out by a wireless handset (i.e., handset A) when a free call is to be initiated and set up with another handset (i.e., handset B). FIGS. 23A and 23B illustrate the various operations and procedures that may be carried out by handset B when responding to the call request from handset A. In addition, FIGS. 24A and 24B are exemplary flowcharts of the functions and procedures carried out by handset A when negotiating a channel for the call with handset B, wherein handset A acts as the originator or originating party for the channel negotiation. Further, FIGS. 25A and 25B are exemplary flowcharts of the various procedures and operations carried out by handset B when negotiating the channel for the call with handset A, wherein handset B acts as the recipient for the channel negotiation.

As shown in FIG. 22A, the call initiation process is started at step S.700 when the user of handset A presses the appropriate key on the handset (e.g., a FREE call button) with handset B being selected or dialed. When the call is initiated by handset A, handset B may or may not be on a call with another handset. To facilitate access, each handset may be equipped with call waiting features to permit a user of a handset to switch between free calls. An embodiment for providing call waiting is discussed below with reference to FIGS. 26-27. However, in order to facilitate description of the embodiment of FIGS. 22A and 22B, it will be assumed that handset B is not on a call when the call request is initiated by handset A.

At step S.702, the transmitter/receiver or tuner of handset A is tuned to a predetermined registry channel. The registry channel may be similar to the registry channel that is utilized for performing the Find features of the invention. Alternatively, a separate registry channel may be established for initiating and establishing a call. After tuning to the registry channel, handset A sets the value of a cycle_clock to 0 at step S.704. Similar to the other embodiments disclosed herein, the cycle_clock may be implemented as a counter that is incremented in accordance with an internal system clock of the handset and may be utilized to monitor the elapsed time.

At step S.706, handset A will monitor and listen to the registry channel in order to determine whether handset B is within range. As further discussed below, in this embodiment each handset (including handset B) will register on the registry channel every predetermined cycle time (i.e., every .times. minutes or seconds). The registry message may include the ID of the registering handset, as well as the status (e.g., Idle or On Call) of the handset. Handset A will wait and listen to the registry channel for approximately one predetermined cycle time in order to determine if handset B is within range. Thus, at step S.708, handset A will determine whether a response has been received on the registry channel. If no response is received, then at step S.710 it will be determined whether the value of the cycle_clock is greater than or equal to the predetermined cycle time. If the cycle_clock is less than the cycle time, then logic flow loops back to step S.708 to determine again whether a handset response has been received. Otherwise, if no response is detected within the predetermined cycle time, then logic flow will proceed to step S.714.

At step S.714, handset A will indicate to the user that handset B is out of range. This notification may take the form of displaying the ID and/or corresponding name of handset B, along with a predetermined message (e.g., "Out of Range"). In addition, at step S.714 handset A may prompt the user to inquire as to whether a network call should be placed in order to contact handset B. If the user decides to contact handset B through a network call, then handset A may place a network call in accordance with conventional methods or techniques. Following step S.714, operation of the call initiate routine may terminate at step S.715, as shown in FIG. 22A.

When a handset response is detected at S.708 within the cycle time, handset A will determine at step S.712 whether the ID of the registering handset corresponds to that of handset B. If the handset of the registering handset does not correspond to the ID of handset B, then logic flow proceeds to step S.710, where it is determined whether the cycle time has elapsed. If, however, the ID of the registering handset corresponds to that of handset B, then handset B is within range and handset A may analyze the status information contained in the registry message at step S.716 to determine if handset B is idle or on a call. This step may be provided when a separate call waiting feature is enabled in the handset. In such a case, when it is determined that handset B is on a call, then logic flow may proceed to step S.717 where the appropriate call waiting routine is performed by handset A. An exemplary embodiment of such a call waiting routing is provided below with reference to FIGS. 26A and 26B. If it is determined at step S.716 that handset B is not on a call, then logic flow proceeds to step S.718. Further, if call waiting features are not enabled in the handset, then step S.716 in FIG. 22A may be eliminated and logic flow may proceed directly from step S.712 to step S.718.

In accordance with an aspect of the invention, the above-described routine of steps S.700-S.715 may be performed on an on-going basis by handset A such that when the user initiates a call, the handset already knows if handset B is in range and/or if handset B is on a call or not. In such a case, handset A may keep track and store the status of all other handsets on the Find list of handset A. Further, with this embodiment, a handset on the list may be required to miss a predetermined number of sequential registrations before being recorded as unavailable by handset A.

Referring again to FIG. 22A, at step S.718, handset A transmits a call request message to handset B over the registry channel. The call request may include the ID of handset A, as well as the ID of the intended recipient of the call request (i.e., the ID of handset B). An appropriate code may also be provided in the message to indicate that a call request is being made. If the call request is received by handset B, then at step S.720 handset A will attempt to negotiate a channel for the call with handset B. For channel negotiation, handset A will act as the originator or originating party, with handset B acting as the recipient or receiving party. An exemplary embodiment of the various operations and processes that may be carried out by handset A to negotiate a channel is discussed below with reference to FIGS. 24A and 24B. Following step S.720, handset A will set the value of a wait_clock to 0 at step S.722. That is, after successfully negotiating a channel with handset B, handset A will wait for a predetermined wait time to determine if the user of handset B responds to the call request from handset A. For this purpose, the wait_clock may be a counter that is incremented in accordance with an internal system clock of the handset to monitor the elapsed time and determine when the wait time has been exceeded.

After tuning to the channel negotiated for the call, handset A will listen and determine whether a response has been received from handset B at step S.724. As further discussed below, a response message may be sent by handset B when it is determined that the user of handset B has responded to the call request from handset A. The user of handset B may respond to the call request by accepting the call or requesting special handling or forwarding of the call (e.g., call forwarding to voice mail or another handset or number). If no response is received from handset B as step S.724, then at step S.726 handset A will check and determine if the value of the wait_clock is greater than or equal to the predetermined wait time. If the value of the wait clock is less than the wait time, then logic flow loops back to step S.724. If, however, the wait time has elapsed or been exceeded, then at step S.728 handset A will assume that the call request was not responded to by the user of handset B and will notify the user of handset A that handset B is unavailable. In this regard, the notification to the user may take the form of a message that is displayed on the display panel of handset A This display may include the ID and/or name of handset B, along with an appropriate message to indicate that handset B is unavailable (e.g., "Unavailable"). At this point, handset A may also prompt or ask the user (e.g., through the display panel of the handset) if the call should be placed through a network. If the user determines to place the call through a network, then conventional techniques and methods may be performed to send the call request through the network. Following step S.728, the free call initialization routine may terminate at step S.729, as shown in FIG. 22A.

If a positive response is received over the negotiated channel at step S.724, then logic flow will proceed to step S.730 (see FIG. 22B), where it will be determined whether the user of handset B has responded to the call request by accepting the call. The determination at step S.730 may be made by analyzing the response message received from handset B. The response message may include a code indicating whether the call has been accepted or forwarded/transferred. If the call is determined as being accepted by handset B, then the user of handset A may initiate a conversation with the user of handset B at step S.736. Further, handset A will then perform other handset functions, at step S.738, including handset registration and listening for queries or requests from other handsets.

If it is determined that the call was not accepted by the user of handset B at step S.730, then at step S.732 handset A will notify that the call was rejected. This notification may take the form of a message on the display panel (e.g., "Call Rejected"). Further, this notification may be generated based on the notification selected by the user of handset B from a number of user definable messages. For example, the user of handset B may send a "Call Back Later" message in response to one call request, while replying with a "I'll Call You Back" message in response to another call request. The selected message may be transmitted from handset B as part of the response message sent to handset A. In addition, handset A may provide a prompt to indicate other options that may be performed by the user of handset A based on the response from handset B. For example, an option may be provided to send a request to handset B which forwards the call to a voice mail network or perform some other function based on the response received from handset B. Following step S.732, the routine terminates at step S.734, as shown in FIG. 22B.

FIGS. 23A and 23B are exemplary flowcharts of the various operations and processes that may be carried out by handset B when responding to a call request from handset A. As noted above, in this embodiment each handset registers on a predetermined registry or control channel every cycle time (e.g., every .times. minutes or seconds). Accordingly, as shown in FIG. 23A, after performing other handset functions at step S.740, handset B will determine at step S.742 whether the predetermined cycle time has elapsed. This is performed by comparing the value of a cycle_clock with the predetermined cycle time. If the cycle time has elapsed, then it is time for handset B to register on the registry channel. As such, at step S.744, handset B will register on the registry channel by transmitting the ID of handset B and transmitting status information. The status information may include a code to indicate whether handset B is idle or on a call. Following step S.744, handset B will initialize and set the value of the cycle_clock to 0 at step S.746 and then proceed to step S.748. Logic flow will also proceed to step S.748 when it is determined at step S.742 that the cycle_clock is less than the predetermined cycle time.

At step S.748, handset B will check to determine whether a call request has been received. As noted above, call request may be transmitted over the registry or control channel, with the call request including the ID of the requesting handset (i.e., the ID of handset A). If a call request is not detected at step S.748 because, for example, the requesting handset is out of range or has not transmitted the call request, then logic flow loops back to step S.740. If, however, a call request message is received at step S.748, then handset B will negotiate a channel for the call at step S.752, with handset B acting as the receiving party.

More particularly, in response to the receipt of a call request from handset A, handset B will negotiate a channel for the call at step S.752, with handset A acting as the originator or originating party. Since handset A initiated the call request and is acting as the originating party, handset B will negotiate the channel for the call as the recipient or receiving party. An exemplary embodiment of the various processes and operations that may be carried out by handset B at step S.752 to negotiate a channel is described below with reference to FIGS. 25A and 25B. Following the successful negotiation of a channel for the call at step S.752, handset B will query the user of handset B at step S.754 so as to notify the user of the presence of the call request from handset A. This query may take the form of providing an alerting tone (such as a ringing tone, etc.), as well as displaying a message (e.g., "Incoming Call") and/or the ID and/or name of handset A. In response to the query, the user of handset B may respond to the call request (e.g., by accepting the call, forwarding the call, etc.) or ignore and not respond to the call request. At step S.756, it is determined whether the user of handset B has decided to respond to the call. If the user of handset B has responded to the call, then at step S.758 a response message is transmitted by handset B to handset A. The response message may be transmitted over the channel negotiated for the call. Thereafter, at step S.760, logic flow proceeds depending on the manner in which the user of handset B has decided to respond to the call. That is, if the user of handset B did not accept the call, then logic flow proceeds from step S.760 to step S.750, where handset B tunes back to the registry channel. As shown in FIG. 23A, logic flow will also proceed to step S.750 when it is determined that the user has not responded to the call request at step S.756. Following step S.750, logic flow loops back to step S.740 so that other handset functions may be performed.

If it is determined at step S.760 that the user has accepted the call, then the user of handset B may be permitted to initiate the conversation with the user of handset A at step S.762 (see FIG. 23B). At step S.762, handset B will transmit and receive voice data over the negotiated channel with handset A. In addition, at step S.764, handset B will perform other handset functions, including registration on the registry channel and listening for queries and requests from other handsets.

As discussed above, handset A will negotiate with handset B to select a channel for the free call after transmitting the call request to handset B (see step S.720 in FIG. 22A). Various procedures and routines may be implemented to facilitate channel negotiation. Channel negotiation may also be utilized to select a new channel for a free call when interference has arisen from other handsets that have moved within range while occupying the same channel for the free call or when other interference occurs. FIGS. 24A and 24B illustrate an exemplary embodiment of the manner in which handset A can negotiate a channel when acting as the originator or originating party. More specifically, as represented at step S.770 in FIG. 24A, handset A needs to negotiate a channel for a free call with handset B, where handset A is acting as the originator or originating party. In order to negotiate a channel, handset A will tune to a predetermined registry channel at step S.772. The registry or control channel may be the same as that utilized for detecting handsets through registry messages. Alternatively, a separate registry channel may be provided for negotiating channels. In any event, after tuning to the registry channel, handset A transmits a hold request over the registry channel to handset B at step S.774. The hold request message, which may include the ID of handset A as the originator and the ID of handset B as the recipient, may be sent to notify to handset B that handset A wishes to negotiate a channel. In response, handset A will wait or expect for a hold confirmation message to be sent back from handset B. Alternatively, this hold request confirmation step may be bypassed in favor of a faster overall negotiation process.

For this purpose, handset A will set the value of a wait_clock to 0 at step S.776 and determine at step S.778 whether the hold confirmation has been received over the registry channel from handset B. The wait_clock may be a counter that is incremented with an internal system clock of the handset to detect whether the hold confirmation message has been received from handset B within a predetermined wait time. If the hold confirmation is not received at step S.778, handset A will determine at step S.780 whether the value of the wait_clock is greater than or equal to the predetermined wait time or period. If the wait time has not been exceeded, then logic flow will loop back to step S.778. However, if the hold confirmation is not received within the wait time, then at step S.790 the user of handset A will be alerted that the call request has failed. This alert or notification may include providing a displayed message and/or tone to the user of handset A to signify that the call has failed. Following step S.790, the call negotiation procedure or routine may terminate at step S.792.

As further shown in FIG. 24A, if a hold confirmation is received at step S.778, then handset A will proceed and attempt to locate an empty or clear channel for the call. Various methods may be employed to locate a channel. According to an aspect of the invention, a predetermined number or set of channels may be available for setting up the call. The handset acting as the originator for the channel negotiation (in this case handset A) may be given a predetermined number of attempts to locate an empty or clear channel to support the call. Channel frequencies may be selected sequentially, randomly or by a specific algorithm or some other method, and then tested to determine activity and use of the channel by other handsets that are within range. Once a clear channel is detected, the originating handset (i.e., handset A) will transmit over the registry channel to the recipient handset (i.e., handset B) the frequency or number of the free channel to notify the other handset of the proposed channel. The recipient handset may then test and confirm as to whether the proposed channel is acceptable. A channel count may be maintained in order to determine the number of attempts to find a clear channel and to determine when the maximum permissible number of tries has been exceeded. When the maximum number of tries has been exceeded, the call negotiation procedure will fail and terminate.

As illustrated in FIG. 24A, at step S.782, handset A will initialize and set the value of a channel_count to 0. Then, at step S.784, handset A will compare the value of the channel_count to the predetermined maximum number of tries that is permitted (which is represented by the value of "max_tries" in FIG. 24A). If the channel_count is less than the max_tries, then at step S.788 handset A will select a channel (i.e., channel x) for monitoring. The selection of the channel may be random, sequential, or based on any other method. After selecting a candidate channel, handset A will listen to the channel for activity at step S.794. Essentially, handset A will determine if the candidate channel is suitable for handling and supporting the free call between handset A and handset B. Handset A may determine that the channel is not clear if other handsets within the area are using the channel for a call or if there is unacceptable level of noise on the channel. If the handset determines that the channel is not clear at step S.796, then the value of the channel_count is incremented by one (i.e., channel_count=channel_count+1) and logic flow will loop back to step S.784 to again compare the value of the channel_count to the value of the max_tries permitted.

If a clear channel cannot be obtained within the predetermined maximum number of permissible tries or attempts, then logic flow will proceed to step S.786 and handset A will notify handset B that the call attempt has failed. For this purpose, a call fail notification may be sent as a message over the registry or control channel to handset B at step S.786. Following step S.786, logic flow proceeds to step S.790 where the user of handset A is alerted that the call failed. The user of handset A may be alerted by generating an appropriate message (e.g., "Call Failed") and/or tone. Thereafter, the call negotiation routine may terminate at step S.792, as shown in FIG. 24A.

If a clear channel is detected at step S.796, then handset A will notify handset B of the proposed channel (i.e., channel x) that has been selected. For this reason, handset A will tune to the registry, channel at step S.798 and then transmit the channel frequency or number of the proposed channel to handset B at step S.800 (see FIG. 24B). Handset A will then wait for a confirmation message from handset B that the proposed channel is suitable for supporting the free call. As such, handset A will set the value of a wait_clock to 0 at step S.801 and determine whether a confirmation response has been received from handset B at step S.802. Handset A may monitor the registry channel for a response for a predetermined wait time before determining that the call negotiation has failed. Thus, if the value of the wait_clock is less than the predetermined wait time at step S.804, then logic flow will loop back to step S.802 to determine again if a response has been received. If a response is not received within the wait time, then logic flow will proceed to step S.808 where handset A will alert the user that the call has failed. Thereafter, the call negotiation routine may terminate at step S.809.

If a response is received within the wait time from handset B at step S.802, then at step S.806 handset A will determine whether the selected channel (i.e., channel x) has been confirmed by handset B. If the channel is confirmed by handset B as being suitable for the free call at step S.806, then at step S.810 handset A will tune to the selected channel to permit the user of handset A to initiate conversation with the user of handset B at step S.812. Further, at step S.814, handset A may perform other handset functions, including the periodic registration on the registry channel and monitoring for queries or requests (e.g., find queries and/or call requests). If, however, the channel selected by handset A was not cleared or confirmed by handset B, then logic flow will proceed from step S.806 back to step S.784 (see FIG. 24A) and the value of the channel_count will be incremented by one. Handset A will then attempt to locate another clear channel if the maximum number of permissible tries has not been exceeded. Logic flow then proceeds after step S.784 as detailed above.

Handset B also performs various operations and procedures when negotiating a channel with handset A for a free call. In the above-described example, handset B is acting as the recipient or receiving party of the call request and is negotiating a channel with handset A (see, for example, step S.752 in FIG. 23A). Various procedures and routines may be implemented to permit handset B to negotiate a channel with handset A. FIGS. 25A and 25B illustrate an exemplary embodiment for handset B to negotiate a channel when acting as the recipient or receiving party.

As represented at step S.816 in FIG. 25A, handset B needs to negotiate a channel with handset A, while acting as the recipient or receiving party. Since a hold request from handset A is transmitted over the registry channel, handset B will tune to the registry channel at step S.818 to determine whether such a hold request has been received within a predetermined wait time. For this purpose, the value of a wait_clock may be initialized to 0 at step S.820 and, thereafter, incremented in accordance with an internal system clock of the handset. Further, handset B determines whether a hold request has been received over the registry channel at step S.821. If a hold request is not determined as being received at step S.821, then at step S.822 handset B will determine whether the value of the wait_clock is greater than or equal to the predetermined wait time. So long as the wait_clock is less than the wait time, logic flow will loop back to step S.821 to determine if the hold request has been received over the registry or control channel.

If a hold request is not received within the wait time, then the call negotiation routine has failed and logic flow will proceed to step S.825. As shown in FIG. 25A, at step S.825 handset B will determine whether handsets A and B are continuing on an interrupted call. That is, as discussed above, it is possible that the need to negotiate a channel for a free call may arise when interference occurs on a channel that is being used to support a current call. In such a case, the decision to negotiate a new channel for the free call may be performed automatically by either handset. In addition, the users of handset A and handset B may be given the ability to determine when it is necessary to negotiate a new channel for the free call. Thus, in addition to negotiating a channel based on a new call request, handset B may also need to negotiate a new channel (e.g., while acting as a recipient or receiving party) for an existing call that has been interrupted (e.g., due to other handsets occupying the same channel or unacceptable noise levels on the channel). The call negotiation procedures of the invention may thus be utilized in either case. If handsets A and B are continuing on an interrupted call, then logic flow may proceed to step S.826 where the user of handset B is alerted that the call has failed. Thereafter, logic flow may proceed to step S.827 where the call negotiation routine will terminate. If, however, handset A and handset B are not continuing on an interrupted call, then the user of handset B does not need to be notified of the failure of the call request and negotiation, and logic flow may proceed directly from step S.825 to step S.827 where the call negotiation routine terminates.

As further shown in FIG. 25A, if a hold request is received at step S.821, then at step S.824 handset B will transmit a hold confirmation message back to handset A. The hold confirmation message may be transmitted over the registry channel from handset B to handset A. Thereafter, handset B will wait for handset A to further respond with a selected or proposed channel for the call.

More particularly, as shown in FIG. 25B, handset B will set the value of a wait_clock2 to 0. The wait_clock2 may be a counter that is incremented in accordance with an internal system clock of handset B. The value of the wait_clock2 may be monitored to determine whether a predetermined wait time has elapsed without receiving a response from handset A. This predetermined wait time should be set in accordance with the maximum number of tries that handset A is permitted to locate a suitable channel. At step S.830, handset B will determine whether a response has been received from handset A over the registry channel. If a response is not received, then at step S.832 the value of the wait_clock2 will be compared with the predetermined wait time. If the value of the wait_clock2 is less than the wait time, then logic flow will loop back to step S.830 to again determine whether a response has been received. If a response has been received within the predetermined wait time, then at step S.833 handset B will check to determine whether handset A has indicated in the response message that the attempt to locate a free channel has failed. If a call fail notification message is received, then logic flow proceeds to step S.834. Logic flow will also proceed to step S.834 if it is determined that a response has not been received from handset A within the predetermined wait time at steps S.830 and S.832.

At step S.834, handset B will determine whether handsets A and B are continuing on an interrupted call. If handsets A and B are continuing on an interrupted call, then at step S.837 handset B will be alerted that the call has failed. Thereafter, logic flow proceeds to step S.838 where the routine may terminate. If, however, handset A and handset B are not continuing on an interrupted call, then the user of handset B does not need to be notified of the failure of the call request and negotiation, and logic flow may proceed directly from step S.834 to step S.838 where the call negotiation routine terminates.

As further shown in FIG. 25B, if handset A has not sent a call fail notification, then handset A has sent the selected or proposed channel (i.e., channel x) and handset B will tune to the proposed channel at step S.835. Handset A may indicate the number or frequency of the selected channel in the response message after detecting that the channel is clear, as described above. Handset B will then confirm that the selected channel is clear and suitable to support the call. Thus, following step S.835, handset B will determine whether the channel is clear by listening for activity on the channel at step S.836. Handset B may check whether the selected channel has become occupied by other handsets within the area or whether the noise level of the channel is at an unacceptable level. After listening for activity on the channel, handset B will tune to the registry channel at step S.839 in preparation of transmitting a response message back to handset A. If channel B determines that the selected channel is clear at step S.840, then at step S.842 handset B will transmit a message to handset A to indicate that the selected channel (i.e., channel x) is suitable for setting Up the call. If, however, handset B determines that the selected channel has become corrupted or is not clear, then at step S.844 a message will be transmitted to handset A to indicate that the proposed channel is bad or unacceptable for setting up the call. Following step S.844, logic flow will loop back to step S.828 to wait for an additional response from handset A (i.e., another selected channel or a call fail notification message).

If the proposed channel was determined as being clear and handset A was notified that the channel is clear at step S.842, then handset B will tune to the confirmed channel at step S.843. Thereafter, at step S.846, handset B will determine whether handsets A and B are continuing on an interrupted call. If this is not the case, then the call negotiation routine may terminate at step S.847. Thereafter, the call initialization procedure for handset B may continue as indicated, for example, in FIGS. 23A and 23B (see, e.g., the steps following step S.752). If, however, handsets A and B are continuing on an interrupted call, then at step S.848 handset B will permit the user to initiate and continue the conversation with the user of handset A. In addition at step S.849, handset B will perform other handset functions, including handset registration on the registry channel and listening for queries and requests on the registry channel.

As described above, the call negotiation procedures of the present invention may be implemented for negotiating a channel when establishing a free call between wireless handsets. In particular, the embodiments of FIGS. 24 and 25 may be utilized as part of the overall procedures of FIGS. 22 and 23 for establishing a handset-to-handset call. In addition, the channel negotiation procedures of the invention may be utilized to negotiate a new channel to avoid interference during a free call. That is, the embodiments of FIGS. 24 and 25 may be utilized by wireless handsets on a free call to select a new channel when the current channel that is supporting the free call has become corrupted due to noise or interference caused by other wireless handsets that have come into range and that are occupying the same channel or due to other causes.

Figure 26A:
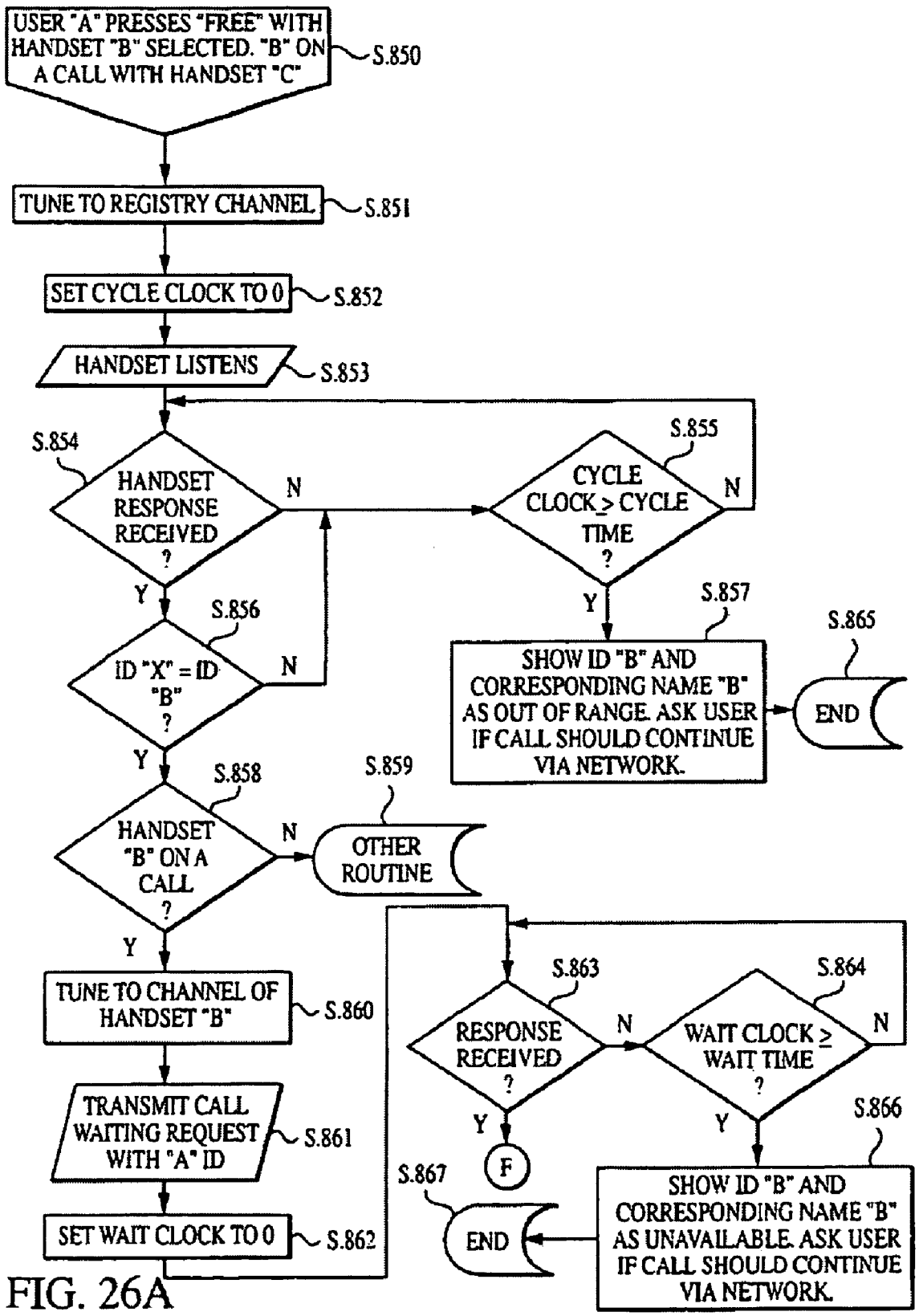
FIGS. 26A and 26B are exemplary flowcharts of the various processes and operations carried out by handset A for initiating a call with handset B, when handset B is on a call with another handset (i.e., handset C)
Figure 26B:
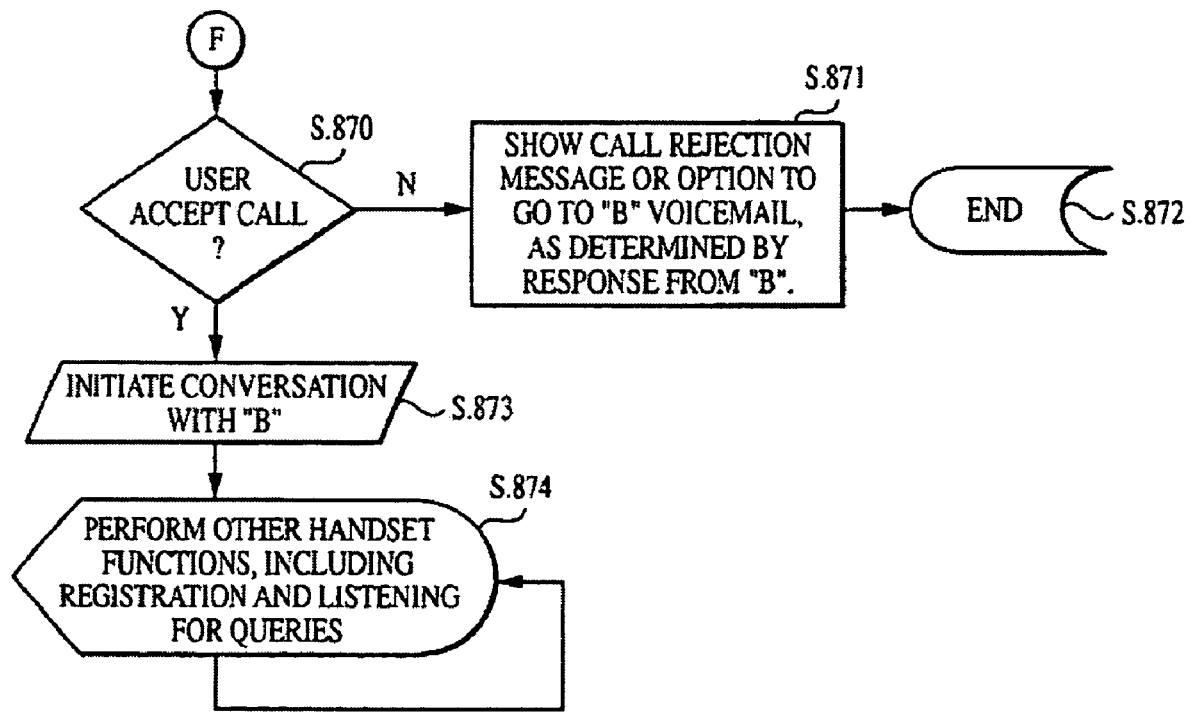
Figure 27A:
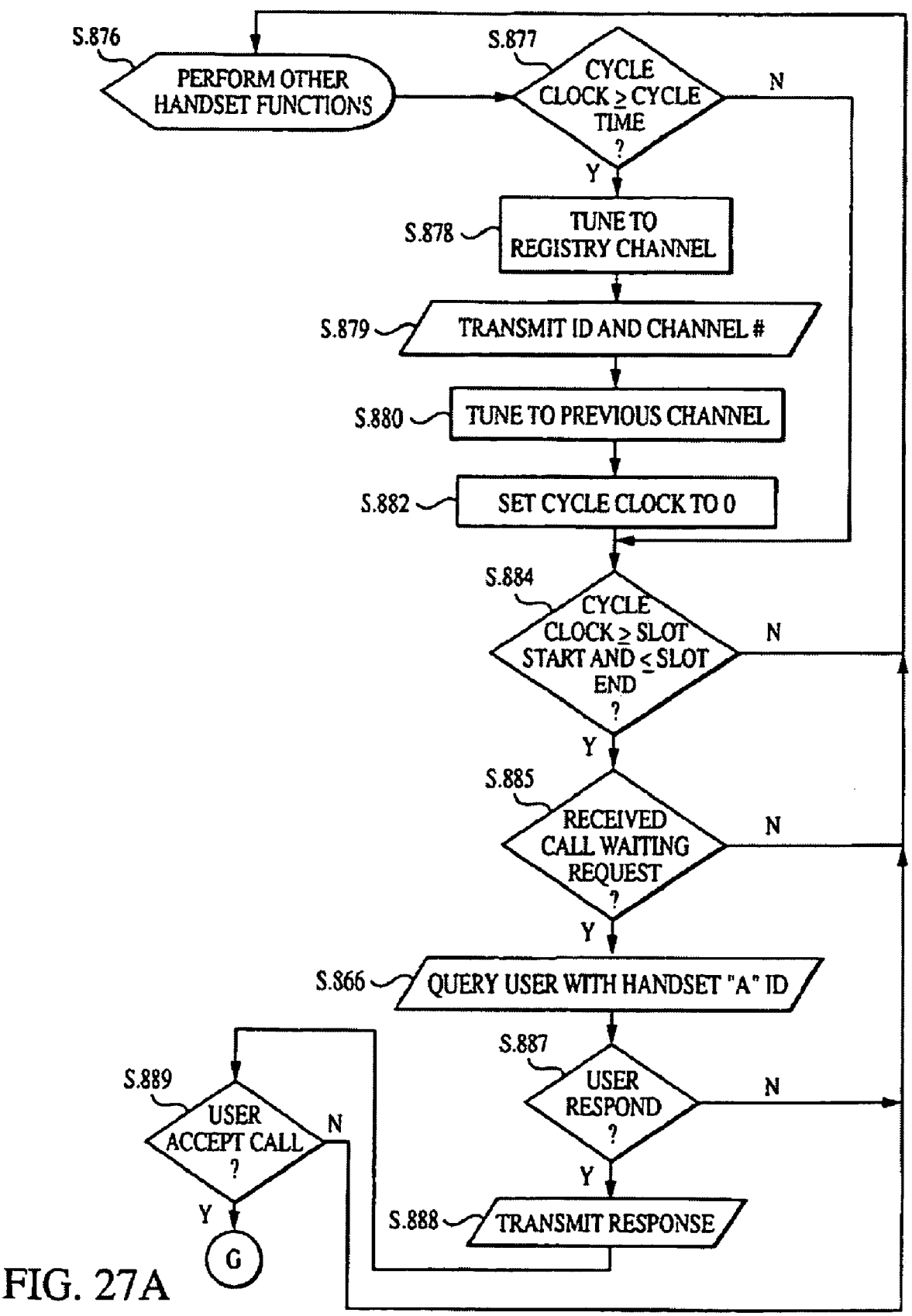
FIGS. 27A and 27B are exemplary flowcharts of the various processes and operations that may be carried out by handset B to handle the call request from handset A, while handset B is on a call with handset C.
Figure 27B:
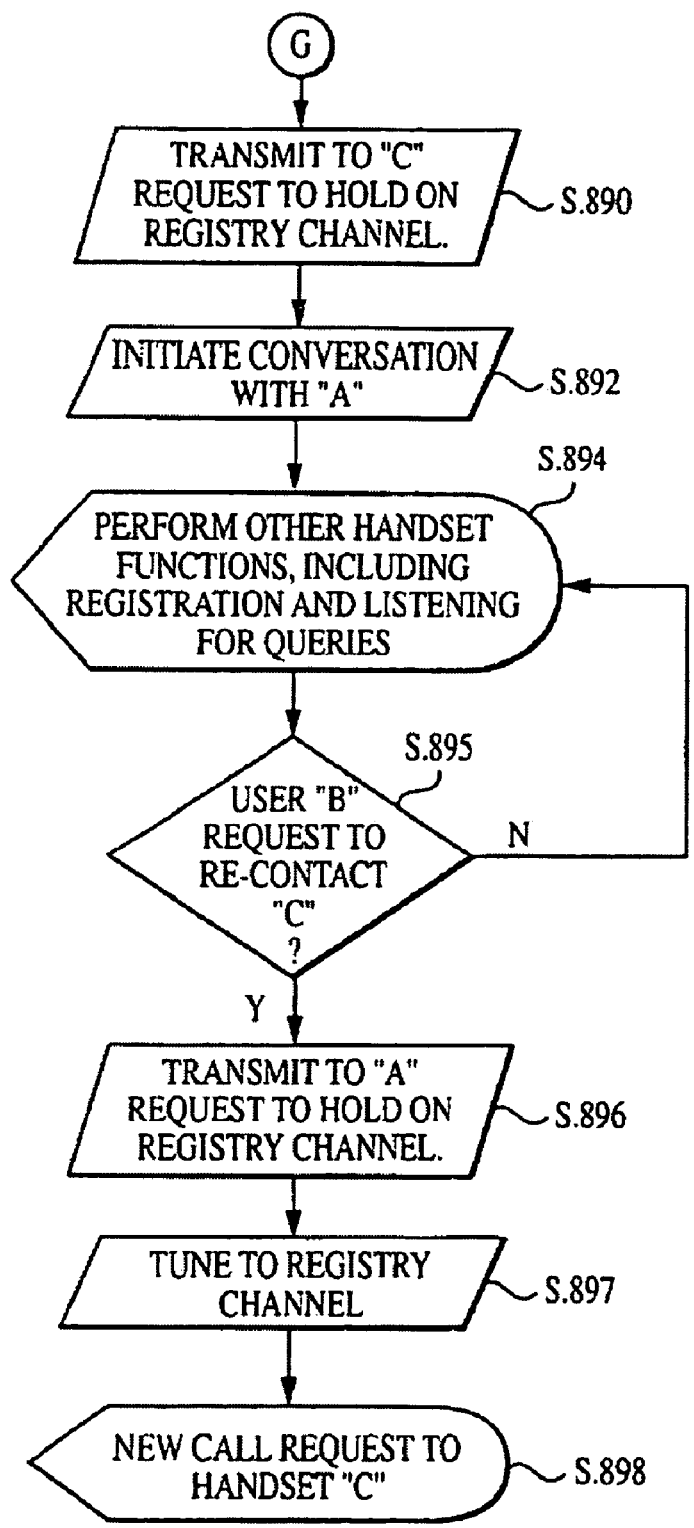
Figure 27C:
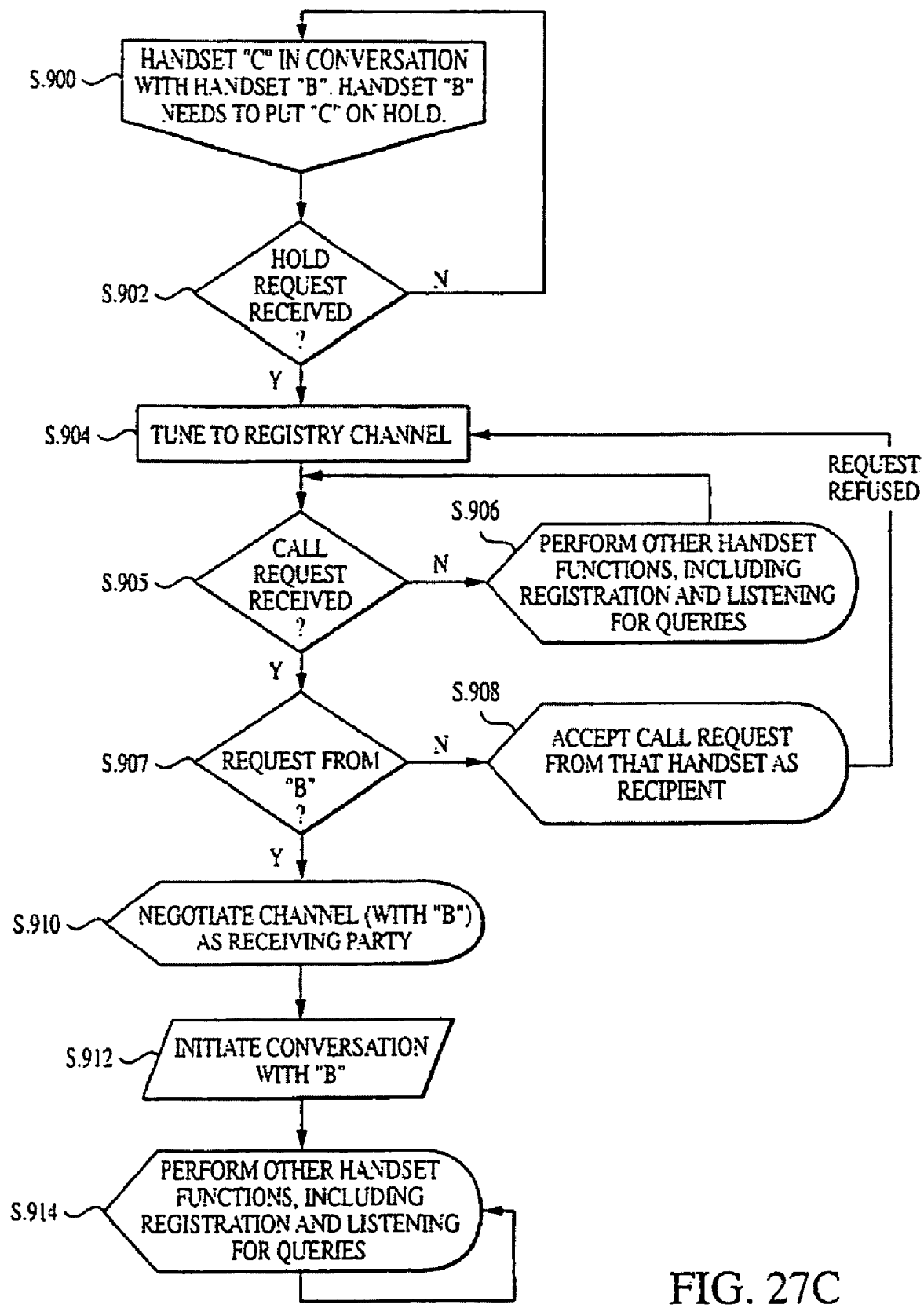
FIG. 27C is an exemplary flowchart of the various processes and operations that may be carried out by handset C when it is placed on hold by handset B to accept the call request from handset A.

As indicated above, the wireless handset of the present invention may be configured to include call waiting features, which permit a wireless handset to switch between calls from other wireless handsets. FIGS. 26-27 illustrate exemplary embodiments for establishing a free call between wireless handsets that are enabled with call waiting features, and for switching between free calls. In particular, FIGS. 26A and 26B are exemplary flowcharts of the various processes and operations carried out by handset A for initiating a call with handset B, when handset B is on a call with another handset (i.e., handset C). FIGS. 27A and 27B are exemplary flowcharts of the various processes and operations that may be carried out by handset B to handle the call request from handset A, while handset B is on a call with handset C. Lastly, FIG. 27C is an exemplary flowchart of the various processes and operations that may be carried out by handset C when it is placed on hold by handset B to accept the call request from handset A. In the embodiments of FIGS. 26-27 a predetermined registry channel is provided, similar to that provided in the embodiments of FIGS. 22-25.

As represented at step S.850 in FIG. 26A, the user of handset A initiates a free call to handset B, while handset B is on a call with handset C. The initiation of the free call may be caused by the user of handset A by pressing a predetermined key (i.e., a free call key) on the handset, with handset B being dialed or selected through the keypad and/or display screen of the handset. In response to the free call being initiated, handset A will tune to the predetermined registry or control channel at step S.851. Further, at step S.852, the value of a cycle_clock will be set to 0. Thereafter, handset A will listen and monitor the registry channel at step S.853 to determine if handset B is within range of the handset A.

In accordance with an aspect of the invention, handset A may listen to and monitor the registry channel for a predetermined cycle time. The cycle time may correspond to the cycle period by which each handset registers on the registry channel. That is, when a handset is idle or on a call, the handset may register on the registry channel every predetermined cycle time (e.g., every x minutes or seconds). At step S.854, handset A will first determine if there is a handset response or registration. If no handset response is detected at step S.854, then at step S.855 handset A will determine whether the value of the cycle_clock is greater than or equal to the predetermined cycle time. The cycle_clock may be incremented in accordance with an internal system clock of the handset, after being initialized in order to keep track of and monitor the elapsed time of listening to the registry channel the value of the cycle_clock is less than the cycle time, then logic flow loops back to step S.854. Thereafter, handset A may again check to see if a response is received on the registry channel at step S.854.

If no handset response is received within the cycle time, then logic flow will proceed to step S.857, as shown in FIG. 26A. At step S.857, handset A will assume that handset B is out of range or unavailable. As such, handset A may alert the user that handset B is out of range or unavailable by displaying the ID and/or name of handset B along with an appropriate message (e.g., "Out of Range"). In addition, at step S.857, handset A may give the user the option as to whether the call should be continued by placing the call to handset B through a network. Following step S.857, the procedure may terminate at step S.865.

If a handset registration is detected at step S.854, then handset A will determine whether the ID of the registering handset corresponds to that for handset B, at step S.856. If the ID in the registry message corresponds to a different handset, then logic flow proceeds to step S.855. Otherwise, if the registration was performed by handset B, then at step S.858 handset A will determine the status of handset B. The status of handset B may be indicated in the registry message which comprises a code for indicating whether the handset is idle or on a call. If handset B is not on a call, then a separate routine may be performed at step S.859. That is, operations and procedures similar to that discussed above with reference to FIGS. 22A and 22B may be performed for establishing a free call with handset A when handset B is not on a call. If, however, handset B is determined to be on a call at step S.858, then the call waiting aspects of the invention may be utilized.

In particular, at step S.860, handset A will tune to the channel that is indicated in the registry message for contacting handset B. Since handset B is on a call with handset C, the channel to contact handset B may be the same channel that supports the free call between handset B and handset C. Further, the registry message may indicate a time slot for contacting handset B. With this information, handset A may transmit a call waiting request to handset B over the channel during the designated time slot at step S.861. The call waiting request may include the ID of handset A. Thereafter, handset A will wait for a response from handset B. In particular, handset A will set the value of a wait_clock to 0 at step S.862 and then determine whether a response has been received from handset B over the contact channel at step S.863. Handset A may wait for such a response for a predetermined wait time. The value of the wait_clock may be incremented in accordance with an internal system clock of the handset to determine when the predetermined wait time has elapsed. Thus, at step S.864, the value of the wait_clock may be compared with the wait time when it is determined that a response has not been received at step S.863. If the wait_clock is less than the wait time, then logic flow will loop back to step S.863. Otherwise, at step S.866, handset A will assume that handset B is unavailable and will notify the user of the unavailability of handset B. This notification may take the form of displaying the ID and/or name of handset B along with an appropriate message (e.g., "Unavailable"). Handset A may also ask the user whether the call should be continued by attempting to contact handset B through a network. Following step S.866, the procedure or routine may terminate at step S.867.

If a response is received from handset B at step S.863, then handset A will determine whether the user of handset B has accepted the call at step S.870 (see FIG. 26B). The determination at step S.870 may be made based on the response message received from handset B, which may include data indicating whether the call has been accepted. If the call is not accepted, then at step S.871 a call rejection message (e.g., "Call Rejected") may be provided to the user of handset A. In addition, an option to send a request to handset B which forwards the call to a voice mail network to leave a message to handset B may be provided to the user of handset A or another appropriate message may be provided based on the response received from handset B. Following step S.871, the procedure may terminate at step S.872.

If it is determined that the user of handset B has responded and accepted the call request at step S.870, then at step S.873 handset A permits the user to initiate the conversation with the user of handset B. This conversation may take place over the channel previously occupied by handset B and C. In addition, at step S.874, handset A will perform other handset functions, including registering on the registry channel and listening for query or request messages.

FIGS. 27A and 27B are exemplary flowcharts of the various processes and operations that may be carried out by handset B for receiving the call request from handset A, while handset B is on another call with handset C. In this embodiment, each handset (including handset B) registers on a predetermined registry, channel every cycle time. Thus, after performing other handset functions at step S.876, handset B will determine whether the predetermined cycle time has elapsed at step S.877, as shown in FIG. 27A. This may be performed by comparing the value of a cycle_clock to that of the cycle time. The cycle_clock may be maintained as a counter and incremented in accordance with an internal system clock of the handset. If the value of the cycle_clock is less than the cycle time, then logic flow proceeds to step S.884. Otherwise, as shown in FIG. 27A, logic flow proceeds to step S.878.

When it is time to register on the registry channel, handset B will tune to the registry channel, as indicated at step S.878. Thereafter, at step S.879, handset B will transmit the channel number or frequency at which handset B can be contacted, as well as the ID of handset B. When handset B is on a free call, the channel to contact handset B may be the channel of the free call. Handset B may also transit at step S.879 the beginning and ending time of a time slot for contacting handset B or the time domain multiplexing control time slot. Following step S.879, handset B tunes to the previous channel (i.e., the channel on which the call with handset C is being supported) as shown at step S.880.

Following step S.880, handset B initializes the value of the cycle_clock to 0 at step S.882. Logic flow then proceeds to step S.884. At step S.884, handset B determines whether the value of the cycle_clock corresponds to a time within the indicated control time slot. This determination may be performed by determining whether the value of the cycle_clock is greater than or equal to the slot start time and whether the cycle_clock is also less than or equal to the slot end time. This time could also be the control time slot used if time domain multiplexing is utilized by the handsets for contacting one another. In any event, if both of these conditions are not satisfied, then logic flow loop backs to step S.876. If, however, the value of the cycle_clock corresponds to the control slot time, then handset B will determine whether a call waiting request has been received at step S.885.

In particular, at step S.885 handset B determines whether a call waiting request has been received from another handset. If a call waiting request is not received, then logic flow loops back to step S.876 so that handset B may perform other handset functions. If a call waiting request is detected at step S.885, then handset B will analyze the call waiting request information and, based on this analysis, query the user of handset B to notify the user that a call request has been received at step S.886. This query or notification may include the displaying of a message containing the ID of the handset that sent the call waiting request (e.g., the ID of handset A) and/or the generation of an appropriate tone to indicate that a call waiting request has been received. Following step S.886, it is determined at step S.887 whether the user of handset B has decided to respond to the call waiting request. The user of handset B may respond to the call waiting request by pressing an appropriate key on the handset to signify the acceptance of the call waiting request and to indicate that handset C should be placed on hold. By pressing other keys on the handset, the user of handset B may also respond to the call waiting request by transferring or forwarding handset A to a voice mail system or to a different handset or location, or by sending a call reject message. If it is determined that the user of handset B has not responded at step S.887 within a predetermined amount of time, then logic flow may loop back to step S.876. If the user does respond, then at step S.888 handset B will transmit a response message to handset A based on the manner on which the user has responded to the call waiting request. The response message may include information indicating whether the user of handset B has determined to accept the call or to place/forward handset A to a voice mail system, etc. If the user of handset B decided not to accept the call but to forward handset A to a voice mail system or another location, then logic flow will loop back to step S.876 where other appropriate handset functions may be performed. If the user of handset B accepted the call request from handset A, then at step S.890 (see FIG. 27B) handset B will transmit to handset C a request to hold the present call. This hold request to handset C may be transmitted during a defined time slot (i.e., the control time slot available for control functions in a time domain multiplexing system, or the time slot that the other handset uses to register when time domain multiplexing is not used). In addition, the hold request may designate a channel at which handset C is to switch to and wait for a possible further call request from handset B. This channel may be the registry channel or another predetermined channel. Following step S.890, the user of handset B is permitted to initiate and conduct a conversation with the user of handset A at step S.892. Handset B will also perform other handset functions at step S.894, including periodic registration on the registry channel and listening for queries and requests from other handsets.

With the call waiting features of the present invention, the user of handset B may determine to reestablish or switch back to a call with handset C after completing or while conducting the call with handset A. As illustrated at step S.895 in FIG. 27B, handset B may periodically check to see if the user of handset B has requested to recontact with handset C. The user of handset B may indicate a request to recontact with handset C by pressing an appropriate key or button on the handset. If there is no request to recontact, then logic flow will loop back to step S.894 from step S.895. Otherwise, when a request to recontact has been detected, logic flow proceeds from step S.895 to step S.896.

At step S.896, handset B will transmit to handset A a hold request message. This request will indicate to handset A that it should switch and wait for a possible recontact request from handset B on another channel. This channel may be the registry channel, or another predetermined channel. Following step S.896, handset B will tune to the registry channel or another predetermined channel at step S.897 and then initiate a new call request with handset C at step S.898. The call may then be setup and supported over the same channel for the previous call between handset A and handset B. The procedures performed at step S.898 may include the initiation/negotiation procedures for a new call in accordance with any one of the embodiments disclosed herein that utilize a registry channel, if deemed appropriate by the handsets (e.g., for interference reasons). Following step S.898, the user of handset B will have the option of completing the call with handset C and/or switching back to the call with handset A to continue the conversation with the user of handset A.

In the above-described embodiment, a call request is sent from handset A to handset B, while handset B is on a call with handset C. In accordance with the call waiting features of the present invention, handset C may be placed on hold while handset B switches between the call with handset C and handset A. While handset C is placed on hold, handset C can also accept call requests from other handsets that are within range. FIG. 27C is an exemplary flowchart of the various processes and operations that may be carried out by handset C for enabling the call waiting features of the invention. In the embodiment of FIG. 27C, a registry or control channel is provided.

As represented at step S.900 in FIG. 27C, handset C is in conversation and on a call with handset B, when handset B receives a call request from handset A. If the user of handset B determines to respond to and accept the call waiting request, then handset B will place handset C on hold by transmitting a hold request message. Thus, at step S.902, handset C determines whether a hold request message has been received from handset B. As indicated above, the hold request may be transmitted during the defined time slot on the channel supporting the call between handset B and handset C. The hold request message from handset B may indicate a channel on which handset C is to wait and hold for further response from handset B. This channel may be a predetermined channel, such as the registry channel, or another appropriate channel. If a hold request is received at step S.902, then at step S.904 handset C will tune to the registry channel. If a hold request is not received at step S.902, then logic flow loops back to step S.900, where handset C is permitted to perform other handset functions and the call between handset B and handset C is maintained.

After receiving a hold request message and tuning to the registry channel at step S.904, handset C will monitor and listen for a recontact request from handset B or a call request from another handset. Thus, at step S.905, handset C will listen to the registry channel and determine whether a call request has been received. If no call request has been received at step S.905, then at step S.906 handset C will continue to perform other handset functions, including periodic registration on the registry channel and listening for other queries. Handset C will also continue to check at step S.905 whether a call request has been received.

When a call request has been received at step S.905, handset C will determine at step S.907 whether the call request was from handset B. Specifically, handset C determines whether the request is a recontact request from handset B. If the request is not from handset B, then the call request was sent from another handset and at step S.908 handset C may receive the call request from the other handset while acting as a recipient of the call request. Various procedures and operations may be performed at step S.908, such as those described above with reference to FIGS. 23A and 23B, for handling a new call request. If the user of handset C decides to receive the call request and initiate a conversation with the user of the other handset, then handset C may negotiate a channel for the call (while acting as the receiving party) with the other handset. If the user of handset C decides to refuse the call request, then logic flow will return to step S.904, where handset C tunes back to the registry channel and again listens for call request or recontact request.

If it is determined that a recontact request was received from handset B at step S.907, then at step S.910 a channel is negotiated with handset B to set up and reestablish the direct handset-to-handset communication between handset B and handset C. The user of handset C may then initiate a conversation with the user of handset B at step S.912. Thereafter, at step S.914, handset C may perform other handset functions, including registration and listening for queries and requests.

The call waiting features of the present invention may be modified or enhanced to provide other capabilities. For example, it is possible to modify the above-described embodiments of FIGS. 26-27 so that a user is permitted to, place more than one handset on hold, since a handset (such as handset C) is not physically placed on hold to seize a particular channel or line when a call waiting request is accepted. With this feature, the handset may display to the user a list of the handsets that have been placed on hold, so that the user may freely select and recontact with handsets that have been placed on hold. The process of switching between handsets may continue indefinitely and with an unlimited number of handsets. Further, the user of the handset may be permitted to receive and respond to more than one call waiting request to provide enhanced operating capabilities.

The above-described embodiments of FIGS. 22-27 are based upon the use of a registry or control channel. In such a case, a separate or dedicated tuner is not required for each of the handsets, since a single tuner may be utilized for supporting calls and periodically registering on the registry channel. It is of course possible to provide modified embodiments corresponding to that of FIGS. 22-27, in which a separate tuner is provided in each handset that is tuned to a dedicated control channel. Through the use of such a dedicated channel, a free call may be initiated and established between handsets, and various call waiting features may be enabled.

Figure 28:
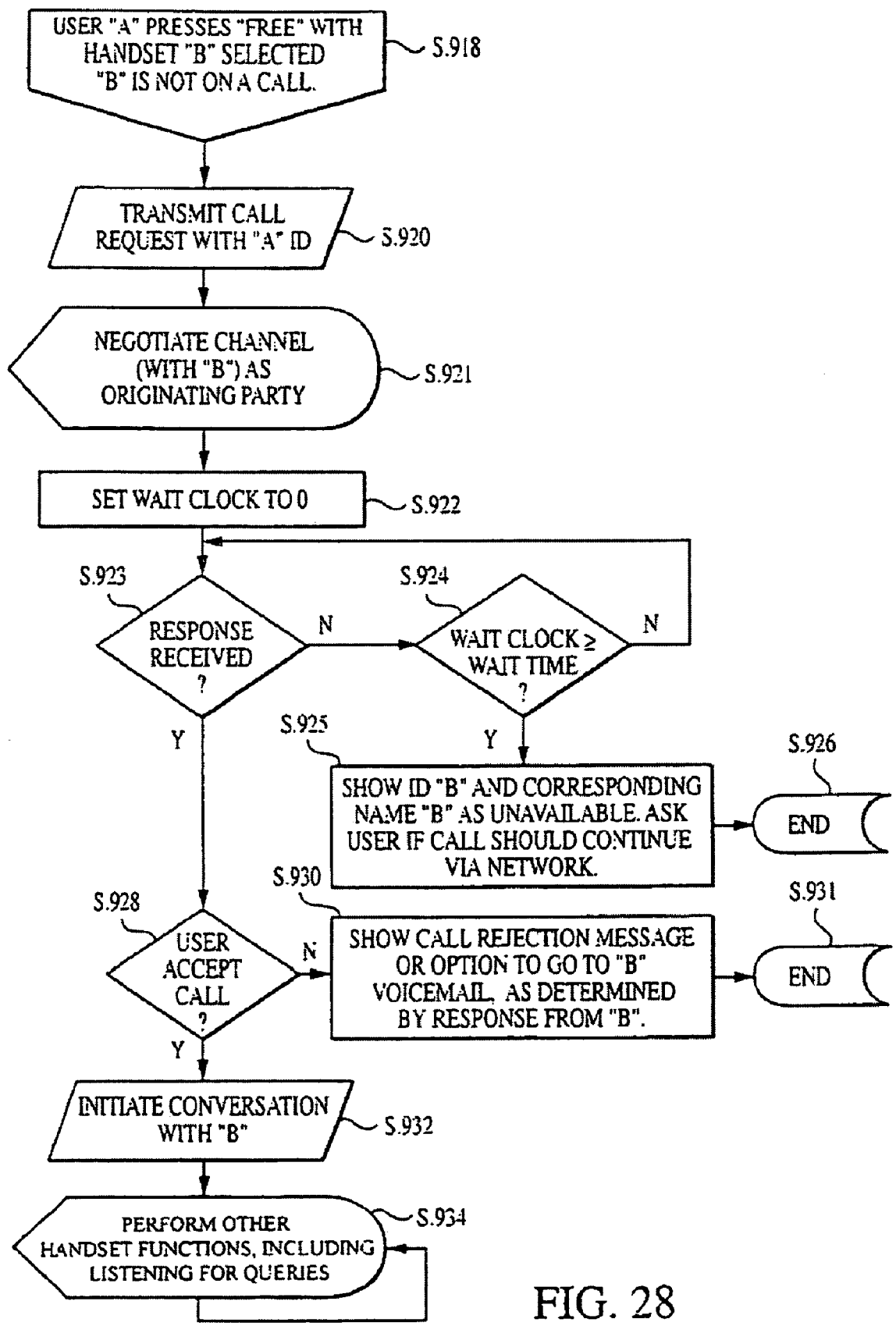
FIG. 28 is an exemplary flowchart of the various processes and operations that may be carried out by handset A to initiate a call request and establish a free call with handset B through the use of a dedicated channel.
Figure 29:
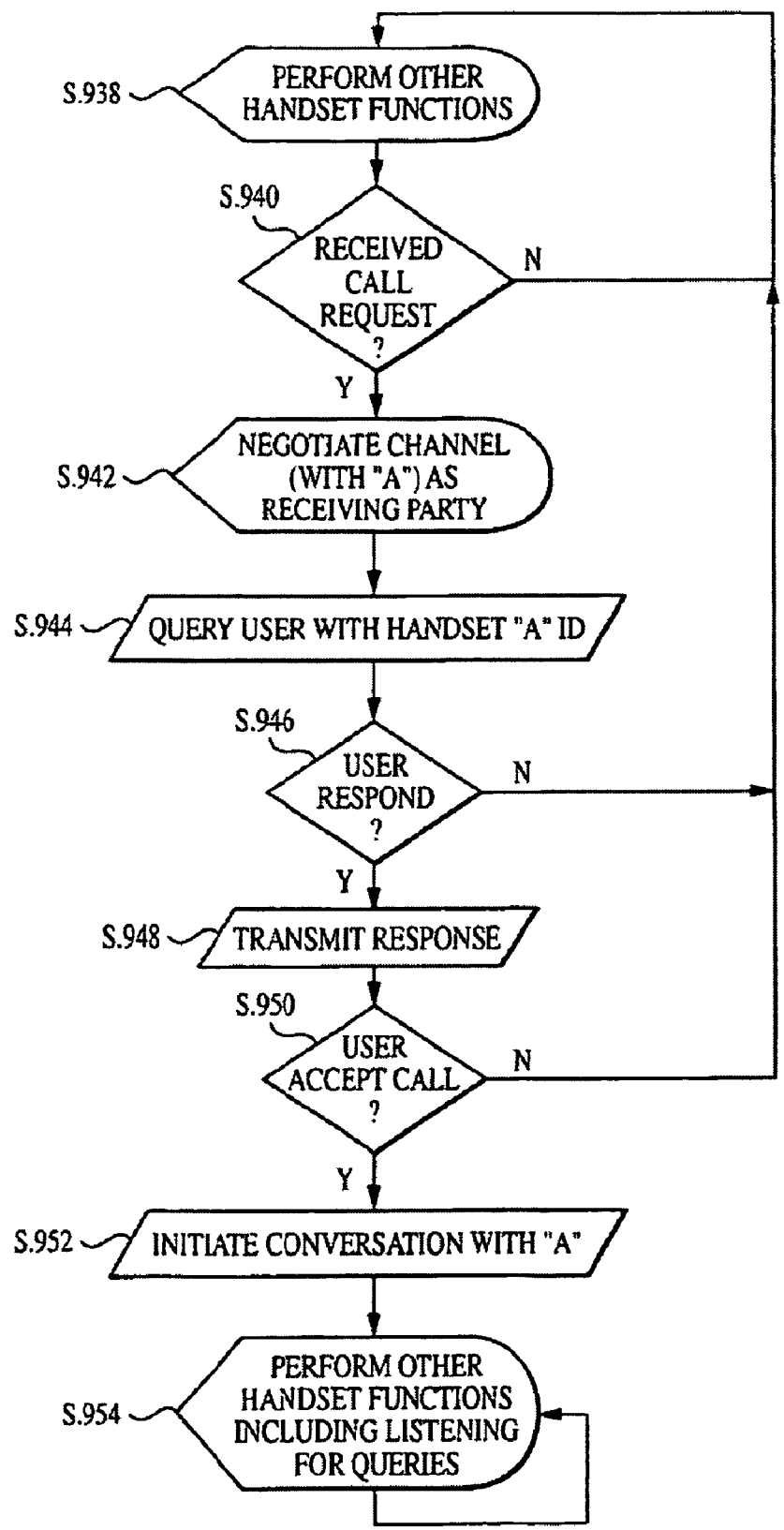
FIG. 29 illustrates the various operations and procedures that may be carried out by handset B when responding to the call request from handset A.

By way of non-limiting examples, FIGS. 28-31 are exemplary embodiments for handling call requests and negotiating channels for free calls through the use of a dedicated channel. In particular, FIG. 28 is an exemplary flowchart of the various processes and operations that may be carried out to initiate a call request and establish a free call through the use of a dedicated channel. In FIG. 28, it is assumed that handset A has initiated a call request and is attempting to establish a direct handset-to-handset call with handset B. Further, it is assumed that handset B is not on call with another handset. FIG. 29 illustrates the various operations and procedures that may be carried out by handset B when responding to the call request from handset A. In addition, FIGS. 30A and 30B are exemplary flowcharts of the functions and procedures carried out by handset A when negotiating a channel for the call with handset B, wherein handset A acts as the originator or originating party for the channel negotiation. Further, FIGS. 31A and 31B are exemplary flowcharts of the various procedures and operations carried out by handset B when negotiating the channel for the call with handset A, wherein handset B acts as the recipient for the channel negotiation.

As represented at step S.918 of FIG. 28, the call request procedure is initiated when the user of handset A presses the appropriate key or button on the handset (e.g., the free call button) with handset B being selected or dialed through the keypad and/or display screen of the handset. Following step S.918, handset A will transmit a call request to handset B at step S.920. As noted above, it is assumed that handset B is not on a call when the call request is initiated. The call request message may include the ID of handset A as well as the ID of handset B to indicate the handset to which the call request is directed. In addition, the call request may be transmitted from handset A to handset B over a dedicated control channel. That is, in the embodiment of FIG. 28, each handset is equipped with a separate tuner which is always tuned to a dedicated control channel. As a result, handsets are not required to periodically register on a registry channel and interruptions to calls (for registering, etc.) is eliminated.

Figure 30A:
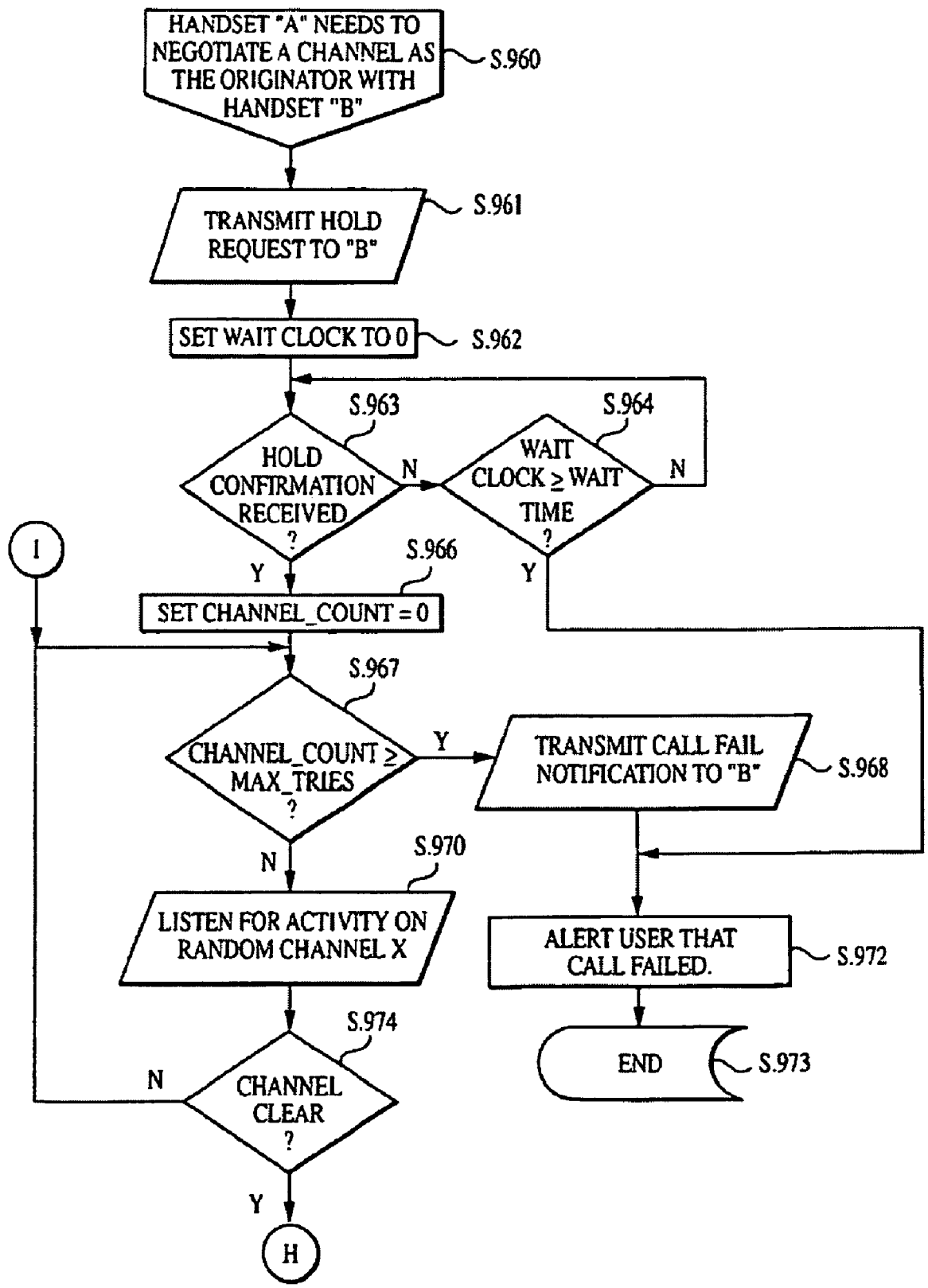
FIGS. 30A and 30B are exemplary flowcharts of the various processes and operations that may be carried out by handset A when negotiating a channel with handset B, with handset A acting as the originator or originating party.
Figure 30B:
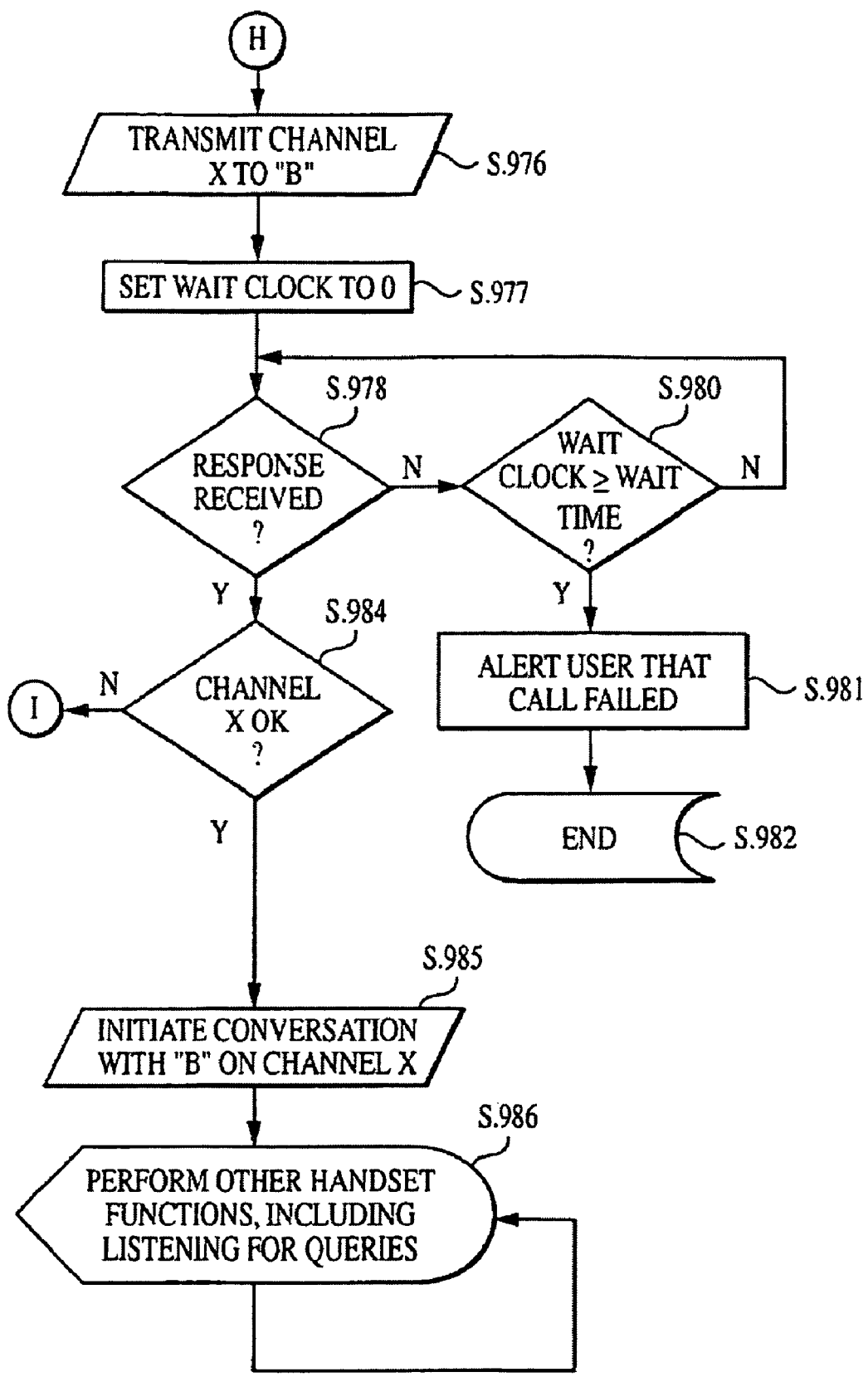

After transmitting the call request, handset A will then attempt to negotiate a channel with handset B for establishing the call at step S.921. Since handset A initiated the call request, handset A will act as the originating party when negotiating a channel with handset B. Various procedures and operations may be performed for negotiating a channel. An exemplary embodiment for negotiating a channel through the use of a dedicated control channel is discussed below with reference to FIGS. 30A and 30B. In FIGS. 30A and 30B, handset A negotiates a channel with handset B, while handset A acts as the originator. Following the successful selection of a channel, handset A then awaits for a response from handset B to determine whether the user of handset B has responded and accepted the call request.

In particular, as illustrated in FIG. 28, handset A will set the value of a wait_clock to 0 at step S.922 and then determine at step S.923 whether a response from handset B has been received. Handset A may monitor and listen to the dedicated control channel for a predetermined wait time to receive a response from handset B. To monitor the wait time, the value of the wait_clock may be incremented in accordance with an internal system clock of the handset and the value of the wait_clock may be periodically compared with the predetermined wait time. Thus, if a response is not received at step S.923, handset A will determine at step S.924 whether the value of the wait_clock is greater than or equal to the wait time. If the wait time has not elapsed, then logic flow loops back to step S.923 where handset A again determines whether a response has been received.

If a response from handset B has not been received within the predetermined wait time, then at step S.925 handset A assumes that handset B is unavailable or out of range. As such, handset A will notify the user that handset B is unavailable. This notification may be performed by displaying the ID and/or name of handset B along with an appropriate message (e.g., "Unavailable"). In addition, at step S.925 handset A may prompt the user as to whether the call should be attempted through the use of a network. If the user decides to place a network call, then handset A may place a network call to handset B using conventional methods or techniques. Following step S.925, the procedure may terminate at step S.926.

If a response from handset B is received over the dedicated control channel at step S.923, then at step S.928 handset A determines whether the user of handset B has accepted the call. The determination at step S.928 may be made by evaluating the response message received from handset B. The response message may indicate whether the user of handset B has responded to the call by accepting the call or by requesting special handling of the call (e.g., by transferring to a voice mail system or call forwarding). If it is determined at step S.928 that the user of handset B has decided to accept the call, then at step S.932 handset A permits the user to initiate a conversation with the user of handset B. In addition, at step S.934, handset A proceeds by performing other handset functions, including listening for queries or requests over the dedicated control channel.

If it is determined at step S.928 that the user of handset B has responded to the call without accepting the call, then at step S.930 handset A notifies the user that the call has been rejected. This notification may take the form of displaying an appropriate message (e.g., "Call Rejected"). In addition, depending on the response from handset B and the manner in which the user of handset B has responded to the call request, handset A may also prompt the user for various options (e.g., transferring to the voice mail system of handset B or forwarding the call to another handset or location). Following step S.930, the procedure may terminate at step S.931.

FIG. 29 is an exemplary flowchart of the various processes and operations and may be carried out by handset B when responding to a call request from handset A over a dedicated control channel. In particular, following the performance of other handset functions at step S.938, handset B may determine at step S.940 whether a call request has been received over the dedicated control channel. For this purpose, handset B may have a separate tuner that constantly listens and monitors the dedicated control channel for call requests. Handset B may perform this function simultaneously with the performance of other handset functions. If a call request is not received, then logic flow loops back to step S.938. Otherwise, if a call request has been received at step S.940, then logic flow proceeds to step S.942, as shown in FIG. 29.

Figure 31A:
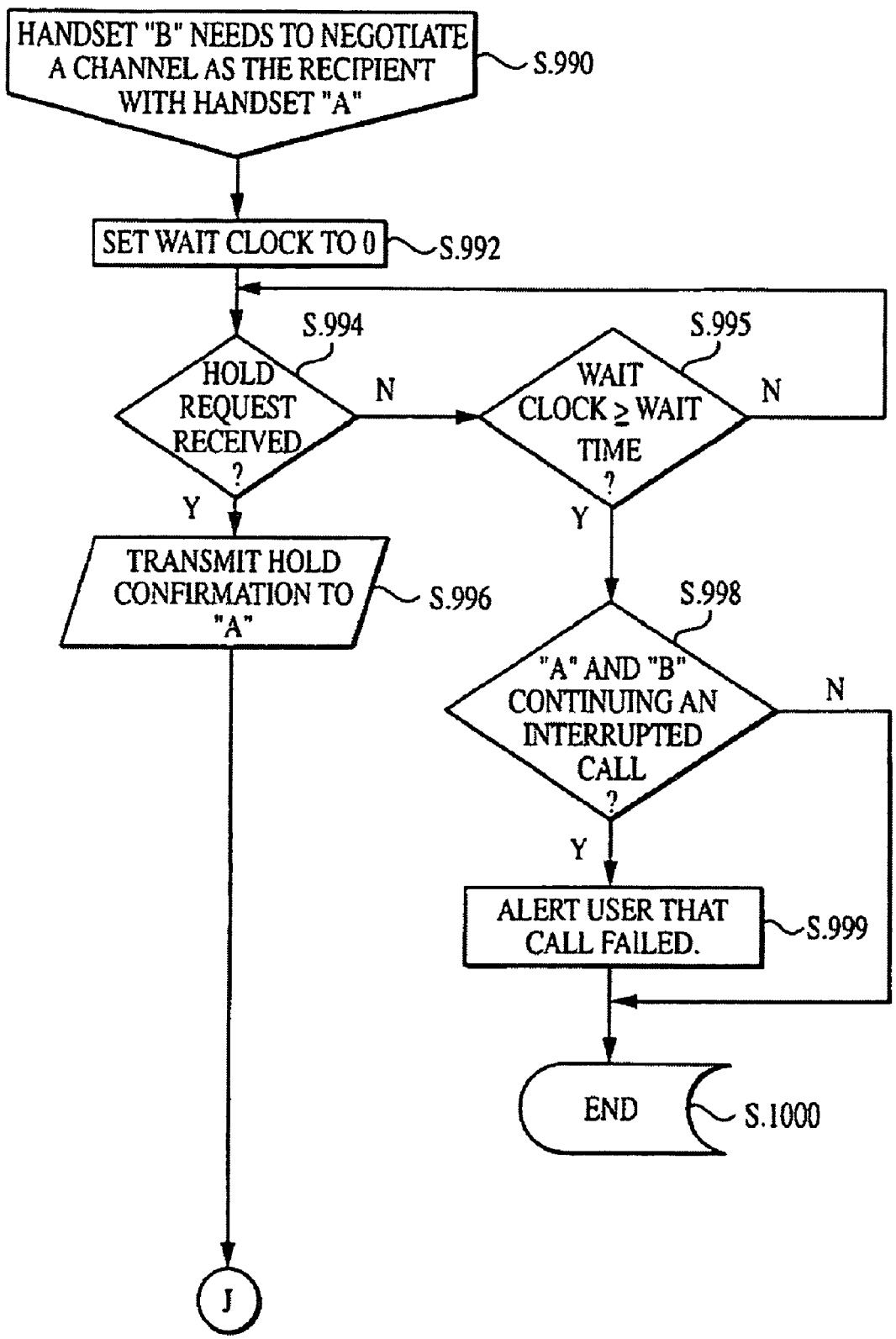
FIGS. 31A and 31B are exemplary flowcharts of the various processes and operations that may be carried out by handset B when negotiating a channel with handset A, with handset B acting as the recipient or receiving party.
Figure 31B:
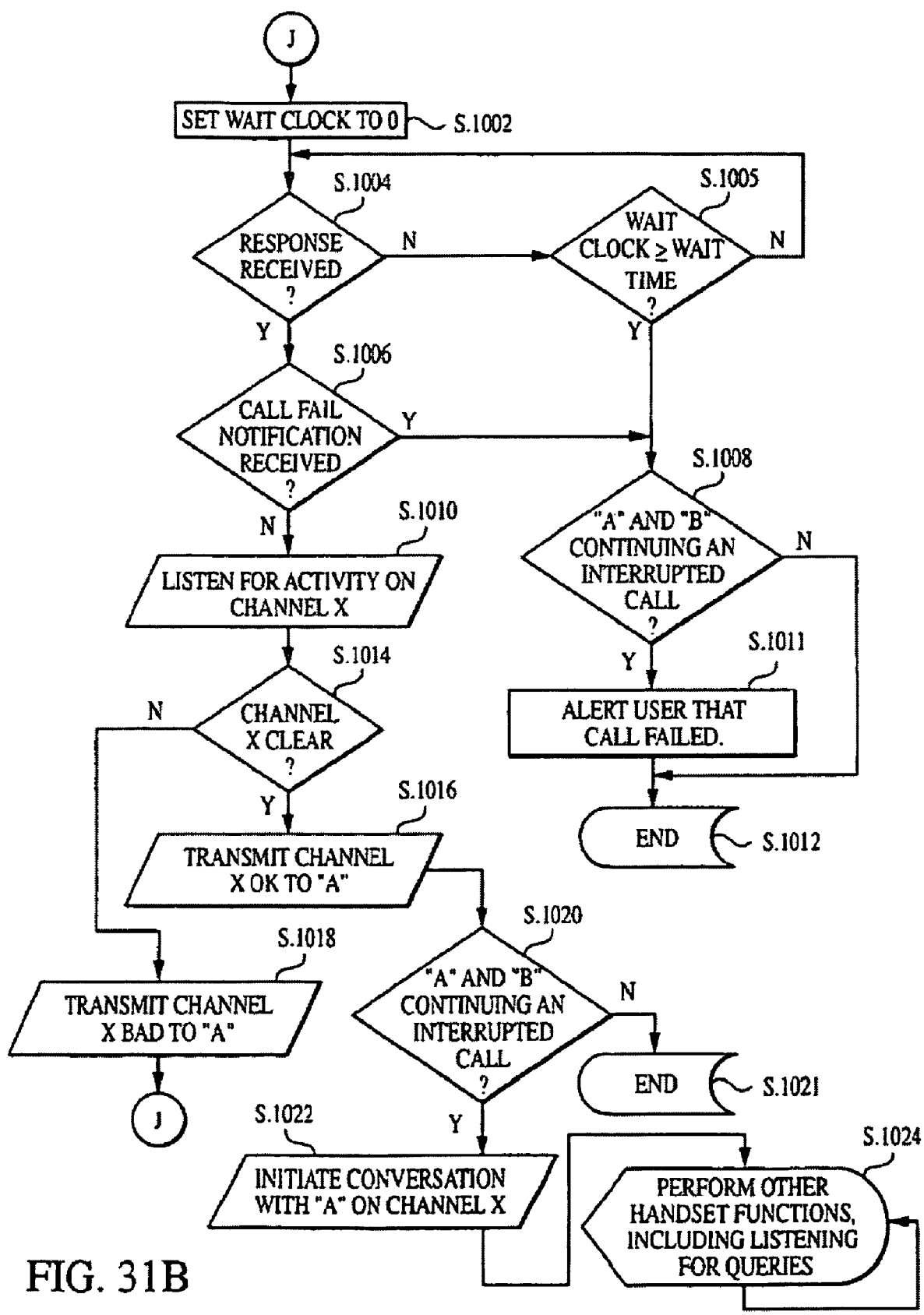

At step S.942, handset B negotiates a channel for setting up the call with handset A. Since handset B has received the call request that was initiated by handset A, handset B acts as the receiving party when negotiating the channel. Various procedures and operations may be performed by handset B to negotiate a channel with handset A. For example, the exemplary embodiment of FIGS. 31A and 31B may be utilized by handset B to negotiate a channel with handset A through the use of a dedicated control channel. In the embodiment of FIGS. 31A and 31B, handset B negotiates a channel with handset A, while handset B acts as the receiving party. Following the successful negotiation of a channel for the call, handset B will then determine if the user wishes to respond to the call request from handset A.

In particular, at step S.944, handset B will query the user regarding the presence of a call request from handset A. This query or notification may include the displaying of a message indicating the ID and/or name of handset A and/or the generating of an appropriate tone. Following step S.944, handset B will determine whether the user has responded to the call request at step S.946. This determination may be made by determining whether one or more appropriate keys or buttons on the handset have been pressed by the user to respond to the call request. If the user of handset B does not respond to the call request, then logic flow loops back to step S.938 from step S.946. However, if the user of handset B does respond to the call request, then at step S.948 handset B will transmit an appropriate response message to handset A over the dedicated control channel based on the manner in which the user responded to the call request. As discussed above, the response message from handset B may indicate whether the user of handset B has responded to the call by accepting the call or by rejecting the call and requesting specialized handling of the call (i.e., forwarding to a voice mail system or to a different handset or location).

Further, handset B will respond depending on whether the user has accepted the call. That is, if it is determined at step S.950 that the user has not accepted the call, then logic flow will proceed back to step S.938. However, if the user has accepted the call, then logic flow will proceed from step S.950 to step S.952. At step S.952, handset B will permit the user to initiate a conversation with the user of handset A by supporting the call over the negotiated channel. In addition, at step S.954 handset B will perform other handset functions, including listening for queries or requests over the dedicated control channel.

As discussed above with reference to FIGS. 28 and 29, handsets A and B will negotiate a channel when setting up a free call. The exemplary flowcharts of FIGS. 30-31 illustrate embodiments for negotiating a channel through the use of a dedicated control channel. In particular, FIGS. 30A and 30B are exemplary flowcharts of the various processes and operations that may be carried out by handset A when negotiating a channel with handset B. In the embodiment of FIGS. 30A and 30B, handset A acts as the originator or originating party. In addition, FIGS. 31A and 31B are exemplary flowcharts of the various processes and operations that may be carried out by handset B when negotiating a channel with handset A. In FIGS. 31A and 31B, handset B acts as the recipient or receiving party when negotiating the channel with handset A.

As indicated above, handset A will negotiate with handset B to select a channel for the call after transmitting the call request to handset B (see step S.921 in FIG. 28). Various procedures and routines may be implemented to facilitate channel negotiation. FIGS. 30A and 30B illustrate an exemplary embodiment of the manner in which handset A can negotiate a channel when acting as the originator of the call request. More specifically, as represented at step S.960 in FIG. 30A, handset A needs to negotiate a channel for the call with handset B, where handset A is acting as the originator or originating party. In order to negotiate a channel, handset A may utilize the dedicated control channel to communicate with handset B. Thus, following step S.960, handset A may transmit a hold request over the dedicated control channel to handset B at step S.961. The hold request message, which may include the ID of handset A (acting as the originator) and the ID of handset B (acting as the recipient), may be sent to signify to handset B that handset A wishes to negotiate a channel. In response, handset A will anticipate and wait for a hold confirmation message to be sent back from handset B.

For this purpose, handset A will set the value of a wait_clock to 0 at step S.962 and then determine at step S.963 whether the hold confirmation has been received over the dedicated control channel from handset B. The wait_clock may be a counter that is incremented in accordance with an internal system clock of the handset to detect whether the hold confirmation message has been received within a predetermined wait time. Thus, if the hold confirmation is not received at step S.963, handset A will determine at step S.964 whether the value of the wait_clock is greater than or equal to the predetermined wait time or period. If the wait time has not been exceeded, then logic flow will loop back to step S.963. However, if the hold confirmation is not received within the wait time, then at step S.972 the user of handset A will be alerted that the call request has failed. This alert or notification may include a displayed message and/or audible tone that is provided to the user by handset A to signify that the call has failed. Following step S.972, the call negotiation procedure or routine may terminate at step S.973. Alternatively, the hold request confirmation step may be bypassed in favor of a faster overall negotiation process.

As further shown in FIG. 30A, if a hold confirmation is received from handset B at step S.970, then handset A will proceed and attempt to locate an empty or clear channel for the call. Various methods may be employed to locate a channel. According to an aspect of the invention, a predetermined number or set of channels may be available for setting up the call. The handset acting as the originator for the channel negotiation (in this case handset A) may be given a predetermined number of attempts to locate an empty or clear channel to support the call. Channel frequencies may be selected sequentially, randomly or by another method, and then tested to determine activity and possible use of the channel by other handsets that are within range. Once a clear channel is detected, the originating handset (i.e., handset A) will transmit to the recipient handset (i.e., handset B) the channel frequency or number of the clear channel over the dedicated control channel to notify the other handset of the proposed channel. A channel count may be maintained in order to determine the number of attempts to find a clear channel and to determine when the maximum permissible number of tries has been exceeded. When the maximum number of tries has been exceeded, the call negotiation procedure will fail and terminate.

For this purpose, the value of a channel_count is set to 0 at step S.966 and then handset A compares the value of the channel_count with the maximum number of tries that is permitted at step S.966 (represented by max_tries in FIG. 30A). If the channel_count is less than the max_tries, then at step S.970 handset A will select a channel (i.e., channel x) for monitoring. The selection of the channel may be random, sequential, or based on any other method. After selecting a candidate channel, handset A will listen to the channel for activity at step S.970. Essentially, handset A will determine if the candidate channel is suitable for handling the call between handset A and handset B. Handset A may determine that the channel is not clear if other handsets within the area are using the channel for a call or if there is unacceptable noise on the channel. If the handset determines that the channel is not clear at step S.974, then the value of the channel_count is incremented by one and logic flow loops back to step S.967 to again compare the value of the channel_count to the max_tries permitted.

If a clear channel cannot be obtained within the maximum number of permissible tries or attempts, then logic flow will proceed to step S.968 and handset A will notify handset B that the call attempt has failed. That is, a call fail notification may be sent by handset A as a message over the dedicated control channel to handset B at step S.968. Following step S.968, logic flow proceeds to step S.964 where handset A will alert the user that the call failed. The call negotiation routine will then terminate at step S.973.

If a clear channel is detected at step S.974, then handset A will notify handset B of the channel (i.e., channel x) that has been detected. For this reason, handset A will transmit the channel frequency or number of the proposed channel to handset B over the dedicated control channel at step S.976 (see FIG. 30B). Handset A will then wait for a confirmation message from handset B that the proposed channel is suitable for setting up the call. As such, handset A will set the value of a wait_clock to 0 at step S.977 and determine whether a confirmation response has been received from handset B at step S.978. Handset A may monitor the dedicated control channel for a confirmation response for a predetermined wait time before determining that the call negotiation has failed (e.g., due to handset B going out of range, etc.). Thus, if the value of the wait_clock is less than the predetermined wait time at step S.980, then logic flow will loop to step S.978 to determine again if a response has been received. If a response is not received within the wait time, then logic flow will proceed to step S.981 where handset A will alert the user that the call has failed. Thereafter, the call negotiation routine may terminate at step S.982, as shown in FIG. 30B.

If a response is received from handset B within the wait time at step S.978, then at step S.984 handset A will determine whether the selected channel (i.e., channel x) has been confirmed by handset B. This determination may be made by analyzing the response from handset B and whether the proposed channel was confirmed by handset B as being clear. If the channel is confirmed as being suitable by handset B at step S.984, then at step S.985 handset A will tune to the selected channel to permit the user of handset A to initiate conversation with the user of handset B at step S.985. Further, at step S.986, handset A may perform other handset functions, including monitoring for queries and requests (e.g., find queries and/or call request queries from other handsets). If, however, the channel selected by handset A was not cleared or confirmed by handset B, then logic flow will proceed from step S.984 back to step S.967 (see FIG. 30A) and the value of the channel_count will be incremented by one. Handset A will then attempt to locate another clear channel if the maximum number of permissible tries has not been exceeded. Logic flow then proceeds after step S.967 as detailed above.

Handset B also performs various operations and procedures when negotiating a channel with handset A. In the above-described example, handset B is acting as the recipient or receiving party of the call request and is negotiating a channel with handset A (see, for example, step S.942 in FIG. 29). Various procedures and routines may be implemented to permit handset B to negotiate a channel with handset A. FIGS. 31A and 31B illustrate an exemplary embodiment for handset B to negotiate a channel when acting as the recipient or receiving party.

As represented at step S.990 in FIG. 31A, handset B needs to negotiate a channel with handset A, while acting as the recipient or receiving party. For this purpose, the value of a wait_clock may be initialized to 0 at step S.992 and thereafter incremented in accordance with an internal system clock of the handset. If a hold request is not determined as being received over the dedicated control channel at step S.994, then at step S.995 handset B will determine whether the value of the wait_clock is greater than or equal to the predetermined wait time. So long as the wait_clock is less than the wait time, logic flow will loop back to step S.994 to again check if a hold request has been received over the dedicated control channel.

If a hold request is not received within the wait time, then logic flow will proceed to step S.998 where it is determined whether handset A and/or handset B are continuing an interrupted call. That is, as discussed above, it is possible that the need to negotiate a channel for a free call may arise when interference occurs on a channel that is being used to support a current call. In such a case, either handset may automatically determine that it is necessary to negotiate a new channel for the call. In addition, the users of handset A and handset B may be provided with the ability to determine when to negotiate a new channel for the free call. Thus, in addition to negotiating a channel based on a new call request, handset B may also need to negotiate a new channel (e.g., while acting as a recipient or receiving party) for an existing call that has been interrupted (e.g., due to other handsets occupying the same channel or unacceptable noise levels on the channel). The call negotiation procedures of the invention may thus be utilized in either case. If handsets A and B are continuing on an interrupted call, then logic flow may proceed to step S.999 where the user of handset R is alerted that the call has failed. Thereafter, logic flow may proceed to step S.1000 where the call negotiation routine will terminate. If, however, handset A and handset B are not continuing on an interrupted call, then the user of handset B does not need to be notified of the failure of the call request and negotiation, and logic flow may proceed directly from step S.998 to step S.1000 where the call negotiation routine terminates.

As further shown in FIG. 31A, if a hold request is received at step S.994, then at step S.996 handset B will transmit a hold confirmation message back to handset A over the dedicated control channel. Thereafter, handset B will wait for handset A to further respond with the proposed channel for the call within a predetermined wait time.

More particularly, as shown in FIG. 31B, handset B will set the value of a wait_clock2 to 0. The wait_clock2 may be a counter that is incremented in accordance with an internal system clock of handset B. The value of the wait_clock2 may be monitored to determine whether the predetermined wait time has elapsed. The predetermined wait time should be set in accordance with the maximum number of tries that handset A is permitted to locate a suitable channel. At step S.1004, handset B will determine whether a response has been received from handset A over the dedicated control channel. If a response is not received, then at step S.1005, the value of the wait_clock2 will be compared with the predetermined wait time. If the value of the wait_clock2 is less than the wait time, then logic flow will loop back to step S.1004 to again determine whether a response has been received. If a response has been received within the predetermined wait time, then at step S.1006 handset B will determine whether handset A has indicated in the response message that the attempt to locate a free channel has failed. If a call fail notification is received, then logic flow proceeds to step S.1008. Logic flow will also proceed to step S.1008 if it is determined that a response has not been received from handset A within the predetermined wait time at steps S.1004 and S.1005 of FIG. 31B.

At step S.1008, handset B will determine whether handsets A and B are continuing on an interrupted call. If handsets A and B are continuing on an interrupted call, then at step S.1011 handset B will be alerted that the call has failed. Thereafter, logic flow proceeds to step S.1012 where the routine may terminate. If, however, handset A and handset B are not continuing on an interrupted call, then the user of handset B does not need to be notified of the failure of the call request and negotiation, and logic flow may proceed directly from step S.1008 to step S.1012 where the call negotiation routine terminates.

As further shown in FIG. 31B, if handset A has not sent a call fail notification, then handset B will tune to the proposed channel (i.e., channel x) at step S.1010 and listen for activity on the channel. As described above, handset A will indicate the number or frequency of the proposed channel in the response message after detecting that the channel is clear. Handset B will then test and confirm as to whether proposed channel is clear for supporting the call. Handset B may check whether the selected channel has become occupied by other handsets within the area or whether the noise over the channel has risen to an unacceptable level. If handset B determines that the selected channel is clear at step S.1014, then at step S.1016 handset B will transmit a message to handset A to indicate that the selected channel (i.e., channel x) is suitable for setting up the call. If, however, handset B determines that the selected channel has become corrupted or is not clear, then at step S.1018 a message will be transmitted to handset A to indicate that the proposed channel is bad or unacceptable for setting up the call. Following step S.1018, logic flow will loop back to step S.1002 to wait for an additional response from handset A (i.e., another selected channel or a call fail notification message).

Following step S.1016, handset B will determine whether handset A and handset B are continuing on an interrupted call at step S.1020. If handset A and B are not continuing on an interrupted call, then the call negotiation routine may terminate at step S.1021. If, however, handsets A and B are continuing on an interrupted call, then at step S.1022 handset B will permit the user to initiate a conversation with the user of handset A on the selected channel. In addition at step S.1024, handset B will perform other handset functions, including listening for additional queries or messages on the dedicated control channel.

As described above, the call negotiation procedures of the invention may be implemented for negotiating a channel when establishing a free call between wireless handsets. In particular, the embodiments of FIGS. 30-31 may be utilized as part of the overall procedures of FIGS. 28 and 29 for establishing a handset-to-handset call. In addition, the channel negotiation procedures of the invention may be utilized to negotiate a new channel to avoid interference during a free call. That is, the embodiments of FIGS. 30-31 may be utilized by wireless handsets on a free call to select a new channel when the current channel that is supporting the free call has become corrupted due to noise or interference caused by other wireless handsets that have come into range and that are occupying the same channel.

Figure 32:
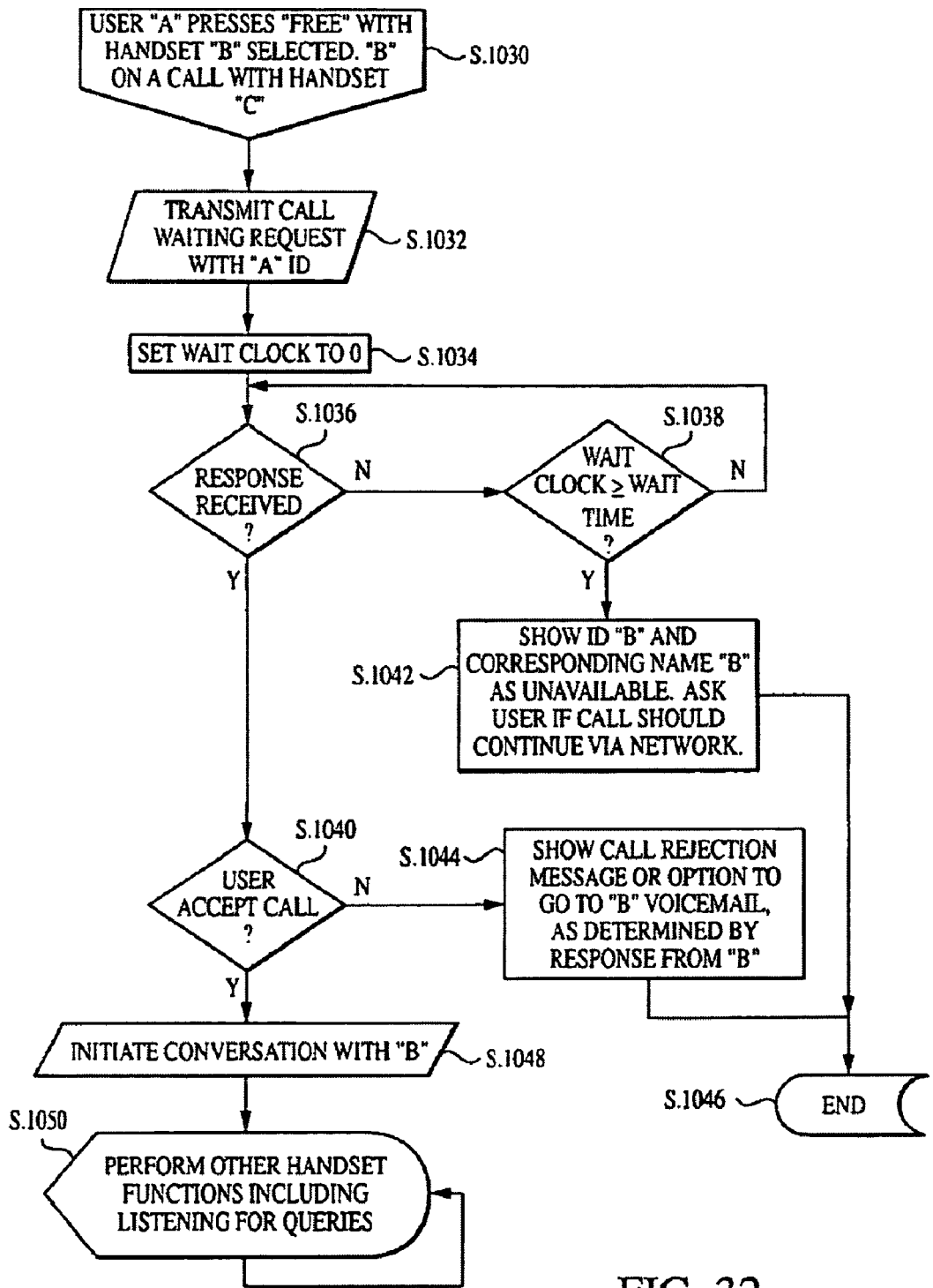
FIG. 32 is an exemplary flowchart of the various processes and operations carried out by handset A for initiating a call with handset B, when handset B is on a call with another handset (i.e., handset C)
Figure 33:
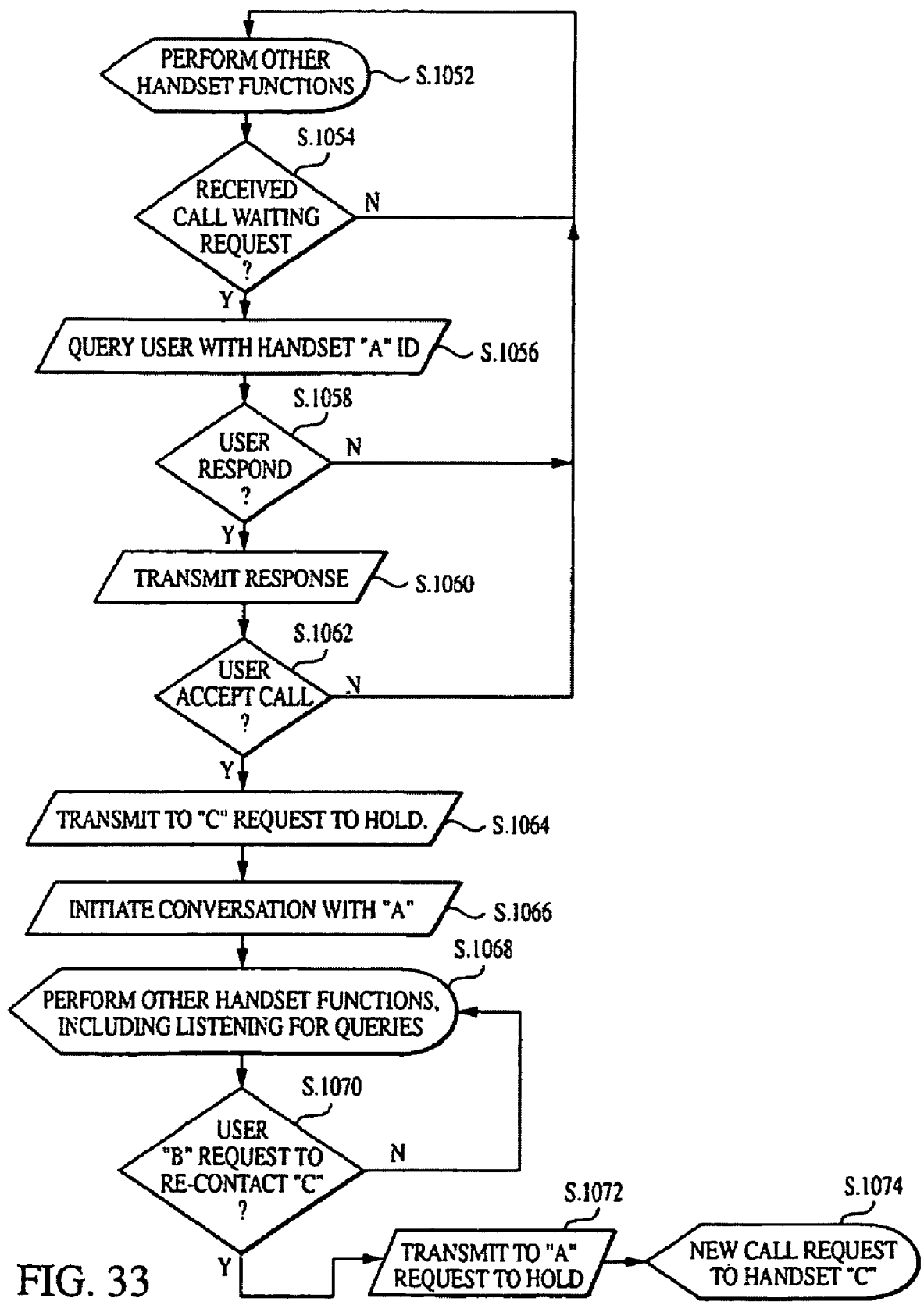
FIG. 33 is an exemplary flowchart of the various processes and operations that may be carried out by handset B to handle the call request from handset A, while handset B is on a call with handset C.
Figure 34:
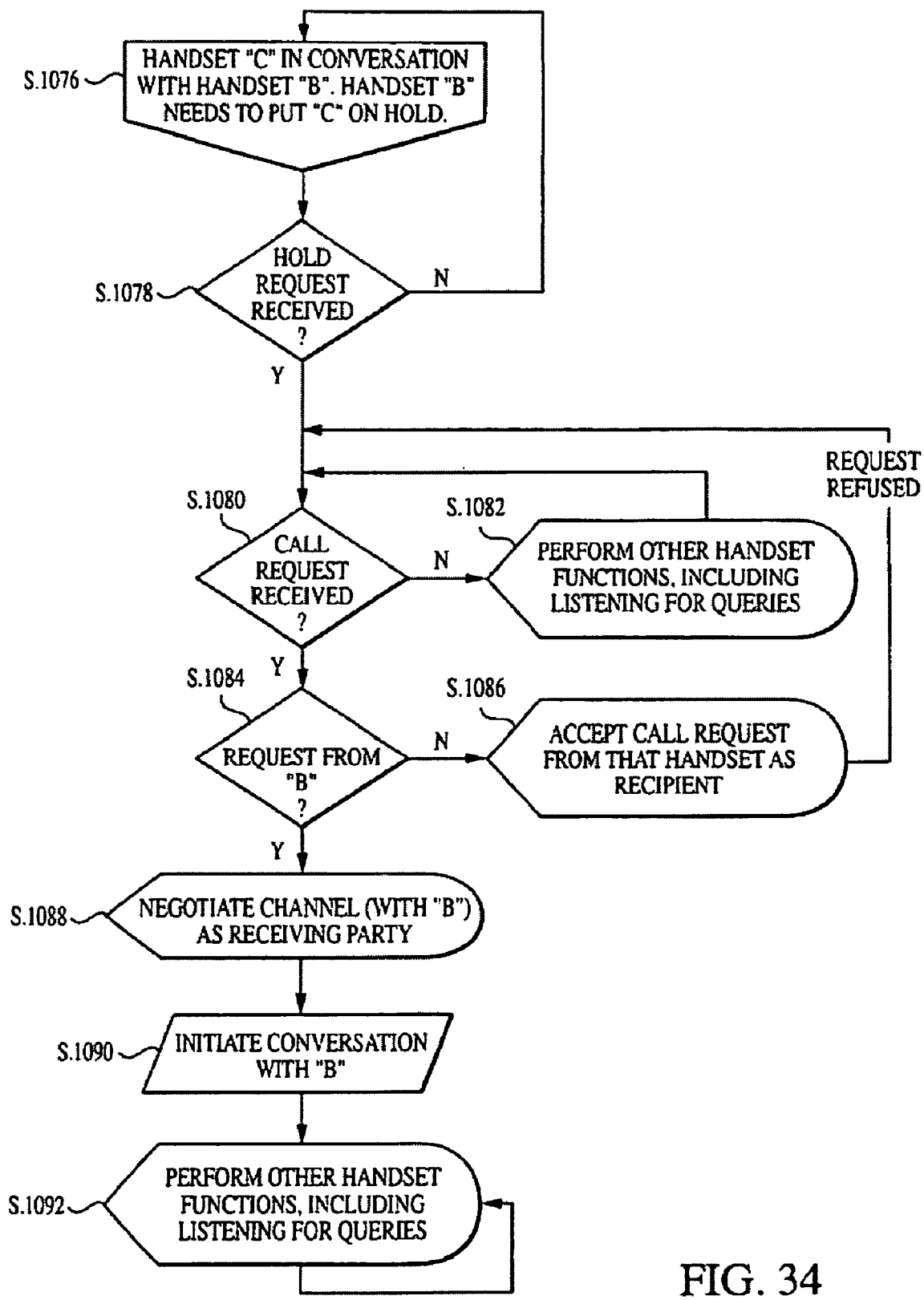
FIG. 34 is an exemplary flowchart of the various processes and operations that may be carried out by handset C when it is placed on hold by handset B to accept the call request from handset A.

The embodiments of FIGS. 28-31 may be modified and/or adapted to enable call waiting features. Such call waiting features, as described above, may permit handset users to be notified when a call request has been received during a call with another handset user, and to permit handset users to selectively switch between calls. FIGS. 32-34 illustrate exemplary embodiments for establishing a free call between wireless handsets that are provided with call waiting features. In each of these embodiments, a dedicated control channel is utilized with each handset including a separate tuner that is always tuned to the dedicated control channel. In particular, FIG. 32 is an exemplary flowchart of the various processes and operations carried out by handset A for initiating a call with handset B, when handset B is on a call with another handset (i.e., handset C). Further, FIG. 33 is an exemplary flowchart of the various processes and operations that may be carried out by handset B to handle the call request from handset A, while handset B is on a call with handset C. Lastly, FIG. 34 is an exemplary flowchart of the various processes and operations that may be carried out by handset C, when it is placed on hold by handset B to accept the call request from handset A. In the embodiments of FIGS. 32-34, it is assumed that a dedicated tuner and predetermined control channel are provided, similar to that provided in the embodiments of FIGS. 28-31.

As represented at step S.1030 in FIG. 32, handset A is attempting to establish a call with handset B, while handset B is on a call with handset C. A free call may be initiated by the user of handset A by pressing a predetermined key or button (i.e., the free call button or key) after dialing or selecting handset B. If handset B is an a call, a call waiting request may be transmitted over the dedicated control channel. That is, at step S.1032, handset A transmits a call waiting request to handset B over the dedicated control channel, with the request containing the ID of handset A. The ID of handset B may also be included in the call waiting request message to indicate to which handset the call waiting request is directed. Following step S.1032, handset A sets the value of a wait_clock to 0 at step S.1034 and listens to the dedicated control channel for a response from handset B. In particular, at step S.1036, handset A determines whether a response has been received from handset B. If no response is detected, then at step S.1038 the value of the wait_clock is compared to a predetermined wait time. If handset A determines that the value of the wait_clock, which may be incremented in accordance with an internal system clock of the handset, is less than the predetermined wait time, then logic flow loops back to step S.1036. Handset A will then again determine whether a response has been received.

If a response is not received from handset B within the predetermined wait time, then at step S.1042 handset A will assume that handset B is unavailable or out of range. Thus, handset A will notify the user that handset B is unavailable. This notification may be performed by handset A by displaying of the ID and/or name of handset B, along with an appropriate message (e.g., "Unavailable"). In addition, handset A may prompt the user as to whether the call should be attempted over a network. Following step S.1042, the procedure may terminate at step S.1046, as shown in FIG. 32.

When a response from handset B is detected as being received over the dedicated control channel, handset A will determine at step S.1040 whether the user of handset B has responded to the call waiting request by accepting the call. This determination may be made by analyzing the response message received from handset B. If the user of handset B has accepted the call, then at step S.1048 handset A will set up the call to permit the user of handset A to initiate conversation with the user of handset B. The free call between handset A and handset B may be set up on a new channel (through channel negotiation, etc.) or may be carried out on the same channel that was utilized for the call between handset B and handset C (whereby handset A is notified of the channel of the call through the response message from handset B). In either case, handset C will be requested to hold the call and to wait for a re-contact request from handset B over the dedicated control channel. Following step S.1048, handset A may perform other handset functions at step S.1050, including listening for queries or requests on the dedicated control channel.

If it is determined at step S.1040 that the user of handset B has responded to the call waiting request by rejecting the call, then at step S.1044 handset A will notify the user that the call has been rejected. This notification may include displaying an appropriate message (e.g., "Call Rejected"), along with the ID and/or name of handset B. In addition, depending upon the manner in which the user of handset B has responded to the call waiting request, handset A may prompt the user for various options (e.g., forwarding to a voice mail system or to a different handset or location). Following step S.1044, the procedure may terminate at step S.1046, as shown in FIG. 32.

As described above, FIG. 33 is an exemplary flowchart of the various operations and procedures that may be performed by handset B to handle a call waiting request form handset A, while on a call with handset C. In particular, after performing other handset functions at step S.1052, handset B determines at step S.1054 whether a call waiting request has been received over the dedicated control channel. If a call waiting request has not been received, then logic flow proceeds back to step S.1052 where handset B may perform other handset functions.

When a call waiting request is detected as being received at step S.1054, handset B will query the user to indicate that a call waiting request has been received at step S.1056. At step S.1056, handset B may query the user by displaying the ID and/or name of handset A to indicate the source of the call waiting request. This query may also include the generation of an appropriate tone to alert the user of handset B, during the call with handset C, as to the presence of the call waiting request. At step S.1058, handset B determines whether the user has responded to the call waiting request query. If the user of handset B ignores the query, then logic flow will loop back to step S.1052. However, if the user responds to the call waiting request, then at step S.1060 handset B will transmit a response message to handset A over the dedicated control channel based on the manner in which the user responded to the call waiting request.

Depending on the manner in which the user of handset B has responded to the call waiting request, handset B may cause a new call to be established with handset A or may maintain the call with handset C. That is, at step S.1062, handset B will determine whether the user has decided to respond to the call by accepting the call. If the user did not decide to accept the call, then logic flow will loop back to step S.1052 and the call with handset C will not be interrupted. However, if the user has indicated to accept the call (e.g., by pressing an appropriate key or button on the handset), then logic flow will proceed to step S.1064. At step S.1064, handset B will transmit to handset C a call hold request message. This request message may be transmitted over the dedicated control channel or may be transmitted during a defined control time slot on the channel supporting the call between handset B and handset C. As further discussed below, when handset C receives the hold request, handset C will place the call on hold and wait for a re-contact request from handset B or a call request from another handset.

Following step S.1064, handset B will set up the call to permit the user of handset B to initiate conversation with the user of handset A at step S.1066. Once again, the call between handset B and handset A may be maintained on the same channel that was used between handset B and handset C, or handset B may negotiate a new or different channel with handset A to set up the free call. Following step S.1066, handset B may perform other handset functions at step S.1068, including listening for queries or requests over the dedicated control channel.

With handset C placed in hold, the user of handset B may carry out communication with handset A and, when desired, switch back and re-contact with handset C. Thus, as represented at step S.1070, handset B may periodically check whether the user of handset B has requested to re-contact with handset C. The determination at step S.1070 may be made based on the detection of the activation of a predetermined key or button on the handset by the user. If a request to re-contact has been made by the user, then at step S.1072 handset B will transmit a hold request to handset A and then initiate a new call or re-contact request to handset C at step S.1074. As a result, handset A will be placed on hold and the user of handset B may conduct a conversation with the user of handset C. Thereafter, the user of handset B can continue to switch between calls with handset A and handset C, and complete calls as desired.

FIG. 34 is an exemplary flowchart of the various processes and operations that may be carried out by handset C in accordance with the call waiting features of the invention and that may be used in connection with the embodiments of FIGS. 32 and 33. As represented at step S.1076 in FIG. 34, handset C is in conversation with handset B, when handset B receives a call request from handset A. If the user of handset B determines to respond to the call waiting request, then handset B will put handset C on hold. Thus, at step S.1078, handset C determines whether a hold request message has been received from handset B. The hold request may be transmitted during a control time slot on the channel supporting the call between handset B and handset C, or may be transmitted over the dedicated control channel. As discussed above with reference to the embodiment of FIG. 33, the hold request message from handset B may indicate a channel on which handset C is to wait and hold for a further request from handset B. This channel may be a predetermined channel, such as the dedicated control channel, or another appropriate channel. If a hold request is not received at step S.1078, then logic flow loops back to step S.1076, where handset C performs other handset functions, including maintaining the call between handset B and handset C.

If a hold request is received from handset B at step S.1076, then handset C will tune to the dedicated control channel and wait for a re-contact request message for handset B or a call request from another handset at step S.1080. If no call request has been received at step S.1080, then at step S.1082 handset C will continue to perform other handset functions, including listening for other queries or requests (e.g., find queries, etc.). Handset C will also continue to check at step S.1080 whether a call request has been received.

When a call request has been received at step S.1080, then at step S.1084 handset C determines whether the call request is from handset B. Specifically, handset C determines whether the request is a re-contact request from handset B. If the request is not from handset B, then at step S.1086 handset C may receive the call request from the other handset while acting as a recipient of the call request. Various procedures and operations may be performed at step S.1086, such as those described above with reference to FIGS. 29, 31A, 31B, and/or 33. Thus, if the user of handset C decides to receive the call request and initiate a conversation with the user of the other handset, then handset C may negotiate a channel for the call (while acting as the receiving party) with the other handset. If the user of handset C decides to refuse the call request, then logic flow will turn to step S.1080, where handset C again listens for call requests on the dedicated control channel.

If a re-contact request is received from handset B at step S.1084, then at step S.1088 handset C will negotiate a channel for the call with handset B to again establish the direct handset-to-handset communication between handset B and handset C. After successfully negotiating a channel, the user of handset C may initiate a conversation with the user of handset B at step S.1090. Thereafter, at step S.1092, handset C may perform other handset functions, including listening for other queries or requests on the dedicated control channel.

Figure 37:
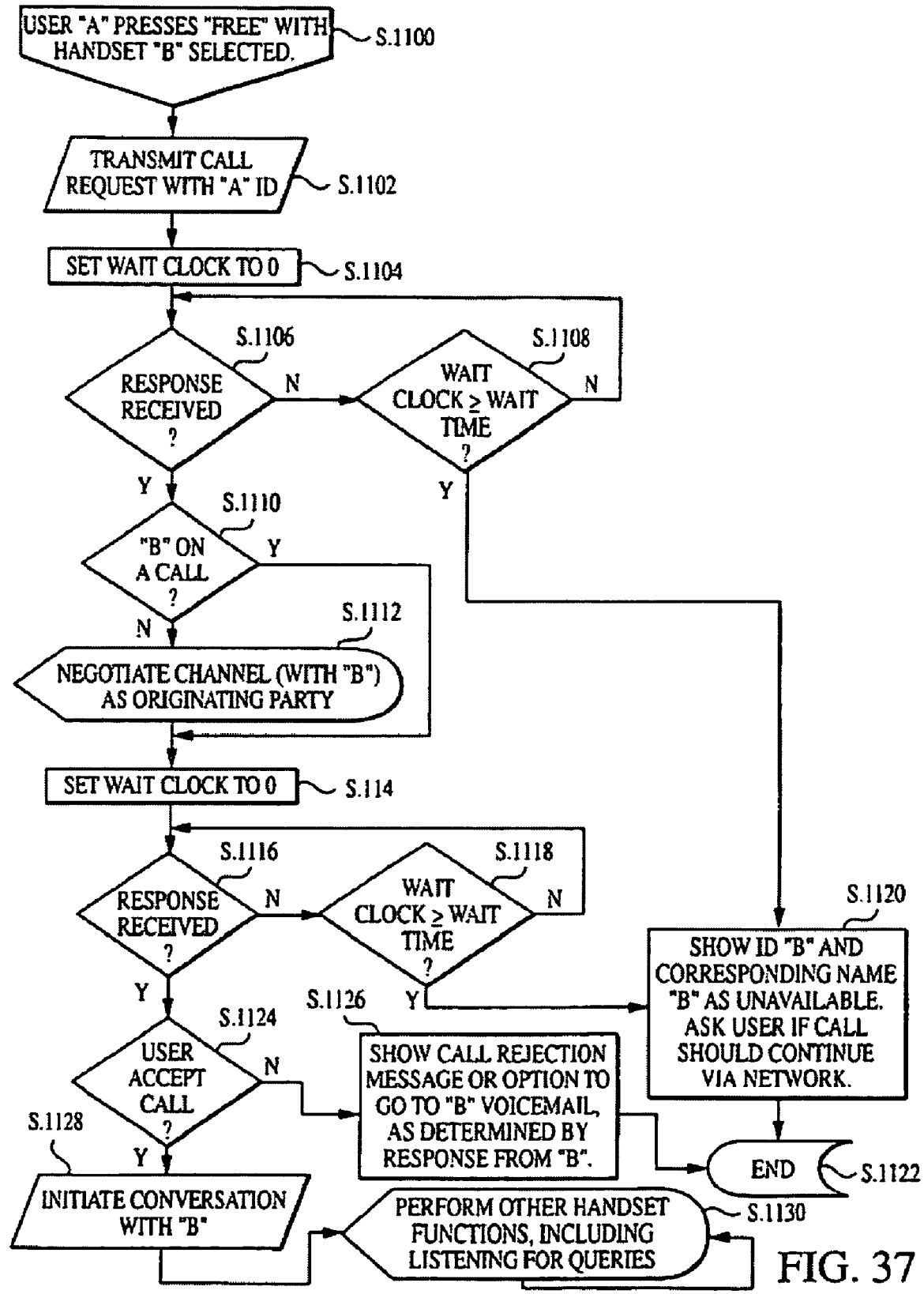
FIGS. 37 and 38 are exemplary flowcharts, in accordance with an aspect of the invention, of the various processes and operations that may be carried out by handset A and handset B, respectively, to establish a free call through the utilization of a dedicated control channel.
Figure 38:
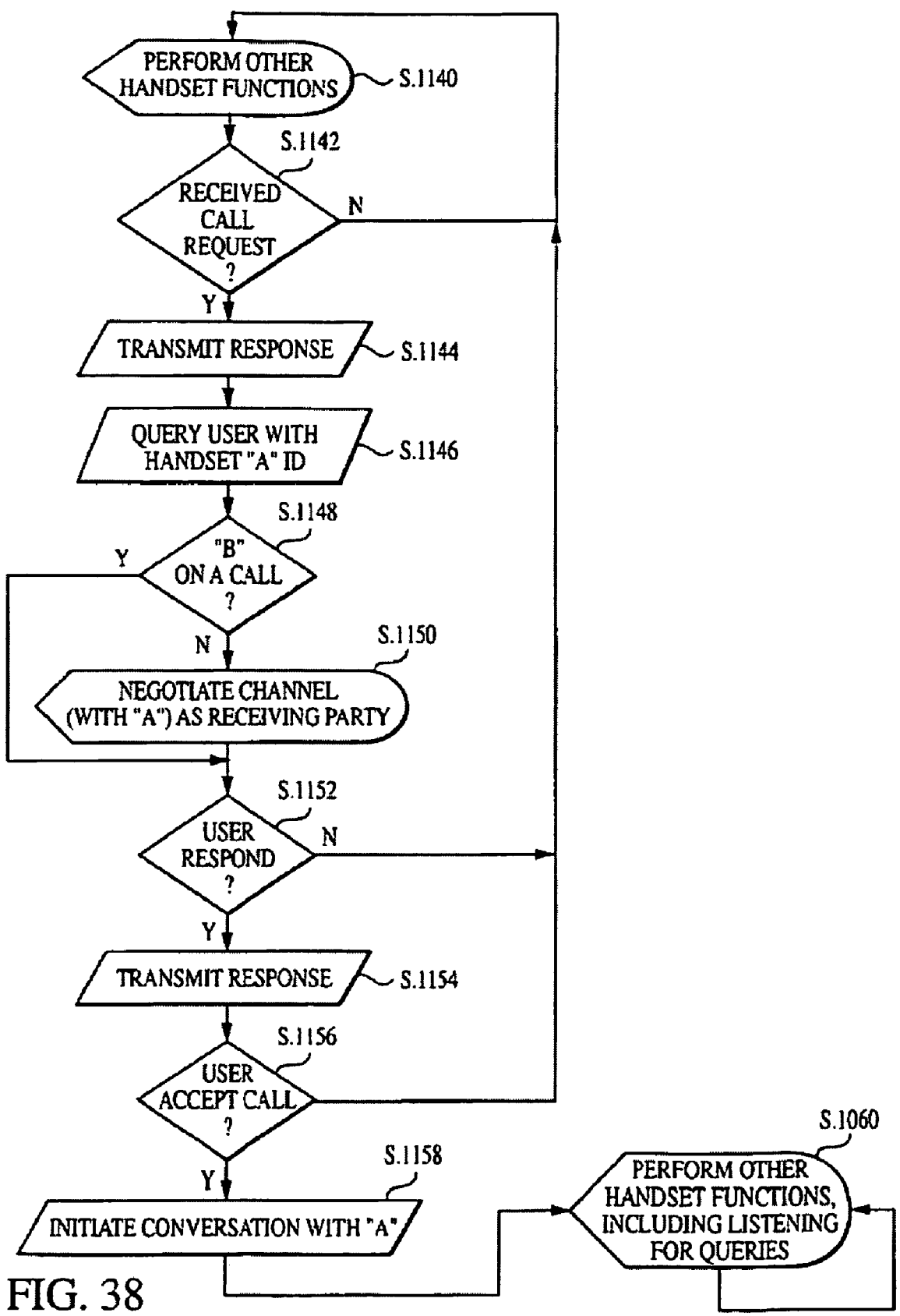

Modifications to the embodiments of FIGS. 28-34 may be provided without departing from the main features and objects of the invention. For example, FIGS. 37 and 38 are exemplary flowcharts of the various processes and operations that may be carried out by handset A and handset B, respectively, to establish a free call through the utilization of a dedicated control channel. The embodiments of FIGS. 37 and 38 incorporate call waiting features to permit a call request from handset A to be received even if handset B is on a call. In FIG. 37, it is assumed that handset A has initiated a call request and is attempting to establish a direct handset-to-handset call with handset B. Further, for the embodiments of FIGS. 37 and 38 it is assumed that each handset B includes a separate tuner that is always tuned to a dedicated control channel. FIG. 38 illustrates the various operations and procedures that may be carried out by handset B when responding to the call request from handset A.

As represented at step S.1100 of FIG. 37, the call request procedure is initiated when the user of handset A presses the appropriate key or button on the handset (e.g., the free call button) with handset B being selected or dialed through the keypad and/or display screen of the handset. Following step S.1100, handset A will transmit a call request to handset B at step S.1102. The call request message may include the ID of handset A, as well as the ID of handset B to indicate the handset to which the call request is directed. In addition, the call request may be transmitted from handset A to handset B over a dedicated control channel. As a result, handsets are not required to periodically register on a registry channel and interruptions to calls (for registering, etc.) is eliminated.

Following step S.1102, handset A will set the value of a wait_clock to 0 at step S.1104 and then wait for a response from handset B. The wait_clock may be incremented in accordance with an internal system clock of handset A and may be provided to determine if a response has been received within a predetermined wait time. If a response is not received within the predetermined wait time, then handset A may assume that handset B is unavailable or out of range.

At step S.1106, handset A will determine if a response to the call request has been received from handset B over the dedicated control channel. If no response is received, then at step S.1108 the value of the wait_clock is compared with the predetermined wait time. If the wait_clock is less than the wait time, then logic flow returns to step S.1106 so that the receipt of a response from handset B may be checked. Otherwise, when the wait time has expired, logic flow proceeds from step S.1108 to step S.1120, as illustrated in FIG. 37.

If a response message is received at step S.1106, then at step S.1110 handset A determines the status of handset B (e.g., Idle or On Call). The determination at step S.1110 may be made based on status information provided in the response message from handset B. If handset B is determined to be on a call at step S.1110, then logic flow proceeds to step S.114 where handset A waits to determine if the user of handset B responds to the call request from handset A. As further described below with reference to FIG. 38, if handset B detects a call request from handset A when handset B is on a call with another handset, handset B may automatically provide a call waiting notification to the user of handset B to alert the user of the presence of the call request from handset A. The user of handset B may then respond to the call request from handset A by accepting the call request or rejecting the same. In either case, handset B may transmit a further response message to handset A to indicate whether the call request has been accepted or rejected.

If it is determined at step S.1110 that handset B is not on a call, then at step S.1112 handset A will then attempt to negotiate a channel with handset B for establishing the call. Since handset A initiated the call request, handset A will act as the originating party when negotiating a channel with handset B. Various procedures and operations may be performed for negotiating a channel, such as the exemplary embodiment for negotiating a channel through the use of a dedicated control channel, as discussed above with reference to FIGS. 30A and 30B. In FIGS. 30A and 30B, handset A negotiates a channel with handset B, while handset A acts as the originator. Following the successful selection of a channel, logic flow proceeds to step S.1114 and handset A then awaits for a response from handset B to determine whether the user of handset B has responded and accepted the call request.

As further illustrated in FIG. 37, handset A may initialize and set the value of the wait_clock to 0 at step S.1114 and then determine at step S.1116 whether a response message from handset B has been received. Handset A may monitor and listen to the dedicated control channel for a predetermined wait time to receive a response from handset B. Thus, if a response is not received at step S.1116, handset A will determine at step S.1118 whether the value of the wait_clock is greater than or equal to the wait time. If the wait time has not elapsed, then logic flow loops back to step S.1116 where handset A again determines whether a response has been received.

If a response from handset B has not been received within the predetermined wait time, then at step S.1120 handset A assumes that handset B is unavailable or out of range. As such, handset A will notify the user that handset B is unavailable. This notification may be performed by displaying the ID and/or name of handset B along with an appropriate message (e.g., "Unavailable"). In addition, at step S.1120 handset A may prompt the user as to whether the call should be attempted through the use of a network. If the user decides to place a network call, then handset A may place a network call to handset B using conventional methods or techniques. Following step S.1120, the procedure may terminate at step S.1122.

If a response from handset B is received over the dedicated control channel at step S.1116, then at step S.1124 handset A determines whether the user of handset B has accepted the call. The determination at step S.1124 may be made by evaluating the response message received from handset B. The response message may indicate whether, the user of handset B has responded to the call by accepting the call or by requesting special handling of the call (e.g., by transferring to a voice mail system or call forwarding). If it is determined at step S.1124 that the user of handset B has decided to accept the call, then at step S.1128 handset A permits the user to initiate a conversation with the user of handset B. In addition, at step S.1130, handset A proceeds by performing other handset functions, including listening for queries or requests over the dedicated control channel.

If it is determined at step S.1124 that the user of handset B has responded to the call without accepting the call, then at step S.1126 handset A notifies the user that the call has been rejected. This notification may take the form of displaying an appropriate message (e.g., "Call Rejected"). In addition, depending on the response from handset B and the manner in which the user of handset B has responded to the call request, handset A may also prompt the user for various options (e.g., transferring to the voice mail system of handset B or forwarding the call to another handset or location). Following step S.1126, the procedure may terminate at step S.1122.

As indicated above, FIG. 38 is an exemplary flowchart of the various processes and operations and may be carried out by handset B when responding to a call request from handset A over a dedicated control channel. In particular, following the performance of other handset functions at step S.1140, handset B may determine at step S.1142 whether a call request has been received over the dedicated control channel. For this purpose, handset B may have a separate tuner that constantly listens and monitors the dedicated control channel for call requests. Handset B may perform this function simultaneously with the performance of other handset functions. If a call request is not received, then logic flow loops back to step S.1140. Otherwise, if a call request has been received at step S.1142, then logic flow proceeds to step S.1144, as shown in FIG. 38.

At step S.1144, handset B transmits a response message to handset A to confirm the receipt of the call request. As indicated above with respect to FIG. 37, the response message may include status information to indicate to handset A the status of handset B (e.g., Idle or On Call). After transmitting the response message at step S.1144, handset B notifies or queries the user of handset B of the receipt of the call request from handset A. This notification may include generating an appropriate tone and/or displaying a message including the ID and/or name of handset A. The type of notification that is provided may depend on the status of handset B. If handset B is not on a call, an audible ringing tone may be provided, as well as displaying an appropriate message with the ID of handset A. If, however, handset B is on a call, a quick or periodic beep tone may be provided in the earpiece of the handset to notify the user of the call waiting request. An appropriate message with the ID of handset A may also be displayed to the user of handset B during the call, so that the user can determine where the call request originated and whether to accept the new call.

After providing the query to the user at step S.1146, handset B performs additional operations depending on the status of the handset. That is, if it is determined at step S.1148 that handset B is on a call then logic flow proceeds to step S.1152, to determine if the user responds to the call request. If, however, it is determined at step S.1148 that handset B is not on a call, then logic flow proceeds to step S.1150. At step S.1150, handset B negotiates a channel for setting up the call with handset A. Since handset B has received the call request that was initiated by handset A, handset B acts as the receiving party when negotiating the channel. Various procedures and operations may be performed by handset B to negotiate a channel with handset A, such as operations of the exemplary embodiment of FIGS. 31A and 31B. In the embodiment of FIGS. 3A and 31B, handset B negotiates a channel with handset A, while handset B acts as the receiving party. Following the successful negotiation of a channel for the call, handset B will then determine if the user wishes to respond to the call request from handset A at step S.1152.

As illustrated in FIG. 38, at step S.1152 handset B will determine whether the user has responded to the call request. This determination may be made by determining whether one or more appropriate keys or buttons on the handset have been pressed by the user to respond to the call request. If the user of handset B does not respond to the call request, then logic flow loops back to step S.1140 from step S.1152. However, if the user of handset B does respond to the call request, then at step S.1154 handset B will transmit an appropriate response message to handset A over the dedicated control channel based on the manner in which the user responded to the call request. As discussed above, the response message from handset B may indicate whether the user of handset B has responded to the call by accepting the call or by rejecting the call and requesting specialized handling of the call (i.e., forwarding to a voice mail system or to a different handset or location).

Further, handset B will respond depending on whether the user has accepted the call. That is, if it is determined at step S.1156 that the user has not accepted the call, then logic flow will proceed back to step S.1140. However, if the user has accepted the call, then logic flow will proceed from step S.1156 to step S.1158. At step S.1158, handset B will permit the user to initiate a conversation with the user of handset A by supporting the call over the negotiated channel. In addition, at step S.1160 handset B will perform other handset functions, including listening for queries or requests over the dedicated control channel.

While the invention has been described with reference to exemplary embodiments, it is understood that the words which have been used herein are words of description and illustration, rather then words of limitation. Changes may be made, within the purview of the appended claims, as presently stated and as amended, without departing from the scope and spirit of the invention in its various aspects.

For example, group lists of beeping clips may be defined in the handset so that a user may page (with or without a beep request) each clip in the group list with a single CALL function. In such a case, the user may select a predefined group list of clips and then press the CALL button on the handset. In response, the handset may then page each clip in the group list and provide information to the user (e.g., via the handset display) as each clip is paged. Such a feature may facilitate a user in locating a group of items (such as tools, pets, children, etc.) with a simple activation of the CALL function.

In addition, modifications may be made to the disclosed embodiments of the invention in order to reduce collisions or interferences. For instance, for each of the embodiments of the invention that utilize a registry, the predetermined cycle time for registering may be reset to a random number (e.g., between 0 and y minutes or seconds) after each registration. By changing the cycle time in this manner, two handsets that are out of range of one another but both in range of a third handset can avoid colliding with one another more than once.

Other modifications to the disclosed embodiments of the invention may also be made. For example, modifications may be made so that the wireless handsets do not need to sequentially register during a free call. That is, one handset could register for both handsets on the free call by transmitting its own ID and channel number first, and then transmitting the ID of the other handset and the channel number to contact the other handset. In addition, the wireless handset of the present invention may be provided with call-waiting features. For instance, where a control time slot is defined (see, e.g., the embodiments of FIGS. 1A and 1B and FIGS. 12A and 12B), the control time slot may be utilized to transmit a call-waiting signal. Such a call-waiting signal may comprise Caller ID information and/or the frequency or number at which to contact the calling party (which may include other wireless handset users).

Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A method for short-range wireless communication by an apparatus, the method comprising:

transmitting, by a transceiver in the apparatus, a message to an object over a time slotted channel of a wireless network, wherein the object is within a short-range wireless communication area of the apparatus and the apparatus is operating in a short-range messaging state;

transmitting, by the transceiver, an inquiry message to two or more other objects from the apparatus to determine whether it is within the short-range wireless communication area of the apparatus, wherein the inquiry message is communicated via another time slotted channel of the wireless network within the short-range wireless communication area of the apparatus and the apparatus stays in communication with the object; and receiving, by the transceiver in the apparatus, a response message from at least one of the two or more other objects to the inquiry message via the another time slotted channel of the wireless network if the at least one of the two or more other objects is set to respond.

2. The method of claim 1, wherein the apparatus, object, and the two or more other objects are mobile telephones.

3. The method of claim 1, further comprising:
generating a list by the apparatus that includes the at least one of the two or more other objects based on the receiving the response message therefrom; and
displaying the list identifying the at least one of the two or more other objects using a graphical user interface.

4. The method of claim 1, further comprising:
receiving, by the transceiver, a different inquiry message from a different object; and
responding to the different inquiry message if the apparatus is set to respond.

5. The method of claim 1, wherein the receiving comprises receiving the response message from the at least one of the two or more other objects via the another time slotted channel if user authorization is provided by the at least one of the two or more other objects.

6. The method of claim 1, wherein the receiving comprises choosing a selected channel for further communication with the at least one of the two or more other objects.

7. The method of claim 1, wherein the another time slotted channel is a control channel that is accessed for a predetermined period of time.

8. The method of claim 1, further comprising communicating by the apparatus with the at least one of the two or more other objects subsequent to a security procedure requiring user input.

9. The method of claim 1, further comprising downloading data by the apparatus from the at least one of the two or more other objects to the apparatus.

10. The method of claim 1, wherein the time slotted channel and the another time slotted channel each comprise two or more frequencies.

11. An apparatus for short-range wireless communication, the apparatus comprising:
a transceiver configured to:
transmit a message to an object over a time slotted channel of a wireless network, wherein the object is within a short-range wireless communication area of the apparatus and the apparatus is operating in a short-range messaging state;
transmit an inquiry message to two or more other objects from the apparatus to determine whether it is within the short-range wireless communication area of the apparatus, wherein the inquiry message is communicated via another time slotted channel of the wireless network within the short-range wireless communication area of the apparatus and the apparatus is configured to stay in communication with the object; and
receive a response message from at least one of the two or more other objects to the inquiry message via the another time slotted channel of the wireless network if the at least one of the two or more other objects is set to respond; and
at least one antenna coupled to the transceiver.

12. The apparatus of claim 11, wherein the apparatus is a mobile telephone.

13. The apparatus of claim 11, further comprising:
circuitry configured to generate a list that includes the at least one of the two or more other objects based on the receiving the response message therefrom; and
circuitry configured to display the list identifying the at least one of the two or more other objects using a graphical user interface.

14. The apparatus of claim 11, wherein the transceiver is further configured to:
receive a different inquiry message from a different object; and
respond to the different inquiry message if the apparatus is set to respond.

15. The apparatus of claim 11, wherein the transceiver is further configured to receive the response message from the at least one of the two or more other objects via the another time slotted channel if user authorization is provided by the at least one of the two or more other objects.

16. The apparatus of claim 11, wherein the transceiver is further configured to receive further comprises choosing a selected channel for further communication with the at least one of the two or more other objects.

17. The apparatus of claim 11, wherein the another time slotted channel is a control channel that is accessed for a predetermined period of time.

18. The apparatus of claim 11, wherein the transceiver is further configured to communicate by the apparatus with the at least one of the two or more other objects subsequent to a security procedure requiring user input.

19. The apparatus of claim 11, wherein the transceiver is further configured to download data from the at least one of the two or more other objects to the apparatus.

20. The apparatus of claim 11, wherein the time slotted channel and the another time slotted channel each comprise two or more frequencies.

* * * * *

UNITED STATES PATENT AND TRADEMARK OFFICE
CERTIFICATE OF CORRECTION

| | | |
|---|---|---|
| PATENT NO. | : 8,265,691 B2 | |
| APPLICATION NO. | : 13/230458 | |
| DATED | : September 11, 2012 | |
| INVENTOR(S) | : Mauney et al. | |

It is certified that error appears in the above-identified patent and that said Letters Patent is hereby corrected as shown below:

In Fig. 4A, Sheet 4 of 72, for Tag "63", in Line 1, delete "TRANSMITER/" and insert -- TRANSMITTER/ --, therefor.

In Fig. 6B, Sheet 8 of 72, delete " 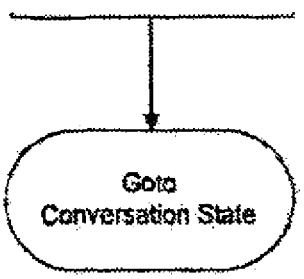 " and insert -- 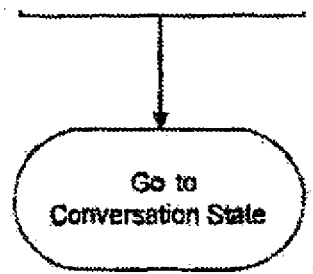 --, therefor.

In Fig. 8, Sheet 14 of 72, delete " 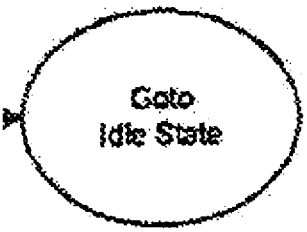 " and

Signed and Sealed this
Nineteenth Day of March, 2013

Teresa Stanek Rea
*Acting Director of the United States Patent and Trademark Office*

CERTIFICATE OF CORRECTION (continued)
U.S. Pat. No. 8,265,691 B2 insert -- 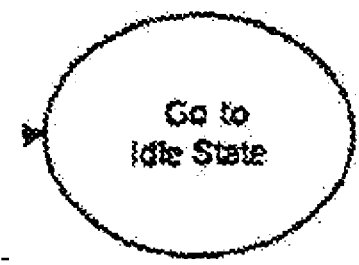 --, therefor.

In Column 1, Line 42, delete "Complimentary" and insert -- Complementary --, therefor.

In Column 1, Line 50, delete "Mobile." and insert -- Mobile --, therefor.

In Column 1, Line 56, delete "(PCS)" and insert -- (PCSs) --, therefor.

In Column 1, Line 57, delete "(PHS)" and insert -- (PHSs) --, therefor.

In Column 2, Line 25, delete "(PCS)" and insert -- (PCSs) --, therefor.

In Column 3, Line 64, delete "phone" and insert -- mobile identification --, therefor.

In Column 4, Line 56, delete "(PCS)" and insert -- (PCSs) --, therefor.

In Column 5, Line 15, delete "radio," and insert -- radio --, therefor.

In Column 5, Line 17, delete "commination" and insert -- communications --, therefor.

In Column 5, Line 22, delete "do," and insert -- do --, therefor.

In Column 11, Line 59, delete "an Short" and insert -- a Short --, therefor.

In Column 14, Line 25, delete "Complimentary" and insert -- Complementary --, therefor.

In Column 14, Line 60, delete "monthly," and insert -- monthly --, therefor.

In Column 14, Line 64, delete "to," and insert -- to --, therefor.

In Column 17, Line 1, delete "circuitry," and insert -- circuitry --, therefor.

In Column 22, Line 58, after Equation, insert -- . --.

In Column 25, Line 63, delete "directly," and insert -- directly --, therefor.

In Column 26, Line 17, under "TABLE 1", delete "Intitiate" and insert -- Initiate --, therefor.

In Column 28, Line 39, delete "configure," and insert -- configure --, therefor.

In Column 30, Line 4, after Equation, insert -- . --.

In Column 33, Line 40, delete "registry," and insert -- registry --, therefor.

In Column 37, Line 18, delete "logic," and insert -- logic --, therefor.

CERTIFICATE OF CORRECTION (continued)
U.S. Pat. No. 8,265,691 B2

In Column 46, Line 45, delete "step," and insert -- step --, therefor.

In Column 49, Line 67, delete "any," and insert -- any --, therefor.

In Column 51, Line 27, after Equation, insert -- . --.

In Column 52, Line 8, delete "proximity," and insert -- proximity --, therefor.

In Column 56, Line 56, delete "along" and insert -- long --, therefor.

In Column 58, Line 19, delete "way," and insert -- way --, therefor.

In Column 58, Line 53, delete "frequency," and insert -- frequency --, therefor.

In Column 59, Line 5, after Equation, insert -- . --.

In Column 61, Line 1, delete "or," and insert -- or --, therefor.

In Column 63, Line 30, delete "at," and insert -- at --, therefor.

In Column 73, Line 17, delete "Up" and insert -- up --, therefor.

In Column 74, Line 34, delete "channel the" and insert -- channel. If the --, therefor.

In Column 77, Line 57, delete "wailing" and insert -- waiting --, therefor.

In Column 78, Line 47, delete "to," and insert -- to --, therefor.

In Column 84, Line 23, delete "R" and insert -- B --, therefor.

In Column 86, Line 14, delete "an a" and insert -- on a --, therefor.